US008886931B2

(12) United States Patent
Matsunaka et al.

(10) Patent No.: US 8,886,931 B2
(45) Date of Patent: Nov. 11, 2014

(54) KEY SHARING SYSTEM, COMMUNICATION TERMINAL, MANAGEMENT DEVICE, KEY SHARING METHOD, AND COMPUTER PROGRAM

(75) Inventors: Takashi Matsunaka, Fujimino (JP); Yoji Kishi, Fujimino (JP); Takayuki Warabino, Fujimino (JP)

(73) Assignee: KDDI Corporation, Tokyo (JP)

( * ) Notice: Subject to any disclaimer, the term of this patent is extended or adjusted under 35 U.S.C. 154(b) by 246 days.

(21) Appl. No.: 13/254,469

(22) PCT Filed: Mar. 3, 2010

(86) PCT No.: PCT/JP2010/001475
§ 371 (c)(1),
(2), (4) Date: Sep. 2, 2011

(87) PCT Pub. No.: WO2010/100923
PCT Pub. Date: Sep. 10, 2010

(65) Prior Publication Data
US 2011/0320815 A1    Dec. 29, 2011

(30) Foreign Application Priority Data
Mar. 3, 2009    (JP) .................. 2009-049839
Jan. 22, 2010    (JP) .................. 2010-012628

(51) Int. Cl.
*H04W 12/04*    (2009.01)
*H04L 9/08*    (2006.01)

(52) U.S. Cl.
CPC ............. *H04L 9/0891* (2013.01); *H04W 12/04* (2013.01); *H04L 9/0833* (2013.01); *H04L 9/085* (2013.01); *H04L 2209/80* (2013.01)
USPC ............ 713/163; 380/270; 380/277; 713/168

(58) Field of Classification Search
USPC .......................................... 713/168; 380/279
See application file for complete search history.

(56) References Cited

U.S. PATENT DOCUMENTS 6,813,357 B1 * 11/2004 Matsuzaki et al. ............ 380/279
2007/0248232 A1   10/2007 Driscoll et al.
2009/0041249 A1   2/2009 Tanaka et al.

FOREIGN PATENT DOCUMENTS

| CN | 1801705 A | 7/2006 |
| CN | 101150404 A | 3/2008 |
| CN | 101166089 A | 4/2008 |

(Continued)

OTHER PUBLICATIONS

Shamir, "How to Share a Secret", Communications of the ACM, vol. 22, No. 11, pp. 612-613, Nov. 1979.

(Continued)

*Primary Examiner* — Gilberto Barron, Jr.
*Assistant Examiner* — Devin Almeida
(74) *Attorney, Agent, or Firm* — Morgan, Lewis & Bockius LLP

(57) ABSTRACT

In a case where another user's communication terminal (nTE$_1$13) departs from a group, user's communication terminal (TE$_b$14) updates encryption information, using the terminal individual information of only the communication terminals (nTE$_2$13 and nTE$_3$13) which remain in the group (PN$_y$). User's communication terminal (TE$_b$14) encrypts the PN-shared key (KPN$_y$), using the updated encryption information. User's communication terminal (TE$_b$14) transmits the encrypted shared key information obtained from this encryption to a management device (PNSP11), and updates the encrypted shared key information stored in the management device (PNSP11).

22 Claims, 95 Drawing Sheets

(56) References Cited

FOREIGN PATENT DOCUMENTS

| JP | 2000-196581 | 7/2000 |
|---|---|---|
| JP | 2000196580 A | 7/2000 |
| JP | 2008-259139 | 10/2008 |

OTHER PUBLICATIONS

Mu et al., "Robust and Secure Broadcasting", INDOCRYPT 2001, LNCS 2247, pp. 223-231, 2001.

Matsunaka et al., "Device Authentication and Registration Method Assisted by a Cellular System for User-driven Service Creation Architecture", Proceedings of the 6th IEEE Consumer Communication and Networking Conference, pp. 1-5, Feb. 18, 2009.

Matsunaka et al., "An Authentication Method for a User-driven Service Creation Platform Assisted by Cellular Systems", IEICE Technical Report, vol. 108, No. 44, pp. 7-12, May 2008.

Zhang et al., "A Novel Dynamic Key Management Scheme for Secure Multicasting", Proceedings of the 11th IEEE International Conference on Networks 2003, pp. 391-395, 2004.

International Search Report with translation from counterpart PCT/JP2010/001475 dated Jun. 8, 2010.

KIPO: Office Action for Korean Patent Application No. KR 10-2011-7021565—Issued on May 8, 2013—Including English Translation of Office Action.

CN Office Action dated Nov. 4, 2013 (with translation of only a part of Search Report.).

Chinese Office Action issued in Chinese Patent Application No. 201080020002.7 on Jul. 3, 2014.

* cited by examiner

KEY SHARING SYSTEM, COMMUNICATION TERMINAL, MANAGEMENT DEVICE, KEY SHARING METHOD, AND COMPUTER PROGRAM

The present application is a national stage of PCT International Application No. PCT/JP2010/001475, filed on Mar. 3, 2010, and claims the benefit of Japanese Patent Application Number's 2009-049839, filed Mar. 3, 2009, and 2010-012628, filed Jan. 22, 2010.

TECHNICAL FIELD

The present invention relates to a key sharing system, a communication terminal, a management device, a key sharing method, and a computer program.

BACKGROUND ART

Heretofore, as a technique for sharing a key among a plurality of devices, a technique disclosed in Patent Document 1 has been known for example. In the conventional technique disclosed in Patent Document 1, in a system for user terminals having an access privilege to certain data to securely share a key for obtaining this access privilege, a management device holds encrypted key information for all user terminals, and when revoking the access privilege of a certain user terminal, it deletes the encrypted key information of this user terminal.

Moreover, Non-Patent Document 1 discloses one technique of a secret sharing scheme called a (k, n) threshold secret sharing scheme. A secret sharing scheme is a technique in which secret information is divided into several pieces that are distributed and stored, to thereby securely store the original secret information. In the (k, n) threshold secrete sharing scheme, provided that original information is divided into n pieces of information (shares) and stored, and k or more pieces of them can be obtained, the original data can be restored.

Moreover, Non-Patent Document 2 discloses a broadcast encryption type technique in which users eligible for subscribing contents on fee-based broadcasting are restricted to a limited number of users such as service subscribers. In the conventional technique disclosed in Non-Patent Document 2, a contents provider encrypts contents in a form to allow only a specified user group to decrypt the contents, based on key information distributed to all users.

PRIOR ART DOCUMENTS

Patent Documents

[Patent Document 1] Japanese Unexamined Patent Application, First Publication No. 2008-259139

Non-Patent Documents

[Non-Patent Document 1] A. Shamir, "*How to share a secret*", Communications of the ACM, Vol. 22, No. 11, pp. 612-613, 1979

[Non-Patent Document 2] Yi Mu and Vijay Varadharajan, "*Robust and secure broadcasting*", in Indocrypt 2001, 2001

[Non-Patent Document 3] T. Matsunaka, T. Warabno, Y. Kishi, K. Nakauchi, T. Umezawa and M. Inoue, "*Device Authentication and Registration Method Assisted by a Cellular System for User-driven Service Creation Architecture*", in CCNC (Consumer Communication Networking and Conference) 2009, 2009

DISCLOSURE OF INVENTION

Problems to be Solved by the Invention

However, in the conventional technique disclosed in Patent Document 1 above, the management device needs to store encrypted key information for all user terminals, and information management load on the management device becomes excessive. Moreover, in those cases where key information to be shared is distributed and stored respectively on the terminals and management device by means of the (k, n) threshold secret sharing scheme, when a terminal departs from a key sharing group, the distributed information stored in the management device and all terminals remaining in the key sharing group all need to be updated in order to invalidate the distributed information on the departing terminal, and load associated with this update becomes excessive.

The present invention takes into consideration the above circumstances, with an object of providing a key sharing system capable of reducing the amount of encrypted key information stored in a management device, and capable, when a terminal departs from a key sharing group, of invalidating key information on the terminal departing from the key sharing group, without the need for updating key information stored in terminals remaining in the key sharing group.

Means for Solving the Problem

In order to solve the above problem, the present invention takes the following measures.

A key sharing system according to one of the measures is a key sharing system with communication terminals which belong to a same group, and a management device which holds information for sharing a group shared key among the communication terminals. A first communication terminal among the communication terminals comprises: a group shared key storage device that stores the group shared key; a terminal individual information generation device that generates terminal individual information individually for each second communication terminal among the communication terminals; a terminal individual information storage device that stores the terminal individual information; a terminal key information generation device that generates terminal key information individually for each of the second communication terminals, using the terminal individual information; a terminal key information transmission device that transmits the terminal key information to the second communication terminals; an encryption information generation device that generates common encryption information for the second communication terminals, using the terminal individual information; an encryption device that encrypts the group shared key, using the encryption information; and an encrypted shared key information transmission device that transmits the encrypted shared key information obtained in the encryption to the management device. The management device comprises: an encrypted shared key information receiving device that receives encrypted shared key information from the first communication terminal; an encrypted shared key information storage device that stores the received encrypted shared key information; and an encrypted shared key information transmission device that transmits encrypted shared key information stored in the encrypted shared key information storage device to the second communication terminal. The second communication terminal comprises: a terminal key information receiving device that receives terminal key information from the first communication terminal; an encrypted shared key information receiving device that receives encrypted shared key information from the management device; and a decryption device that restores the group shared key, using the received terminal key information and the received encrypted shared key information. When a situation arises where any of the second communication terminals departs from the group, the first communication terminal: updates the encryption information, using the terminal individual information of only the second communication terminals remaining in the group; transmits encrypted shared key information, in which the group shared key is encrypted using the updated encryption information, to the management device; and updates the encrypted shared key information to be stored in the management device.

A communication terminal according to another measure is the communication terminal (first communication terminal) in a key sharing system with communication terminals which belong to a same group, and a management device which holds information for sharing a group shared key among the communication terminals. The communication terminal comprises: a group shared key storage device that stores the group shared key; a terminal individual information generation device that generates terminal individual information individually for each second communication terminal among the communication terminals; a terminal individual information storage device that stores the terminal individual information; a terminal key information generation device that generates terminal individual information individually for each of the second communication devices, using the terminal individual information; a terminal key information transmission device that transmits the terminal key information to the second communication terminal; an encryption information generation device that generates common encryption information for the second communication terminals, using the terminal individual information; an encryption device that encrypts the group shared key, using the encryption information; and an encrypted shared key information transmission device that transmits the encrypted shared key information obtained by the above encryption to the management device. When a situation arises where any of the second communication terminals departs from the group, the encryption information is updated using the terminal individual information of only the second communication terminals remaining in the group, encrypted shared key information in which the group shared key is encrypted using the updated encryption information, is transmitted to the management device, and the encrypted shared key information to be stored in the management device is updated.

A key sharing method according to another measure is a key sharing method in a key sharing system with communication terminals which belong to a same group, and a management device which holds information for sharing a group shared key among the communication terminals. The key sharing method includes: a step in which a first communication terminal among the communication terminals stores the group shared key in a storage device; a step in which the first communication terminal generates terminal individual information individually for each second communication terminal among the communication terminals; a step in which the first communication terminal stores the terminal individual information in the storage device; a step in which the first communication terminal generates terminal key information individually for each of the second communication terminals, using the terminal individual information; a step in which the first communication terminal transmits the terminal key information to the second communication terminal; a step in which the first communication terminal generates common encryption information for the second communication terminals, using the terminal individual information; a step in which the first communication terminal encrypts the group shared key, using the encryption information; a step in which the first communication terminal transmits the encrypted shared key information obtained from the encryption to the management device; a step in which the management device receives the encrypted shared key information from the first communication terminal; a step in which the management device stores the received encrypted shared key information in the storage device; a step in which the management device transmits the encrypted shared key information stored in the storage device to the second communication terminal; a step in which the second communication terminal receives the terminal key information from the first communication terminal; a step in which the second communication terminal receives the encrypted shared key information from the management device; a step in which the second communication terminal restores the group shared key, using the received terminal key information and the received encrypted shared key information; a step in which when a situation arises where any of the second communication terminals departs from the group, the first communication terminal updates the encryption information, using the terminal individual information of only the second communication terminal remaining in the group; a step in which the first communication terminal transmits the encrypted shared key information, in which the group shared key is encrypted using the updated encryption information, to the management device; and a step in which the management device updates the encrypted shared key information stored in the storage device, using the encrypted shared key information received from the first communication terminal.

A computer program according to another measure is a computer program for performing a key sharing process of the communication terminal (first communication terminal) in a key sharing system with communication terminals which belong to a same group, and a management device which holds information for sharing a group shared key among the communication terminals. The computer program includes steps of: storing the group shared key in a storage device; generating terminal individual information individually for each second communication terminal among the communication terminals; storing the terminal individual information in the storage device; generating terminal key information individually for each of the second communication terminals, using the terminal individual information; transmitting the terminal key information to the second communication terminal; generating common encryption information for the second communication terminals, using the terminal individual information; encrypting the group shared key, using the encryption information; transmitting the encrypted shared key information obtained from the encryption to the management device; updating, when a situation arises where any of the second terminals departs from the group, the encryption information, using the terminal individual information of only the second communication terminals remaining in the group; and transmitting the encrypted shared key information, in which the group shared key is encrypted using the updated encryption information, to the management device, and updating the encrypted shared key information stored in the management device.

As a result, the aforementioned communication terminal (first communication terminal) can be realized, using a computer.

A key sharing system according to another measure is a key sharing system with communication terminals which belong to a same group, and a management device which holds information for sharing a group shared key among the communication terminals. A third communication terminal among the communication terminals has a distributed key supply device that generates first and second distributed keys from the group shared key, supplying the first distributed key to the management device, and supplying the second distributed key to a first communication terminal among the communication terminals. The first communication terminal among the communication terminals has: a distributed key storage device that stores the second distributed key; a terminal individual information generation device that generates terminal individual information individually for each of the second communication terminals among the communication terminals; a terminal individual information storage device that stores the terminal individual information; a terminal key generation device that generates terminal key information individually for each of the second communication terminals, using the terminal individual information; a terminal key information transmission device that transmits the terminal key information to the second communication terminals; an encryption information generation device that generates common encryption information for the second communication terminals, using the terminal individual information; an encryption device that encrypts the second distributed key, using the encryption information; and an encrypted distributed key information transmission device that transmits the encrypted distributed key information obtained from the encryption to the management device. The management device has: an encrypted distributed key information receiving device that receives encrypted distributed key information from the first communication terminal; an encrypted distributed key information storage device that stores the received encrypted distributed key information; a distributed key storage device that stores the first distributed key; an encrypted distributed key information transmission device that transmits the encrypted distributed key information stored in the encrypted distributed key information storage device to the second communication terminal; and a distributed key transmission device that transmits the first distributed key stored in the distributed key storage device to the second communication terminal. The second communication terminal has: a terminal key information receiving device that receives terminal key information from the first communication terminal; an encrypted distributed key information receiving device that receives encrypted distributed key information from the management device; a distributed key receiving device that receives the first distributed key from the management device; a decryption device that restores the second distributed key, using the received terminal key information and the received encrypted distributed key information; and a distributed key combining device for combining the received first distributed key and the restored second distributed key to restore the group shared key. When a situation arises where any of the second communication terminals departs from the group, the first communication terminal uses the terminal individual information of only the second communication terminals remaining in the group to update the encryption information, transmits the encrypted distributed key information, in which the second distributed key is encrypted using the updated encryption information, to the management device, and updates the encrypted distributed key information stored in the management device.

The key sharing system according to the above measure is characterized in that the distributed key supply device generates the first and second distributed keys from the group shared key by means of a secret sharing scheme.

The key sharing system according to the above measure is characterized in that the distributed key supply device generates the first and second distributed keys from the group shared key by means of exclusive-OR.

A communication terminal according to another measure is the communication terminal (first communication terminal) in a key sharing system with communication terminals which belong to a same group, and a management device which holds information for sharing a group shared key among the communication terminals. The communication terminal comprises: a distributed key storage device that stores a second distributed key of the group shared key; a terminal individual information generation device that generates terminal individual information individually for each second communication terminal among the communication terminals; a terminal individual information storage device that stores the terminal individual information; a terminal key information generation device that generates terminal individual information individually for each of the second communication devices, using the terminal individual information; a terminal key information transmission device that transmits terminal key information to the second communication terminal; an encryption information generation device that generates common encryption information for the second communication terminals, using the terminal individual information; an encryption device that encrypts the second distributed key, using the encryption information; and an encrypted distributed key information transmission device that transmits the encrypted distributed key information obtained by the above encryption to the management device. When a situation arises where any of the second communication terminals departs from the group, the encryption information is updated using the terminal individual information of only the second communication terminals remaining in the group, encrypted distributed key information in which the second distributed key is encrypted using the updated encryption information, is transmitted to the management device, and the encrypted distributed key information to be stored in the management device is updated.

A key sharing method according to another measure is a key sharing method in a key sharing system with communication terminals which belong to a same group, and a management device which holds information for sharing a group shared key among the communication terminals. The key sharing method includes: a step in which a third communication terminal among the communication terminals generates a first and second distributed key from the group shared key; a step in which the third communication terminal supplies the first distributed key to the management device, and supplies the second distributed key to a first communication terminal among the communication terminals; a step in which the first communication terminal among the communication terminals stores the second distributed key of the group shared key to a storage device; a step in which the first communication terminal generates terminal individual information individually for each of the second communication terminals among the communication terminals; a step in which the first communication terminal stores the terminal individual information in the storage device; a step in which the first communication terminal generates terminal key information individually for each of the second communication terminals, using the terminal individual information; a step in which the first communication terminal transmits the terminal key information to the second communication terminal; a step in which the first communication terminal generates common encryption information for the second communication terminals, using the terminal individual information; a step in which the first communication terminal encrypts the second distributed key, using the encryption information; a step in which the first communication terminal transmits encrypted distributed key information obtained from the above encryption to the management device; a step in which the management device receives the encrypted distributed key information from the first communication terminal; a step in which the management device stores the received encrypted distributed key information in the storage device; a step in which the management device stores the first distributed key of the group shared key in the storage device; a step in which the management device transmits the encrypted distributed key information stored in the storage device to the second communication terminal; a step in which the management device transmits the first distributed key stored in the storage device to the second communication terminal; a step in which the second communication terminal receives the terminal key information from the first communication terminal; a step in which second communication terminal receives the encrypted distributed key information from the management device; a step in which the second communication terminal receives the first distributed key from the management device; a step in which the second communication terminal restores the second distributed key, using the received terminal key information and the received encrypted distributed key information; a step in which the second communication terminal restores the group shared key, combining the received first distributed key and the restored second distributed key; a step in which when a situation arises where any of the second communication terminals departs from the group, the first communication terminal updates the encryption information, using the terminal individual information of only the second communication terminals remaining in the group; a step in which the first communication terminal transmits the encrypted distributed key information, in which the second distributed key is encrypted using the updated encryption information, to the management device; and a step in which the management device updates the encrypted distributed key information stored in the storage device, using the encrypted distributed key information received from the first communication terminal.

A computer program according to another measure is a computer program for performing a key sharing process of the communication terminal (first communication terminal) in a key sharing system with communication terminals which belong to a same group, and a management device which holds information for sharing a group shared key among the communication terminals. The computer program includes steps of: storing a second distributed key of the group shared key in a storage device; generating terminal individual information individually for each second communication terminal among the communication terminals; storing the terminal individual information in the storage device; generating terminal key information individually for each of the second communication terminals, using the terminal individual information; transmitting the terminal key information to the second communication terminal; generating common encryption information for the second communication terminals, using the terminal individual information; encrypting the second distributed key, using the encryption information; transmitting the encrypted distributed key information obtained from the encryption to the management device; updating, when a situation arises where any of the second terminals departs from the group, the encryption information, using the terminal individual information of only the second communication terminals remaining in the group; and transmitting the encrypted distributed key information, in which the second distributed key is encrypted using the updated encryption information, to the management device, and updating the encrypted distributed key information stored in the management device.

As a result, the aforementioned communication terminal (first communication terminal) can be realized, using a computer.

A key sharing system according to another measure is a key sharing system with communication terminals which belong to a same group and a management device. A first communication terminal among the communication terminals comprises: a terminal individual information generation device that generates terminal individual information individually for each second communication terminal among the communication terminals; a terminal individual information storage device that stores the terminal individual information; a terminal key information generation device that generates terminal key information individually for each of the second communication terminals, using the terminal individual information; a terminal key information transmission device that transmits the terminal key information to the second communication terminal; an encryption information generation device that generates common encryption information for the second communication terminals, using the terminal individual information; and an encryption information transmission device that transmits the encryption information to the management device. The management device comprises: an encryption information receiving device that receives the encryption information from the first communication terminal; an encryption device that encrypts a group shared key of the group, using the encryption information; an encrypted shared key information storage device that stores the encrypted shared key information obtained from the encryption; and an encrypted shared key information transmission device that transmits the encrypted shared key information to the second communication terminal. The second communication terminal comprises: a terminal key information receiving device that receives terminal key information from the first communication terminal; an encrypted shared key information receiving device that receives encrypted shared key information from the management device; and a decryption device that restores the group shared key, using the received terminal key information and the received encrypted shared key information. When a situation arises where any of the second communication terminals departs from the group, the first communication terminal updates the encryption information, using the terminal individual information of only the second communication terminals remaining in the group, and transmits the updated encryption information to the management device.

The key sharing system is characterized in that the management device is provided with a group shared key generation device that generates a group shared key of the group.

A communication terminal according to another measure is the communication terminal (first communication terminals which belong to a same group and a key encryption device, characterized in that there are provided: a terminal individual information generation device that generates terminal individual information individually for each second communication terminal among the communication terminals; a terminal individual information storage device that stores the terminal individual information; a terminal key information generation device that generates terminal key information individually for each of the n terminal) in a key sharing system with communication second communication terminals, using the terminal individual information; a terminal key information transmission device that transmits the terminal key information to the second communication terminal; an encryption information generation device that generates common encryption information for the second communication terminals, using the terminal individual information; and an encryption information transmission device that transmits the encryption information to the key encryption device. When a situation arises where any of the second communication terminals departs from the group, the communication terminal updates encryption information using the terminal individual information of only the second communication terminals remaining in the group, and transmits the updated encryption information to the key encryption device.

A management device according to another measure is a management device in a key sharing system with communication terminals which belong to a same group and a management device, characterized in that there are provided: an encryption information receiving device that receives encryption information from a first communication terminal among the communication terminals; an encryption device that encrypts a group shared key of the group, using the encryption information; an encrypted shared key information storage device that stores the encrypted shared key information obtained from the encryption; and an encrypted shared key information transmission device that transmits the encrypted shared key information to the second communication terminal among the communication terminals.

The management device is characterized as being provided with a group shared key generation device that generates a group shared key of the group.

A key sharing system according to another measure is a key sharing system with communication terminals which belong to a same group and a management device, characterized in that the management device comprises: a group shared key generation device that generates a group shared key of the group; and a group shared key transmission device that transmits the group shared key to a first communication terminal among the communication terminals. The first communication terminal comprises: a group shared key receiving device that receives the group shared key from the management device; a terminal individual information generation device that generates terminal individual information individually for each second communication terminal among the communication terminals; a terminal individual information storage device that stores the terminal individual information; a terminal key information generation device that generates terminal key information individually for each of the second communication terminals, using the terminal individual information; a terminal key information transmission device that transmits the terminal key information to the second communication terminal; an encryption information generation device that generates common encryption information for the second communication terminals, using the terminal individual information; an encryption device that encrypts the group shared key, using the encryption information; an encrypted shared key information storage device that stores encrypted shared key information obtained from the encryption; and an encrypted shared key information transmission device that transmits the encrypted shared key information to the second communication terminal. The second communication terminal comprises: a terminal key information receiving device that receives terminal key information from the first communication terminal; an encrypted shared key information receiving device that receives encrypted shared key information from the first communication terminal; and a decryption device that restores the group shared key, using the received terminal key information and the received encrypted shared key information. When a situation arises where any of the second communication terminals departs from the group, the first communication terminal updates encryption information, using the terminal individual information of only the second communication terminals remaining in the group.

A communication terminal according to another measure is the communication terminal (first communication terminal) in a key sharing system with communication terminals which belong to a same group and a group shared key transmission device, characterized in that there are provided: a group shared key receiving device that receives a group shared key of the group from the group shared key transmission device; a terminal individual information generation device that generates terminal individual information individually for each second communication terminal among the communication terminals; a terminal individual information storage device that stores the terminal individual information; a terminal key information generation device that generates terminal key information individually for each of the second communication terminals, using the terminal individual information; a terminal key information transmission device that transmits the terminal key information to the second communication terminal; an encryption information generation device that generates common encryption information for the second communication terminals, using the terminal individual information; an encryption device that encrypts the group shared key, using the encryption information; an encrypted shared key information storage device that stores the encrypted shared key information obtained from the encryption; and an encrypted shared key information transmission device that transmits the encrypted shared key information to the second communication terminal. When a situation arises where any of the second communication terminals departs from the group, the first communication terminal updates encryption information, using the terminal individual information of only the second communication terminals remaining in the group.

A management device according to another measure is the management device in a key sharing system with communication terminals which belong to a same group and a management device, characterized in that the management device is provided with a group shared key generation device that generates a group shared key of the group, and a group shared key transmission device that transmits the group shared key to a first communication terminal among the communication terminals.

A key sharing system according to another measure is a key sharing system with a first communication terminal, second communication terminals, and a third communication terminal which belong to a same group, characterized in that the first communication terminal comprises: a terminal individual information generation device that generates terminal individual information individually for each second communication terminal; a terminal individual information storage device that stores the terminal individual information; a terminal key information generation device that generates terminal key information individually for each of the second communication terminals, using the terminal individual information; a terminal key information transmission device that transmits the terminal key information to the second communication terminal; an encryption information generation device that generates common encryption information for the second communication terminals, using the terminal individual information; and an encryption information transmission device that transmits the encryption information to the third communication terminal. The third communication terminal comprises: an encryption information receiving device that receives the encryption information from the first communication terminal; an encryption device that encrypts a group shared key of the group, using the encryption information; an encrypted shared key information storage device that stores encrypted shared key information obtained from the encryption; and an encrypted shared information transmission device that transmits the encrypted shared key information to the second communication terminal. The second communication terminal comprises: a terminal key information receiving device that receives terminal key information from the first communication terminal; an encrypted shared key information receiving device that receives encrypted shared key information from the third communication terminal; and a decryption device that restores the group shared key, using the received terminal key information and the received encrypted shared key information. When a situation arises where any of the second communication terminals departs from the group, the first communication terminal updates encryption information using the terminal individual information of only the second communication terminals remaining in the group, and transmits the updated encryption information to the third communication terminal.

A communication terminal according to another measure is the third communication terminal in a key sharing system with a first communication terminal, second communication terminals, and a third communication terminal which belong to a same group, and an encrypted shared key information receiving device for supplying encrypted shared key information to the second communication terminal, characterized in that there are provided: an encryption information receiving device that receives encryption information from the first communication terminal; an encryption device that encrypts a group shared key of the group, using the encryption information; an encrypted shared key information storage device that stores encrypted shared key information obtained from the encryption; and an encrypted shared key information transmission device that transmits the encrypted shared key information to the encrypted shared key information receiving device.

A key sharing system according to another measure is a key sharing system with a first communication terminal, second communication terminals, and a third communication terminal which belong to a same group, characterized in that the third communication terminal comprises: a group shared key generation device that generates a group shared key of the group; and a group shared key transmission device that transmits the group shared key to the first communication terminal. The first communication terminal comprises: a group shared key receiving device that receives the group shared key from the third communication terminal; a terminal individual information generation device that generates terminal individual information individually for each of the second communication terminals; a terminal individual information storage device that stores the terminal individual information; a terminal key information generation device that generates terminal key information individually for each of the second communication terminals, using the terminal individual information; a terminal key information transmission device that transmits the terminal key information to the second communication terminal; an encryption information generation device that generates common encryption information for the second communication terminals, using the terminal individual information; an encryption device that encrypts the group shared key, using the encryption information; an encrypted shared key information storage device that stores encrypted shared key information obtained from the encryption; and an encrypted shared key information transmission device that transmits the encrypted shared key information to the second communication terminal. The second communication terminal comprises: a terminal key information receiving device that receives terminal key information from the first communication terminal; an encrypted shared key information receiving device that receives encrypted shared key information from the first communication terminal; and a decryption device that restores the group shared key, using the received terminal key information and the received encrypted shared key information. When a situation arises where any of the second communication terminals departs from the group, the first communication terminal updates encryption information, using the terminal individual information of only the second communication terminals remaining in the group.

A communication terminal according to another measure is the third communication terminal in a key sharing system with a first communication terminal, second communication terminals, and a third communication terminal which belong to a same group, characterized in that there are provided: a group shared key generation device that generates a group shared key of the group; and a group shared key transmission device that transmits the group shared key to the first communication terminal.

A key sharing system according to another measure is a key sharing system with a first communication terminal, second communication terminals, and a third communication terminal which belong to a same group, and a management device, characterized in that the first communication terminal comprises: a terminal individual information generation device that generates terminal individual information individually for each second communication terminal; a terminal individual information storage device that stores the terminal individual information; a terminal key information generation device that generates terminal key information individually for each of the second communication terminals, using the terminal individual information; a terminal key information transmission device that transmits the terminal key information to the second communication terminal; an encryption information generation device that generates common encryption information for the second communication terminals, using the terminal individual information; and an encryption information transmission device that transmits the encryption information to the third communication terminal. The third communication terminal comprises: an encryption information receiving device that receives the encryption information from the first communication terminal; an encryption device that encrypts a group shared key of the group, using the encryption information; an encrypted shared key information storage device that stores encrypted shared key information obtained from the encryption; and an encrypted shared information transmission device that transmits the encrypted shared key information to the management device. The management device comprises: an encrypted shared key information receiving device that receives the encrypted shared key information from the third communication terminal; an encrypted shared key information storage device that stores the encrypted shared key information; and an encrypted shared key information transmitting device that transmits the encrypted shared key information to the second communication terminal. The second communication terminal comprises: a terminal key information receiving device that receives terminal key information from the first communication terminal; an encrypted shared key information receiving device that receives encrypted shared key information from the management device; and a decryption device that restores the group shared key, using the received terminal key information and the received encrypted shared key information. When a situation arises where any of the second communication terminals departs from the group, the first communication terminal updates encryption information using the terminal individual information of only the second communication terminals remaining in the group, and transmits the updated encryption information to the third communication terminal.

A management device according to another measure is the management device in a key sharing system with a first communication terminal, second communication terminals, and a third communication terminal which belong to a same group, and a management device, characterized in that there are provided: an encrypted shared key information receiving device that receives encrypted shared key information from the third communication terminal; an encrypted shared key information storage device that stores the encrypted shared key information; and an encrypted shared key information transmission device that transmits the encrypted shared key information to the second communication terminal.

A key sharing system according to another measure is a key sharing system with communication terminals which belong to a same group and a management device, wherein a first communication terminal among the communication terminals comprises: a terminal individual information generation device that generates terminal individual information individually for each second communication terminal among the communication terminals; a terminal individual information storage device that stores the terminal individual information; a terminal key information generation device that generates terminal key information individually for each of the second communication terminals, using the terminal individual information; a terminal key information transmission device that transmits the terminal key information to the second communication terminal; an encryption information generation device that generates common encryption information for the second communication terminals, using the terminal individual information; and an encryption information transmission device that transmits the encryption information to the management device. The management device comprises: an encryption information receiving device that receives the encryption information from the first communication terminal; an encryption device that encrypts a second distributed key among first and second distributed keys generated from a group shared key of the group, using the encryption information; an encrypted distributed key information storage device that stores encrypted distributed key information obtained from the encryption; an encrypted distributed key information transmission device that transmits the encrypted distributed key information to the second communication terminal; and a first distributed key transmission device that transmits the first distributed key to the second communication terminal. The second communication terminal comprises: a terminal key information receiving device that receives terminal key information from the first communication terminal; an encrypted distributed key information receiving device that receives encrypted distributed key information from the management device; a distributed key receiving device that receives the first distributed key from the management device; a decryption device that restores the second distributed key, using the received terminal key information and the received encrypted distributed key information; and a distributed key combining device that restores the group shared key, combining the received first distributed key and the restored second distributed key. When a situation arises where any of the second communication terminals departs from the group, the first communication terminal updates encryption information, using the terminal individual information of only the second communication terminals remaining in the group, and transmits the updated encryption information to the management device.

The key sharing system is characterized in that the management device is provided with a group shared key generation device that generates a group shared key of the group, and a distributed key generation device that generates first and second distributed keys from the group shared key.

A management device according to another measure is the management device in a key sharing system with communication terminals which belong to a same group and a management device, characterized in that there are provided: an encryption information receiving device that receives encryption information from a first communication terminal among the communication terminals; an encryption device that encrypts a second distributed key among first and second distributed keys generated from a group shared key of the group, using the encryption information; an encrypted distributed key information storage device that stores encrypted distributed key information obtained from the encryption; an encrypted distributed key information transmission device that transmits the encrypted distributed key information to a second communication terminal among the communication terminals; and a first distributed key transmission device that transmits the first distributed key to the second communication terminal.

The management device is characterized as being provided with a group shared key generation device that generates a group shared key of the group, and a distributed key generation device that generates first and second distributed keys from the group shared key.

A key sharing system according to another measure is a key sharing system with communication terminals which belong to a same group and a management device, characterized in that the management device comprises: a group shared key generation device that generates a group shared key of the group; a distributed key generation device that generates first and second distributed keys from the group shared key; and a distributed key transmission device that transmits the first and second distributed keys to a first communication terminal among the communication terminals. The first communication terminal comprises: a distributed key receiving device that receives the first and second distributed keys from the management device; a terminal individual information generation device that generates terminal individual information individually for each second communication terminal among the communication terminals; a terminal individual information storage device that stores the terminal individual information; a terminal key information generation device that generates terminal key information individually for each of the second communication terminals, using the terminal individual information; a terminal key information transmission device that transmits the terminal key information to the second communication terminal; an encryption information generation device that generates common encryption information for the second communication terminals, using the terminal individual information; an encryption device that encrypts the second distributed key, using the encryption information; an encrypted distributed key information storage device that stores encrypted distributed key information obtained from the encryption; an encrypted distributed key information transmission device that transmits the encrypted distributed key information to the second communication terminal; and a first distributed key transmission device that transmits the first distributed key to the second communication terminal. The second communication terminal comprises: a terminal key information receiving device that receives terminal key information from the first communication terminal; an encrypted distributed key information receiving device that receives encrypted distributed key information from the first communication terminal; a distributed key receiving device that receives the first distributed key from the first communication terminal; a decryption device that restores the second distributed key, using the received terminal key information and the received encrypted distributed key information; and a distributed key combining device that restores the group shared key, combining the received first distributed key and the restored second distributed key. When a situation arises where any of the second communication terminals departs from the group, the first communication terminal updates encryption information, using the terminal individual information of only the second communication terminals remaining in the group.

A communication terminal according to another measure is the communication terminal (first communication terminal) in a key sharing system with communication terminals which belong to a same group and a distributed key transmission device, characterized in that there are provided: a distributed key receiving device that receives first and second distributed keys generated from a group shared key of the group; a terminal individual information generation device that generates terminal individual information individually for each second communication terminal among the communication terminals; a terminal individual information storage device that stores the terminal individual information; a terminal key information generation device that generates terminal key information individually for each of the second communication terminals, using the terminal individual information; a terminal key information transmission device that transmits the terminal key information to the second communication terminal; an encryption information generation device that generates common encryption information for the second communication terminals, using the terminal individual information; an encryption device that encrypts the second distributed key, using the encryption information; an encrypted distributed key information storage device that stores the encrypted distributed key information obtained from the encryption; an encrypted distributed key information transmission device that transmits the encrypted distributed key information to the second communication terminal; and a first distributed key transmission device that transmits the first distributed key to the second communication terminal. When a situation arises where any of the second communication terminals departs from the group, encryption information is updated using the terminal individual information of only the second communication terminals remaining in the group.

A management device according to another measure is the management device in a key sharing system with communication terminals which belong to a same group and a management device, characterized in that the management device is provided with a group shared key generation device that generates a group shared key of the group, a distributed key generation device that generates first and second distributed keys from the group shared key, and a distributed key transmission device that transmits the first and second distributed keys to the first communication terminal among the communication terminals.

A key sharing system according to another measure is a key sharing system with a first communication terminal, second communication terminals, and a third communication terminal which belong to a same group, characterized in that the first communication terminal comprises: a terminal individual information generation device that generates terminal individual information individually for each second communication terminal; a terminal individual information storage device that stores the terminal individual information; a terminal key information generation device that generates terminal key information individually for each of the second communication terminals, using the terminal individual information; a terminal key information transmission device that transmits the terminal key information to the second communication terminal; an encryption information generation device that generates common encryption information for the second communication terminals, using the terminal individual information; and an encryption information transmission device that transmits the encryption information to the third communication terminal. The third communication terminal comprises: a group shared key generation device that generates a group shared key of the group; a distributed key generation device that generates first and second distributed keys from the group shared key; an encryption information receiving device that receives the encryption information from the first communication terminal; an encryption device that encrypts the second distributed key, using the encryption information; an encrypted distributed key information storage device that stores encrypted distributed key information obtained from the encryption; an encrypted distributed key information transmission device that transmits the encrypted distributed key information to the second communication terminal; and a first distributed key transmission device that transmits the first distributed key to the second communication terminal. The second communication terminal comprises: a terminal key information receiving device that receives terminal key information from the first communication terminal; an encrypted distributed key information receiving device that receives encrypted distributed key information from the third communication terminal; a distributed key receiving device that receives the first distributed key from the third communication terminal; a decryption device that restores the second distributed key, using the received terminal key information and the received encrypted distributed key information; and a distributed key combining device that restores the group shared key, combining the received first distributed key and the restored second distributed key. When a situation arises where any of the second communication terminals departs from the group, the first communication terminal updates encryption information, using the terminal individual information of only the second communication terminals remaining in the group, and transmits the updated encryption information to the third communication terminal.

A communication terminal according to another measure is the third communication terminal in a key sharing system with a first communication terminal, second communication terminals, and a third communication terminal which belong to a same group, and a distributed key receiving device for supplying a first distributed key to the second communication terminal, and an encrypted distributed key information receiving device for supplying encrypted distributed key information to the second communication terminal, characterized in that there are provided: a group shared key generation device that generates a group shared key of the group; a distributed key generation device that generates first and second distributed keys from the group shared key; an encryption information receiving device that receives encryption information from the first communication terminal; an encryption device that encrypts the second distributed key, using the encryption information; an encrypted distributed key information storage device that stores encrypted distributed key information obtained from the encryption; an encrypted distributed key information transmission device that transmits the encrypted distributed key information to the encrypted distributed key information receiving device; and a first distributed key transmission device that transmits the first distributed key to the distributed key receiving device.

A key sharing system according to another measure is a key sharing system with a first communication terminal, second communication terminals, and a third communication terminal which belong to a same group, characterized in that the third communication terminal comprises: a group shared key generation device that generates a group shared key of the group; a distributed key generation device that generates first and second distributed keys from the group shared key; and a distributed key transmission device that transmits the first and second distributed keys to the first communication terminal. The first communication terminal comprises: a distributed key receiving device that receives the first and second distributed keys from the third communication terminal; a terminal individual information generation device that generates terminal individual information individually for each of the second communication terminals; a terminal individual information storage device that stores the terminal individual information; a terminal key information generation device that generates terminal key information individually for each of the second communication terminals, using the terminal individual information; a terminal key information transmission device that transmits the terminal key information to the second communication terminal; an encryption information generation device that generates common encryption information for the second communication terminals, using the terminal individual information; an encryption device that encrypts the second distributed key, using the encryption information; an encrypted distributed key information storage device that stores encrypted distributed key information obtained from the encryption; an encrypted distributed key information transmission device that transmits the encrypted distributed key information to the second communication terminal; and a first distributed key transmission device that transmits the first distributed key to the second communication terminal. The second communication terminal comprises: a terminal key information receiving device that receives terminal key information from the first communication terminal; an encrypted distributed key information receiving device that receives encrypted distributed key information from the first communication terminal; a distributed key receiving device that receives a first distributed key from the first communication terminal; a decryption device that restores the second distributed key, using the received terminal key information and the received encrypted distributed key information; and a distributed key combining device that restores the group shared key, combining the received first distributed key and the restored second distributed key. When a situation arises where any of the second communication terminals departs from the group, the first communication terminal updates encryption information, using the terminal individual information of only the second communication terminals remaining in the group.

A communication terminal according to another measure is the third communication terminal in a key sharing system with a first communication terminal, second communication terminals, and a third communication terminal which belong to a same group, characterized in that there are provided: a group shared key generation device that generates a group shared key of the group; a distributed key generation device that generates first and second distributed keys from the group shared key; and a distributed key transmission device that transmits the first and second distributed keys to the first communication terminal.

A key sharing system according to another measure is a key sharing system with a first communication terminal, second communication terminals, and a third communication terminal which belong to a same group, and a management device, characterized in that the first communication terminal comprises: a terminal individual information generation device that generates terminal individual information individually for each second communication terminal; a terminal individual information storage device that stores the terminal individual information; a terminal key information generation device that generates terminal key information individually for each of the second communication terminals, using the terminal individual information; a terminal key information transmission device that transmits the terminal key information to the second communication terminal; an encryption information generation device that generates common encryption information for the second communication terminals, using the terminal individual information; and an encryption information transmission device that transmits the encryption information to the third communication terminal. The third communication terminal comprises: a group shared key generation device that generates a group shared key of the group; a distributed key generation device that generates first and second distributed keys from the group shared key; an encryption information receiving device that receives the encryption information from the first communication terminal; an encryption device that encrypts the second distributed key, using the encryption information; an encrypted distributed key information storage device that stores encrypted distributed key information obtained from the encryption; an encrypted distributed key information transmission device that transmits the encrypted distributed key information to the management device; and a first distributed key transmission device that transmits the first distributed key to the management device. The management device comprises: an encrypted distributed key information receiving device that receives the encrypted distributed key information from the third communication terminal; a distributed key receiving device that receives the first distributed key from the third communication terminal; an encrypted distributed key information storage device that stores the encrypted distributed key information; an encrypted distributed key information transmission device that transmits the encrypted distributed key information to the second communication terminal; and a distributed key transmission device that transmits the first distributed key to the second communication terminal. The second communication terminal comprises: a terminal key information receiving device that receives terminal key information from the first communication terminal; an encrypted distributed key information receiving device that receives encrypted distributed key information from the management device; a distributed key receiving device that receives the first distributed key from the management device; a decryption device that restores the second distributed key, using the received terminal key information and the received encrypted distributed key information; and a distributed key combining device that restores the group shared key, combining the received first distributed key and the restored second distributed key. When a situation arises where any of the second communication terminals departs from the group, the first communication terminal updates encryption information, using the terminal individual information of only the second communication terminals remaining in the group, and transmits the updated encryption information to the third communication terminal.

A management device according to another measure is the management device in a key sharing system with a first communication terminal, second communication terminals, and a third communication terminal which belong to a same group, and a management device, characterized in that there are provided: an encrypted distributed key information receiving device that receives encrypted distributed key information from the third communication terminal; a distributed key receiving device that receives the first distributed key among first and second distributed keys generated from a group shared key of the group, from the third communication terminal; an encrypted distributed key information storage device that stores the encrypted distributed key information; an encrypted distributed key information transmission device that transmits the encrypted distributed key information to the second communication terminal; and a distributed key transmission device that transmits the first distributed key to the second communication terminal.

Effect of the Invention

According to the present invention, there can be achieved an effect such that the amount of encrypted key information to be stored in a management device is reduced, and when a situation arises where a terminal departs from a key sharing group, key information of the terminal departing from the key sharing group can be invalidated without updating the key information of the terminals remaining in the group.

BEST MODE FOR CARRYING OUT THE INVENTION

Hereunder, embodiments of the present invention are described, with reference to the drawings.

Figure 1:
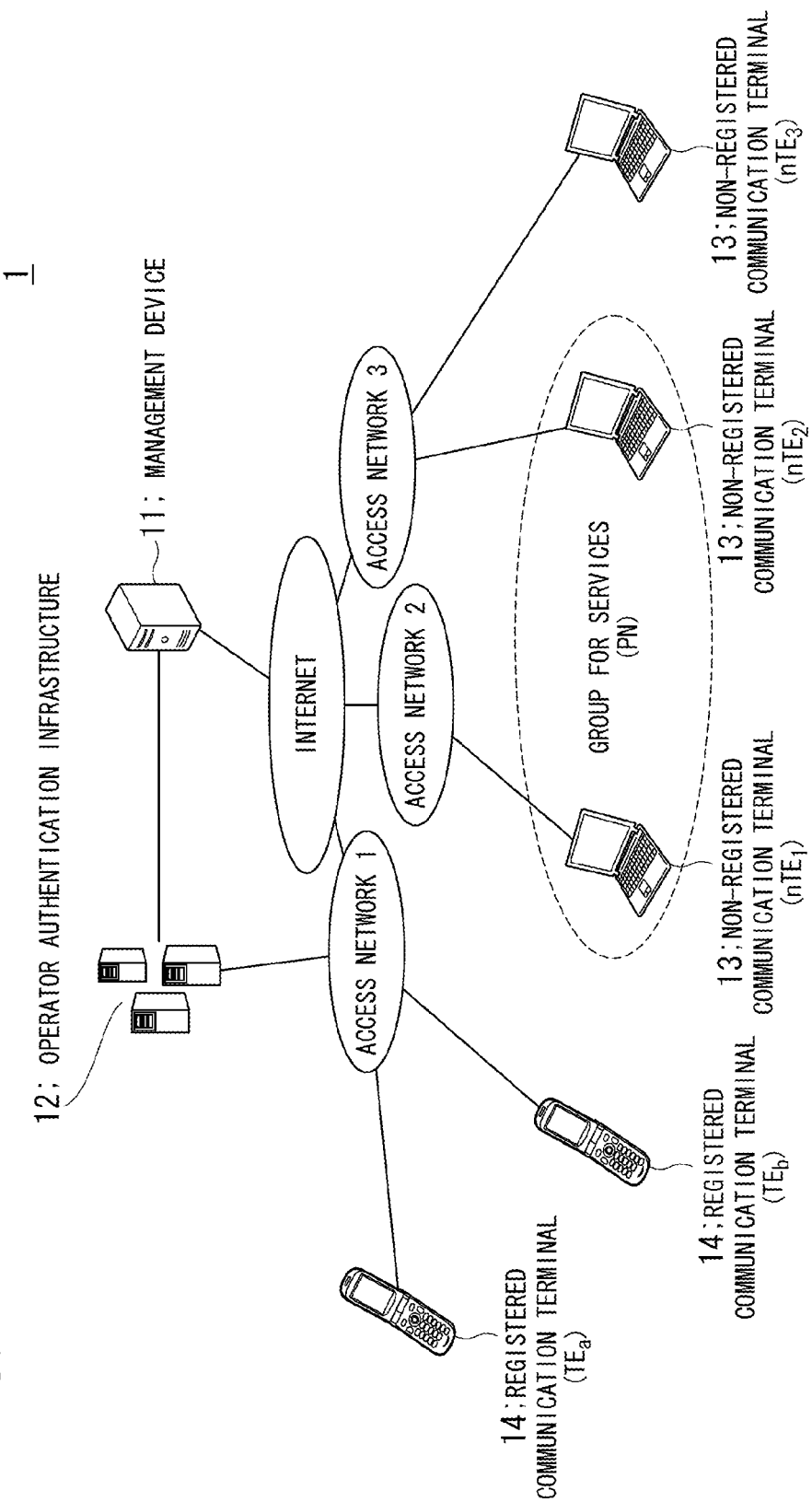
FIG. 1 is a conceptual diagram showing a configuration of a key sharing system according to an embodiment.

FIG. 1 is a conceptual diagram showing a configuration of a key sharing system 1 according to an embodiment. In FIG. 1, the key sharing system 1 has a management device (PNSP) 11, non-registered communication terminals (nTE)13, and registered communication terminals (TE)14. The registered communication terminal 14 communicates with an operator authentication infrastructure (IMS: IP multimedia subsystem) 12 via a network 1. Confidentiality (data will not be intercepted by a third party) and integrity (data will not be altered in the middle of communication) of communications between this registered communication terminal 14 are guaranteed. The management device 11 communicates with the operator authentication infrastructure 12, and confidentiality and integrity of communications therebetween are guaranteed. Accordingly, the registered communication terminal 14 communicates with the management device 11 via the operator authentication infrastructure 12, and confidentiality and integrity of this communication are guaranteed. On the other hand, the non-registered communication terminal 13 connects to the Internet via access networks 2 and 3, and communicates with the management device 11 via the Internet. However, confidentiality and integrity of this communication are not guaranteed.

The registered communication terminal 14 and the non-registered communication terminal 13 belong to a group (PN) for services, and share a group shared key, and thereby, it can receive common services, using the group shared key. Hereunder, there are sequentially described embodiments for sharing a group shared key in the key sharing system shown in FIG. 1.

Embodiment 1

Figure 2:
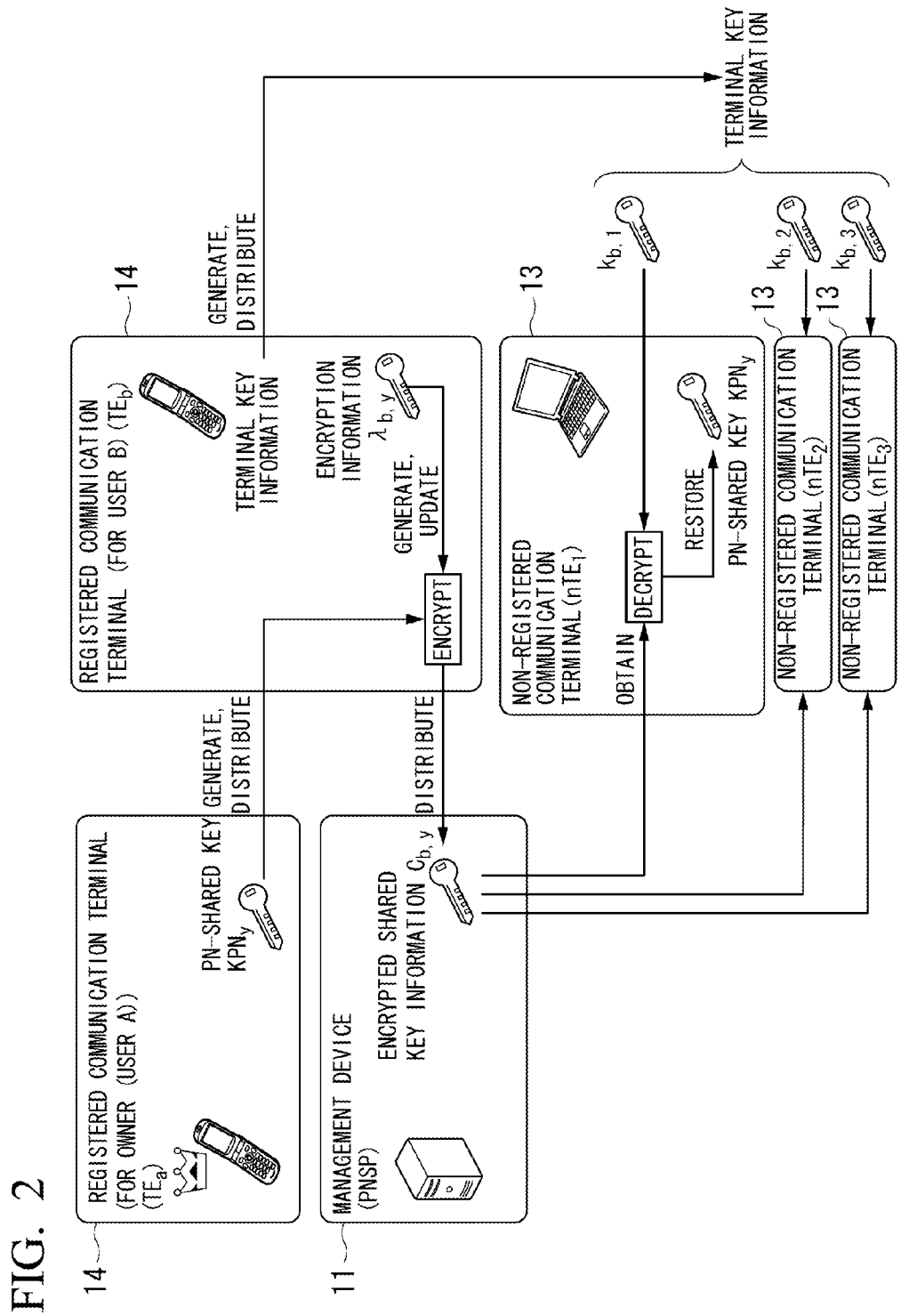
FIG. 2 is Embodiment 1 of a key sharing system.

FIG. 2 shows Embodiment 1 of the relevant key sharing system 1. First, a brief overview of Embodiment 1 is described, with reference to FIG. 2.

In FIG. 2, the registered communication terminal ($TE_a$)14 (hereunder, owner $TE_a$14) is a communication terminal of an owner (user A) of a group ($PN_y$). The registered communication terminal ($TE_b$)14 (hereunder, user $TE_b$14) is a communication terminal of a user B which joins the group ($PN_y$). The non-registered communication terminal (nTE)13 (hereunder, nTE13) is a user communication terminal which joins or departs from the group ($PN_y$). Here, three terminals, namely $nTE_1$13, $nTE_2$13, and $nTE_3$13 belong to users engaged with the group ($PN_y$).

The owner $TE_a$14 generates a group shared key (hereunder, PN-shared key) ($KPN_y$) and supplies it to the user $TE_b$14. The user $TE_b$14 stores the PN-shared key ($KPN_y$) in a group shared key storage device such as a memory device.

The user $TE_b$14 generates terminal individual information individually for each of $nTE_1$13, $nTE_2$13, and $nTE_3$13 of the users engaged with the group ($PN_y$). The user $TE_b$14 stores the terminal individual information of each of $nTE_1$13, $nTE_2$13, and $nTE_3$13 in a terminal individual information storage device such as a memory device. The user $TE_b$14 generates terminal key information ($k_{b,1}$, $k_{b,2}$, and $k_{b,3}$) individually for each of $nTE_1$13, $nTE_2$13, and $nTE_3$13, using the terminal individual information stored in the terminal individual information storage device. The user $TE_b$14 transmits the terminal key information ($k_{b,1}$) to $nTE_1$13, the terminal key information ($k_{b,2}$) to $nTE_2$13, and the terminal key information ($k_{b,3}$) to $nTE_3$13.

The user $TE_b$14 generates common encryption information ($\lambda_{b,y}$) for $nTE_1$13, $nTE_2$13, and $nTE_3$13, using the terminal individual information stored in the terminal individual information storage device. The user $TE_b$14 encrypts the PN-shared key ($KPN_y$) stored in the group shared key storage device, using the encryption information ($\lambda_{b,y}$). The user $TE_b$14 transmits encrypted shared key information ($C_{b,y}$) obtained from this encryption to the management device 11 (hereunder, PNSP11).

PNSP11 receives the encrypted shared key information ($C_{b,y}$) from the user $TE_b$14. PNSP11 stores this received encrypted shared key information ($C_{b,y}$) in an encrypted shared key information storage device such as a memory device. In response to a request from $nTE_1$13, $nTE_2$13, and $nTE_3$13, PNSP11 transmits the encrypted shared key information ($C_{b,y}$) stored in the encrypted shared key information storage device to $nTE_1$13, $nTE_2$13, and $nTE_3$13.

$nTE_1$13 receives the terminal key information ($k_{b,1}$) from the user $TE_b$14. $nTE_1$13 requests the encrypted shared key information ($C_{b,y}$) from PNSP11, and receives the encrypted shared key information ($C_{b,y}$). $nTE_1$13 restores the PN-shared key ($KPN_y$), using the received terminal key information ($k_{b,1}$) and the received encrypted shared key information ($C_{b,y}$). The process is common with $nTE_1$13, $nTE_2$13, and $nTE_3$13, and therefore, descriptions of the process for $nTE_2$13 and $nTE_3$13 are omitted.

Here, it is assumed that any one of $nTE_1$13, $nTE_2$13, and $nTE_3$13 departs from the group ($PN_y$). Here, it is assumed that $nTE_1$13 departs from the group.

In a case where $nTE_1$13 departs from the group, the user $TE_b$14 updates the encryption information, using the terminal individual information of only $nTE_2$13 and $nTE_3$13, which remain in the group ($PN_y$). The user $TE_b$14 encrypts the PN-shared key ($KPN_y$), using the updated encryption information. The user $TE_b$14 transmits the encrypted shared key information obtained from this encryption to PNSP11, and updates the encrypted shared key information stored in PNSP11.

As a result, the encrypted shared key information stored in PNSP11 cannot restore the PN-shared key ($KPN_y$) even if it is combined with the terminal key information ($k_{b,1}$) possessed by $nTE_1$13 departing from the group ($PN_y$). Therefore, it becomes possible to invalidate the terminal key information ($k_{b,1}$) of $nTE_1$13 departing from the group ($PN_y$), without updating the terminal key information ($k_{b,2}$ and $k_{b,3}$) of $nTE_2$13 and $nTE_3$13, which remain in the group ($PN_y$). Moreover, since the encrypted shared key information stored in PNSP11 is common in the group ($PN_y$), the amount of information to be stored in PNSP11 can be reduced.

Hereunder, Embodiment 1 is described in detail for each step. Here, it is assumed that each communication between the owner $TE_a$14, the user $TE_b$14, and PNSP11 is performed via the operator authentication infrastructure (IMS) 12.

[Preparation Stage]

The owner $TE_a$14 generates a PN-shared key ($KPN_y$) of a group ($PN_y$), and stores it in a memory.

The user $TE_b$14 generates the following values (1) through (8), and stores them in the memory. These values (1) through (8) are common with all of the groups (PN).

Hereunder, a to the $x_i$th power is expressed with a superscripted character surrounded by brackets, such as $a^{x(i)}$ (that is to say, $a^{x(i)} = a$ to the $x_i$th power).

(1) $n$: Upper limit value of the number of $nTE$ that can be simultaneously used by a user.

(2) $p$, $q$: Sufficiently large prime number (3) $q$: The value of which satisfies $q|p-1$ (4) Randomly generate $X_{b,i} \in Z_q (i=1, 2, \ldots, n)$.

(5) $g_{b,0}=g^{a(0)} \bmod p, \ldots, g_{b,n}=g^{a(n)} \bmod p$, where $g \in Z_q$, $a_0, \ldots, a_n$ is a coefficient of $f_b(x) = \pi_{1 \le i \le n} (x - x_{b,i}) \bmod q$.

(6) ($x_{b,j}$ to the $i$th power)

(7) $s_{b,i}, \ldots, s_{b,n}$, where $s_{b,j} s_{b,j} = S_{b,j} \bmod q (s_{b,j} \in Z_q, (s_{b,i}|s_{b,j}))$ is satisfied. That is to say, where $\lambda_{b,y} = \pi_{1 \le i \le n} s_{b,i}, s_{b,j} \lambda_{b,j} \bmod q$.

(8) Randomly generate $d \in Z_q$, and calculate $d^{-1}$. [Formulas 1]

[Communication Terminal Proxy Registration Stage]

Figure 3:
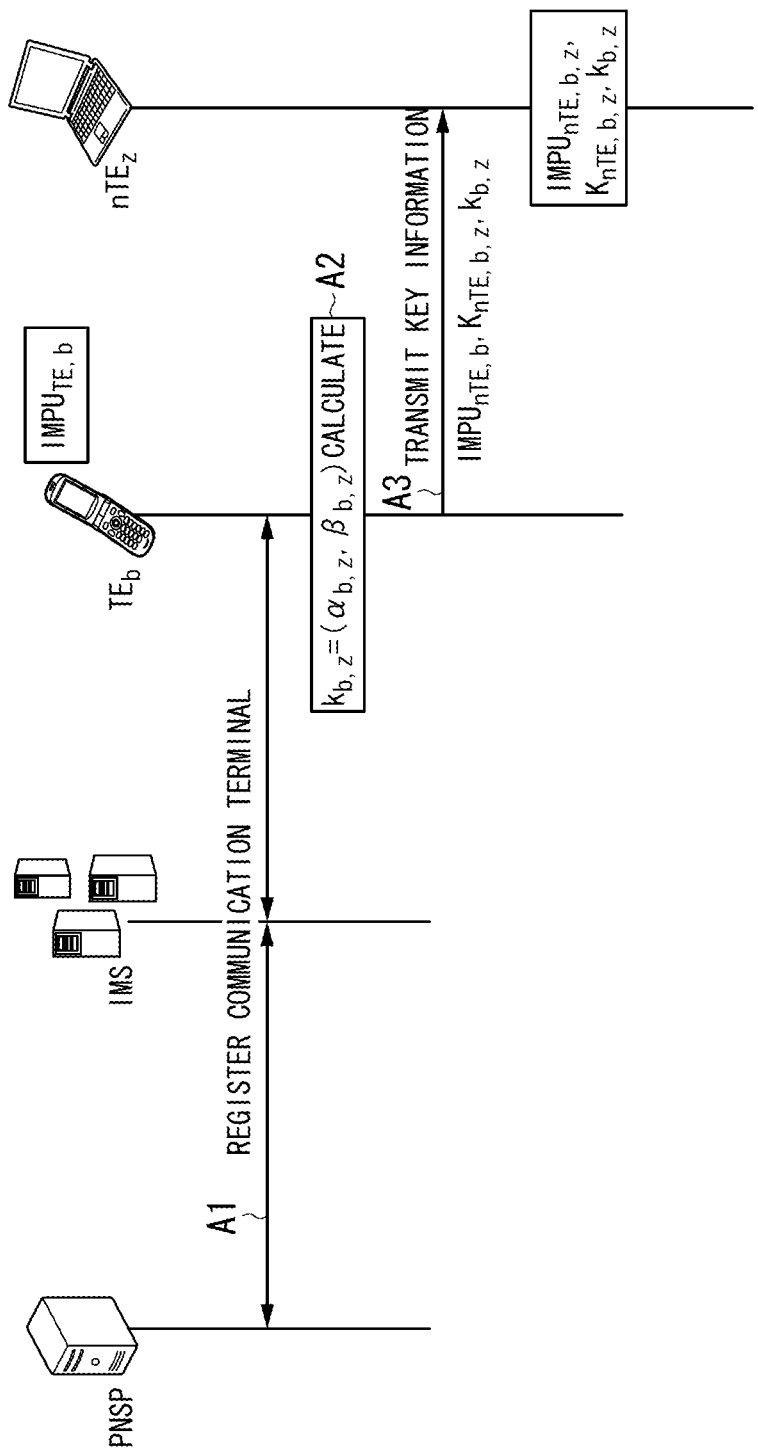
FIG. 3 is a sequence chart showing a processing procedure of a communication terminal proxy registration stage according to Embodiment 1.

FIG. 3 is a sequence chart showing a processing procedure of a communication terminal proxy registration stage according to Embodiment 1. Hereunder, a communication terminal proxy registration stage is described, with reference to FIG. 3.

Step A1: The user $TE_b$14 registers $nTE_z$13 to PNSP11 (step A1). At this time, the user $TE_b$14 obtains an ID ($IMPU_{nTE,bz}$) for $nTE_z$13 and a shared key ($K_{nTE,bz}$) with PNSP. The ID ($IMPU_{nTE,bz}$) and shared key ($K_{nTE,bz}$) are described in Non-Patent Document 3. The ID ($IMPU_{nTE,bz}$) for $nTE_z$13 and the shared key ($K_{nTE,bz}$) are not essential, and it is not always necessary to obtain ID ($IMPU_{nTE,bz}$) and the shared key ($K_{nTE,bz}$).

Step A2: The user $TE_b$14 calculates terminal key information ($k_{b,z}$) for $nTE_z$13 through the following formulas, using "$x_{b,i}$ (i=1, 2, ..., n), $d^{-1}$, $s_{b,z}$".

$K = (\alpha_{b,z} \beta_{b,z})$ $\alpha_{b,z} = d - 1 \Sigma_{1 \le i \le n, i \ne z} x_{b,i}{}^n \bmod q, \beta_{b,z} = s_{b,z} x_{b,z}{}^n \bmod q$ [Formulas 2]

Step A3: The user $TE_b 14$ transmits the ID ($IMPU_{nTE,b,z}$), shared key ($K_{nTE,b,z}$), and terminal key information ($k_{b,z}=(\alpha_{b,z}, \beta_{b,z})$) to $nTE_z 13$. For this transmission device, NFC (near field communication), short-range wireless communication, or the like may be used. $nTE_z 13$ stores the ID ($IMPU_{nTE,b,z}$), shared key ($K_{nTE,b,z}$), and terminal key information ($k_{b,z}=(\alpha_{b,z}, \beta_{b,z})$) in the memory.

[User Usage Registration Stage]

Figure 4:
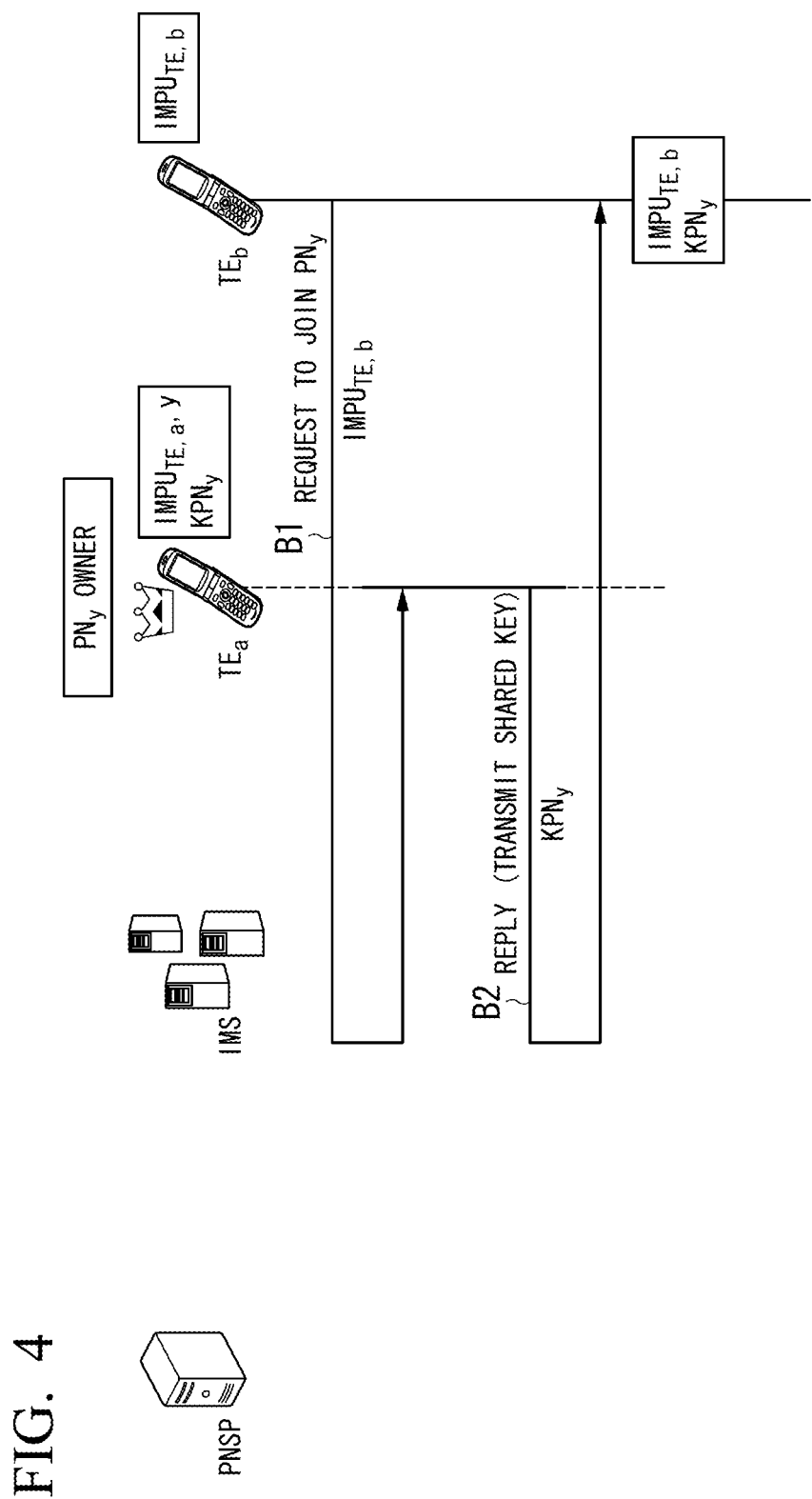
FIG. 4 is a sequence chart showing a processing procedure of a user usage registration stage according to Embodiment 1.

FIG. 4 is a sequence chart showing a processing procedure of a user usage registration stage according to Embodiment 1. Hereunder, a user usage registration stage is described, with reference to FIG. 4.

Step B1: The user $TE_b 14$ transmits a request for joining the group ($PN_y$) to the owner $TE_a 14$. At this time, the ID ($IMPU_{TE,b}$) of the user $TE_b 14$ is transmitted theretogether to the owner $TE_b 14$.

Step B2: In a case of permitting the user B to join, the owner $TE_a 14$ transmits the PN-shared key ($KPN_y$) to the user $TE_b 14$. The user $TE_b 14$ stores the PN-shared key ($KPN_y$) in the memory.

[Communication Terminal Addition Stage]

Figure 5:
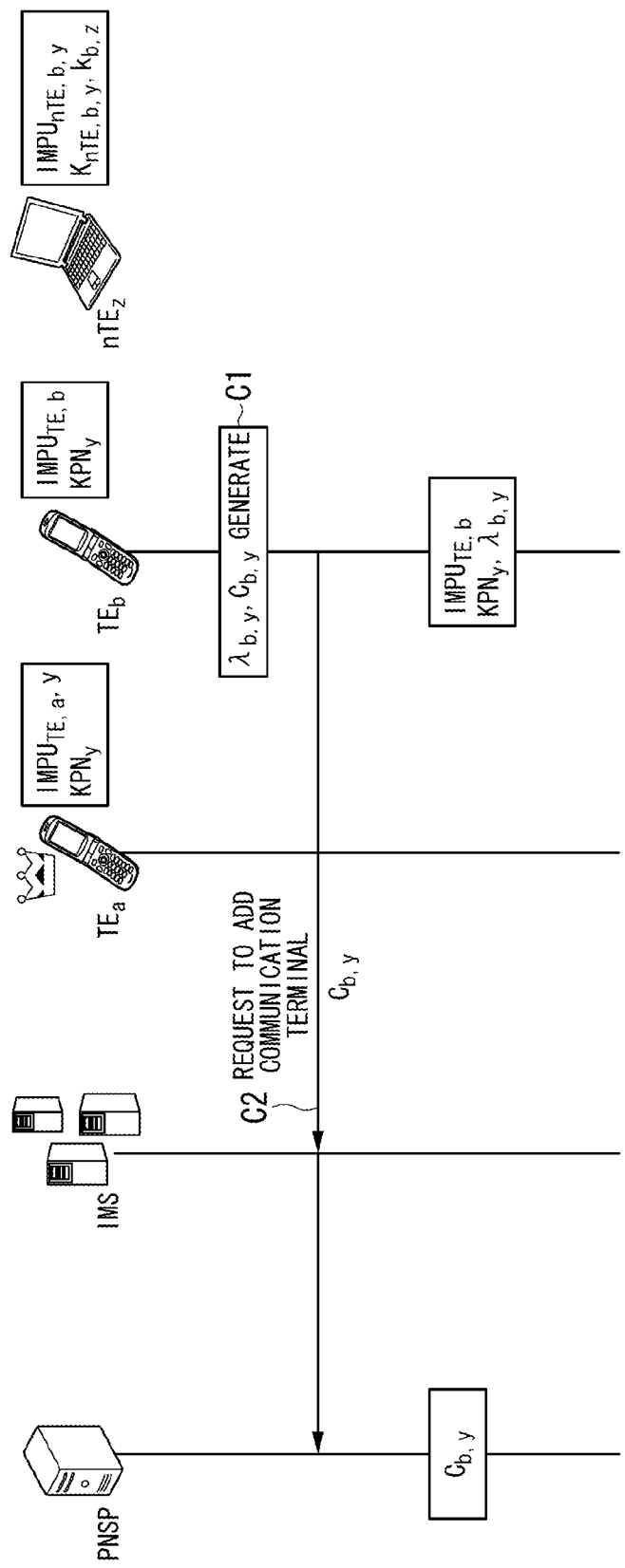
FIG. 5 is a sequence chart showing a processing procedure of a communication terminal addition stage according to Embodiment 1.

FIG. 5 is a sequence chart showing a processing procedure of a communication terminal addition stage according to Embodiment 1. Hereunder, a communication terminal addition stage is described, with reference to FIG. 5.

Step C1: In a case of adding $nTE_z 13$ to the group ($PN_y$), the user $TE_b 14$ calculates encryption information ($\lambda_{b,y}$) and encrypted shared key information ($C_{b,y}=(g_{\alpha,b,y}, g_{\beta,b,y}, c_{b,y})$) through the following formulas, using the PN-shared key ($KPN_y$) and "$s_{b,z}$, d, $A_b$".

$\lambda_{b,y}=\lambda_{b,y} \times s'_{b,z}(\lambda_{b,y}=\pi_{i \in P} s_{b,i}$, P is a set of $nTE$ of user $b$ that belong to $PNy$, When P is an empty set, $\lambda_{b,y}=1$)

$g_{\alpha,b,y}=g^{\lambda(b,y) \times r}$ mod $p, g_{\beta,b,y}=g^{\lambda(b,y) \times dr}$ mod $p (r \in Z_p$ is a random number)

$c_{b,y}=KPN_y \times A^{\lambda(b,y) \times r}$ mod $p$      [Formulas 3]

Step C2: The user $TE_b 14$ transmits the encrypted shared key information ($C_{b,y}$) to PNSP11. PNSP11 stores the encrypted shared key information ($C_{b,y}$) received from the user $TE_b 14$ in the memory, and updates the encrypted shared key information ($C_{b,y}$) in the memory. The user $TE_b 14$ stores the encryption information ($\lambda_{b,y}$) in the memory.

[Shared Key Restoration Stage]

Figure 6:
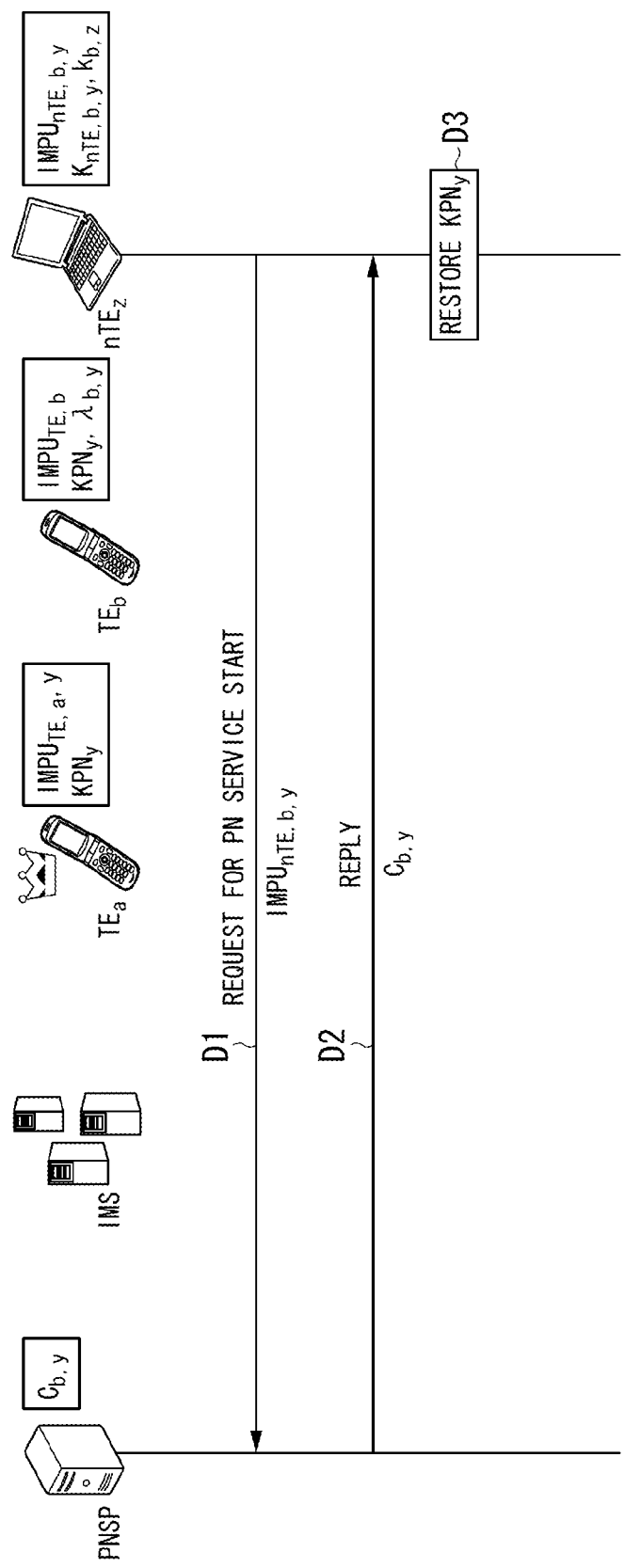
FIG. 6 is a sequence chart showing a processing procedure of a shared key restoration stage according to Embodiment 1.

FIG. 6 is a sequence chart showing a processing procedure of a shared key restoration stage according to Embodiment 1. Hereunder, a shared key restoration stage is described, with reference to FIG. 6.

Step D1: $nTE_z 13$ transmits a message to request the group ($PN_y$) to start services, to PNSP11. At this time, ID ($IMPU_{nTE,b,z}$) is added to this message.

Step D2: In response to the request from $nTE_z 13$, PNSP11 transmits the encrypted shared key information ($C_{b,y}=(g_{\alpha,b,y}, g_{\beta,b,y}, c_{b,y})$) to $nTE_z 13$.

Moreover, confidentiality and integrity of communications between $nTE_z 13$ and PNSP11 can be maintained by the shared key ($K_{nTE,b,z}$).

Step D3: $nTE_z 13$ restores the PN-shared key ($KPN_y$) through the following formulas, using the encrypted shared key information ($C_{b,y}=(g_{\alpha,b,y}, g_{\beta,b,y}, c_{b,y})$) received from PNSP11 and the terminal key information ($k_{b,z}=(\alpha_{b,z}, \beta_{b,z})$) stored in itself.

$$c_{b,y} \times g_{\alpha,b,y}^{\beta(b,z)} \times g_{\beta,b,y}^{\alpha(b,z)} = KPN_y \times A^{\lambda(b,y) \times r} \times$$
$$g^{\lambda(b,y) \times r \times \beta(b,z)} \times$$
$$g^{\lambda(b,y) \times dr \times \alpha(b,z)}$$
$$= KPN_y$$

$$A^{\lambda(b,y) \times r} \times g^{\lambda(b,y) \times r \times \beta(b,z)} \times g^{\lambda(b,y) \times dr \times \alpha(b,z)} =$$

$$g^{\wedge}\left\{r\lambda_{b,y} \times \left(\sum_{1 \leq j \leq n} \sum_{1 \leq i \leq n-1} a_i x_{b,j}^i + s_{b,2} x_{b,z}^n + dd^{-1} \right.\right.$$
$$\left.\left.\sum_{1 \leq i \leq n, i \neq z} x_{b,i}^n\right)\right\} =$$

$$g^{\wedge}\left\{r\lambda_{b,y} \times \left(\sum_{1 \leq j \leq n} \sum_{1 \leq i \leq n-1} a_i x_{b,j}^i + x_{b,z}^n + \sum_{1 \leq i \leq n, i \neq z} x_{b,i}^n\right)\right\}$$

$(\lambda_{b,y} s_{b,z} = \lambda_{b,y}) =$ $$g^{\wedge}\left\{r\lambda_{b,y} \times \left(\sum_{1 \leq j \leq n} f(x_{b,j})\right)\right\} = 1 (f_b(x_{b,j}) = 0)$$

($g^{\wedge} x$ is $g$ to the xth power)    [Formulas 4]

As a result, $nTE_z 13$ becomes able to receive common services in the group ($PN_y$), using the PN-shared key ($KPN_y$).

[Communication Terminal Departure Stage]

Figure 7:
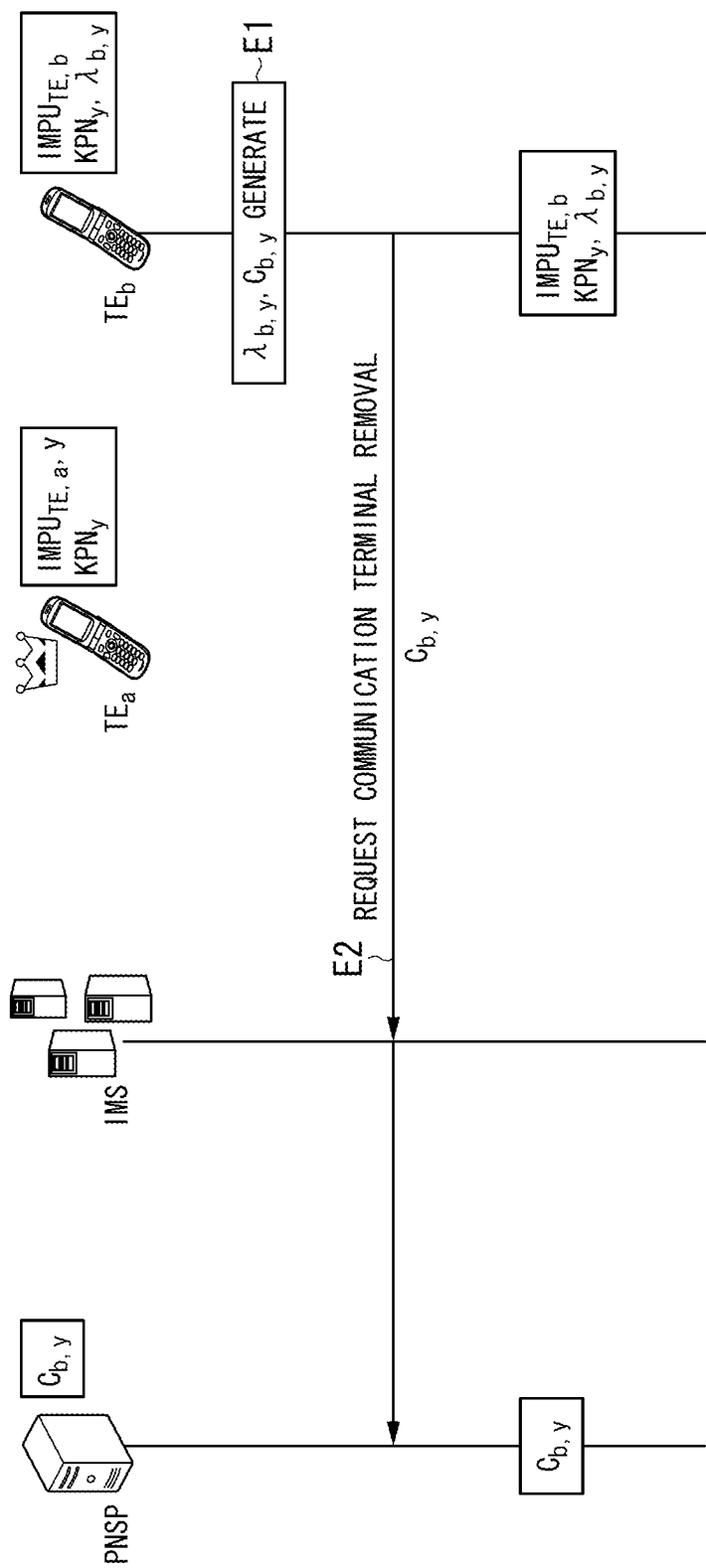
FIG. 7 is a sequence chart showing a processing procedure of a communication terminal departure stage according to Embodiment 1.

FIG. 7 is a sequence chart showing a processing procedure of a communication terminal departure stage according to Embodiment 1, Hereunder, a communication terminal departure stage is described, with reference to FIG. 7.

Step E1: In a case where $nTE_z 13$ departs from the group ($PN_y$), the user $TE_b 14$ calculates and updates encryption information ($\lambda_{b,y}$) and encrypted shared key information ($C_{b,y}=g_{\alpha,b,y}, g_{\beta,b,y}, c_{b,y}$)) through the following formulas, using the PN-shared key ($KPN_y$), the encryption information ($\lambda_{b,y}$), and "$s_{b,z}$, d, $A_b$".

$\lambda_{b,y}=\lambda_{b,y}/s_{b,z}$ mod $q, g_{\alpha,b,y}=g^{\lambda(b,y) \times r}$ mod $p, g_{\beta,b,y}=g^{\lambda(b,y) \times dr}$ mod $p(r \in Z_p$ is a random number)

$c_{b,y}=KPN_y \times A^{\lambda(b,y) \times r}$ mod $p$     [Formulas 5]

Step E2: The user $TE_b 14$ transmits the updated encrypted shared key information ($C_{b,y}$) to PNSP11. PNSP11 stores the encrypted shared key information ($C_{b,y}$) received from the user $TE_b 14$ in the memory, and updates the encrypted shared key information ($C_{b,y}$) in the memory. The user $TE_b 14$ stores the updated encryption information ($\lambda_{b,y}$) in the memory, and updates the encryption information ($\lambda_{b,y}$) in the memory.

From this point on, even if there is made an attempt to restore the PN-shared key ($KPN_y$) using the terminal key information ($k_{b,z}=(\alpha_{b,z}, \beta_{b,z})$) of $nTE_z 13$, the decryption process of the encrypted shared key information ($C_{b,y}=(g_{\alpha,b,y}, g_{\beta,b,y}, c_{b,y})$) gives "$\lambda_{b,y} s_{b,z} \neq \lambda_{b,y}$", and consequently, decryption of the encrypted shared key information ($C_{b,y}$) fails. As a result, the PN-shared key ($KPN_y$) cannot be restored.

[User Departure Stage]

Figure 8:
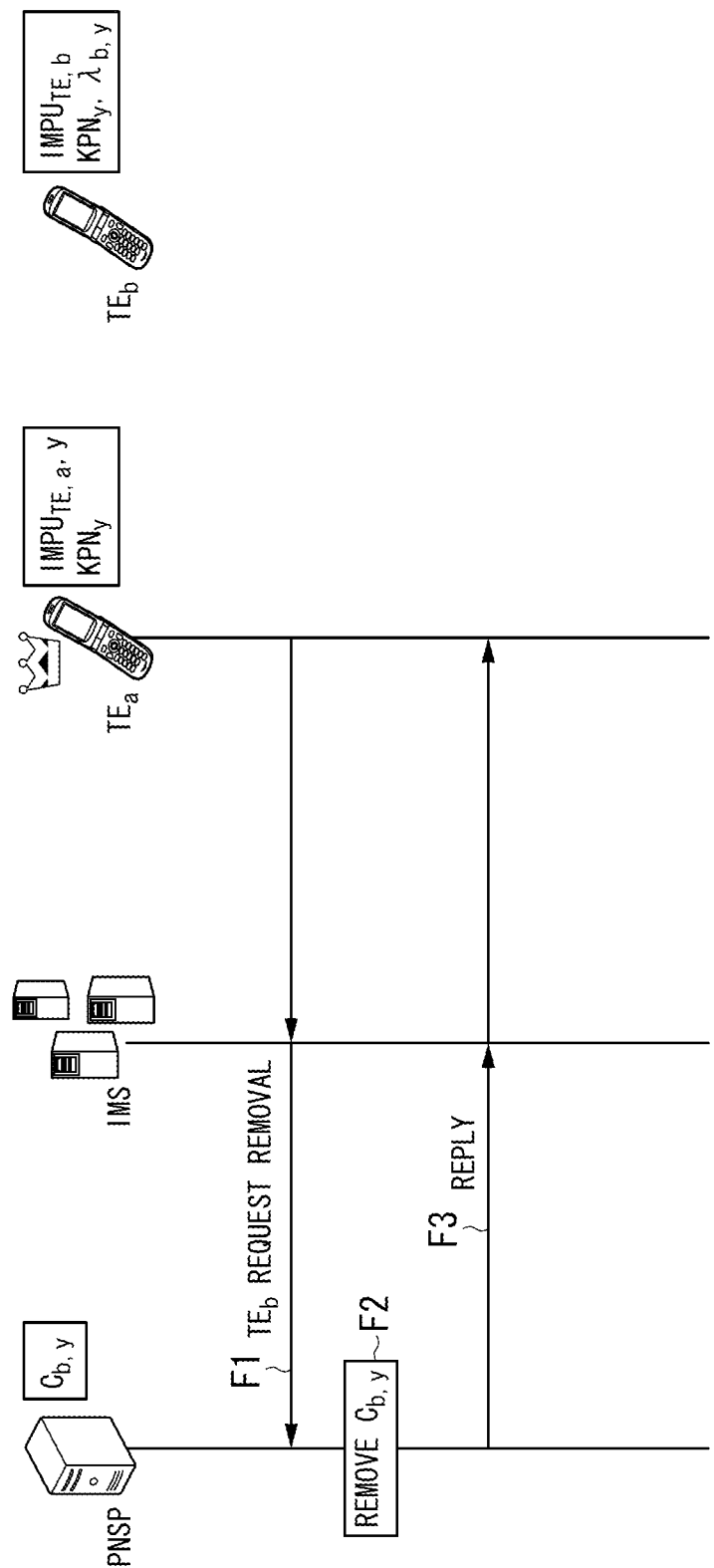
FIG. 8 is a sequence chart showing a processing procedure of a user departure stage according to Embodiment 1.

FIG. 8 is a sequence chart showing a processing procedure of a user departure stage according to Embodiment 1. Hereunder, the user departure stage is described, with reference to FIG. 8.

Step F1: The owner $TE_a 14$ transmits, to PNSP11, a message which requests removal of the encrypted shared key information ($C_{b,y}$) related to the user $TE_b 14$ departing from the group ($PN_y$).

Step F2: In response to the removal request, PNSP11 removes the encrypted shared key information ($C_{b,y}$) related to the user $TE_b 14$.

Step F3: PNSP11 transmits, to the owner $TE_a14$, a message which notifies that the encrypted shared key information ($C_{b,y}$) related to the user $TE_b14$ has been removed.

This completes the description of Embodiment 1.

Embodiment 2

Figure 9:
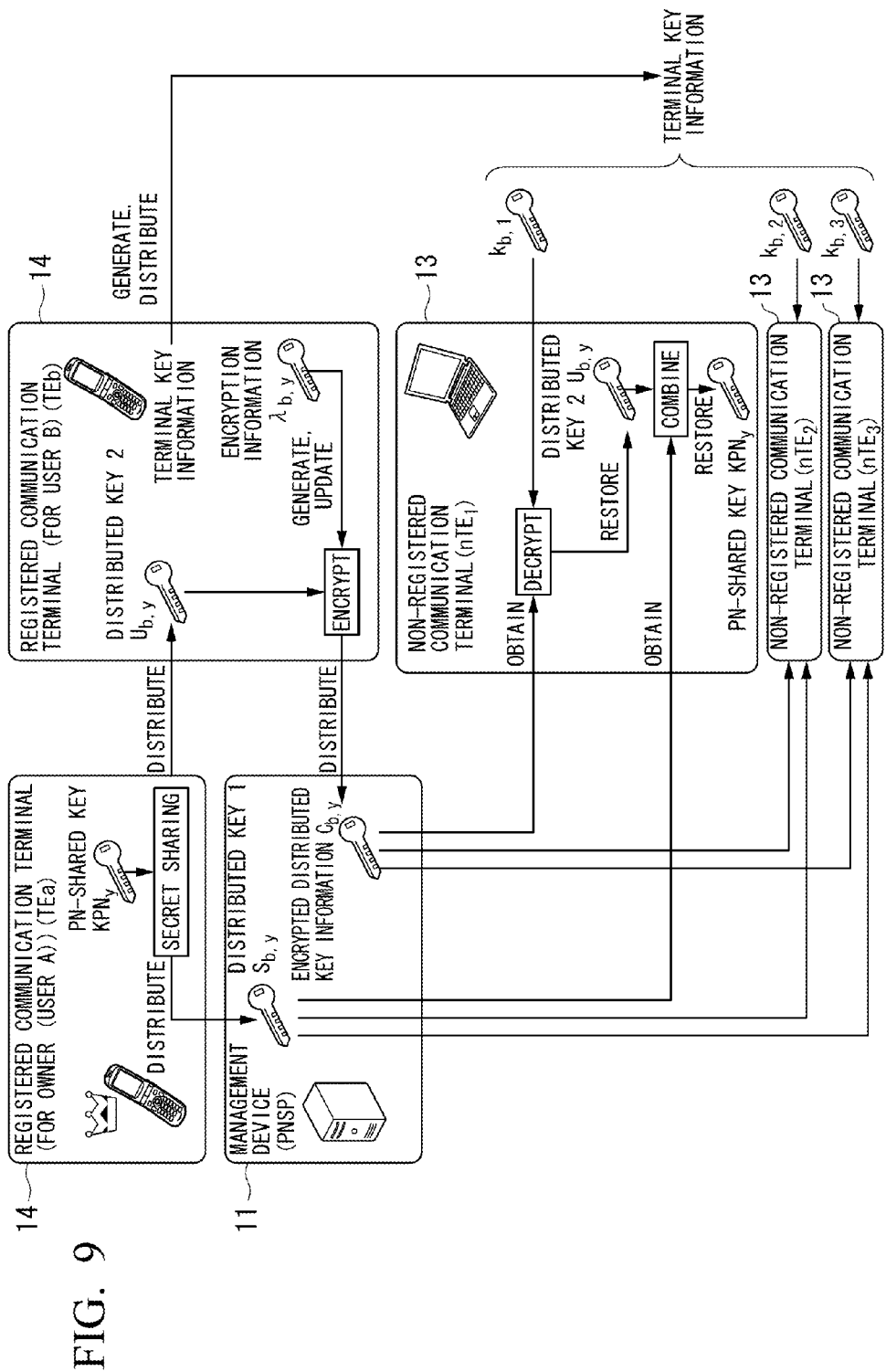
FIG. 9 is Embodiment 2 of a key sharing system.

FIG. 9 shows Embodiment 2 of the relevant key sharing system 1. First, a brief overview of Embodiment 2 is described, with reference to FIG. 9.

In FIG. 9, the owner $TE_a14$ is a communication terminal of an owner (user A) of a group ($PN_y$). The user $TE_b14$ is a communication terminal of a user B which joins the group ($PN_y$). nTE13 is a user communication terminal which joins or departs from the group ($PN_y$). Here, three terminals, namely $nTE_113$, $nTE_213$, and $nTE_313$ belong to users engaged with the group ($PN_y$).

The owner $TE_a14$ generates a distributed key 1 ($S_{b,y}$) and a distributed key 2 ($U_{b,y}$) from a PN-shared key ($KPN_y$) by means of a secret sharing scheme, and supplies the distributed key 1 ($S_{b,y}$) to PNSP11 and the distributed key 2 ($U_{b,y}$) to the user $TE_b14$. PNSP11 stores the distributed key 1 ($S_{b,y}$) in a distributed key storage device such as a memory device. The user $TE_b14$ stores the distributed key 2 ($U_{b,y}$) in a distributed key storage device such as a memory device.

The user $TE_b14$ generates terminal individual information individually for each of $nTE_113$, $nTE_213$, and $nTE_313$ of the users engaged with the group ($PN_y$). The user $TE_b14$ stores the terminal individual information of each of $nTE_113$, $nTE_213$, and $nTE_313$ in a terminal individual information storage device such as a memory device. The user $TE_b14$ generates terminal key information ($k_{b,1}$, $k_{b,2}$, and $k_{b,3}$) individually for each of $nTE_113$, $nTE_213$, and $nTE_313$, using the terminal individual information stored in the terminal individual information storage device. The user $TE_b14$ transmits the terminal key information ($k_{b,1}$) to $nTE_113$, the terminal key information ($k_{b,2}$) to $nTE_213$, and the terminal key information ($k_{b,3}$) to $nTE_313$.

The user $TE_b14$ generates common encryption information ($\lambda_{b,y}$) for $nTE_113$, $nTE_213$, and $nTE_313$, using the terminal individual information stored in the terminal individual information storage device. The user $TE_b14$ encrypts the distributed key 2 ($U_{b,y}$) stored in the distributed key storage device, using the encryption information ($\lambda_{b,y}$). The user $TE_b14$ transmits encrypted distributed key information ($C_{b,y}$) obtained from this encryption to PNSP11.

PNSP11 receives the encrypted distributed key information ($C_{b,y}$) from the user $TE_b14$. The PNSP11 stores this received encrypted distributed key information ($C_{b,y}$) in an encrypted distributed key information storage device such as a memory device. In response to a request from $nTE_113$, $nTE_213$, and $nTE_313$, PNSP11 transmits the encrypted distributed key information ($C_{b,y}$) stored in the encrypted distributed key information storage device to $nTE_113$, $nTE_213$, and $nTE_313$. Furthermore, in response to a request from $nTE_113$, $nTE_213$, and $nTE_313$, PNSP11 transmits the distributed key 1($S_{b,y}$) stored in the encrypted distributed key information storage device to $nTE_113$, $nTE_213$, and $nTE_313$.

$nTE_113$ receives the terminal key information ($k_{b,1}$) from the user $TE_b14$. $nTE_113$ requests the encrypted distributed key information ($C_{b,y}$) from PNSP11, and receives the encrypted distributed key information ($C_{b,y}$). $nTE_113$ restores the distributed key 2($U_{b,y}$), using the received terminal key information ($k_{b,1}$) and the received encrypted distributed key information ($C_{b,y}$). Furthermore, $nTE_113$ requests the distributed key 1 ($S_{b,y}$) from PNSP11, and receives the distributed key 1 ($S_{b,y}$). $nTE_113$ combines the received distributed key 1 ($S_{b,y}$) and the restored distributed key 2 ($U_{b,y}$), and restores the PN-shared key ($KPN_y$). The process is common with $nTE_113$, $nTE_213$, and $nTE_313$, and therefore, descriptions of the process for $nTE_213$ and $nTE_313$ are omitted.

Here, it is assumed that any one of $nTE_113$, $nTE_213$, and $nTE_313$ departs from the group ($PN_y$). Here, it is assumed that $nTE_113$ departs from the group.

In a case where $nTE_113$ departs from the group, the user $TE_b14$ updates the encryption information, using the terminal individual information of only $nTE_213$ and $nTE_313$, which remain in the group ($PN_y$). The user $TE_b14$ encrypts the distributed key 2 ($U_{b,y}$), using the updated encryption information. The user $TE_b14$ transmits the encrypted distributed key information obtained from this encryption to PNSP11, and updates the encrypted distributed key information stored in PNSP11.

As a result, the encrypted distributed key information stored in PNSP11 cannot restore the distributed key 2 ($U_{b,y}$) even if it is combined with the terminal key information ($k_{b,1}$) possessed by $nTE_113$ departing from the group ($PN_y$). Therefore, it becomes possible to invalidate the terminal key information ($k_{b,1}$) of $nTE_113$ departing from the group ($PN_y$), without updating the terminal key information ($k_{b,2}$ and $k_{b,3}$) of $nTE_213$ and $nTE_313$, which remain in the group ($PN_y$). Moreover, since the encrypted distributed key information stored in PNSP11 is common in the group ($PN_y$), the amount of information to be stored in PNSP11 can be reduced.

Hereunder, Embodiment 2 is described in detail for each step. Here, it is assumed that each communication between the owner $TE_a14$, the user $TE_b14$, and PNSP11 is performed via the operator authentication infrastructure (IMS) 12.

[Preparation Stage]

This step is similar to that of Embodiment 1, and description is therefore omitted.

[Communication Terminal Proxy Registration Stage]

This step is similar to that of Embodiment 1, and description is therefore omitted.

[User Usage Registration Stage]

Figure 10:
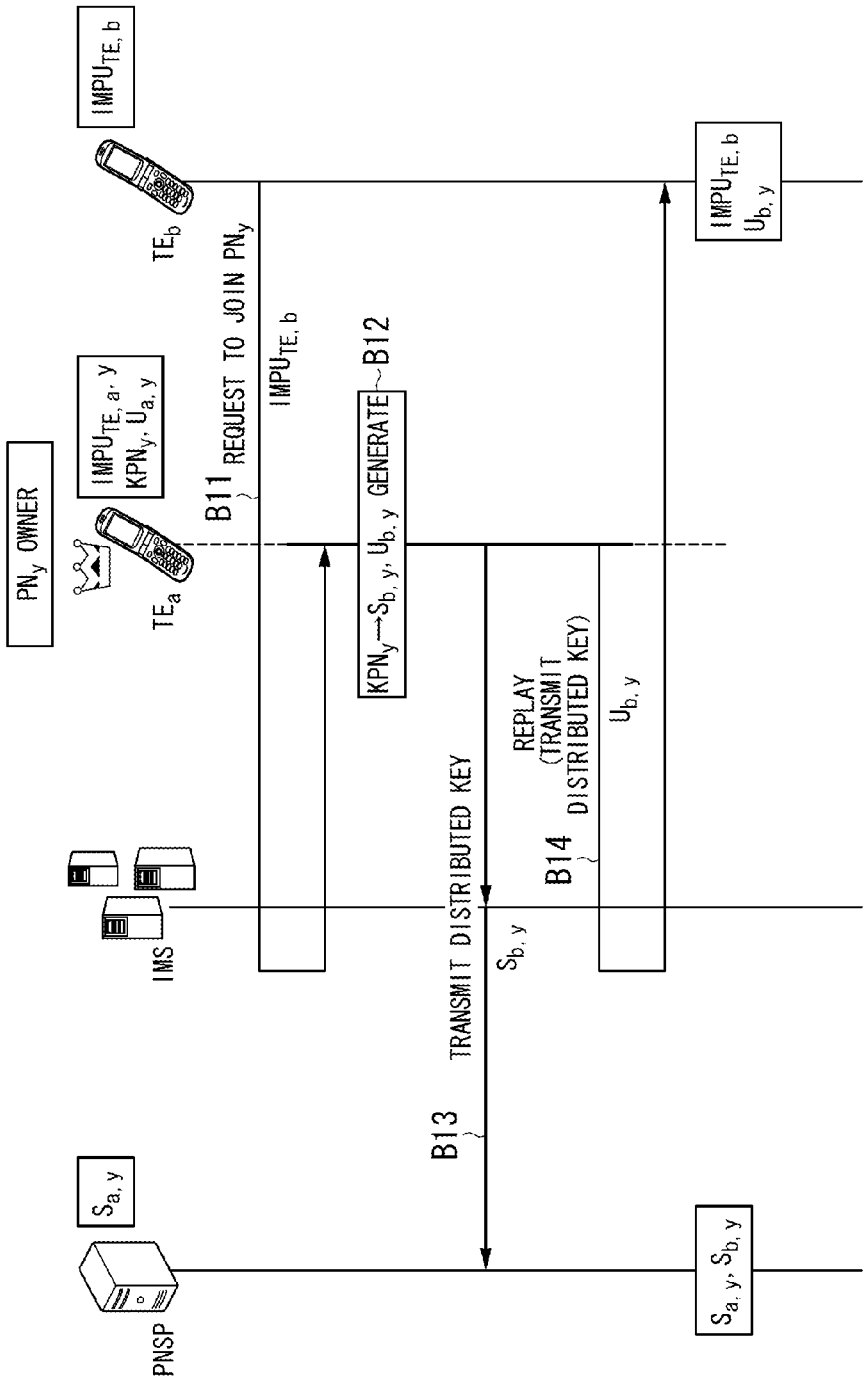
FIG. 10 is a sequence chart showing a processing procedure of a user usage registration stage according to Embodiment 2.

FIG. 10 is a sequence chart showing a processing procedure of a user usage registration stage according to Embodiment 2. Hereunder, a user usage registration stage is described, with reference to FIG. 10.

Step B11: The user $TE_b14$ transmits a request for joining the group ($PN_y$) to the owner $TE_a14$. At this time, the ID ($IMPU_{TE,b}$) of the user $TE_b14$ is transmitted theretogether to the owner $TE_b14$.

Step B12: In a case where the user B is permitted to join, the owner $TE_a14$ calculates a distributed key 1 ($S_{b,y}$) and a distributed key 2 ($U_{b,y}$) through the following formulas, using a PN-shared key ($KPN_y$).

$$S_{b,y}=x_{u,b,y}\|x_{s,b,y}\|g_{b,y}(x_{s,b,y}), U_{b,y}=x_{u,b,y}\|g_{b,y}(x_{u,b,y})$$

$(x_{s,b,y}, x_{u,b,y} \in Z_k$ is a random number ($k=2^l-1$, l is a bit count of shared key $KPN_y$))

$(f_{b,y}(x)$ is a linear function that satisfies $g_{b,y}(0)=KPN_y$ mod $k, x_{s,b,y}=h("PNSP"\|y\|IMPU_{TE,a})x_{u,b,y}=h$ ("user"$\|y\|IMPU_{TE,b}$), h is a unidirectional hash function that satisfies $h: \{0,1\}^* \rightarrow \{0,1\})$     [Formulas 6]

Step B13: The owner $TE_a14$ transmits the distributed key 1 ($S_{b,y}$) to PNSP11. PNSP11 stores the distributed key 1 ($S_{b,y}$) in a memory device.

Step B14: The owner $TE_a14$ transmits the distributed key 2 ($U_{b,y}$) to the user $TE_b14$. The user $TE_b14$ stores the distributed key 2 ($U_{b,y}$) in a memory device.

[Communication Terminal Addition Stage]

Figure 11:
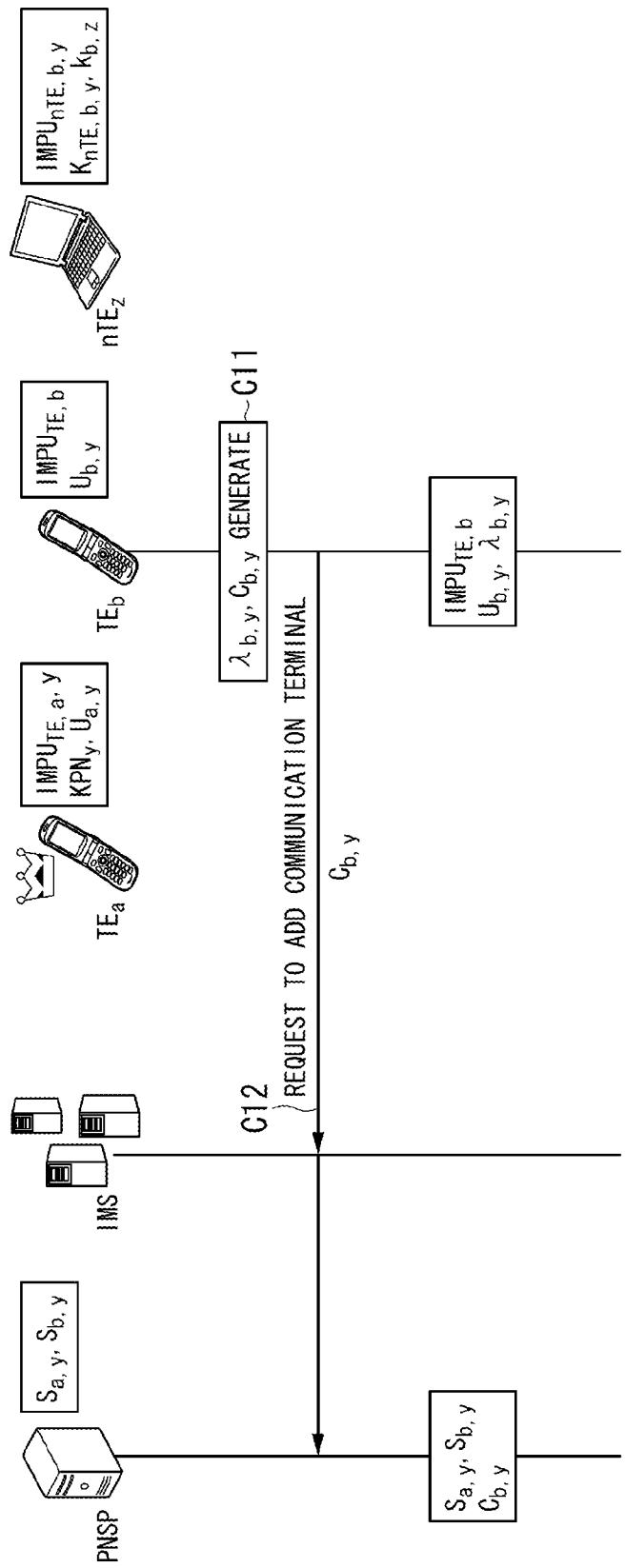
FIG. 11 is a sequence chart showing a processing procedure of a communication terminal addition stage according to Embodiment 2.

FIG. 11 is a sequence chart showing a processing procedure of a communication terminal addition stage according to Embodiment 2. Hereunder, a communication terminal addition stage is described, with reference to FIG. 1L Step C11: In a case of adding $nTE_z13$ to the group ($PN_y$), the user $TE_b14$ calculates encryption information ($\lambda_{b,y}$) and encrypted distributed key information ($C_{b,y} = (g_{\alpha,b,y}, g_{\beta b,y}, c_{b,y})$) through the following formulas, using the distributed key 2 ($U_{b,y}$) and "$s_{b,z}$, d, $A_b$".

$$\lambda_{b,y} = \lambda_{b,y} \times s_{b,z}(\lambda_{b,y} = \pi_{i \in P} s_{b,i}, P \text{ is a set of } nTE \text{ of user } b$$
$$\text{that belong to } PNy, \text{When } P \text{ is an empty set,}$$
$$\lambda_{b,y} = 1)$$

$$g_{\alpha,b,y} = g^{\lambda(b,y) \times r} \bmod p, g_{\beta,b,y} = g^{\lambda(b,y) \times dr} \bmod p (r \in Z_p \text{ is a random number})$$

$$c_{b,y} = U_{b,y} \times A^{\lambda(b,y) \times r} \bmod p \qquad \text{[Formulas 7]}$$

Step C12: The user $TE_b14$ transmits the encrypted distributed key information ($C_{b,y}$) to PNSP11. PNSP11 stores the encrypted distributed key information ($C_{b,y}$) received from the user $TE_b14$ in the memory, and updates the encrypted distributed key information ($C_{b,y}$) in the memory. The user $TE_b14$ stores the encryption information ($\lambda_{b,y}$) in the memory.

[Shared Key Restoration Stage]

Figure 12:
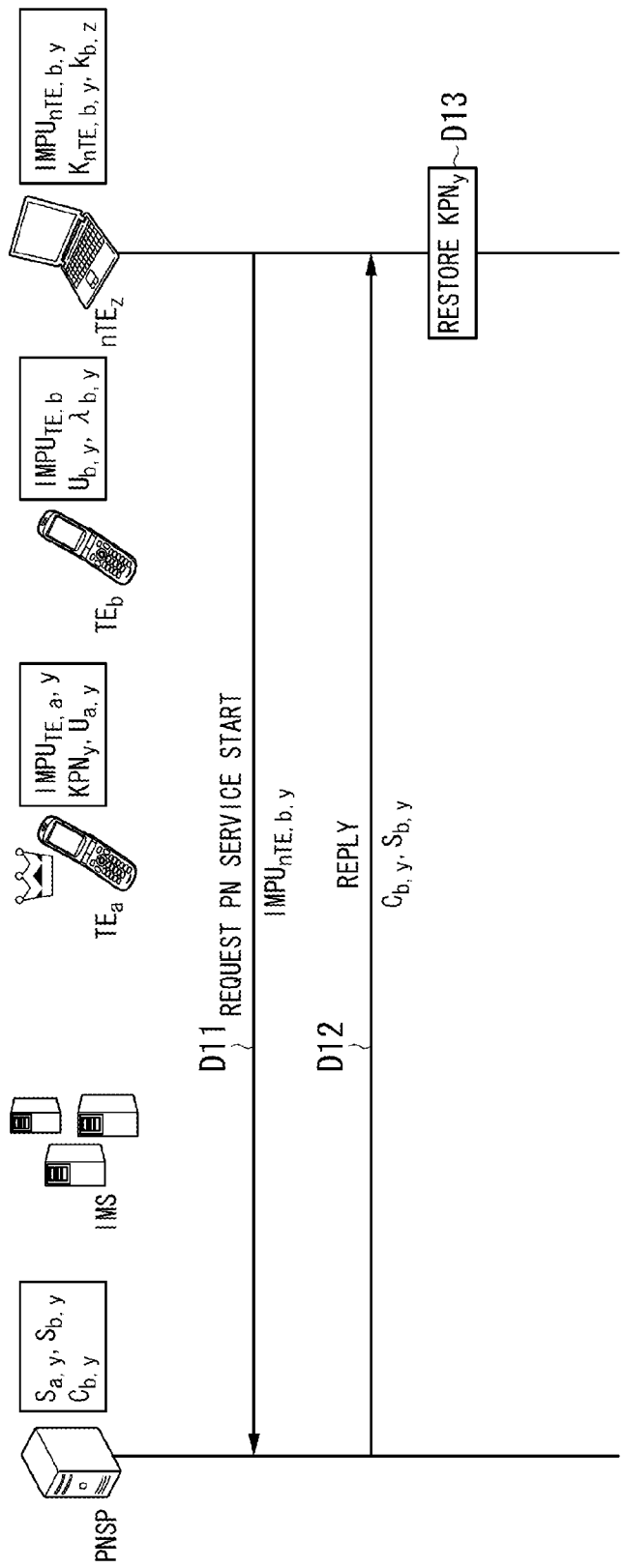
FIG. 12 is a sequence chart showing a processing procedure of a shared key restoration stage according to Embodiment 2.

FIG. 12 is a sequence chart showing a processing procedure of a shared key restoration stage according to Embodiment 2. Hereunder, a shared key restoration stage is described, with reference to FIG. 12.

Step D11: $nTE_z13$ transmits a message to request the group ($PN_y$) to start services, to PNSP11. At this time, ID ($IMPU_{nTE,b,z}$) is added to this message.

Step D12: In response to the request from $nTE_z13$, PNSP11 transmits the encrypted distributed key information ($C_{b,y} = (g_{\alpha,b,y}, g_{\beta b,y}, c_{b,y})$) and the distributed key 1 ($S_{b,y}$) to $nTE_z13$.

Moreover, confidentiality and integrity of communications between $nTE_z13$ and PNSP11 can be maintained by the shared key ($K_{nTE,b,z}$).

Step D13: $nTE_z13$ restores the PN-shared key ($KPN_y$) through the following formulas, using the encrypted distributed key information ($C_{b,y} = (g_{\alpha,b,y}, g_{\beta b,y}, c_{b,y})$) received from PNSP11, the distributed key 1 ($S_{b,y}$), and the terminal key information ($k_{b,z} = (\alpha_{b,z}, \beta_{b,z})$) stored in itself.

$$c_{b,y} \times g_{\alpha,b,y}^{\beta(b,z)} \times g_{\beta,b,y}^{\alpha(b,z)} = U_{b,y} \times A^{\lambda(b,y) \times r} \times \qquad \text{[Formulas 8]}$$
$$g^{\lambda(b,y) \times r \times \beta(b,z)} \times$$
$$g^{\lambda(b,y) \times dr \times \alpha(b,z)}$$
$$= U_{b,y}$$

$$A^{\lambda(b,y) \times r} \times g^{\lambda(b,y) \times r \times \beta(b,z)} \times g^{\lambda(b,y) \times dr \times \alpha(b,z)} = g^{\wedge} \left\{ r\lambda_{b,y} \times \right.$$
$$\left. \left( \sum_{1 \leq j \leq n} \sum_{1 \leq i \leq n-1} a_i x_{b,j}^i + s_{b,z} x_{b,z}^n + dd^{-1} \sum_{1 \leq i \leq n, i \neq z} x_{b,i}^n \right) \right\}$$

$(g^{\wedge} x \text{ is } g \text{ to the xth power}) =$ $$g^{\wedge} \left\{ r\lambda_{b,y} \times \left( \sum_{1 \leq j \leq n} \sum_{1 \leq i \leq n-1} a_i x_{b,j}^i + x_{b,z}^n + \sum_{1 \leq i \leq n, i \neq z} x_{b,i}^n \right) \right\}$$

$(\lambda_{b,y} s_{b,z} = \lambda_{b,y}) =$ $$g^{\wedge} \left\{ r\lambda_{b,y} \times \left( \sum_{1 \leq j \leq n} f(x_{b,j}) \right) \right\} = 1 (f_b(x_{b,j}) = 0)$$

$$KPN_y = g_{b,y}(0)$$
$$= g_{b,y}(x_{s,b,y})(-x_{u,b,y}/x_{u,b,y} - x_{s,b,y}) +$$
$$g_{b,y}(x_{u,b,y})(-x_{s,b,y}/x_{s,b,y} - x_{u,b,y}) \bmod k$$

$(U_{b,y} = x_{u,b,y} \| f_{b,y}(x_{u,b,y}), S_{b,y} = x_{u,b,y} \| x_{s,b,y} \| f_{b,y}(x_{s,b,y}))$

As a result, $nTE_z13$ becomes able to receive common services in the group ($PN_y$), using the PN-shared key ($KPN_y$).

[Communication Terminal Departure Stage]

Figure 13:
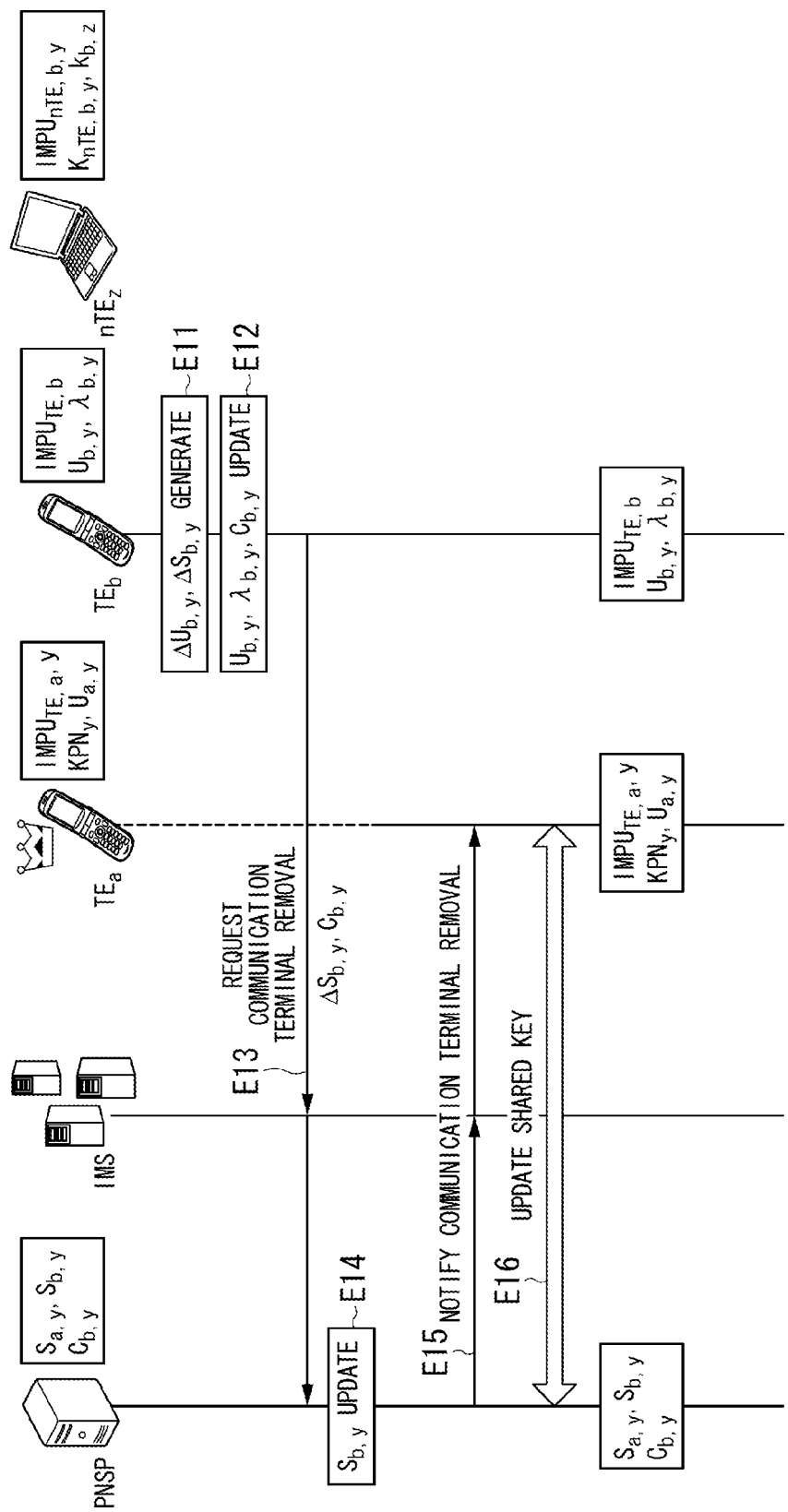
FIG. 13 is a sequence chart showing a processing procedure of a communication terminal departure stage according to Embodiment 2.

FIG. 13 is a sequence chart showing a processing procedure of a communication terminal departure stage according to Embodiment 2. Hereunder, a communication terminal departure stage is described, with reference to FIG. 13.

Step E11: In a case where $nTE_z13$ departs from the group ($PN_y$), the user $TE_b14$ calculates distributed key update information ($\Delta U_{b,y}, \Delta S_{b,y}$) through the following formulas.

$$\Delta U_{b,y} = g_0(x_{u,b,y}), \Delta S_{b,y} = a_0(g_0(x) = a_0 x(a_0 \in Z_p \text{ is a random number})) \qquad \text{[Formulas 9]}$$

Step S12: The user $TE_b14$ updates the distributed key 2 ($U_{b,y}$), which is possessed by itself, to a distributed key 2 ($Uf_{b,y}$) through the following form.ulas, using distributed key update information ($\Delta U_{b,y}$). Furthermore, the user $TE_b14$ calculates and updates the encryption information ($\lambda_{b,y}$) and the encrypted distributed key information ($C_{b,y} = (g_{\alpha,b,y}, g_{\alpha b,y}, c_{b,y})$) through the following formulas, using the distributed key 2 ($U'_{b,y}$), the encryption information ($\lambda_{b,y}$), and "$s_{b,z}$, d, $A_b$".

$$U'_{b,y} = x_{u,b,y} \| (g_{b,y}(x_{u,b,y}) + \Delta U_{b,y} \bmod k)$$

$$\lambda_{b,y} = \lambda_{b,y}/s_{b,z}, g_{\alpha,b,y} = g^{\lambda(b,y) \times r} \bmod p, g_{\beta,b,y} = g^{\lambda(b,y) \times dr} \bmod p (r \in Z_p \text{ is a random number})$$

$$c_{b,y} = U'_{b,y} \times A^{\lambda(b,y) \times r} \bmod p \qquad \text{[Formulas 10]}$$

Step E13: The user $TE_b14$ transmits the updated encrypted distributed key information ($C_{b,y}$) and distributed key update information ($\Delta S_{b,y}$) to PNSP11. PNSP11 stores the encrypted distributed key information ($C_{b,y}$) received from the user $TE_b14$ in the memory, and updates the encrypted distributed key information ($C_{b,y}$) in the memory.

Step S14: PNSP11 updates the distributed key 1 ($S_{b,y}$), which is possessed by itself, to a distributed key 1 ($S'_{b,y}$) through the following formulas, using distributed key update information ($\Delta S_{b,y}$) received from the user $TE_b14$.

$$S'_y = x_{u,b,y} \| x_{s,b,y} \| (g_{b,y}(x_{s,b,y}) + \Delta S_{b,y} \times x_{s,b,y} \bmod k) \qquad \text{[Formulas 11]}$$

Step E15: PNSP11 transmits a message which notifies completion of communication terminal departure to the owner $TE_a14$. As a result, the owner $TE_a14$ performs a shared key update stage described later (step E16). If the same PN-shared key ($KPN_y$) should continue to be used, the shared key update stage is not performed.

[User Departure Stage]

Figure 14:
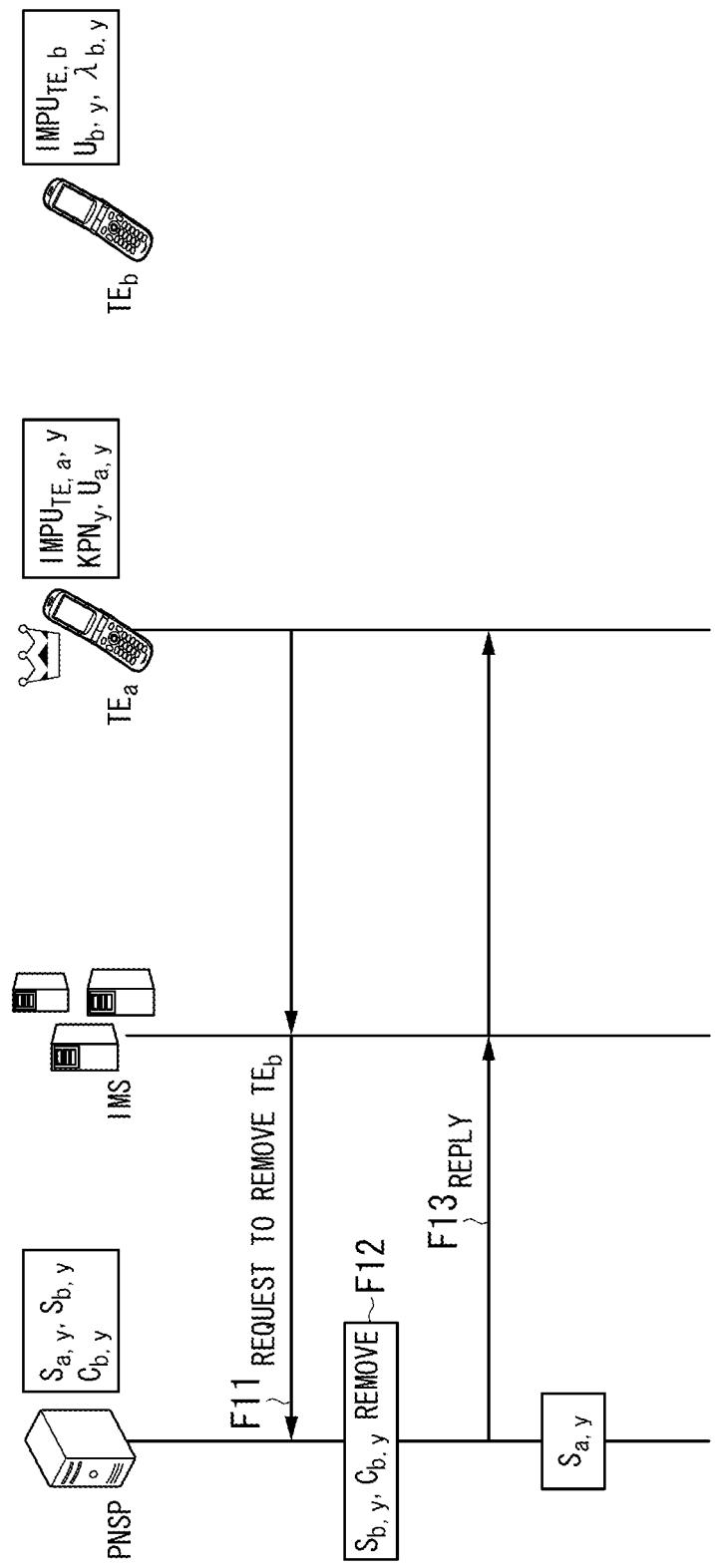
FIG. 14 is a sequence chart showing a processing procedure of a user departure stage according to Embodiment 2.

FIG. 14 is a sequence chart showing a processing procedure of a user departure stage according to Embodiment 2. Hereunder, the user departure stage is described, with reference to FIG. 14.

Step F11: The owner $TE_a14$ transmits, to PNSP11, a message which requests removal of the encrypted distributed key information ($C_{b,y}$) related to the user $TE_b14$ departing from the group ($PN_y$), and the distributed key 1 ($S_{b,y}$).

Step F12: In response to the removal request, PNSP11 removes the encrypted distributed key information ($C_{b,y}$) related to the user $TE_b14$, and the distributed key 1 ($S_{b,y}$).

Step F13: PNSP11 transmits, to the owner $TE_a14$, a message which notifies that the encrypted distributed key information ($C_{b,y}$) related to the user $TE_b14$, and the distributed key 1 ($S_{b,y}$) has been removed.

[Shared Key Update Stage]

Figure 15:
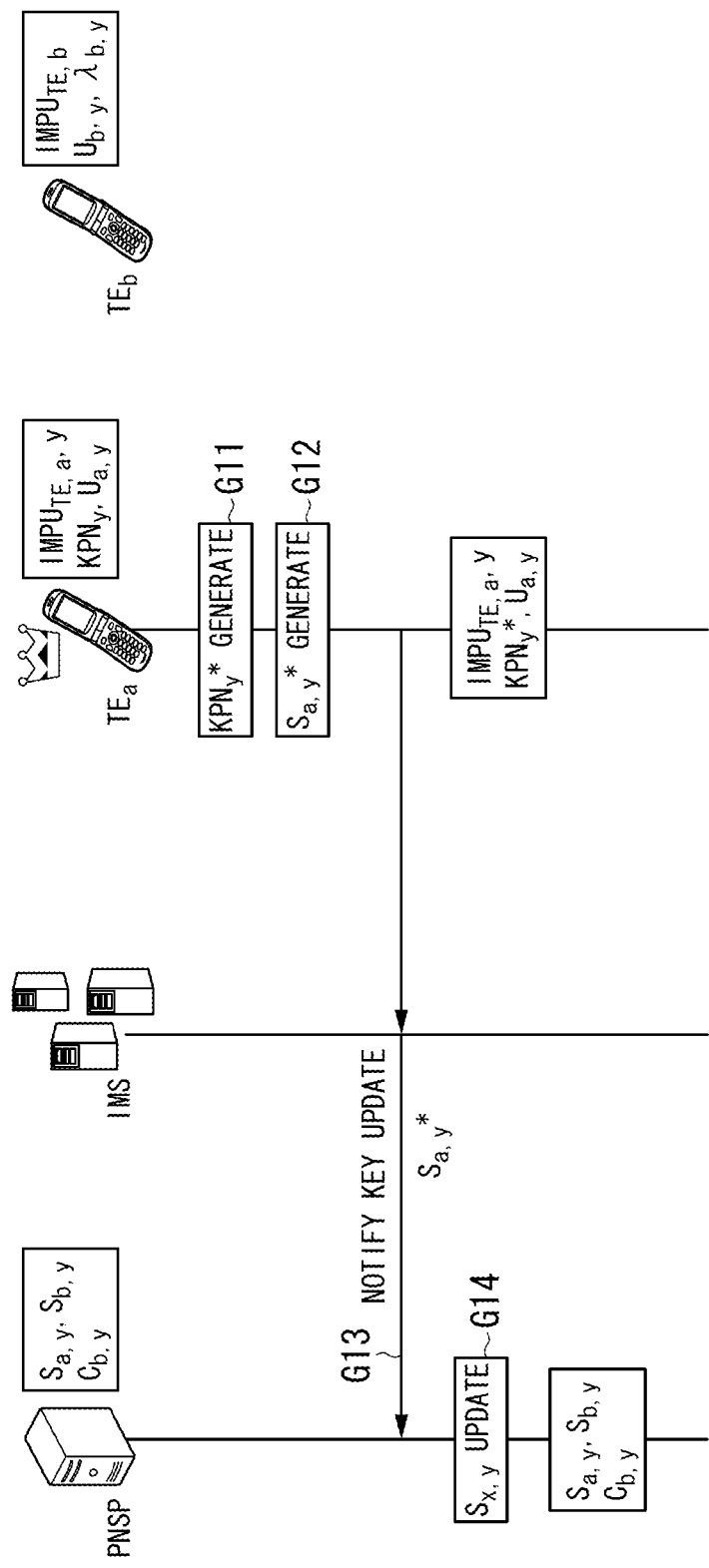
FIG. 15 is a sequence chart showing a processing procedure of a shared key update stage according to Embodiment 2.

FIG. 15 is a sequence chart showing a processing procedure of a shared key update stage according to Embodiment 2. Hereunder, a shared key update stage is described, with reference to FIG. 15.

Step G11: The owner $TE_a14$ randomly generates a new PN-shared key ($KPN_y^*(\in Z_k)$) of a group ($PN_y$), and stores it in the memory.

Step G12: The owner $TE_a14$ calculates shared key update information ($S^*_{a,y}$) through the following formulas.

$$S^*_{a,y} = x_{u,a,y} \| x_{s,a,y} \| g^*_{a,y}(x_{s,a,y})$$

$g^*_{a,y}(x)$ is a linear function that satisfies $g^*_{a,y}(0) = KPN_y, g^*_{a,y}(x_{u,a,y}) = g_{a,y}(x_{u,a,y})$, $U_{a,y} = x_{u,a,y} \| g_{a,y}(x_{u,a,y})$, h is a unidirectional hash function that satisfies $h:\{0,1\}^* \to \{0,1\}^{19}$  [Formulas 12]

Step G13: The owner $TE_a14$ transmits the shared key update information ($S^*_{a,y}$) to PNSP11.

Step G14: PNSP11 updates the distributed key 1 ($S_{b,y}$) possessed by itself through the following formulas, using the shared key update information ($S^*_{a,y}$) received from the owner $TE_a14$.

$$S^*_{b,y} = x_{u,b,y} \| x_{s,b,y} \| g^*_{b,y}(x_{s,b,y})$$

where $g^*_{b,y}(x_{s,b,y}) = g_{b,y}(x_{s,b,y}) + \{x_{u,a,y}(x_{u,b,y} - x_{s,b,y})/x_{u,b,y}(x_{u,a,y} - x_{s,a,y})\} \times \{g^*_{a,y}(x_{s,a,y}) - g_{a,y}(x_{s,a,y})\}$ $(S_{a,y} = x_{u,a,y} \| x_{s,a,y} \| g_{a,y}(x_{s,a,y}), S_{x,y} = x_{u,x,y} \| x_{s,x,y} \| g_{x,y}(x_{s,x,y}))$  [Formulas 13]

This completes the description of Embodiment 2.

Embodiment 3

Embodiment 3 differs from the above Embodiment 2 in the method of distributing the PN-shared key ($KPN_y$). In Embodiment 2 described above, the PN-shared key ($KPNy$) is distributed by means of a secret sharing scheme. However, in Embodiment 3, the PN-shared key ($KPN_y$) is distributed by means of exclusive-OR (XOR). Hereunder, only the points that differ from those in Embodiment 2 are described.

[User Usage Registration Stage]

In a case where the user B is permitted to join the group ($PN_y$), the owner $TE_a14$ generates a random number ($r_{b,y}$ ($\in Z_k$)), and calculates a distributed key 1 ($S_{b,y}$) and a distributed key 2 ($U_{b,y}$) related to the PN-shared key ($KPN_y$) through the following formulas.

$S_{b,y} = r_{b,y}, U_{b,y} = r_{b,y} \oplus KPN_y$, where "$A \oplus B$" represents an XOR computation at the bit unit $A$ and $B$.  [Formulas 14]

[Shared Key Restoration Stage]

$nTE_z13$ restores the distributed key 2 ($U_{b,y}$) using the encrypted distributed key information ($C_{b,y}$) received from PNSP11 and the terminal key information ($k_{b,z}$) stored with itself, and restores the PN-shared key ($KPN_y$) using the distributed key 1 ($S_{b,y}$) received from PNSP11 and this distributed key 2 ($U_{b,y}$).

$S_{b,y} \oplus U_{b,y} = r_{b,y} \oplus r_{b,y} \oplus KPN_y = KPN_y$  [Formulas 15]

[Communication Terminal Departure Stage]

In a case where $nTE_z13$ departs from the group ($PN_y$), the user $TE_b14$ calculates distributed key update information ($\Delta U_{b,y}, \Delta S_{b,y}$) through the following formulas. Moreover, the user $TE_b14$ updates the distributed key 2 ($U_{b,y}$), which is possessed by itself, to a distributed key 2 ($U'_{b,y}$) through the following formulas. Furthermore, PNSP11 updates the distributed key 1 ($S_{b,y}$), which is possessed by itself, to a distributed key 1 ($S'_{b,y}$) through the following formulas.

$\Delta S_{b,y} = \Delta U_{b,y} = r'(r' \in Z_p$ is a random number)

$S'_{b,y} = \Delta S_{b,y} \oplus S_{b,y}, U'_{b,y} = \Delta U_{b,y} \oplus U_{b,y}$  [Formulas 16]

[Shared Key Update Stage]

The owner $TE_a14$ randomly generates a new PN-shared key ($KPN_y^*(\in Z_k)$) of the group ($PN_y$), and calculates shared key update information ($S^*_{a,y}$) through the following formula.

$S^*_{x,y} = KPN_y^* \oplus KPN_y$  [Formulas 17]

PNSP11 updates the distributed key 1 ($S_{b,y}$) possessed by itself through the following formulas, using the shared key update information ($S^*_{a,y}$) received from the owner $TE_a14$. PNSP11 does not store the shared key information ($S^*_{a,y}$) and removes it.

$S^*_{x,y} = S^*_{a,y} \oplus S_{x,y}$

Further, PN-shared key ($KPN_y^*$) can be restored as follows, based on $S^*_{b,y}$ and $U_{b,y}$.

$S^*_{x,y} \oplus U_{x,y} = S^*_{a,y} \oplus S_{x,y}$
$\oplus U_{x,y} = KPN_y^* \oplus KPN_y \oplus KPN_y = KPN_y^*$  [Formulas 18]

This completes the description of Embodiment 3.

Next, Embodiment 4 through Embodiment 9, which are modified examples of Embodiment 1 described above, are sequentially described. In Embodiments 4 through 9, the following denotations are used.

$TE_X$: Mobile phone of user x (first communication terminal, registered communication terminal)

$TE_{owner}$: Mobile phone of owner (third communication terminal, registered communication terminal)

$PN_y$: Group y $nTE_z$: Device z (second communication terminal, non-registered communication terminal)

IMS: Operator authentication infrastructure (IP multimedia subsystem)

PNSP: Group key management device (management device)

$IMPU_{nTE,x,z}$: IMS ID of $nTE_z$ used by user x (IMPU: IP multimedia public identity)

$K_{nTE,x,z}$: Shared key $nTE_z$ used by user x and PNSP (second shared key)

$K_{PN_y}$: Group shared key in $PN_y$ (key to be used within the group, group key), $1 = |K_{PN_y}|$ $I_{x,z}$: Terminal individual information for $nTE_z$ of user x $k_{x,z}$: Terminal individual information for $nTE_z$ of user x $K_{x,y}$: Encryption information of shared key within $PN_y$ of user x $C_{x,y}$: Encrypted shared key information for $PN_y$ of user x E(k, x): Encrypt x with encryption information x D(k, c): Decrypt c with terminal key information k Embodiment 4

Figure 16:
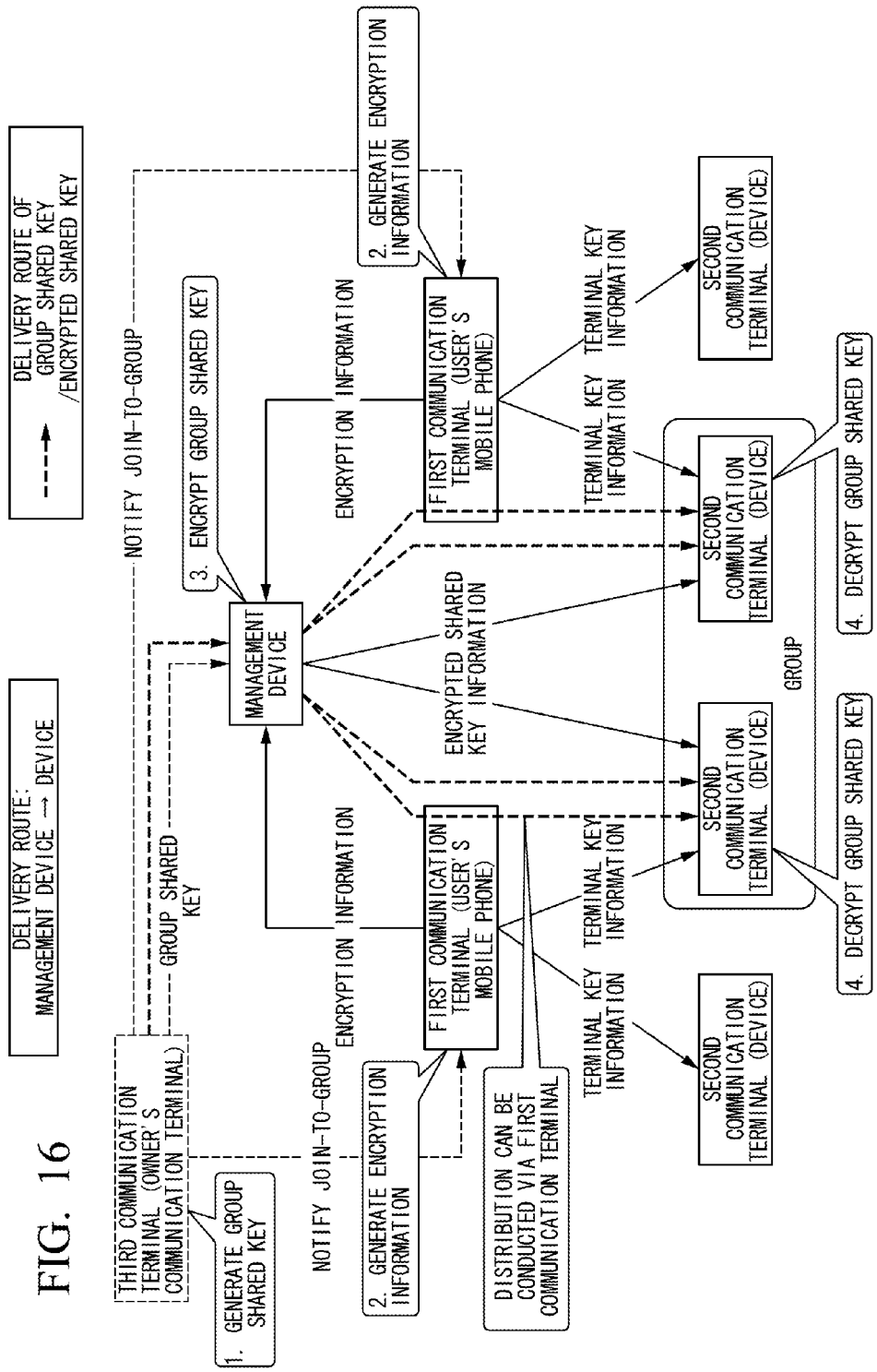
FIG. 16 is a conceptual diagram according to Embodiment 4.

In Embodiment 4, a group shared key (encrypted shared key) is delivered from the management device (PNSP) to the second communication terminal (device, $nTE_z$). FIG. 16 is a conceptual diagram according to Embodiment 4. As shown in FIG. 16, the group shared key is encrypted by the management device (PNSP), and is then transmitted as encrypted shared key information from the management device (PNSP) to the second communication terminal (device, $nTE_z$). The encrypted shared key information may be delivered from the management device (PNSP) to the second communication terminal (device, $nTE_z$) via the first communication terminal (user's mobile phone, $TE_x$).

In FIG. 16, the third communication terminal (owner's mobile phone, $TE_{owner}$) generates a group shared key and transmits it to the management device (PNSP). The first communication terminal (user's mobile phone, $TE_x$) generates terminal key information from terminal individual information for each of the second communication terminals (device, $nTE_z$) to join the group, and transmits the terminal key information to the second communication terminal (device, $nTE_z$). The first communication terminal (user's mobile phone, $TE_x$) generates encryption information using the terminal individual information of the second communication terminals (device, $nTE_z$) to join the group, and transmits the encryption information to the management device (PNSP). The management device (PNSP) encrypts the group shared key using the encryption information, and transmits the encrypted shared key information to the second communication terminal (device, $nTE_z$). The second communication terminal (device, $nTE_z$) decrypts the group shared key, using the encrypted shared key information and the terminal key information.

Figure 17:
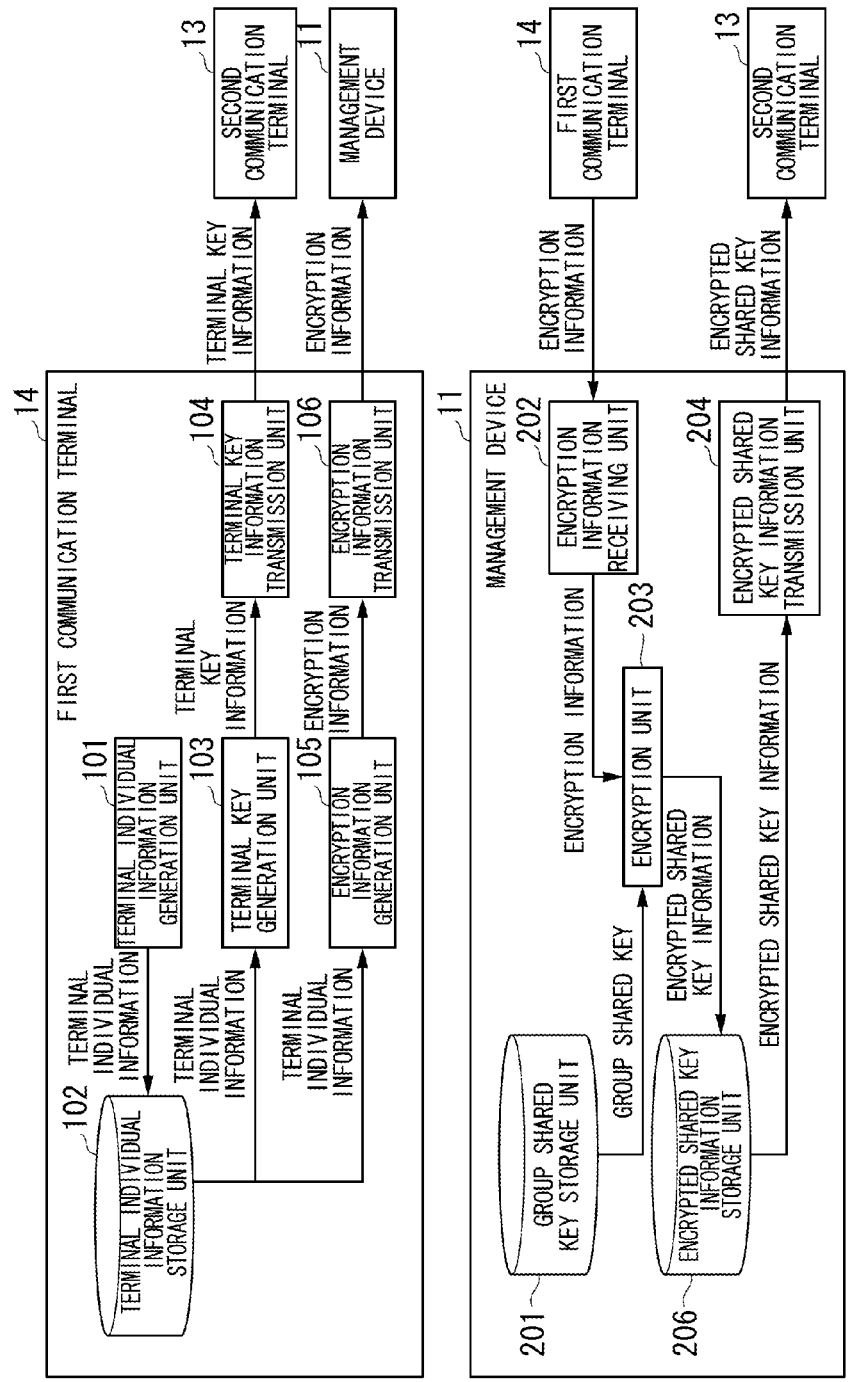
FIG. 17 is a diagram of a device configuration according to Embodiment 4.

FIG. 17 is a diagram of a device configuration according to Embodiment 4. In FIG. 17, the first communication terminal (user's mobile phone, $TE_x$) 14 has a terminal individual information generation unit 101, a terminal individual information storage unit 102, a terminal key information generation unit 103, a terminal key information transmission unit 104, an encryption information generation unit 105, and an encryption information transmission unit 106. The management device (PNSP) 11 has a group shared key storage unit 201, an encryption information receiving unit 202, an encryption unit 203, an encrypted shared key information transmission unit 204, and an encrypted shared key information storage unit 206. Embodiment 4 differs from Embodiment 1 in that the management device (PNSP) generates encrypted shared key information.

Next, among the operations according to Embodiment 4, the points which differ from those in Embodiment 1 are mainly described, with reference to FIG. 18 through FIG. 22. FIG. 18 through FIG. 22 are sequence charts each showing a procedure of operations according to Embodiment 4.

[Preparation Stage]

Figure 18:
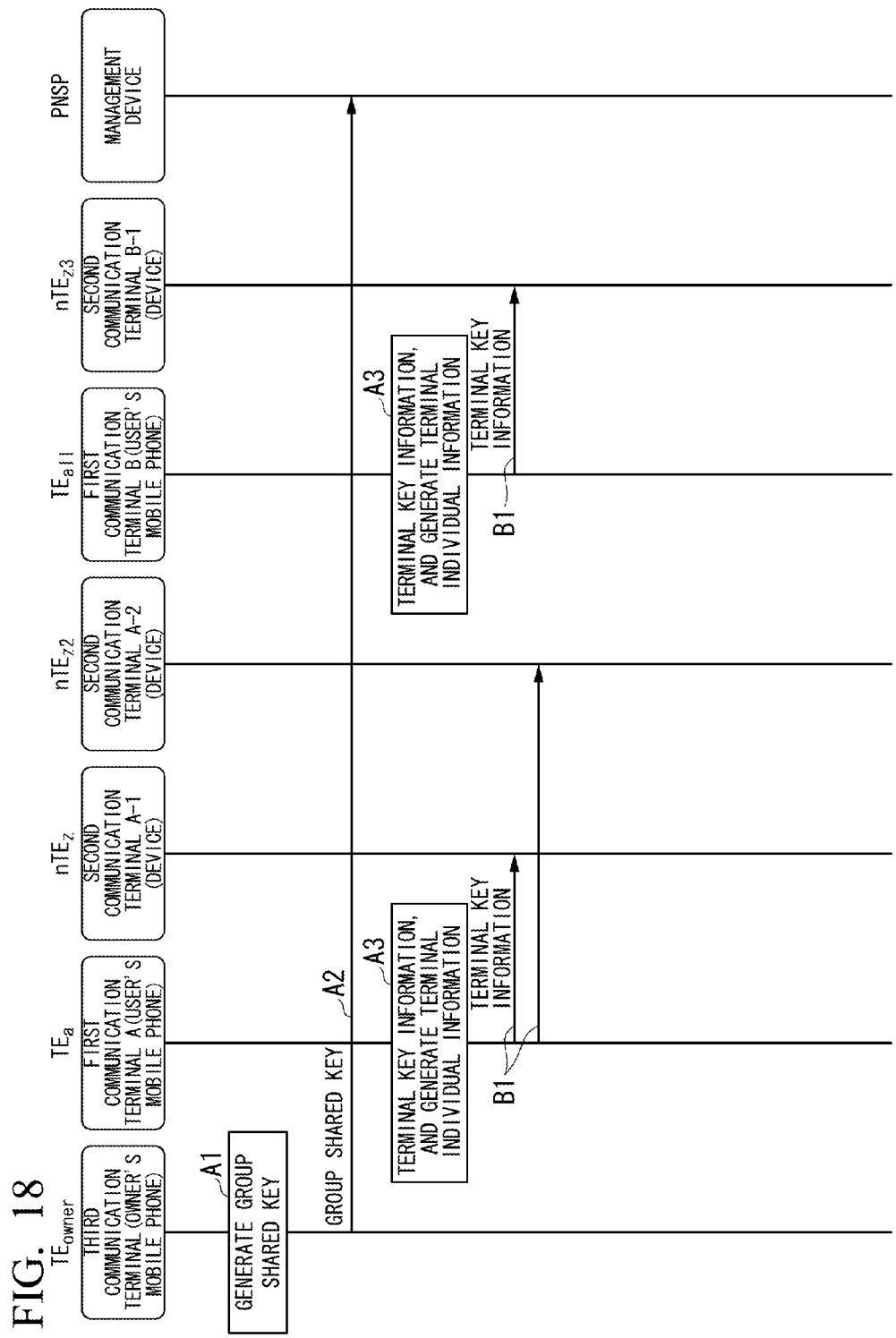
FIG. 18 is a sequence chart of a preparation stage according to Embodiment 4.

FIG. 18 is a sequence chart of a preparation stage according to Embodiment 4. In FIG. 18, the third communication terminal (owner's mobile phone, $TE_{owner}$) generates a group shared key ($K_{PN_y}$) of the group ($PN_y$) (step A1) and transmits it to the management device (PNSP) (step A2). The first communication terminal (user's mobile phone $TE_a$) generates terminal individual information ($I_{a,z}$ (z=1, ..., $N_{nTE}$: $N_{nTE}$ is an upper limit of the number of devices which can be used by user), and generates terminal key information ($k_{a,z}$) from terminal individual information ($I_{a,z}$) (step A3). The first communication terminal (user's mobile phone, $TE_a$) transmits the terminal key information ($k_{a,z}$) to the second communication terminal (device, $nTE_z$) (step B1).

[User Usage Registration Stage]

Figure 19:
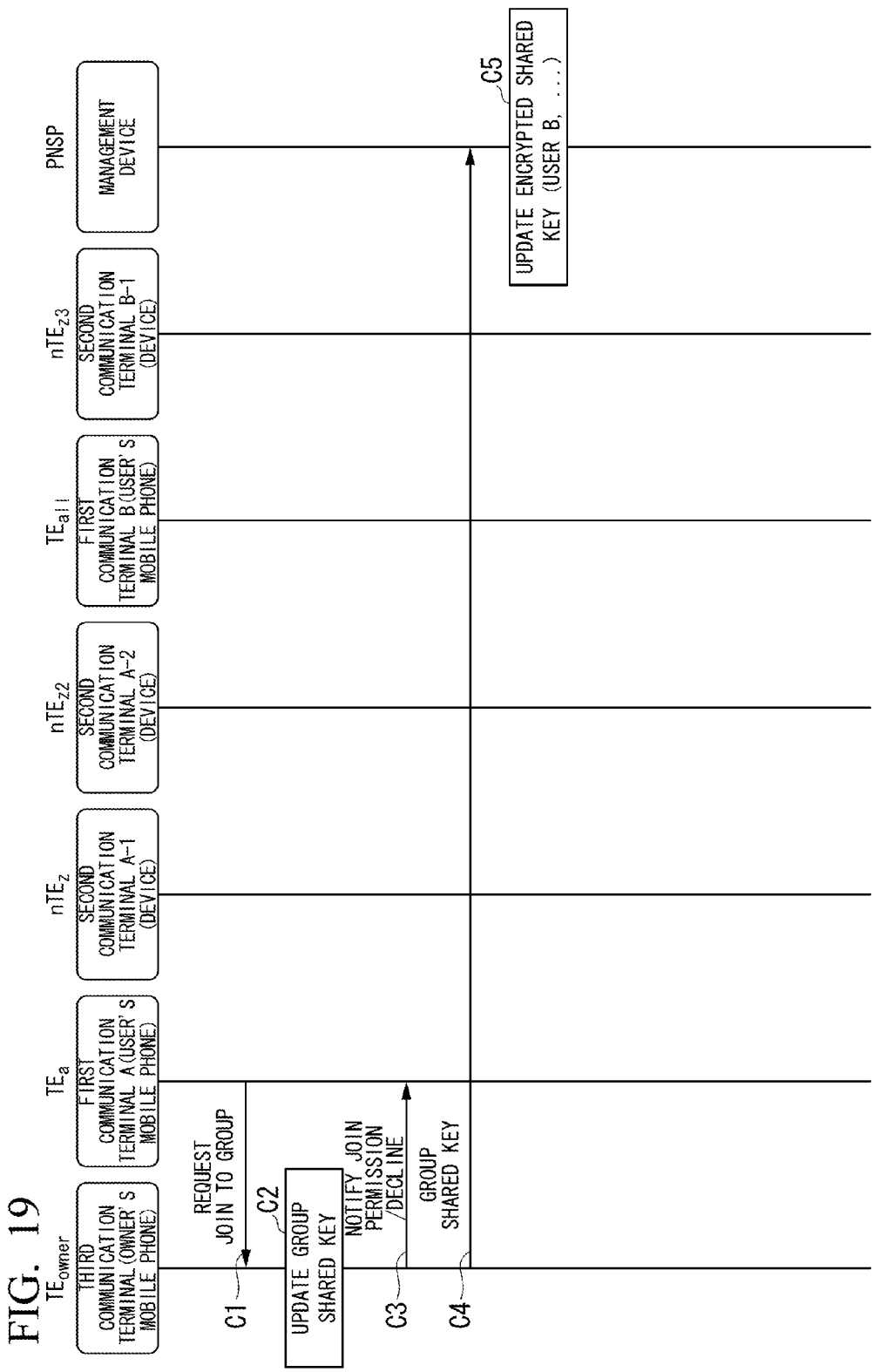
FIG. 19 is a sequence chart of a user usage registration stage according to Embodiment 4.

FIG. 19 is a sequence chart of a user usage registration stage according to Embodiment 4. This is a step in which a user performs usage registration with the owner of a group when joining a group. In FIG. 19, the first communication terminal (user's mobile phone, $TE_a$) transmits a request to join the group ($PN_y$) to the third communication terminal (owner's mobile phone, $TE_{owner}$) (step C1). When permitting the user to join the group ($PN_y$), the third communication terminal (owner's mobile phone, $TE_{owner}$) updates the group shared key ($K_{PN_y}$) from "$K_{PN_y}$" to "$K^*_{PN_y}$" (step C2). The third communication terminal (owner's mobile phone, $TE_{owner}$) replies to the first communication terminal (user's mobile phone, $TE_a$) with a permission for join or decline for join (step C3). When permitting join, the third communication terminal (owner's mobile phone, $TE_{owner}$) transmits the updated group shared key ($K^*_{PN_y}$) to the management device (PNSP) (step C4). The management device (PNSP) encrypts the updated group shared key ($K^*_{PN_y}$) using encryption information corresponding to each group member ($k_{all,y}$), and updates the encrypted shared key information ($C_{all,y}$) to "$C^*_{all,y}=E(K_{all,y}, K^*_{PN_y})$" (step C5).

[Device Addition Stage]

Figure 20:
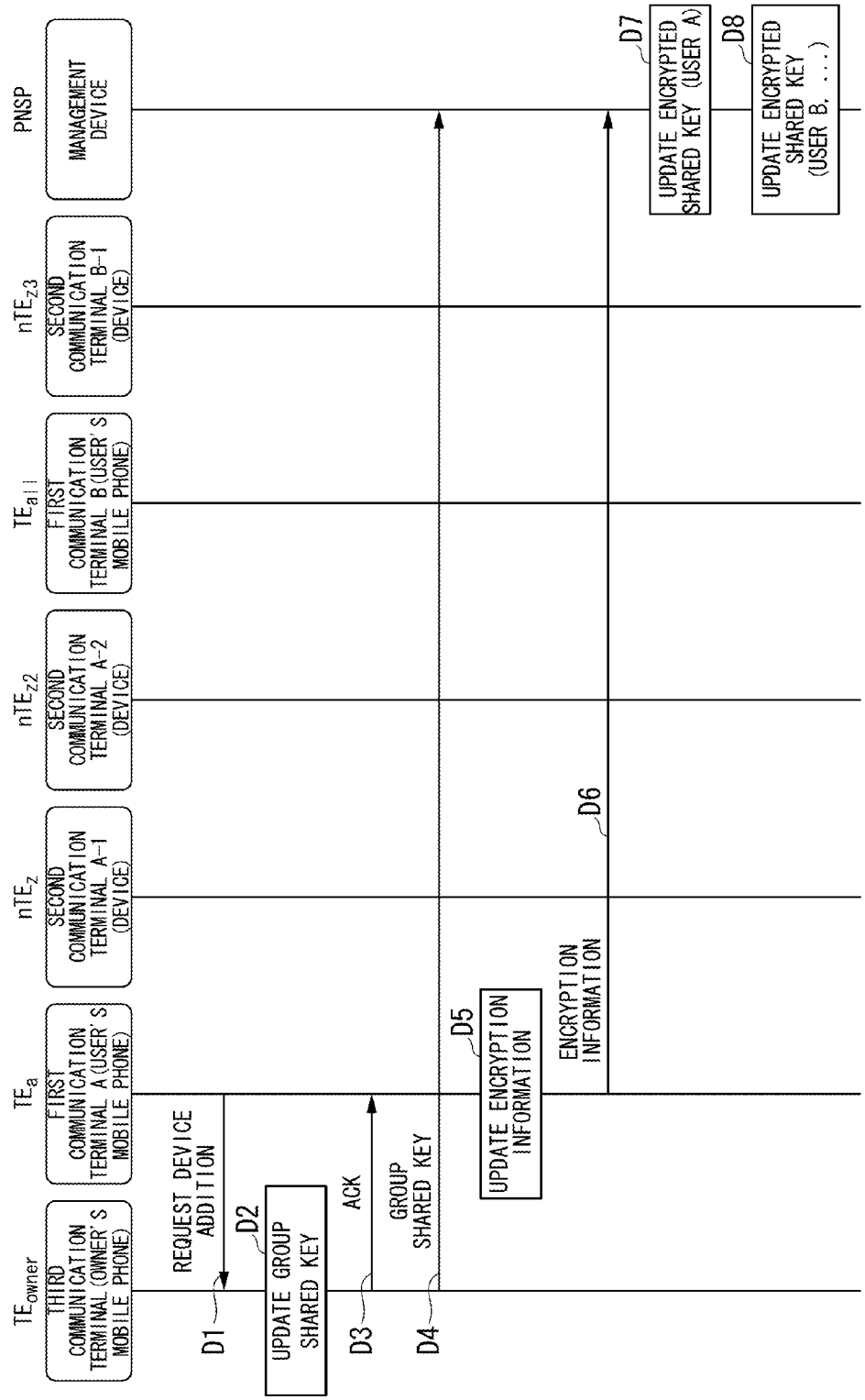
FIG. 20 is a sequence chart of a device addition stage according to Embodiment 4.

FIG. 20 is a sequence chart of a device addition stage according to Embodiment 4. This is a step to be performed when the second communication terminal (device, $nTE_z$) joins the group after a user has performed user usage registration. In FIG. 20, the first communication terminal (user's mobile phone, $TE_a$) requests the third communication terminal (owner's mobile phone, $TE_{owner}$) for an addition of a second communication terminal (device, $TE_z$) (step C1). The third communication terminal (owner's mobile phone, $TE_{owner}$) updates the group shared key ($K_{PN_y}$) from "$K_{PN_y}$" to "$K^*_{PN_y}$" (step D2). The third communication terminal (owner's mobile phone, $TE_{owner}$) replies to the first communication terminal (user's mobile phone, $TE_a$) (step D3). The third communication terminal (owner's mobile phone, $TE_{owner}$) transmits the updated group shared key ($K^*_{PN_y}$) to the management device (PNSP) (step D4).

The first communication terminal (user's mobile phone, $TE_a$) updates the encryption information ($K_{a,y}$) from "$K_{a,y}$" to "$K^*_{a,y}$", using the terminal individual information ($I_{a,z}$, $I_{a,z'}$ (w∈$P_{a,y}$, $P_{a,y}$: aggregate of nTE ($nTE_z$) already engaged with $PN_y$, among the nTE used by user A)) corresponding to the second communication terminal (device, $nTE_z$) added to the group ($PN_y$) and each of the second communication terminals (device, $nTE_z$) already engaged with the group ($PN_y$) (step D5). The first communication terminal (user's mobile phone, $TE_a$) transmits the updated encryption information ($k^*_{a,z}$) to the management device (PNSP) (step D6).

The management device (PNSP) encrypts the group shared key using the encryption information ($K^*_{a,y}$), and generates and updates encrypted shared key information "$C^*_{a,y}=E(K^*_{a,y}, K^*_{PN_y})$" (step D7). The management device (PNSP) generates and updates the encrypted shared key information "$C^*_{all,y}=E(K_{all,y}, K^*_{PN_y})$", using the group shared key ($K^*_{PN_y}$) and the encryption information ($K_{all,y}$) corresponding to each group member (step D8).

[Device Departure Stage]

Figure 21:
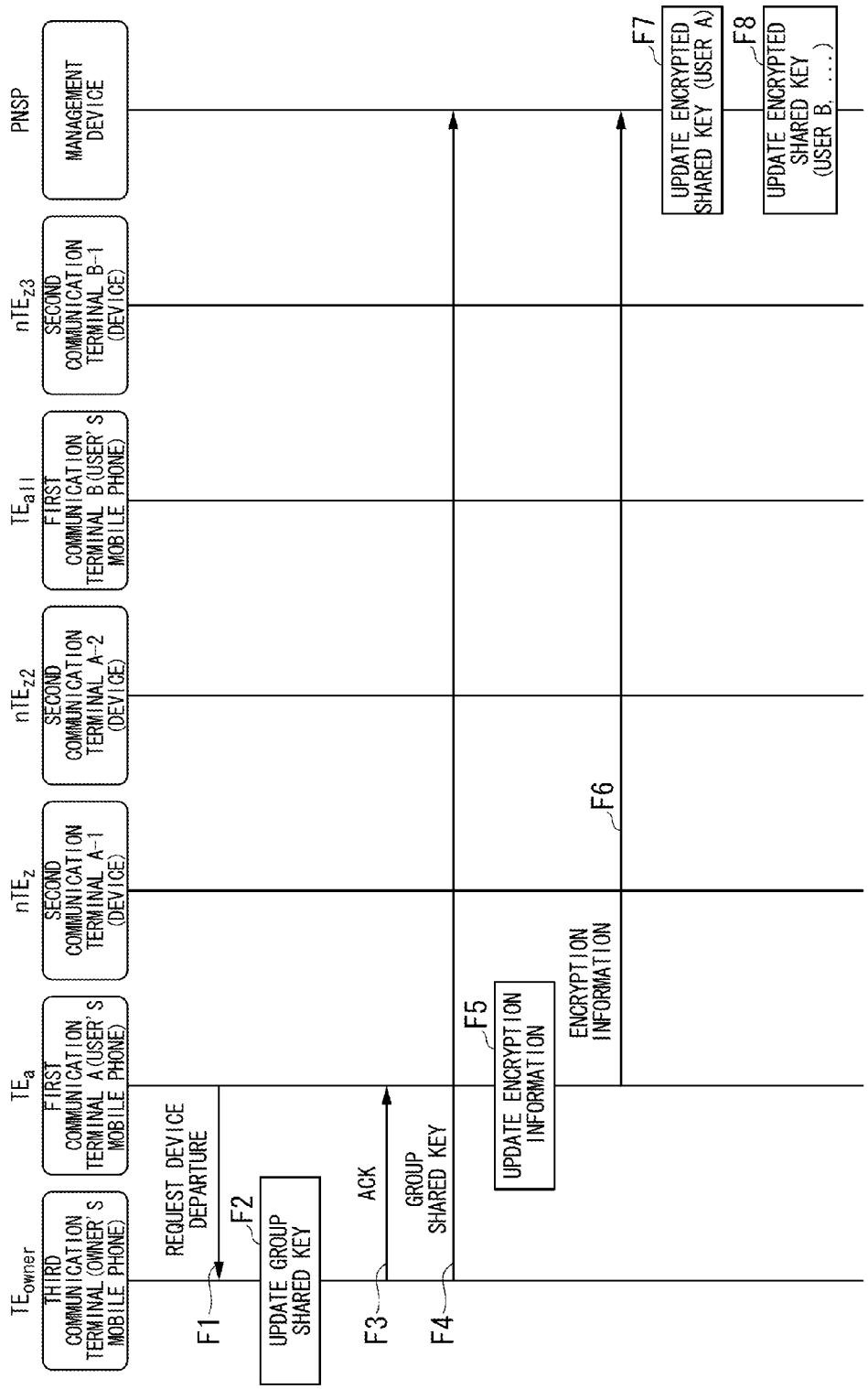
FIG. 21 is a sequence chart of a device departure stage according to Embodiment 4.

FIG. 21 is a sequence chart of a device departure stage according to Embodiment 4. This is a step to be performed when a user makes a second communication terminal (device, $nTE_z$) depart from the group. In FIG. 21, the first communication terminal (user's mobile phone, $TE_a$) transmits a device departure request to the third communication terminal (owner's mobile phone, $TE_{owner}$) (step F1). The third communication terminal (owner's mobile phone, $TE_{owner}$) updates the group shared key ($K_{PN_y}$) from "$K_{PN_y}$" to "$K^*_{PN_y}$" (step F2). The third communication terminal (owner's mobile phone, $TE_{owner}$) replies to the first communication terminal (user's mobile phone, $TE_a$) (step F3). The third communication terminal (owner's mobile phone, $TE_{owner}$) transmits the updated group shared key ($K^*_{PN_y}$) to the management device (PNSP) (step F4).

The first communication terminal (user's mobile phone, $TE_a$) generates and updates encryption information ($K^*_{a,y}$), using the terminal individual information ($I_{a,w}$) corresponding to each of the second communication terminals (device, $nTE_z$) engaged with the group ($PN_y$), other than the second communication terminal (device, $nTE_z$) which has departed from the group ($PN_y$) (step F5). The first communication terminal (user's mobile phone, $TE_a$) transmits the updated encryption information ($k^*_{a,z}$) to the management device (PNSP) (step F6).

The management device (PNSP) encrypts the group shared key using the encryption information ($K^*_{a,y}$), and generates and updates encrypted shared key information "$C^*_{a,y} = E(K^*_{a,y}, K^*_{PN,y})$" (step F7). The management device (PNSP) generates and updates the encrypted shared key information "$C^*_{all,y} = E(K_{all,y}, K^*_{PN,y})$", using the group shared key ($K^*_{PN,y}$) and the encryption information ($K_{all,y}$) corresponding to each group member (step F8).

[User Departure Stage]

Figure 22:
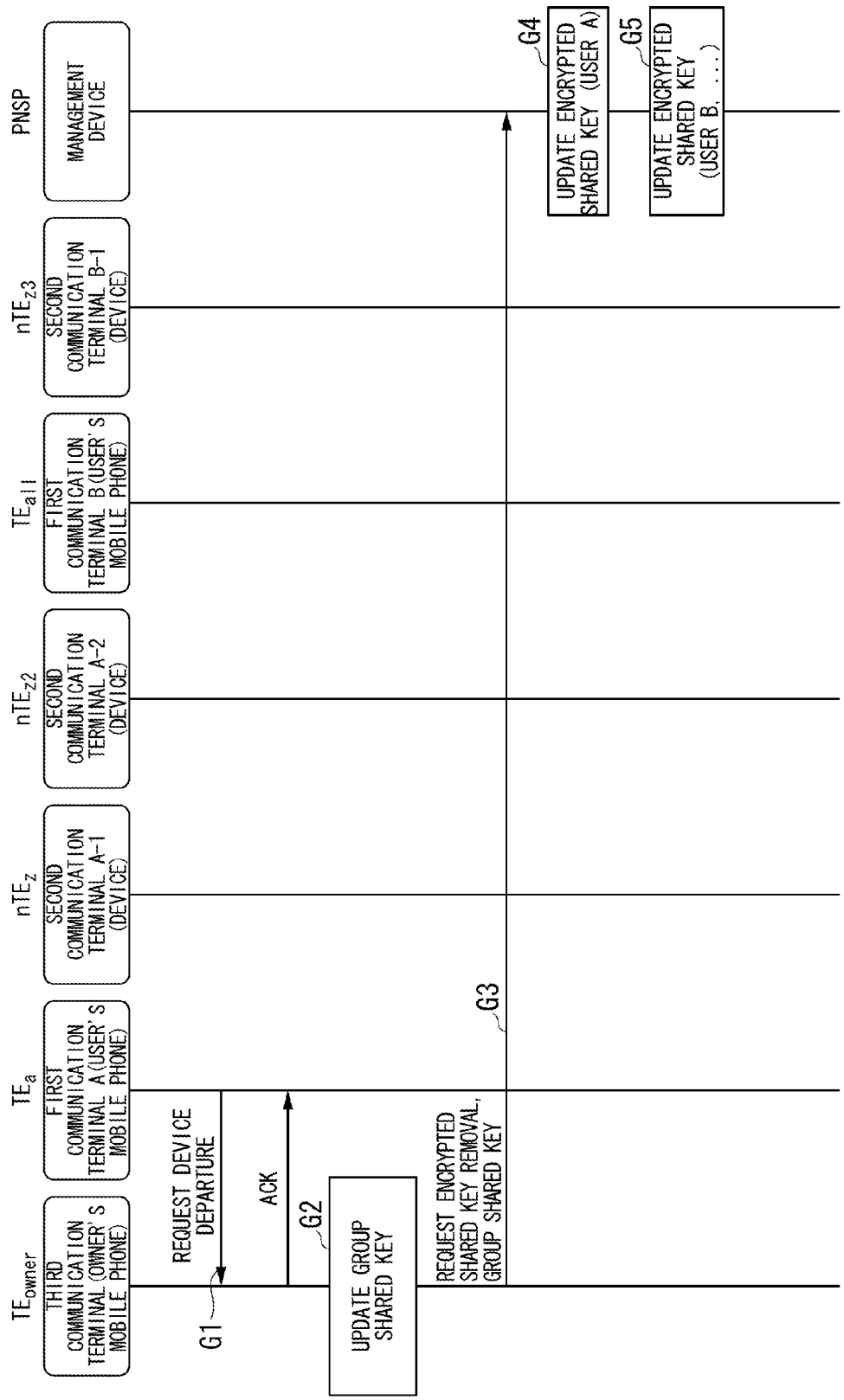
FIG. 22 is a sequence chart of a user departure stage according to Embodiment 4.

FIG. 22 is a sequence chart of a user departure stage according to Embodiment 4. This is a step to be performed when the group owner makes a user depart from the group. In FIG. 21, the first communication terminal (user's mobile phone, $TE_a$) requests the third communication terminal (owner's mobile phone, $TE_{owner}$) for removal of information ($C_{a,y}$) related to the first communication terminal (user's mobile phone, $TE_a$) (step G1). The third communication terminal (owner's mobile phone, $TE_{owner}$) replies to the first communication terminal (user's mobile phone, $TE_a$). The third communication terminal (owner's mobile phone, $TE_{owner}$) updates the group shared key ($K_{PN,y}$) from "$K_{PN,y}$" to "$K^*_{PN,y}$" (step G2). The third communication terminal (owner's mobile phone, $TE_{owner}$) requests the management device (PNSP) for removal of the encrypted shared key information ($C_{a,y}$) related to the first communication terminal (user's mobile phone, TEA and transmits the updated group shared key ($K^*_{PN,y}$) thereto (step G3).

The management device (PNSP) removes the encrypted shared key information ($C_{a,y}$) related to the first communication terminal (user's mobile phone, $TE_a$) (step G4). The management device (PNSP) generates and updates the encrypted shared key information "$C_{all,y} = E(K_{all,y}, K^*_{PN,y})$", using the group shared key ($K^*_{PN,y}$) and the encryption information ($K_{all,y}$) corresponding to each group member (step G5).

This completes the description of Embodiment 4.

Embodiment 5

Figure 23:
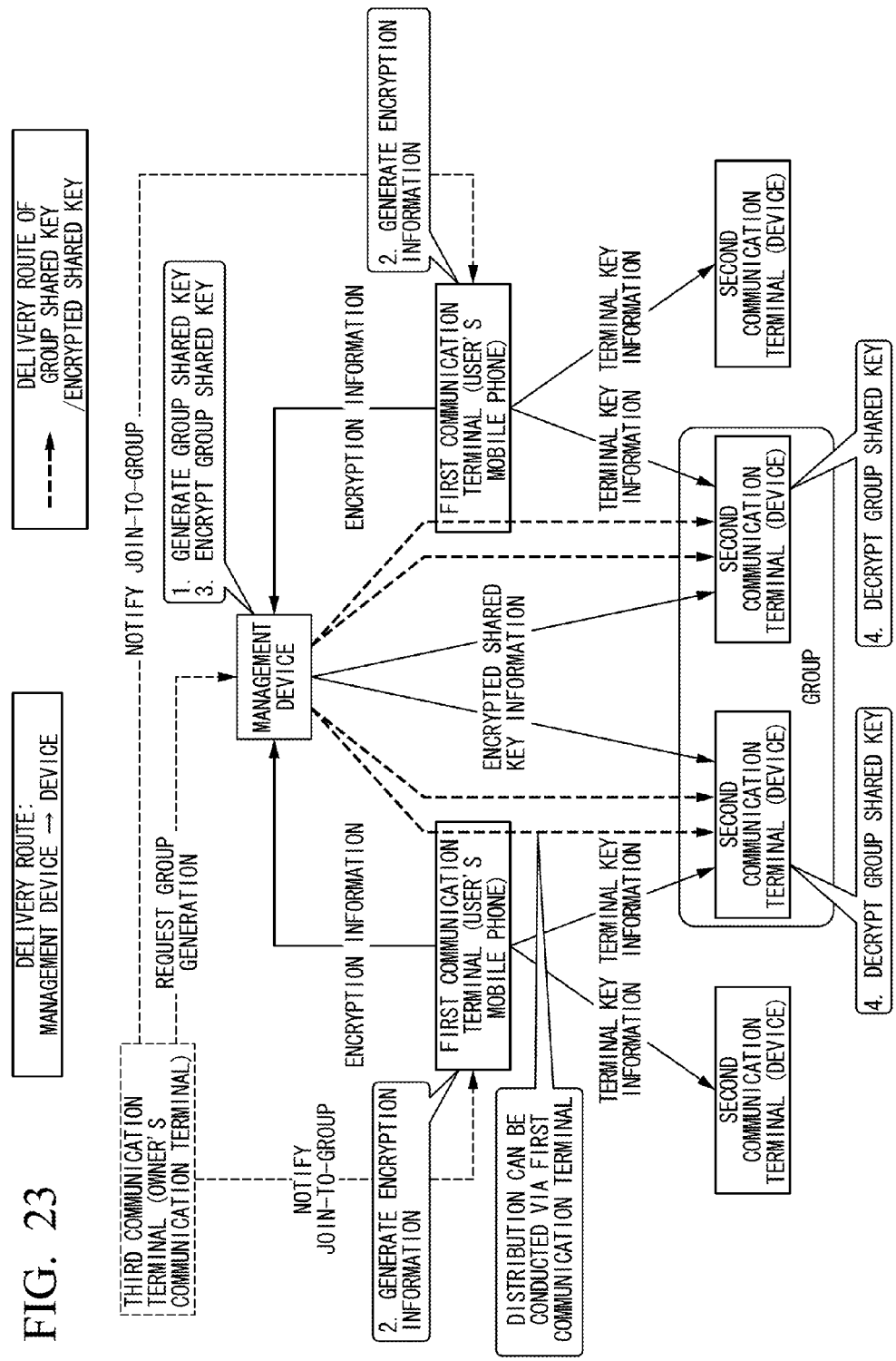
FIG. 23 is a conceptual diagram according to Embodiment 5.

In Embodiment 5, a group shared key (encrypted shared key) is delivered from the management device (PNSP) to the second communication terminal (device, $nTE_z$). FIG. 23 is a conceptual diagram according to Embodiment 5. As shown in FIG. 23, the group shared key is encrypted by the management device (PNSP), and is then transmitted as encrypted shared key information from the management device (PNSP) to the second communication terminal (device, $nTE_z$). The encrypted shared key information may be delivered from the management device (PNSP) to the second communication terminal (device, $nTE_z$) via the first communication terminal (user's mobile phone, $TE_x$).

In FIG. 23, the management device (PNSP) generates a group shared key. The first communication terminal (user's mobile phone, $TE_x$) generates terminal key information from terminal individual information for each of the second communication terminals (device, $nTE_z$) to join the group, and transmits the terminal key information to the second communication terminal (device, $nTE_z$). The first communication terminal (user's mobile phone, $TE_x$) generates encryption information using the terminal individual information of the second communication terminals (device, $nTE_z$) to join the group, and transmits the encryption information to the management device (PNSP). The management device (PNSP) encrypts the group shared key using the encryption information, and transmits the encrypted shared key information to the second communication terminal (device, $nTE_z$). The second communication terminal (device, $nTE_z$) decrypts the group shared key, using the encrypted shared key information and the terminal key information.

Figure 24:
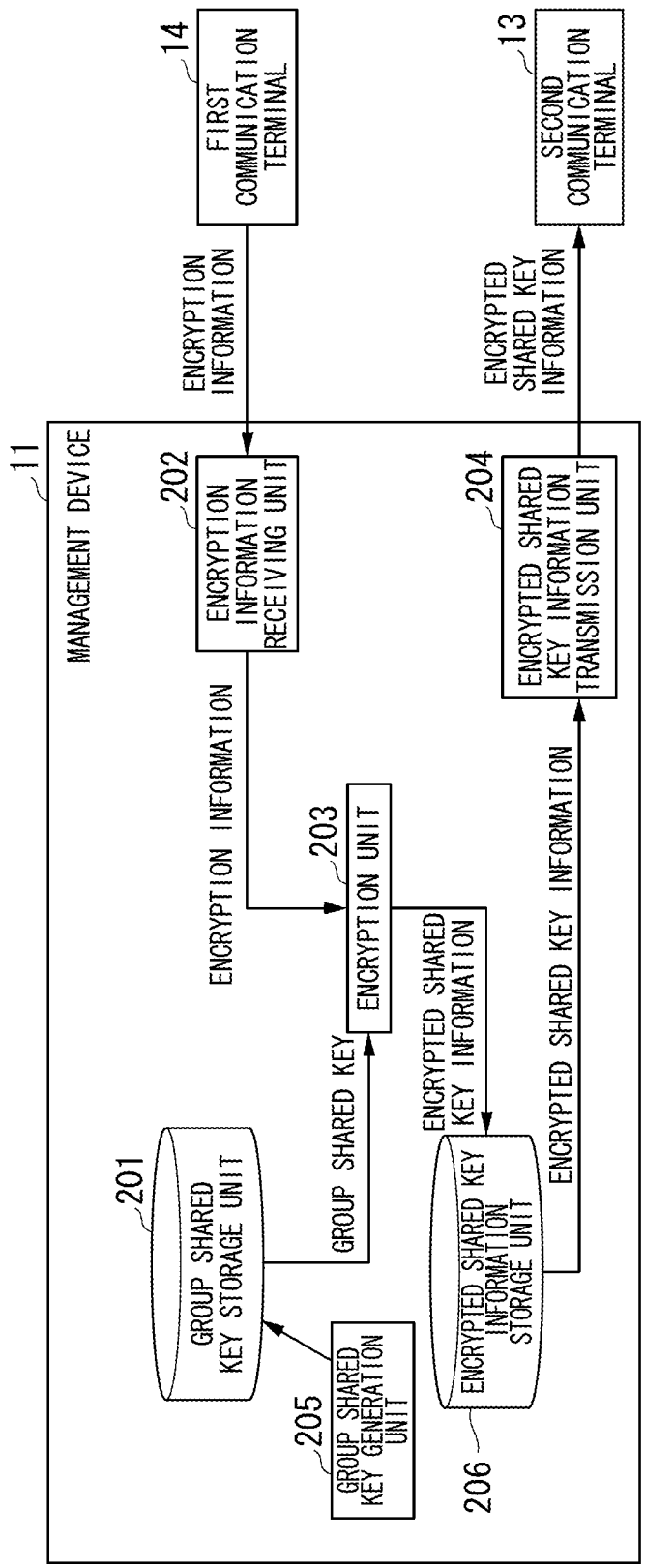
FIG. 24 is a diagram of a device configuration according to Embodiment 5.

FIG. 24 is a diagram of a device configuration according to Embodiment 5. In FIG. 24, the management device (PNSP) 11 has a group shared key storage unit 201, an encryption information receiving unit 202, an encryption unit 203, an encrypted shared key information transmission unit 204, a group shared key generation unit 205, and an encrypted shared key information storage unit 206. A first communication terminal (user's mobile phone, $TE_x$) is of a configuration similar to that of Embodiment 4 illustrated in FIG. 17. Embodiment 5 differs from Embodiment 1 in that the management device (PNSP) generates a group shared key and encrypted shared key information.

Next, among the operations according to Embodiment 5, the points which differ from those in Embodiment 1 are mainly described, with reference to FIG. 25 through FIG. 29. FIG. 25 through FIG. 29 are sequence charts each showing a procedure of operations according to Embodiment 5.

[Preparation Stage]

Figure 25:
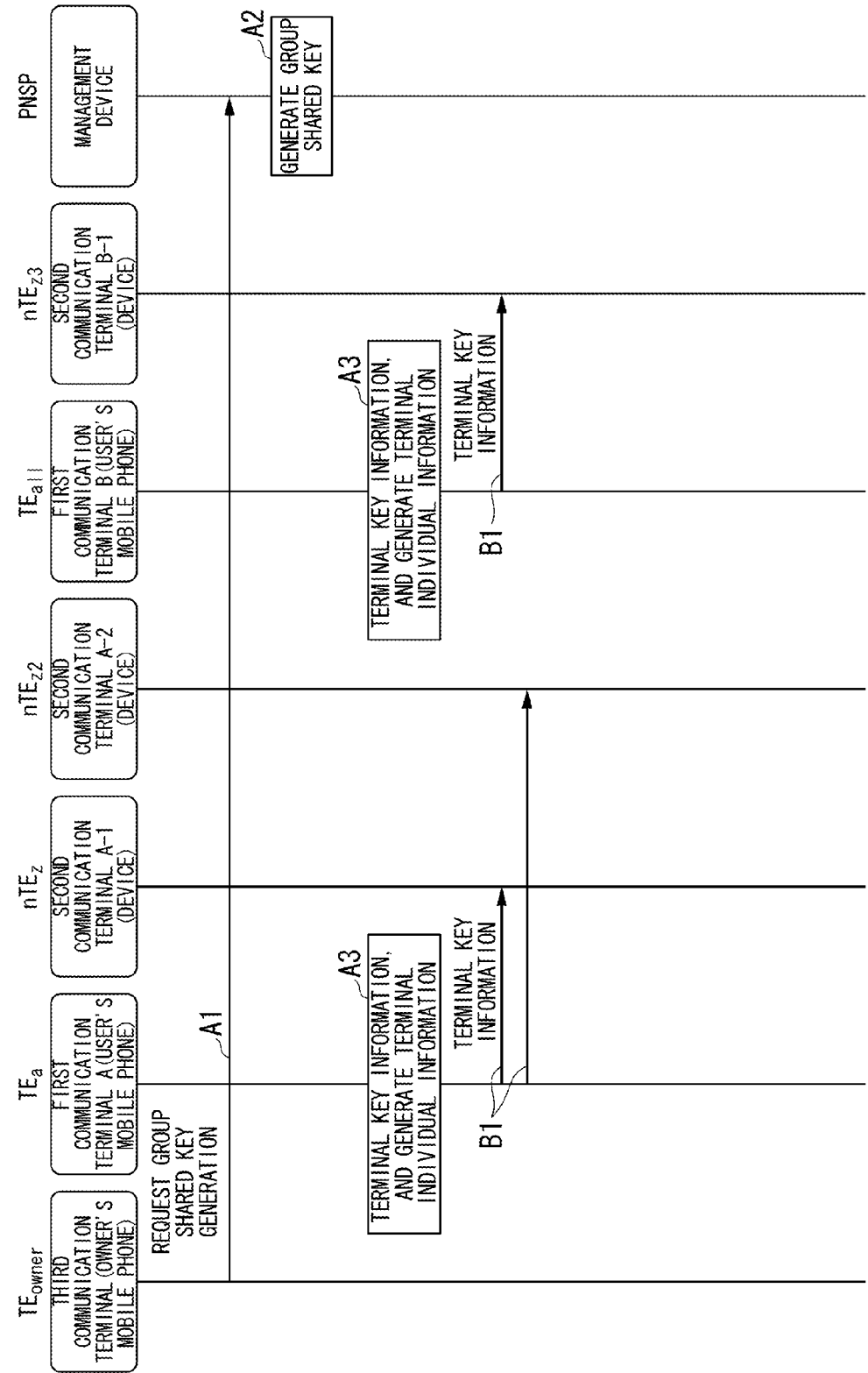
FIG. 25 is a sequence chart of a preparation stage according to Embodiment 5.

FIG. 25 is a sequence chart of a preparation stage according to Embodiment 5. In FIG. 25, the third communication terminal (owner's mobile phone, $TE_{owner}$) requests the management device (PNSP) to generate a group shared key ($K_{PN,y}$) of the group ($PN_y$) (step A1). The management device (PNSP) generates the group shared key ($K_{PN,y}$) of the group ($PN_y$) (step A2). The first communication terminal (user's mobile phone $TE_a$) generates terminal individual information ($I_{a,z}$ (z=1, . . . , $N_{nTE}$:$N_{nTE}$ is an upper limit of the number of devices which can be used by user), and generates terminal key information ($k_{a,z}$) from terminal individual information ($I_{a,z}$) (step A3). The first communication terminal (user's mobile phone, $TE_a$) transmits the terminal key information ($k_{a,z}$) to the second communication terminal (device, $nTE_z$) (step B1).

[User Usage Registration Stage]

Figure 26:
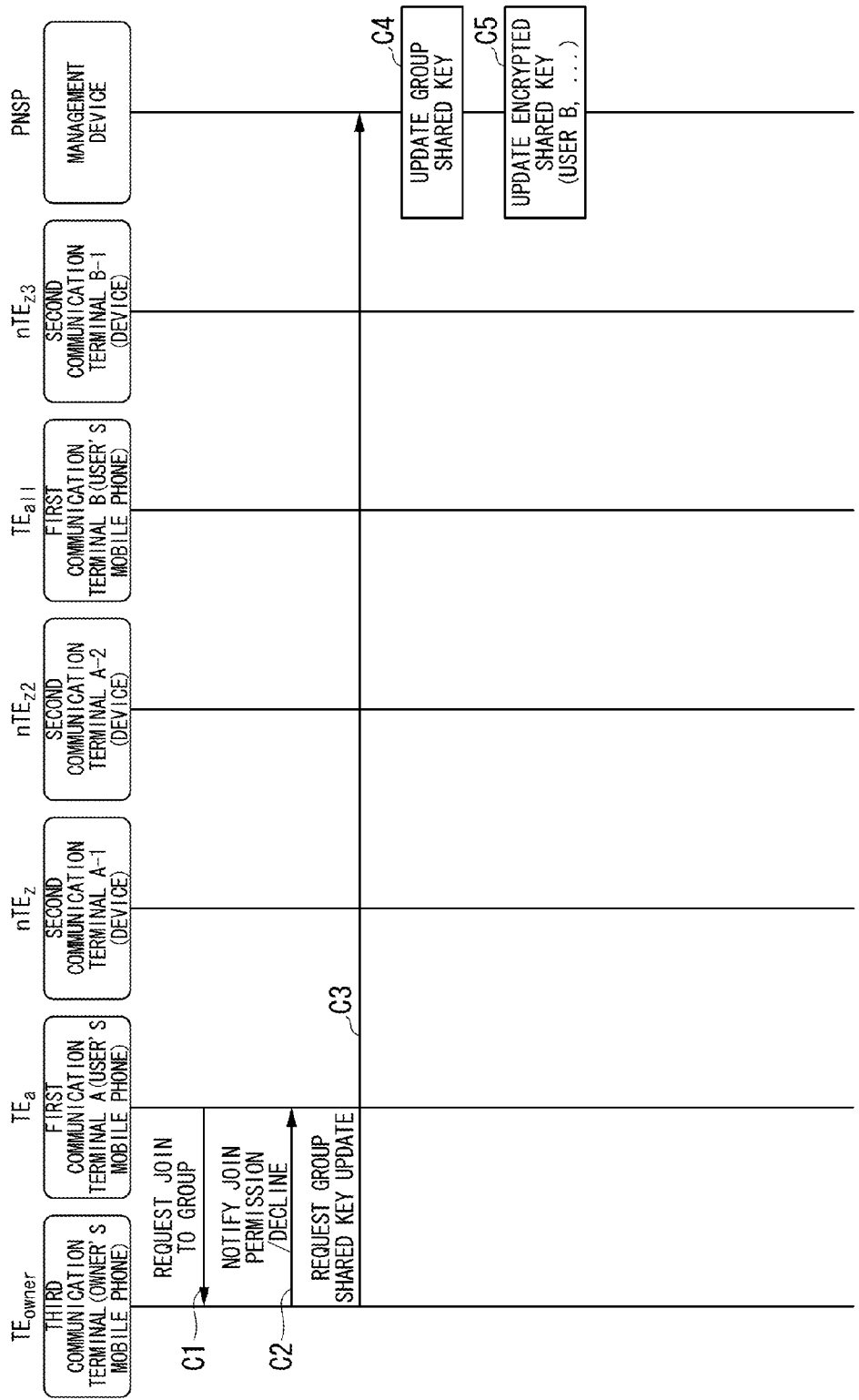
FIG. 26 is a sequence chart of a user usage registration stage according to Embodiment 5.

FIG. 26 is a sequence chart of a user usage registration stage according to Embodiment 5. This is a step in which a user performs usage registration with the owner of a group when joining a group. In FIG. 26, the first communication terminal (user's mobile phone, $TE_a$) transmits a request to join the group ($PN_y$) to the third communication terminal (owner's mobile phone, $TE_{owner}$) (step C1). The third communication terminal (owner's mobile phone, $TE_{owner}$) replies to the first communication terminal (user's mobile phone, $TE_a$) with a permission for join or decline for join (step C2). When permitting join, the third communication terminal (owner's mobile phone, $TE_{owner}$) requests the management device (PNSP) to update the group shared key (step C3). The management device (PNSP) updates the group shared key ($K_{PN,y}$) from "$K_{PN,y}$" to "$K^*_{PN,y}$" (step C4). The management device (PNSP) encrypts the updated group shared key ($K^*_{PN,y}$) using encryption information corresponding to each group member ($k_{all,y}$), and updates the encrypted shared key information ($C_{all,y}$) to "$C^*_{all,y} = E(K_{all,y}, K^*_{PN,y})$" (step C5).

[Device Addition Stage]

Figure 27:
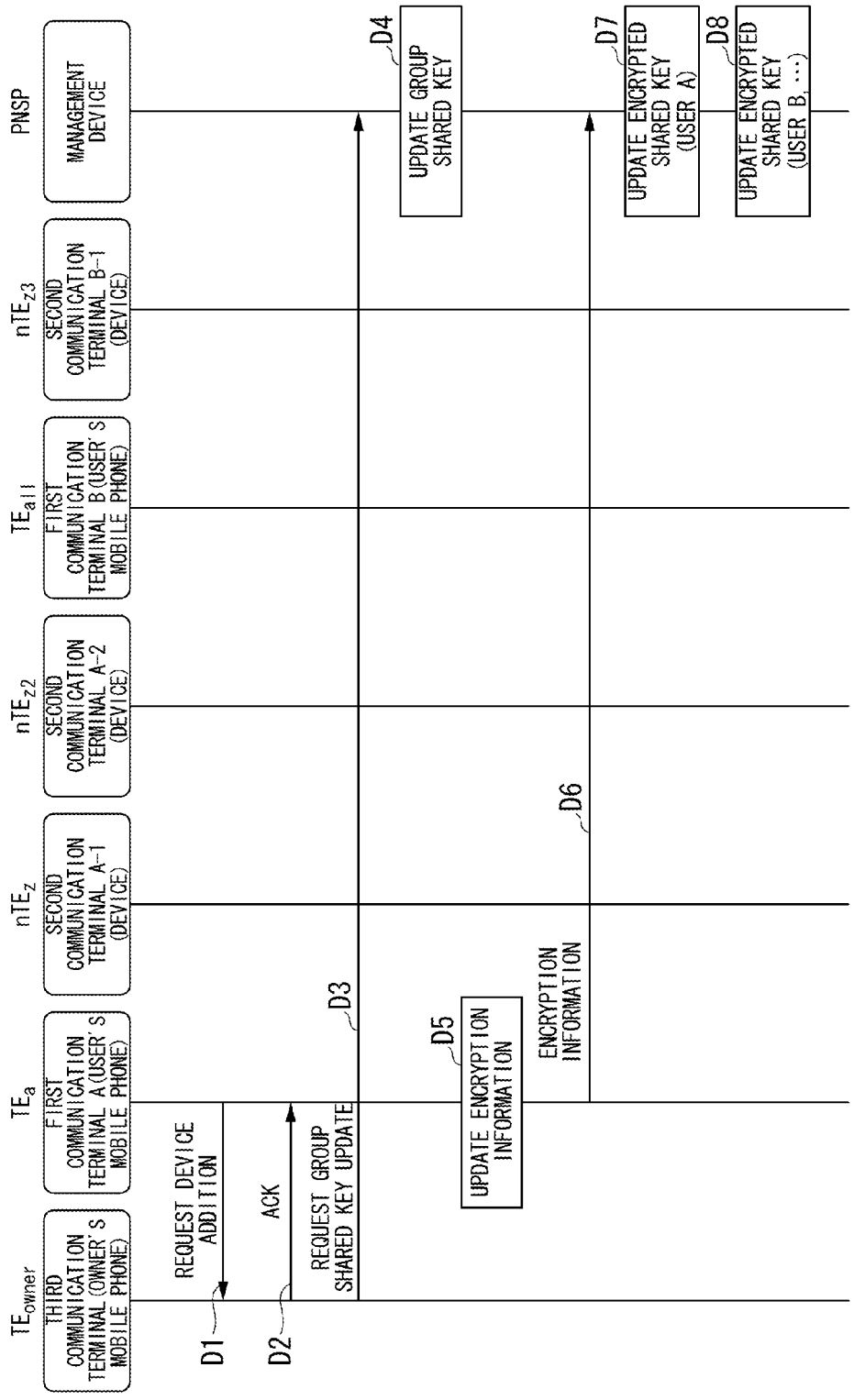
FIG. 27 is a sequence chart of a device addition stage according to Embodiment 5.

FIG. 27 is a sequence chart of a device addition stage according to Embodiment 5. This is a step to be performed when the second communication terminal (device, $nTE_z$) joins the group after a user has performed user usage registration. In FIG. 27, the first communication terminal (user's mobile phone, $TE_a$) requests the third communication terminal (owner's mobile phone, $T_{owner}$) for an addition of a second communication terminal (device, $TE_z$) (step D1). The third communication terminal (owner's mobile phone, $TE_{owner}$) replies to the first communication terminal (user's mobile phone, $TE_a$) (step D2). The third communication terminal (owner's mobile phone, $TE_{owner}$) requests the management device (PNSP) to update the group shared key ($K_{PN,y}$) (step D3). The management device (PNSP) updates the group shared key ($K_{PN,y}$) from "$K_{PN,y}$" to "$K^*_{PN,y}$" (step D4).

The first communication terminal (user's mobile phone, $TE_a$) updates the encryption information ($K_{a,y}$) from "$K_{a,y}$" to "$K^*_{a,y}$", using the terminal individual information ($I_{a,z}$, $I_{a,z}$, (w∈$P_{a,y}$, $P_{a,y}$:aggregate of nTE ($nTE_z$) already engaged with $PN_y$, among the nTE used by user A)) corresponding to the second communication terminal (device, $nTE_z$) added to the group ($PN_y$) and each of the second communication terminals (device, $nTE_z$) already engaged with the group ($PN_y$) (step D5). The first communication terminal (user's mobile phone, $TE_a$) transmits the updated encryption information ($k^*_{a,z}$) to the management device (PNSP) (step D6).

The management device (PNSP) encrypts the group shared key using the encryption information ($K^*_{a,y}$), and generates and updates encrypted shared key information "$C^*_{a,y}$= $E(K^*_{a,y}, K^*_{PN,y})$" (step D7). The management device (PNSP) generates and updates the encrypted shared key information "$C^*_{all,y}$=$E(K_{all,y}, K^*_{PN,y})$", using the group shared key ($K^*_{PN,y}$) and the encryption information ($K_{all,y}$) corresponding to each group member (step D8).

[Device Departure Stage]

Figure 28:
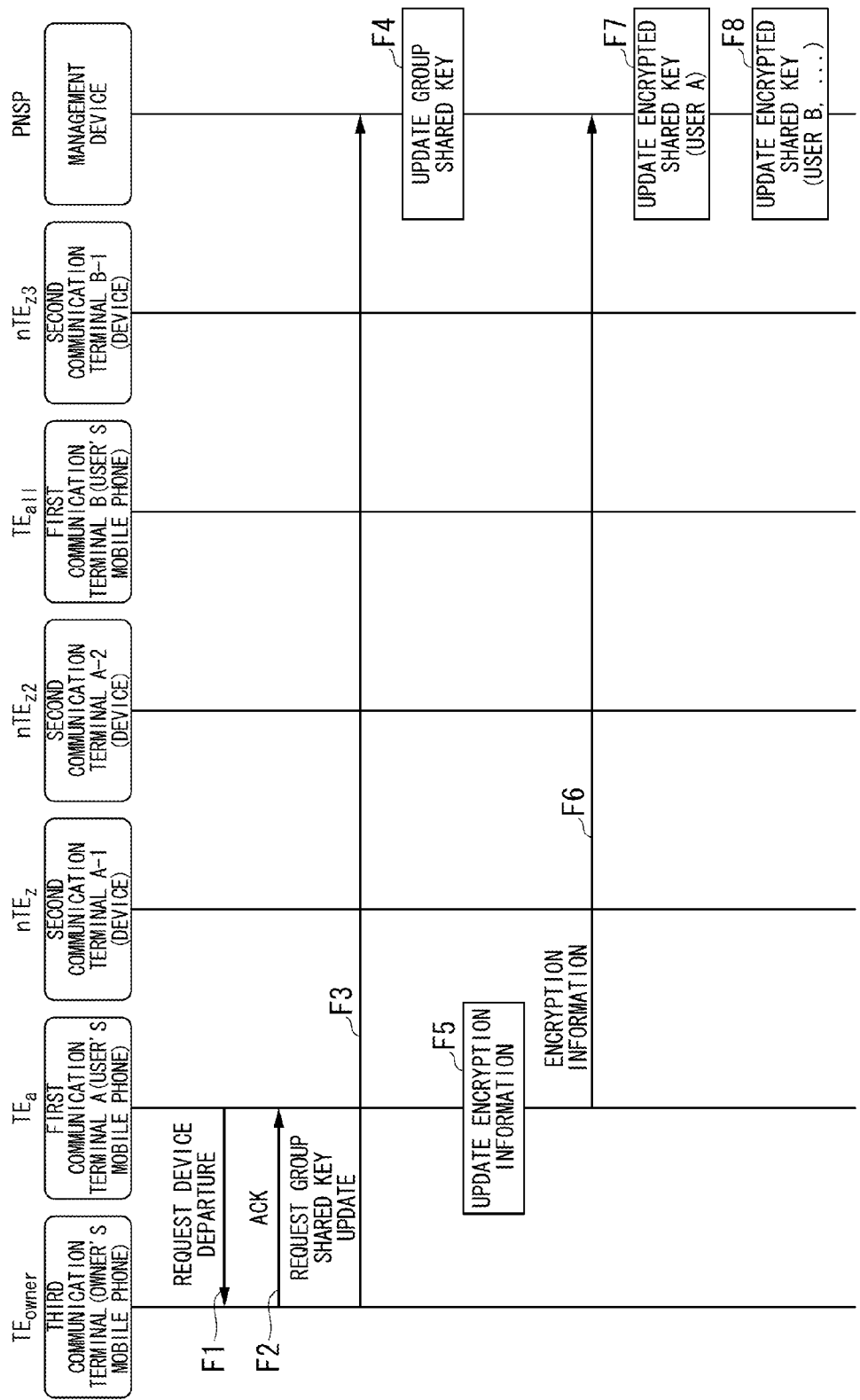
FIG. 28 is a sequence chart of a device departure stage according to Embodiment 5.

FIG. 28 is a sequence chart of a device departure stage according to Embodiment 5. This is a step to be performed when a user makes a second communication terminal (device, $nTE_z$) depart from the group. In FIG. 28, the first communication terminal (user's mobile phone, $TE_a$) transmits a device departure request to the third communication terminal (owner's mobile phone, $TE_{owner}$) (step F1). The third communication terminal (owner's mobile phone, $TE_{owner}$) replies to the first communication terminal (user's mobile phone, $TE_a$) (step F2). The third communication terminal (owner's mobile phone, $T_{owner}$) requests the management device (PNSP) to update the group shared key ($K_{PN,y}$) (step F3). The management device (PNSP) updates the group shared key ($K_{PN,y}$) from "$K_{PN,y}$" to "$K^*_{PN,y}$" (step F4).

The first communication terminal (user's mobile phone, $TE_a$) generates and updates encryption information ($K^*_{a,y}$), using the terminal individual information ($I_{a,w}$) corresponding to each of the second communication terminals (device, $nTE_z$) engaged with the group ($PN_y$), other than the second communication terminal (device, $nTE_z$) which has departed from the group ($PN_y$) (step F5). The first communication terminal (user's mobile phone, $TE_a$) transmits the updated encryption information ($k^*_{a,z}$) to the management device (PNSP) (step F6).

The management device (PNSP) encrypts the group shared key using the encryption information ($K^*_{a,y}$), and generates and updates encrypted shared key information "$C^*_{a,y}$= $E(K^*_{a,y}, K^*_{PN,y})$" (step F7). The management device (PNSP) generates and updates the encrypted shared key information "$C^*_{all,y}$=$E(K_{all,y}, K^*_{PN,y})$", using the group shared key ($K^*_{PN,y}$) and the encryption information ($K_{all,y}$) corresponding to each group member (step F8).

[User Departure Stage]

Figure 29:
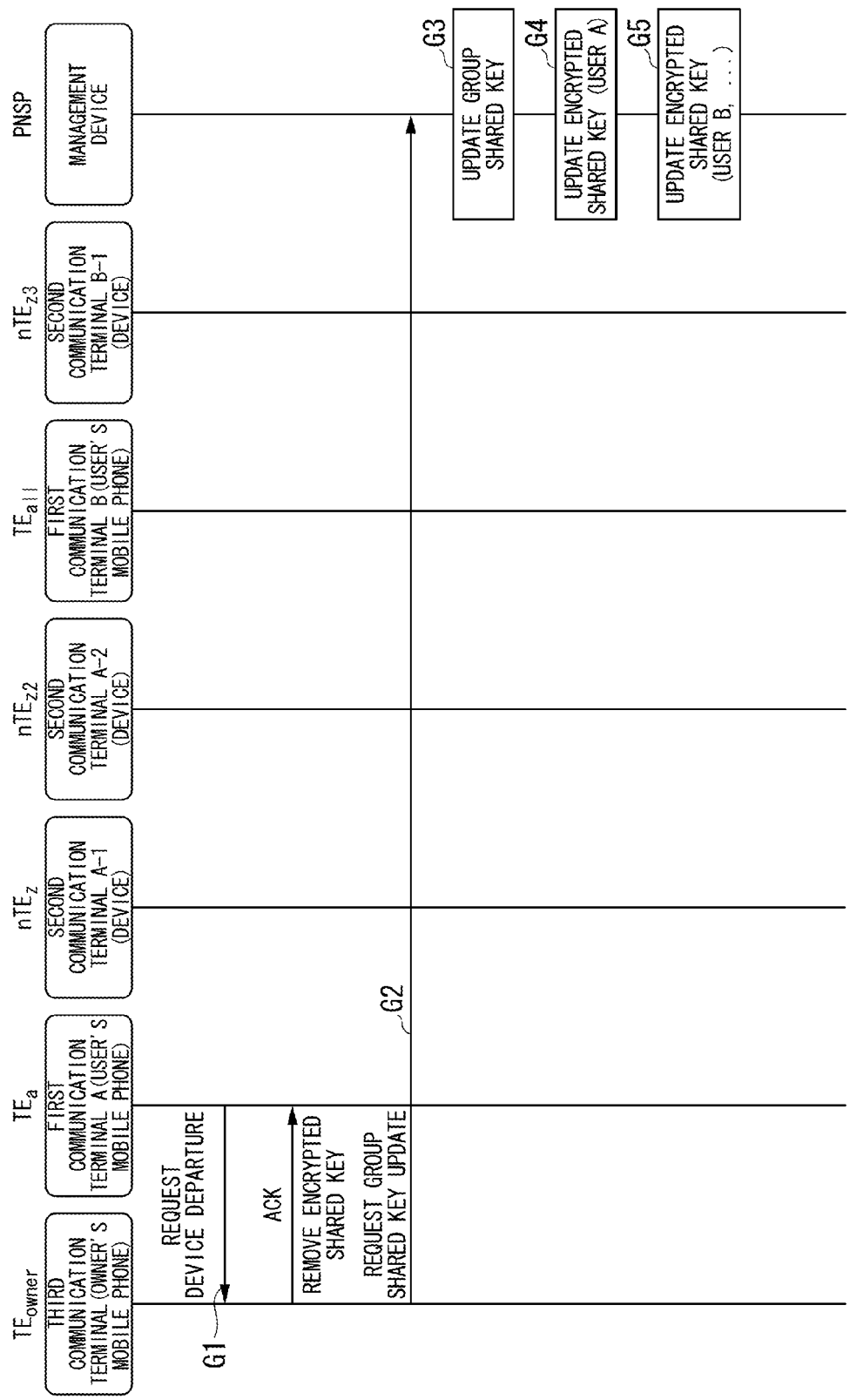
FIG. 29 is a sequence chart of a user departure stage according to Embodiment 5.

FIG. 29 is a sequence chart of a user departure stage according to Embodiment 5. This is a step to be performed when the group owner makes a user depart from the group. In FIG. 29, the first communication terminal (user's mobile phone, $TE_a$) requests the third communication terminal (owner's mobile phone, $TE_{owner}$) for removal of information ($C_{a,y}$) related to the first communication terminal (user's mobile phone, $TE_a$) (step G1). The third communication terminal (owner's mobile phone, $TE_{owner}$) replies to the first communication terminal (user's mobile phone, $TE_a$). The third communication terminal (owner's mobile phone, $TE_{owner}$) requests the management device (PNSP) for removal of the encrypted shared key information ($C_{a,y}$) related to the first communication terminal (user's mobile phone, $TE_a$), and requests it to update the group shared key ($K_{PN,y}$) (step G2).

The management device (PNSP) updates the group shared key ($K_{PN,y}$) from "$K_{PN,y}$" to "$K^*_{PN,y}$" (step G3). The management device (PNSP) removes the encrypted shared key information ($C_{a,y}$) related to the first communication terminal (user's mobile phone, $TE_a$) (step G4). The management device (PNSP) generates and updates the encrypted shared key information "$C_{all,y}$=$E(K_{all,y}, K^*_{PN,y})$", using the group shared key ($K^*_{PN,y}$) and the encryption information ($K_{all,y}$) corresponding to each group member (step G5).

This completes the description of Embodiment 5.

Embodiment 6

Figure 30:
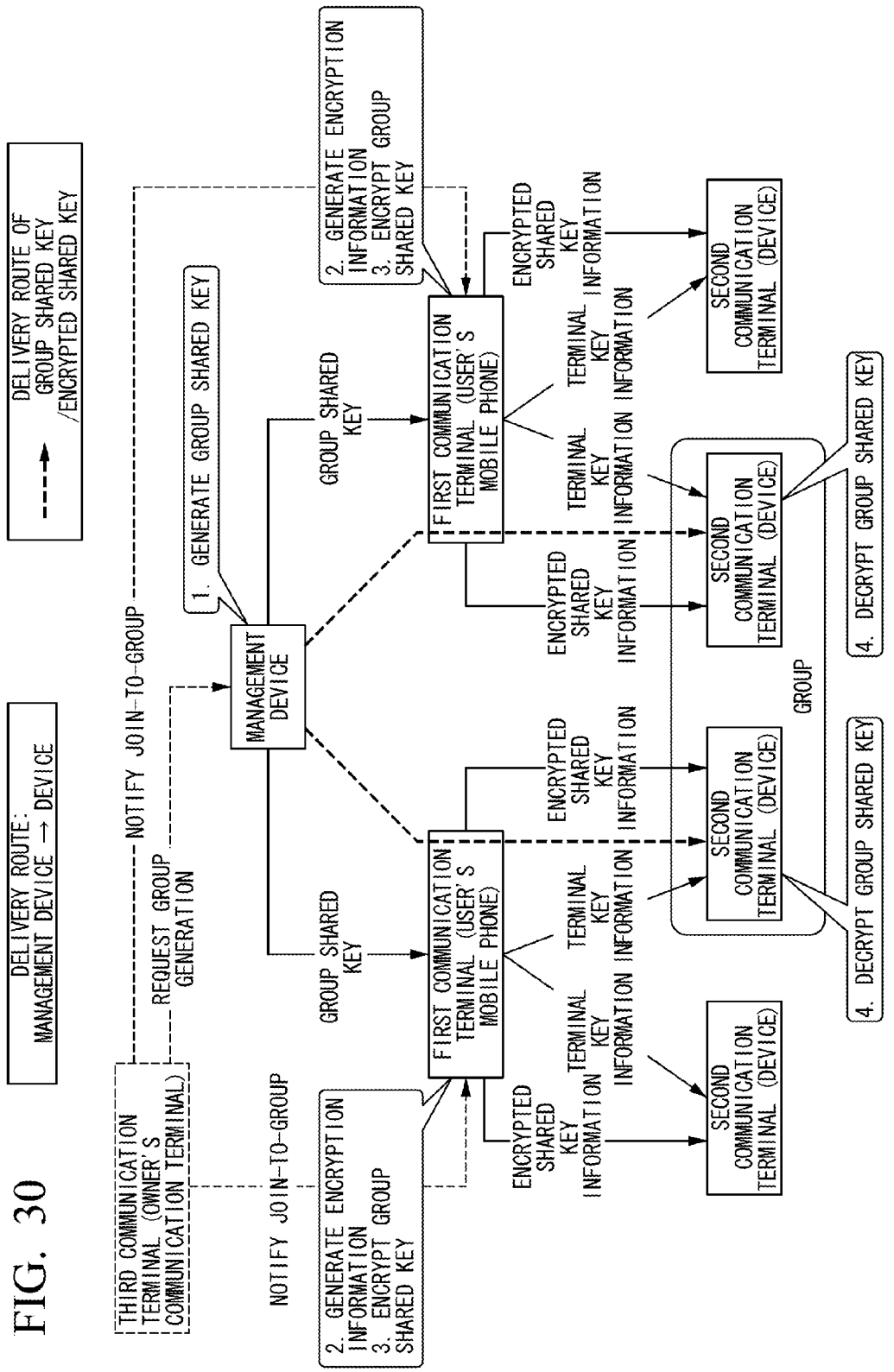
FIG. 30 is a conceptual diagram according to Embodiment 6.

In Embodiment 6, a group shared key (encrypted shared key) is delivered from the management device (PNSP) to the second communication terminal (device, $nTE_z$). FIG. 30 is a conceptual diagram according to Embodiment 6. As shown in FIG. 30, the group shared key is transmitted from the management device (PNSP) to the first communication terminal (user's mobile phone, $TE_x$), it is encrypted by the first communication terminal (user's mobile phone, $TE_x$), and it is then transmitted as encrypted shared key information from the first communication terminal (user's mobile phone, $TE_x$) to the second communication terminal (device, $nTE_z$).

In FIG. 30, the management device (PNSP) generates a group shared key, and transmits it to the first communication terminal (user's mobile phone, $TE_x$). The first communication terminal (user's mobile phone, $TE_x$) generates terminal key information from terminal individual information for each of the second communication terminals (device, $nTE_z$) to join the group, and transmits the terminal key information to the second communication terminal (device, $nTE_z$). The first communication terminal (user's mobile phone, $TE_x$) generates encryption information using the terminal individual information of the second communication terminals (device, $nTE_z$) to join the group. The first communication terminal (user's mobile phone, $TE_x$) encrypts the group shared key using the encryption information, and transmits the encrypted shared key information to the second communication terminal (device, $nTE_z$). The second communication terminal (device, $nTE_z$) decrypts the group shared key, using the encrypted shared key information and the terminal key information.

Figure 31:
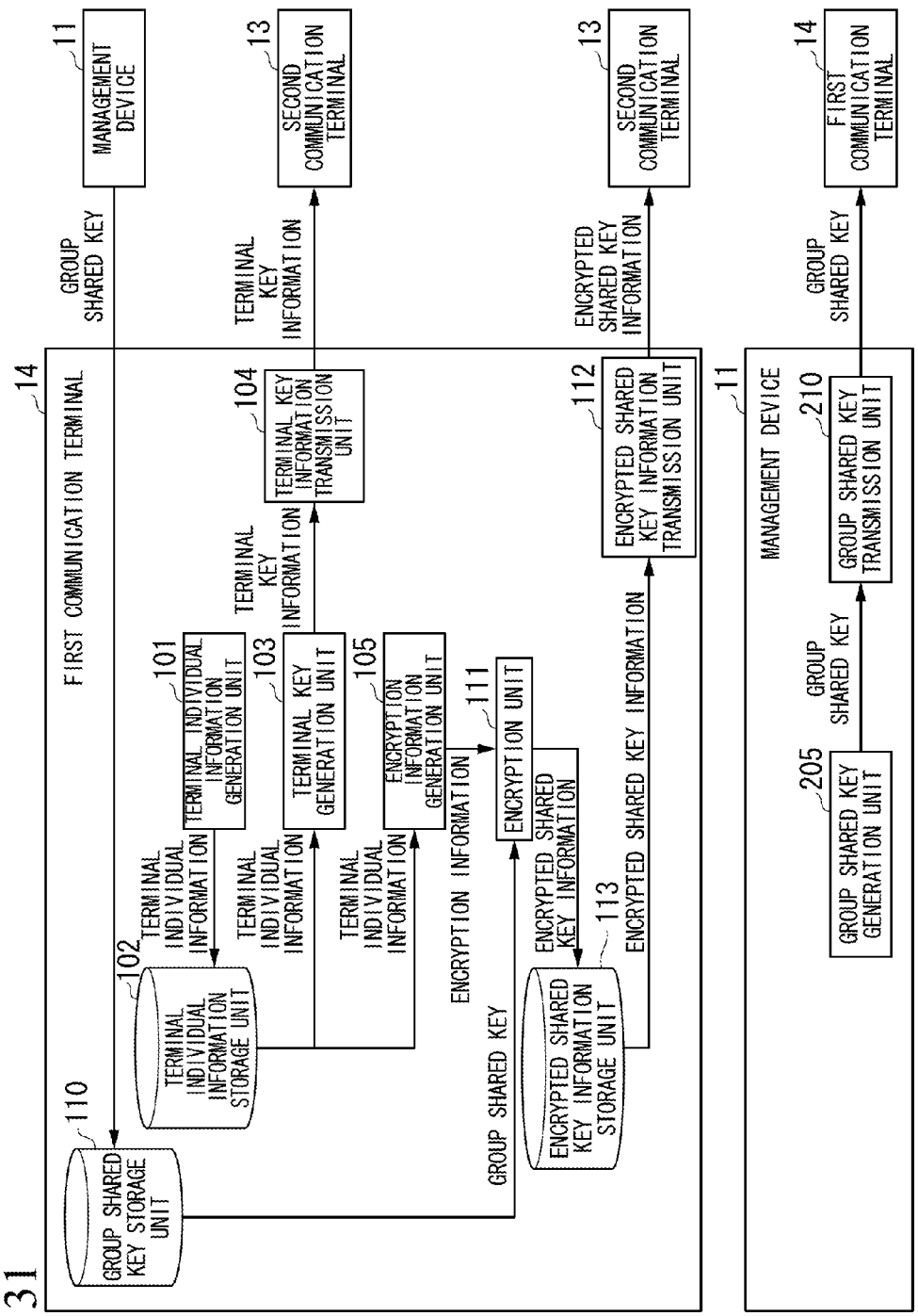
FIG. 31 is a diagram of a device configuration according to Embodiment 6.

FIG. 31 is a diagram of a device configuration according to Embodiment 6. In FIG. 31, the first communication terminal (user's mobile phone, $TE_x$) 14 has a terminal individual information generation unit 101, a terminal individual information storage unit 102, a terminal key information generation unit 103, a terminal key information transmission unit 104, an encryption information generation unit 105, a group shared key storage unit 110, an encryption unit 111, an encrypted shared key information transmission unit 112, and an encrypted shared key information storage unit 113. The management device (PNSP) 11 has a group shared key generation unit 205 and a group shared key transmission unit 210. Embodiment 6 differs from Embodiment 1 in that the management device (PNSP) generates a group shared key and supplies it to the first communication terminal (user's mobile phone, $TE_x$), and in that the first communication terminal (user's mobile phone, $TE_x$) supplies encrypted shared key information to the second communication terminal (device, $nTE_z$).

Next, among the operations according to Embodiment 6, the points which differ from those in Embodiment 1 are mainly described, with reference to FIG. 32 through FIG. 36. FIG. 32 through FIG. 36 are sequence charts each showing a procedure of operations according to Embodiment 6.

[Preparation Stage]

A preparation stage according to Embodiment 6 is similar to that in Embodiment 5 illustrated in FIG. 25.

[User Usage Registration Stage]

Figure 32:
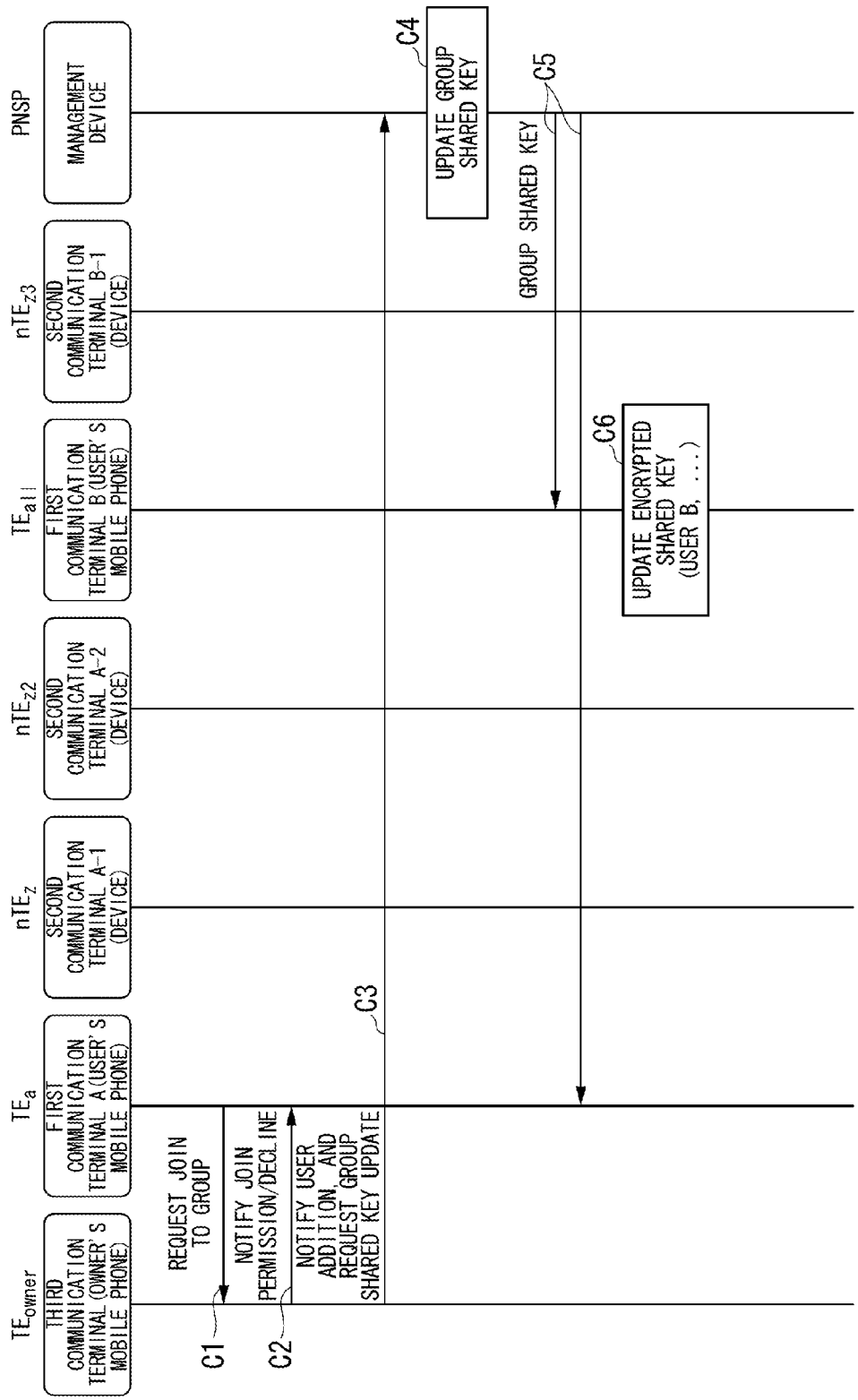
FIG. 32 is a sequence chart of a user usage registration stage according to Embodiment 6.

FIG. 32 is a sequence chart of a user usage registration stage according to Embodiment 6. This is a step in which a user performs usage registration with the owner of a group when joining a group. In FIG. 32, the first communication terminal (user's mobile phone, $TE_a$) transmits a request to join the group ($PN_y$) to the third communication terminal (owner's mobile phone, $TE_{owner}$) (step C1). The third communication terminal (owner's mobile phone, $TE_{owner}$) replies to the first communication terminal (user's mobile phone, $TE_a$) with a permission for join or decline for join (step C2). When permitting join, the third communication terminal (owner's mobile phone, $TE_{owner}$) requests the management device (PNSP) to update the group shared key (step C3). The management device (PNSP) updates the group shared key ($K_{PN,y}$) from "$K_{PN,y}$" to "$K^*_{PN,y}$" (step C4).

The management device (PNSP) transmits the updated group shared key ($K_{PN,y}$) to the first communication terminal (user's mobile phone, $TE_a$) and the other group-member first communication terminal (user's mobile phone, $TE_{all}$) (step C5). Each of the group-member first communication terminals (user's mobile phone, $TE_{all}$) encrypts the updated group shared key ($K^*_{PN,y}$) using encryption information ($k_{all,y}$), and updates the encrypted shared key information ($C_{all,y}$) to "$C_{all,y}=E(K_{all,y}, K^*_{PN,y})$" (step C6).

[Device Addition Stage]

Figure 33:
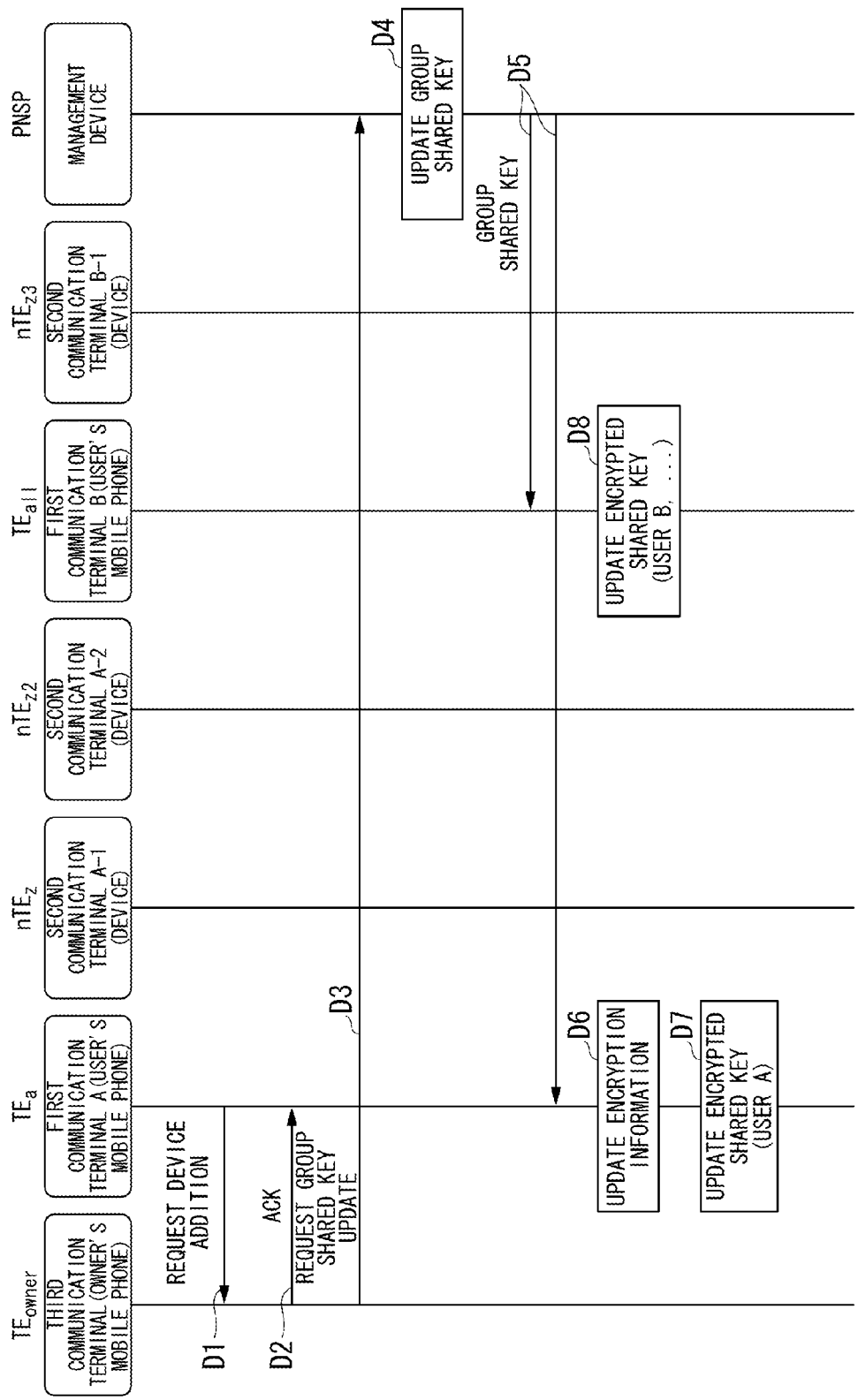
FIG. 33 is a sequence chart of a device addition stage according to Embodiment 6.

FIG. 33 is a sequence chart of a device addition stage according to Embodiment 6. This is a step to be performed when the second communication terminal (device, $nTE_z$) joins the group after a user has performed user usage registration. In FIG. 33, the first communication terminal (user's mobile phone, $TE_a$) requests the third communication terminal (owner's mobile phone, $TE_{owner}$) for an addition of a second communication terminal (device, $TE_z$) (step D1). The third communication terminal (owner's mobile phone, $TE_{owner}$) replies to the first communication terminal (user's mobile phone, $TE_a$) (step D2). The third communication terminal (owner's mobile phone, $TE_{owner}$) requests the management device (PNSP) to update the group shared key ($K_{PN,y}$) (step D3). The management device (PNSP) updates the group shared key ($K_{PN,y}$) from "$K_{PN,y}$" to "$K^*_{PN,y}$" (step D4). The management device (PNSP) transmits the updated group shared key ($K^*_{PN,y}$) to the first communication terminal (user's mobile phone, $TE_a$) and the other group-member first communication terminal (user's mobile phone, $TE_{all}$) (step D5).

The first communication terminal (user's mobile phone, $TE_a$) updates the encryption information ($K_{a,y}$) from "$K_{a,y}$" to "$K^*_{a,y}$", using the terminal individual information ($I_{a,z}, I_{a,w}$ ($w \in P_{a,y}, P_{a,y}$: aggregate of nTE ($nTE_z$) already engaged with $PN_y$, among the nTE used by user A)) corresponding to the second communication terminal (device, $nTE_z$) added to the group ($PN_y$) and each of the second communication terminals (device, $nTE_z$) already engaged with the group ($PN_y$) (step D6). The first communication terminal (user's mobile phone, $TE_a$) encrypts the group shared key ($K^*_{a,y}$) using the encryption information ($K^*_{a,y}$), and generates and updates encrypted shared key information "$C^*_{a,y}=E(K^*_{a,y}, K^*_{PN,y})$" (step D7). The other group-member first communication terminal (user's mobile phone, $TE_{all}$) encrypts the group shared key ($K^*_{PN,y}$) using the encryption information ($k_{all,y}$), and updates the encrypted shared key information ($C_{all,y}$) to "$C^*_{all,y}=E(K_{all,y}, K^*_{PN,y})$" (step D8).

[Shared Key Restoration Stage]

Figure 34:
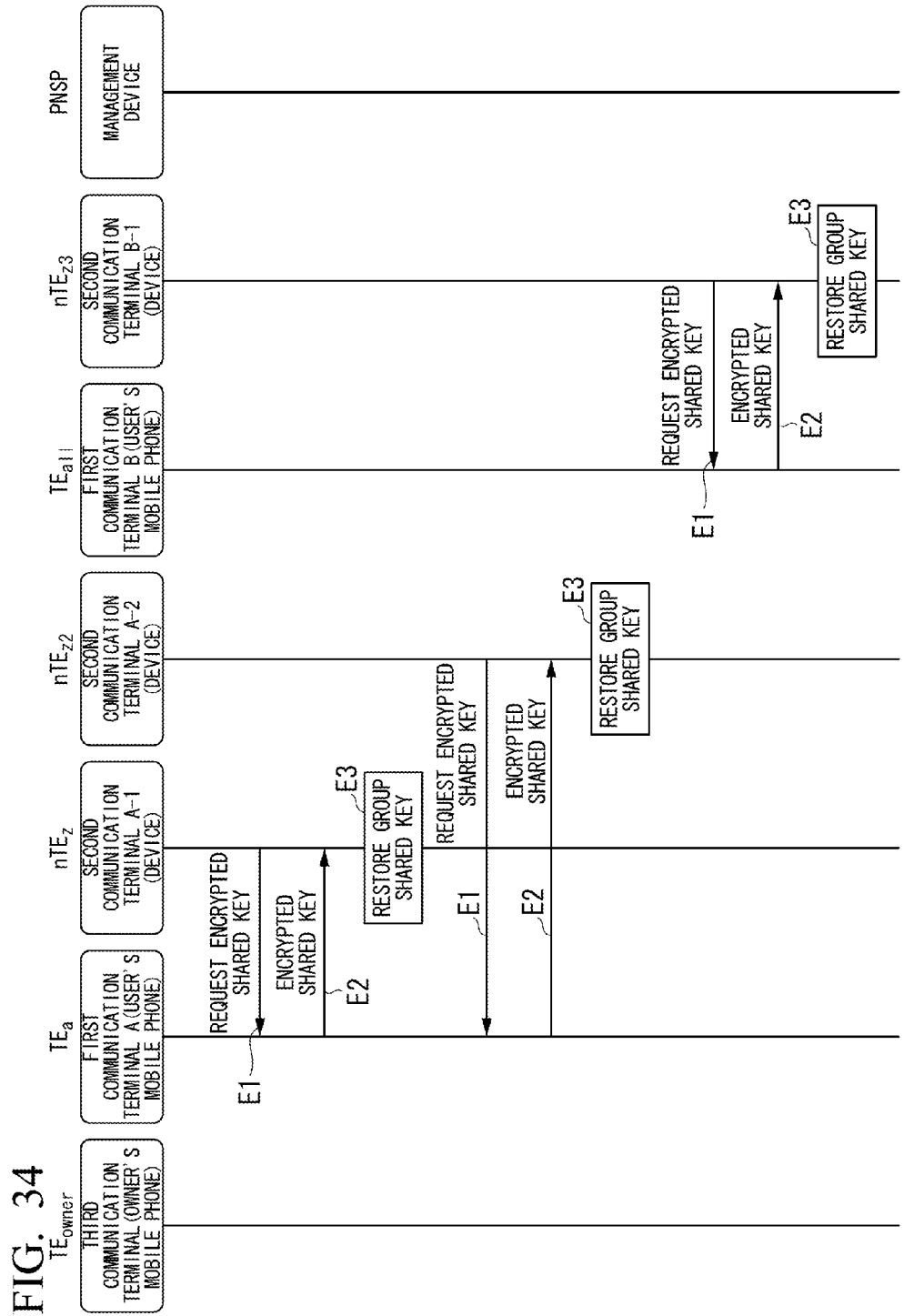
FIG. 34 is a sequence chart of a shared key restoration stage according to Embodiment 6.

FIG. 34 is a sequence chart of a shared key restoration stage according to Embodiment 6. This is a step to be performed when a group shared key is restored at the point in time where the second communication terminal (device, $nTE_z$) actually receives services within a group. In FIG. 34, the second communication terminal (device, $nTE_z$) requests the first communication terminal (user's mobile phone, $TE_a$) to start services of the group ($PN_y$) (encrypted shared key) (step E1). The first communication terminal (user's mobile phone, $TE_a$) transmits, to the second communication terminal (device, $nTE_z$) of the service-start request origin, encrypted shared key information ($C_{a,y}$) corresponding to the device of the group ($PN_y$) (step E2). The second communication terminal (device, $nTE_z$) restores the group shared key ($K_{PN,y}=D(k_{a,z}, C_{a,y})$), using the encrypted shared key information ($C_{a,y}$) and the terminal key information ($k_{a,z}$).

[Device Departure Stage]

Figure 35:
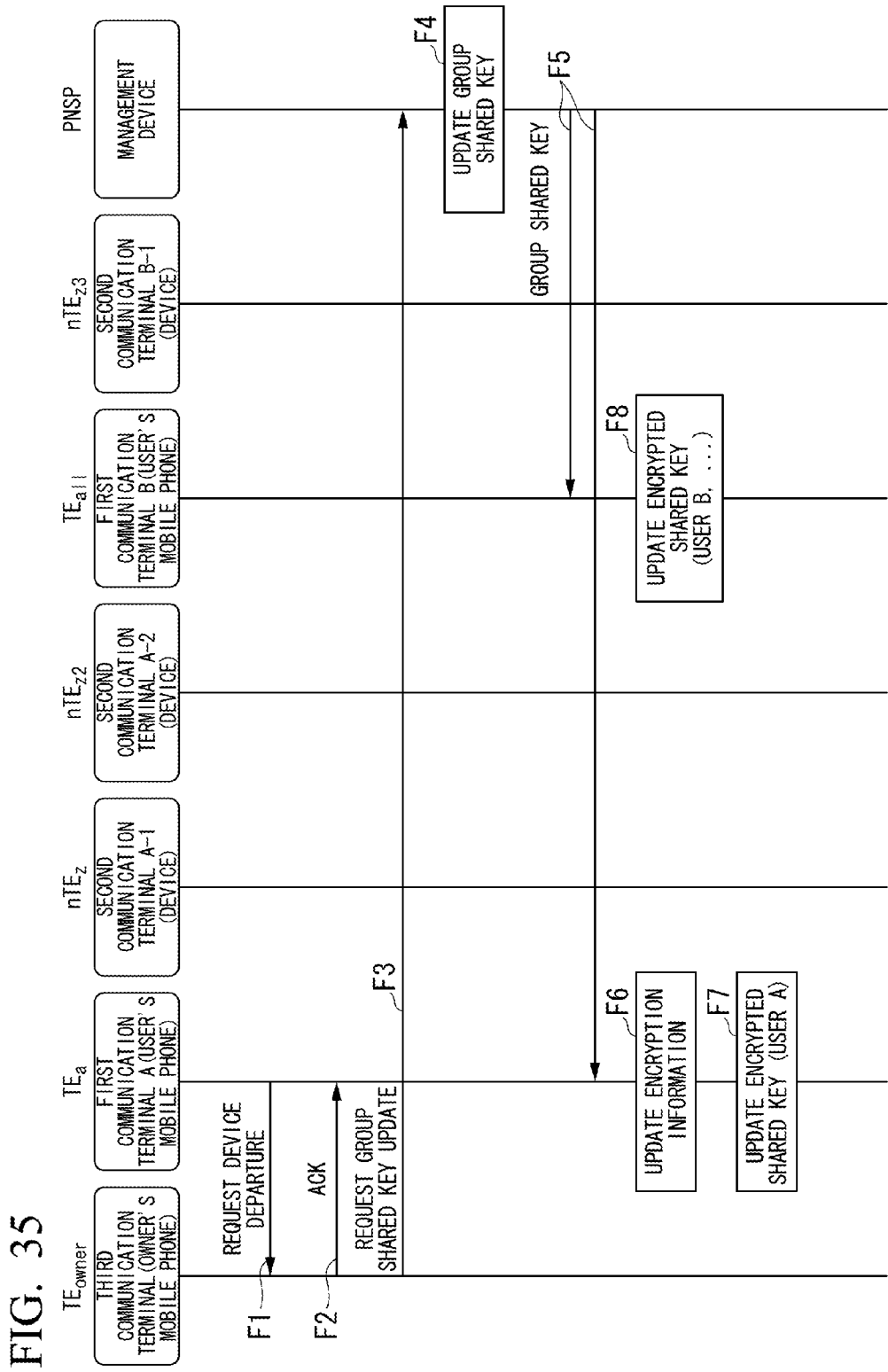
FIG. 35 is a sequence chart of a device departure stage according to Embodiment 6.

FIG. 35 is a sequence chart of a device departure stage according to Embodiment 6. This is a step to be performed when a user makes a second communication terminal (device, $nTE_z$) depart from the group. In FIG. 35, the first communication terminal (user's mobile phone, $TE_a$) transmits a device departure request to the third communication terminal (owner's mobile phone, $TE_{owner}$) (step F1). The third communication terminal (owner's mobile phone, $TE_{owner}$) replies to the first communication terminal (user's mobile phone, $TE_a$) (step F2). The third communication terminal (owner's mobile phone, $T_{owner}$) requests the management device (PNSP) to update the group shared key ($K_{PN,y}$) (step F3). The management device (PNSP) updates the group shared key ($K_{PN,y}$) from "$K_{PN,y}$" to "$K^*_{PN,y}$" (step F4). The management device (PNSP) transmits the updated group shared key ($K^*_{PN,y}$) to the first communication terminal (user's mobile phone, $TE_a$) and the other group-member first communication terminal (user's mobile phone, $TE_{all}$) (step F5).

The first communication terminal (user's mobile phone, $TE_a$) generates and updates encryption information ($K^*_{a,y}$), using the terminal individual information ($I_{a,w}$) corresponding to each of the second communication terminals (device, $nTE_z$) engaged with the group ($PN_y$), other than the second communication terminal (device, $nTE_z$) which has departed from the group ($PN_y$) (step F6). The first communication terminal (user's mobile phone, $TE_a$) encrypts the group shared key ($K^*_{PN,y}$) using the encryption information ($K^*_{a,y}$), and generates and updates encrypted shared key information "$C^*_{a,y}=E(K^*_{a,y}, K^*_{PN,y})$" (step F7). The other group-member first communication terminal (user's mobile phone, $TE_{all}$)

encrypts the group shared key ($K^*_{PN,y}$) using the encryption information ($k_{all,y}$), and updates the encrypted shared key information ($C_{all,y}$) to "$C^*_{all,y}=E(K_{all,y}, K^*_{PN,y})$" (step F8).

[User Departure Stage]

Figure 36:
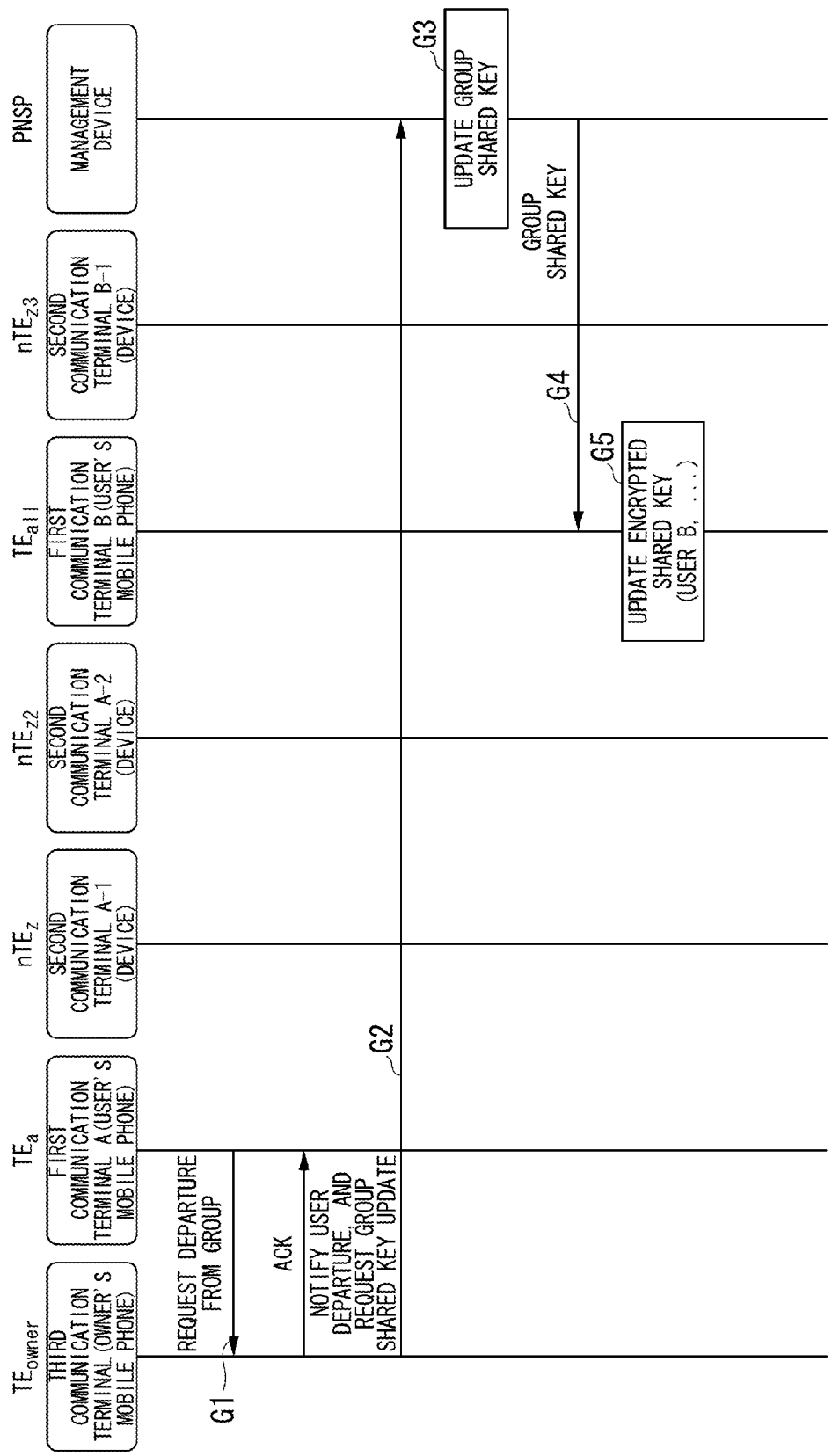
FIG. 36 is a sequence chart of a user departure stage according to Embodiment 6.

FIG. 36 is a sequence chart of a user departure stage according to Embodiment 6. This is a step to be performed when the group owner makes a user depart from the group. In FIG. 36, the first communication terminal (user's mobile phone, $TE_a$) requests the third communication terminal (owner's mobile phone, $TE_{owner}$) for removal of information ($C_{a,y}$) related to the first communication terminal (user's mobile phone, $TE_a$) (step G1). The third communication terminal (owner's mobile phone, $TE_{owner}$) replies to the first communication terminal (user's mobile phone, $TE_a$). The third communication terminal (owner's mobile phone, $TE_{owner}$) notifies the management device (PNSP) of the departure of the first communication terminal (user's mobile phone, $TE_a$) from the group, and requests it to update the group shared key ($K_{PN,y}$) (step G2).

The management device (PNSP) updates the group shared key ($K_{PN,y}$) from "$K_{PN,y}$" to "$K^*_{PN,y}$" (step G3). The management device (PNSP) transmits the updated group shared key ($K^*_{PN,y}$) to the other group-member first communication terminal (user's mobile phone, $TE_{all}$) (step G4). The other group-member first communication terminal (user's mobile phone, $TE_{all}$) encrypts the group shared key ($K^*_{PN,y}$) using the encryption information ($k_{all,y}$), and updates the encrypted shared key information ($C_{all,y}$) to "$C^*_{all,y}=E(K_{all,y}, K^*_{PN,y})$" (step G5).

This completes the description of Embodiment 6.

Embodiment 7

Figure 37:
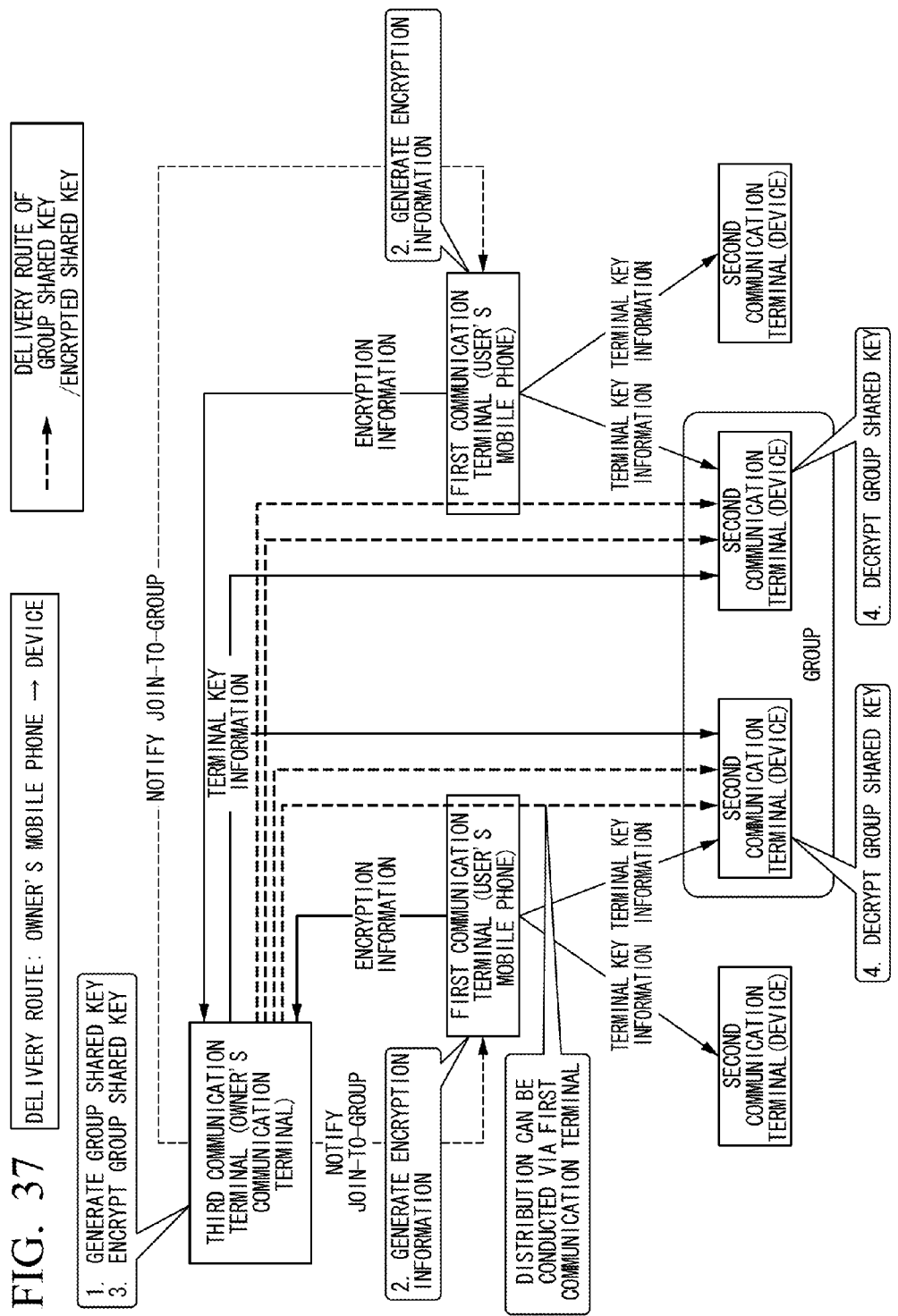
FIG. 37 is a conceptual diagram according to Embodiment 7.

In Embodiment 7, a group shared key (encrypted shared key) is delivered from a third communication terminal (owner's mobile phone, $TE_{owner}$) to a second communication terminal (device, $nTE_z$). FIG. 37 is a conceptual diagram according to Embodiment 7. As shown in FIG. 37, having been encrypted by the third communication terminal (owner's mobile phone, $TE_{owner}$), the group shared key is transmitted as encrypted shared key information from the third communication terminal (owner's mobile phone, $TE_{owner}$) to the second communication terminal (device, $nTE_z$). The encrypted shared key information may be delivered from the third communication terminal (owner's mobile phone, $TE_{owner}$) to the second communication terminal (device, $nTE_z$) via the first communication terminal (user's mobile phone, $TE_x$).

In FIG. 37, the third communication terminal (owner's mobile phone, $TE_{owner}$) generates a group shared key. The first communication terminal (user's mobile phone, $TE_x$) generates terminal key information from terminal individual information for each of the second communication terminals (device, $nTE_z$) to join the group, and transmits the terminal key information to the second communication terminal (device, $nTE_z$). The first communication terminal (user's mobile phone, $TE_x$) generates encryption information using the terminal individual information of the second communication terminals (device, $nTE_z$) to join the group, and transmits the encryption information to the third communication terminal (owner's mobile phone, $TE_{owner}$). The third communication terminal (owner's mobile phone, $TE_{owner}$) encrypts the group shared key using the encryption information, and transmits the encrypted shared key information to the second communication terminal (device, $nTE_z$). The second communication terminal (device, $nTE_z$) decrypts the group shared key, using the encrypted shared key information and the terminal key information.

Figure 38:
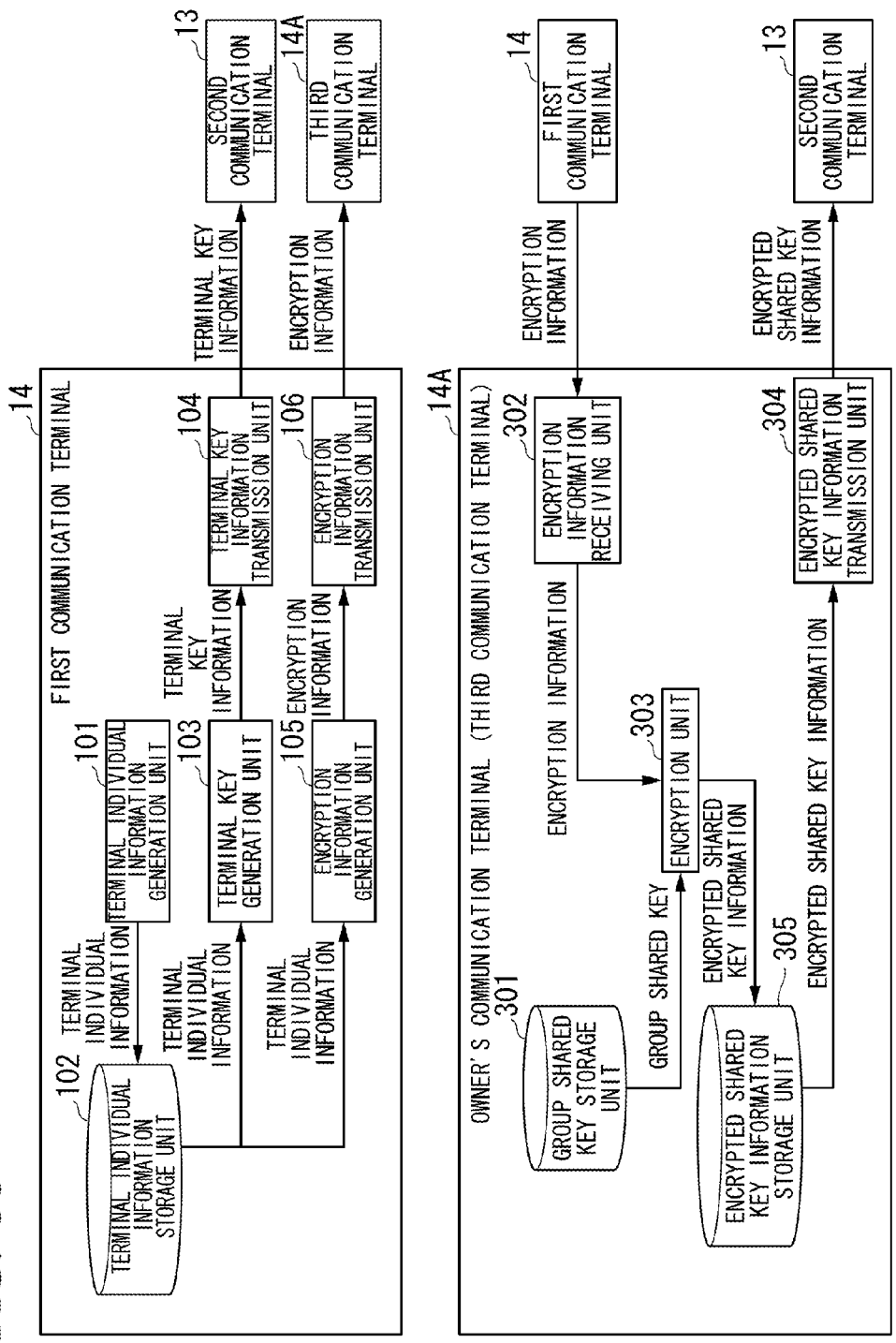
FIG. 38 is a diagram of a device configuration according to Embodiment 7.

FIG. 38 is a diagram of a device configuration according to Embodiment 7. In FIG. 38, the first communication terminal (user's mobile phone, $TE_x$) 14 has a terminal individual information generation unit 101, a terminal individual information storage unit 102, a terminal key information generation unit 103, a terminal key information transmission unit 104, an encryption information generation unit 105, and an encryption information transmission unit 106. The third communication terminal (owner's mobile phone, $TE_{owner}$) 14A has a group shared key storage unit 301, an encryption information receiving unit 302, an encryption unit 303, an encrypted shared key information transmission unit 304, and an encrypted shared key information storage unit 305. Embodiment 7 differs from Embodiment 1 in that the third communication terminal (owner's mobile phone, $TE_{owner}$) generates encrypted shared key information and transmits it to the second communication terminal (device, $nTE_z$).

Next, among the operations according to Embodiment 7, the points which differ from those in Embodiment 1 are mainly described, with reference to FIG. 39 through FIG. 43. FIG. 39 through FIG. 43 are sequence charts each showing a procedure of operations according to Embodiment 7.

[User Usage Registration Stage]

Figure 39:
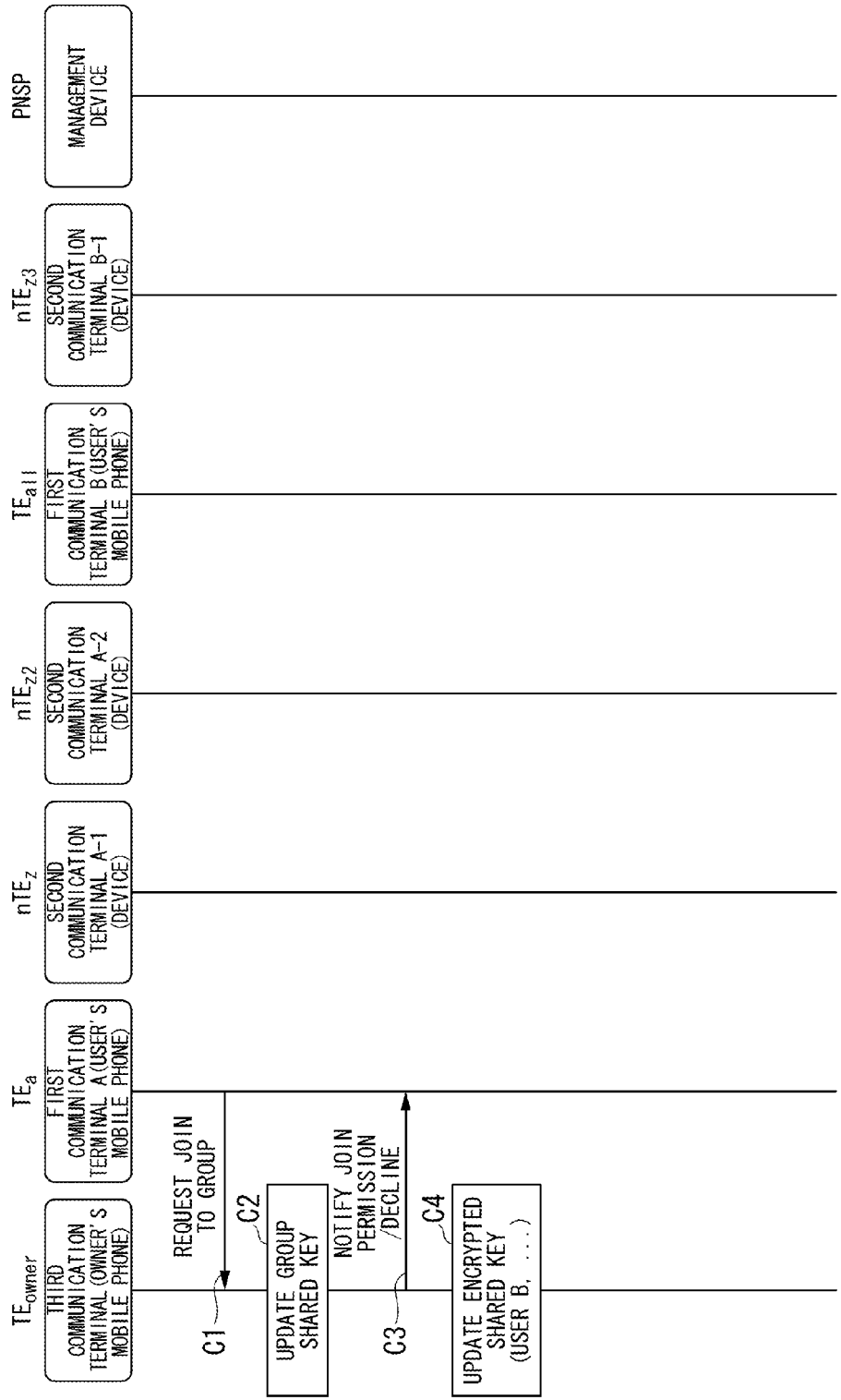
FIG. 39 is a sequence chart of a user usage registration stage according to Embodiment 7.

FIG. 39 is a sequence chart of a user usage registration stage according to Embodiment 7. This is a step in which a user performs usage registration with the owner of a group when joining a group. In FIG. 39, the first communication terminal (user's mobile phone, $TE_a$) transmits a request to join the group ($PN_y$) to the third communication terminal (owner's mobile phone, $TE_{owner}$) (step C1). When permitting the user to join the group ($PN_y$), the third communication terminal (owner's mobile phone, $TE_{owner}$) updates the group shared key ($K_{PN,y}$) from "$K_{PN,y}$" to "$K^*_{PN,y}$" (step C2). The third communication terminal (owner's mobile phone, $TE_{owner}$) replies to the first communication terminal (user's mobile phone, $TE_a$) with a permission for join or decline for join (step C3). When permitting join, the third communication terminal (owner's mobile phone, $TE_{owner}$) encrypts the updated group shared key ($K^*_{PN,y}$) using encryption information corresponding to each group member ($k_{all,y}$), and updates the encrypted shared key information ($C_{all,y}$) to "$C^*_{all,y}=E(K_{all,y}, K^*_{PN,y})$" (step C4).

[Device Addition Stage]

Figure 40:
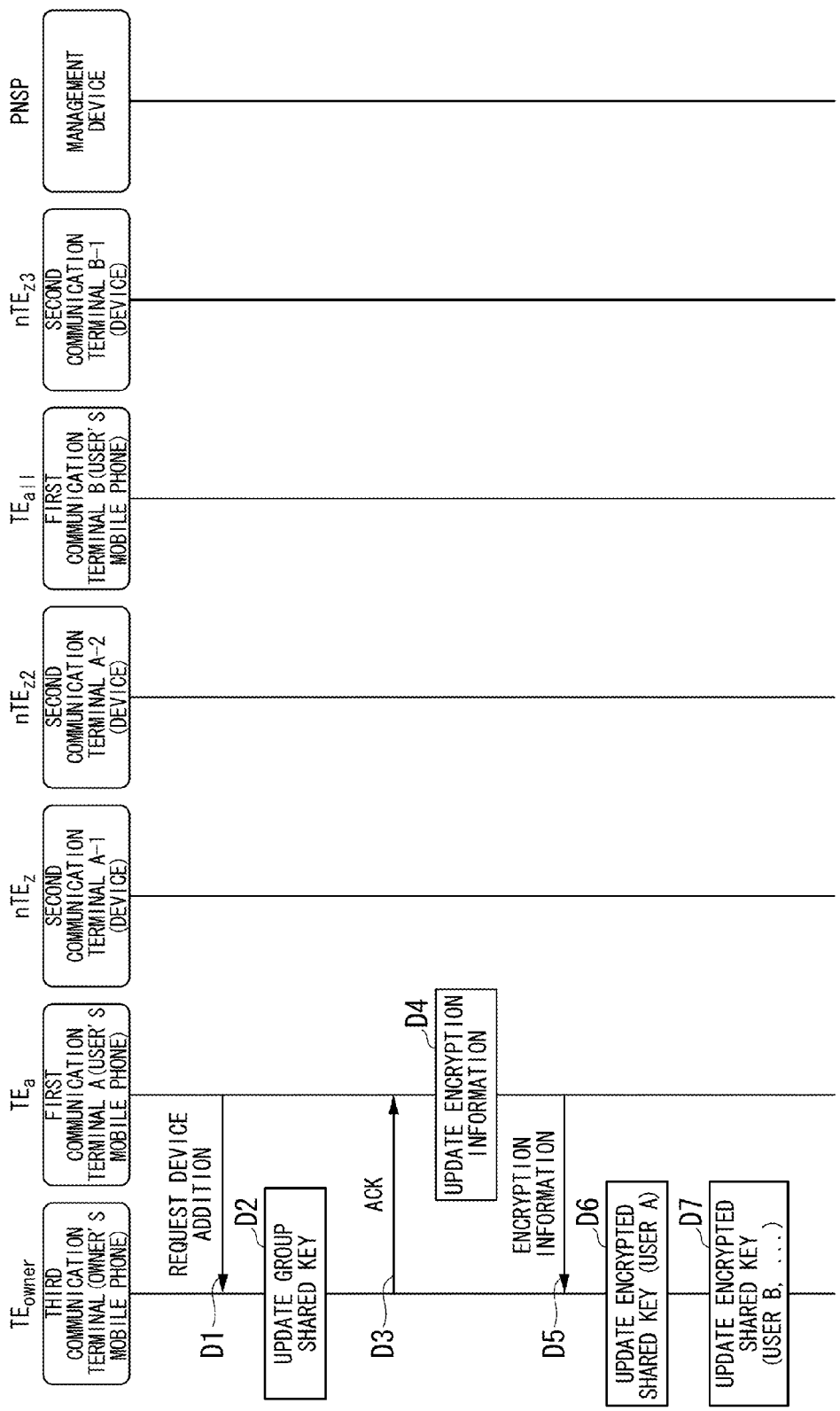
FIG. 40 is a sequence chart of a device addition stage according to Embodiment 7.

FIG. 40 is a sequence chart of a device addition stage according to Embodiment 7. This is a step to be performed when the second communication terminal (device, $nTE_z$) joins the group after a user has performed user usage registration. In FIG. 40, the first communication terminal (user's mobile phone, $TE_a$) requests the third communication terminal (owner's mobile phone, $TE_{owner}$) for an addition of a second communication terminal (device, $TE_z$) (step D1). The third communication terminal (owner's mobile phone, $TE_{owner}$) updates the group shared key ($K_{PN,y}$) from "$K_{PN,y}$" to "$K^*_{PN,y}$" (step D2). The third communication terminal (owner's mobile phone, $TE_{owner}$) replies to the first communication terminal (user's mobile phone, $TE_a$) (step D3).

The first communication terminal (user's mobile phone, $TE_a$) updates the encryption information ($K_{a,y}$) from "$K_{a,y}$" to "$K^*_{a,y}$", using the terminal individual information ($I_{a,z}, I_{a,w}$ ($w \in P_{a,y}, P_{a,y}$: aggregate of nTE ($nTE_w$) already engaged with $PN_y$, among the nTE used by user A)) corresponding to the second communication terminal (device, $nTE_z$) added to the group ($PN_y$) and each of the second communication terminals (device, $nTE_z$) already engaged with the group ($PN_y$) (step D4). The first communication terminal (user's mobile phone, $TE_a$) transmits the updated encryption information ($K^*_{a,y}$) to the third communication terminal (owner's mobile phone, $TE_{owner}$) (step D5).

The third communication terminal (owner's mobile phone, $TE_{owner}$) encrypts the group shared key ($K^*_{PN,y}$) using the encryption information ($K^*_{a,y}$), and generates and updates encrypted shared key information "$C^*_{a,y}=E(K^*_{a,y}, K^*_{PN,y})$" (step D6). The third communication terminal (owner's mobile phone, $TE_{owner}$) generates and updates the encrypted shared key information "$C^*_{all,y}=E(K_{all,y}, K^*_{PN,y})$", using the group shared key ($K^*_{PN,y}$) and the encryption information ($K_{all,y}$) corresponding to each group member (step D7).

[Shared Key Restoration Stage]

Figure 41:
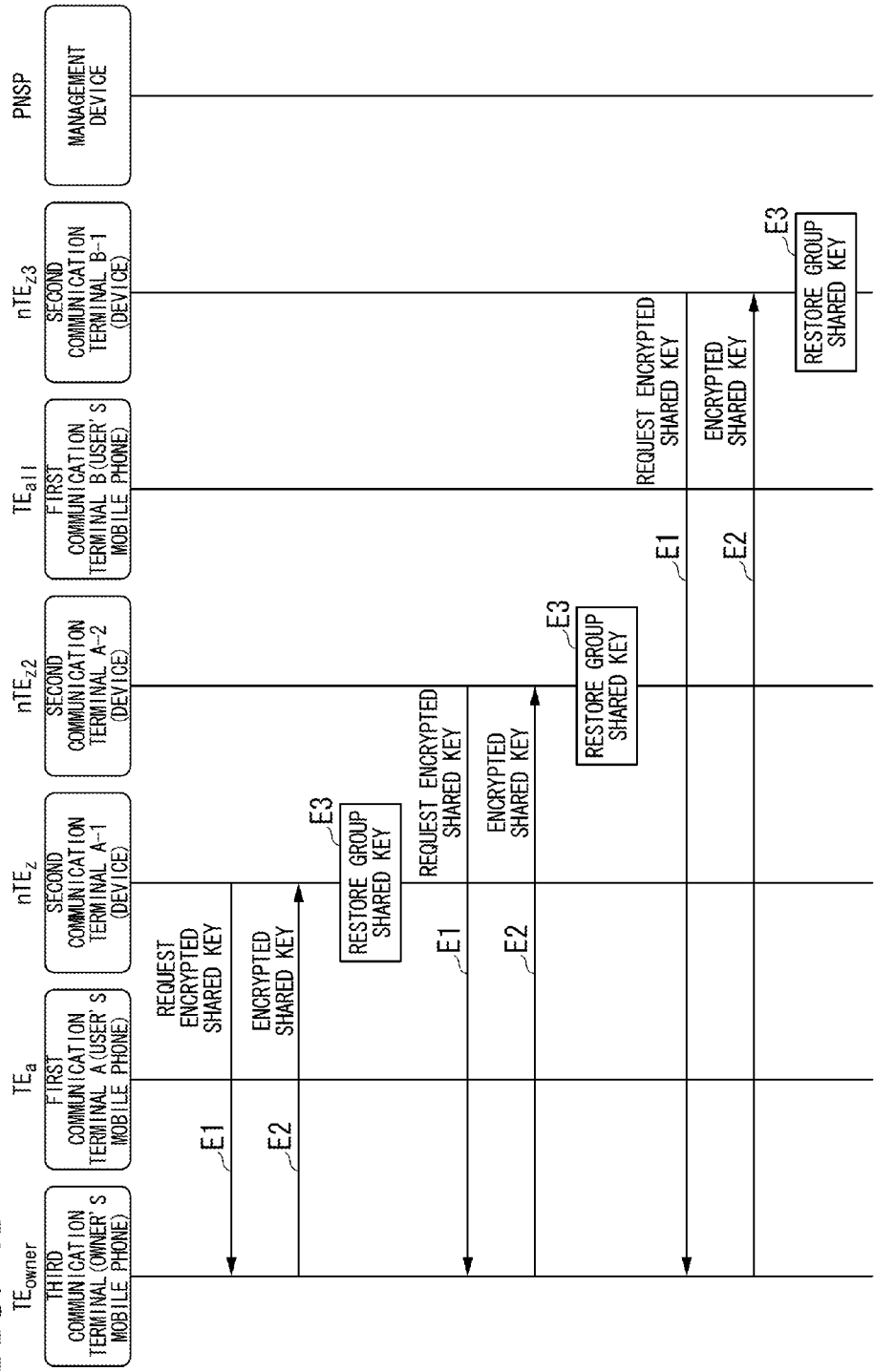
FIG. 41 is a sequence chart of a shared key restoration stage according to Embodiment 7.

FIG. 41 is a sequence chart of a shared key restoration stage according to Embodiment 7. This is a step to be performed when a group shared key is restored at the point in time where the second communication terminal (device, $nTE_z$) actually receives services within a group. In FIG. 41, the second communication terminal (device, $nTE_z$) requests the third communication terminal (owner's mobile phone, $TE_{owner}$) to start services of the group ($PN_y$) (encrypted shared key) (step E1). The third communication terminal (owner's mobile phone, $TE_{owner}$) transmits, to the second communication terminal (device, $nTE_z$) of the service-start request origin, encrypted shared key information ($C_{a,y}$) corresponding to the device of the group ($PN_y$) (step E2). The second communication terminal (device, $nTE_z$) restores the group shared key ($K_{PN,y}=D(k_{a,z}, C_{a,y})$), using the encrypted shared key information ($C_{a,y}$) and the terminal key information ($k_{a,z}$).

[Device Departure Stage]

Figure 42:
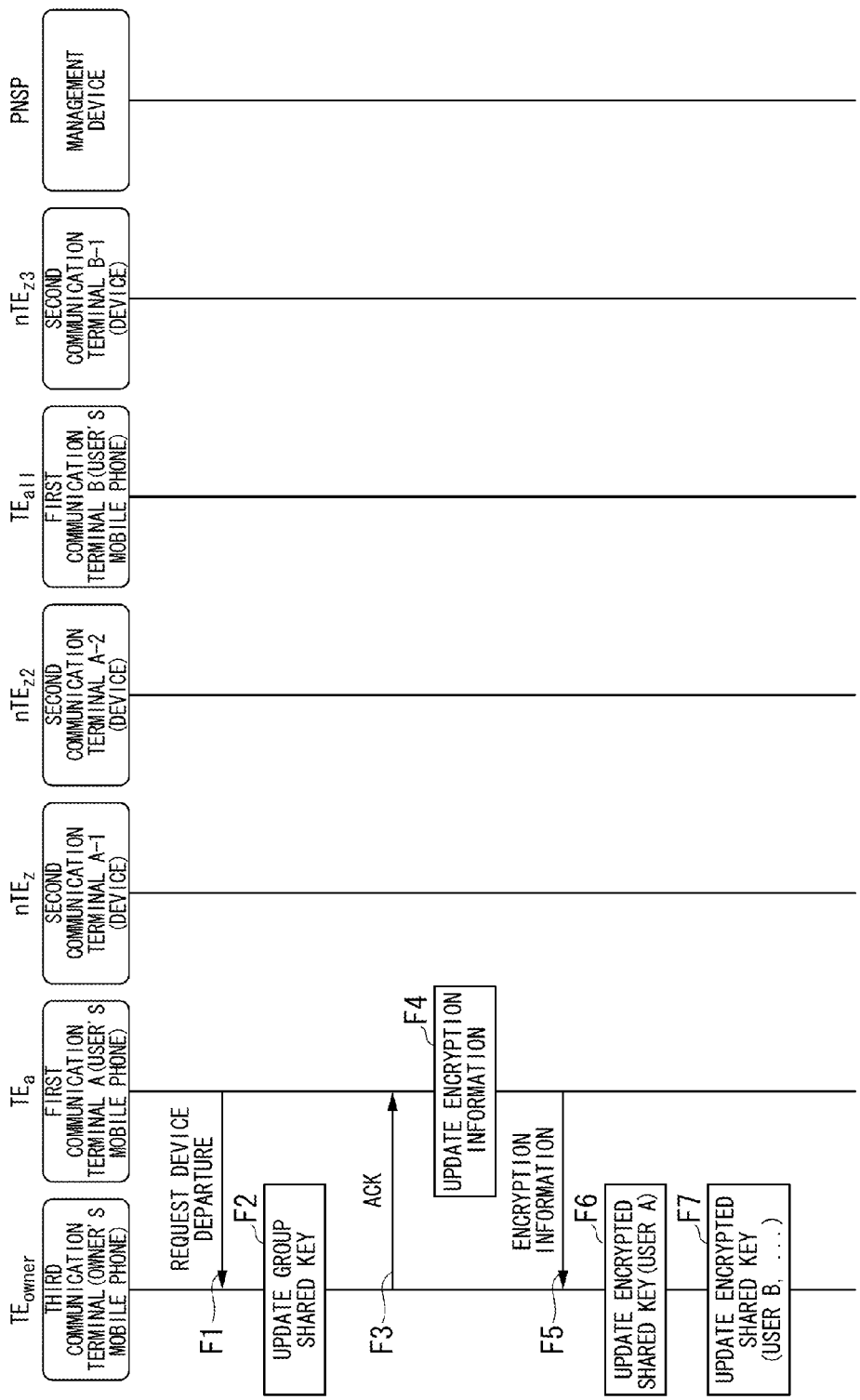
FIG. 42 is a sequence chart of a device departure stage according to Embodiment 7.

FIG. 42 is a sequence chart of a device departure stage according to Embodiment 7. This is a step to be performed when a user makes a second communication terminal (device, $nTE_z$) depart from the group. In FIG. 42, the first communication terminal (user's mobile phone, $TE_a$) transmits a device departure request to the third communication terminal (owner's mobile phone, $TE_{owner}$) (step F1). The third communication terminal (owner's mobile phone, $TE_{owner}$) updates the group shared key ($K_{PN,y}$) from "$K_{PN,y}$" to "$K^*_{PN,y}$" (step F2). The third communication terminal (owner's mobile phone, $TE_{owner}$) replies to the first communication terminal (user's mobile phone, $TE_a$) (step F3).

The first communication terminal (user's mobile phone, $TE_a$) generates and updates encryption information ($K^*_{a,y}$), using the terminal individual information ($I_{a,w}$) corresponding to each of the second communication terminals (device, $nTE_z$) engaged with the group ($PN_y$), other than the second communication terminal (device, $nTE_z$) which has departed from the group ($PN_y$) (step F4). The first communication terminal (user's mobile phone, $TE_a$) transmits the updated encryption information ($K^*_{a,y}$) to the third communication terminal (owner's mobile phone, $TE_{owner}$) (step F5).

The third communication terminal (owner's mobile phone, $TE_{owner}$) encrypts the group shared key ($K^*_{PN,y}$) using the encryption information ($K^*_{a,y}$), and generates and updates encrypted shared key information "$C^*_{a,y}=E(K^*_{a,y}, K^*_{PN,y})$" (step F6). The third communication terminal (owner's mobile phone, $TE_{owner}$) generates and updates the encrypted shared key information "$C^*_{all,y}=E(K_{all,y}, K^*_{PN,y})$", using the group shared key ($K^*_{PN,y}$) and the encryption information ($K_{all,y}$) corresponding to each group member (step F7).

[User Departure Stage]

Figure 43:
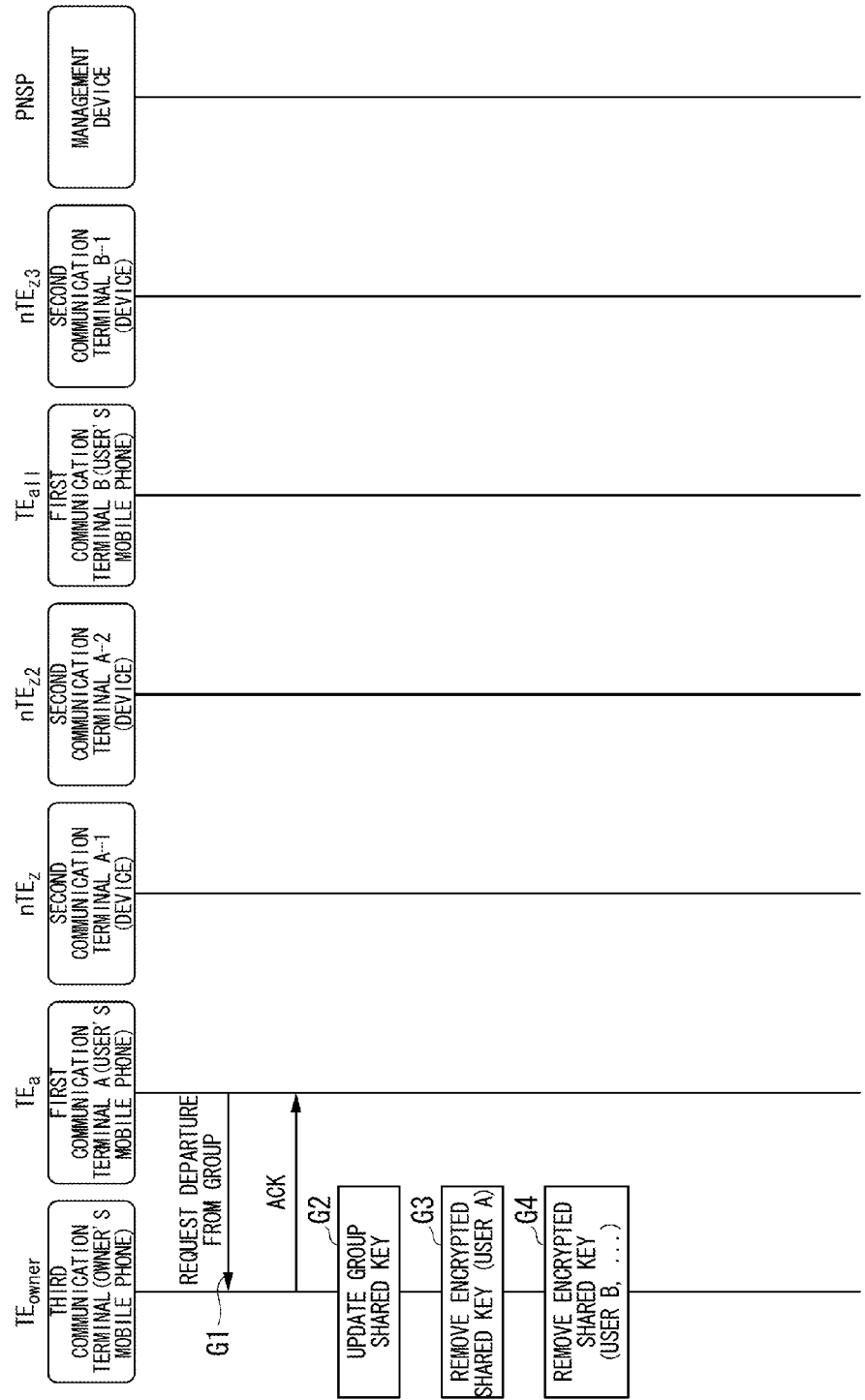
FIG. 43 is a sequence chart of a user departure stage according to Embodiment 7.

FIG. 43 is a sequence chart of a user departure stage according to Embodiment 7. This is a step to be performed when the group owner makes a user depart from the group. In FIG. 43, the first communication terminal (user's mobile phone, $TE_a$) requests the third communication terminal (owner's mobile phone, $TE_{owner}$) for removal of information ($C_{a,y}$) related to the first communication terminal (user's mobile phone, $TE_a$) (step G1). The third communication terminal (owner's mobile phone, $TE_{owner}$) replies to the first communication terminal (user's mobile phone, $TE_a$). The third communication terminal (owner's mobile phone, $TE_{owner}$) updates the group shared key ($K_{PN,y}$) from "$K_{PN,y}$" to "$K^*_{PN,y}$" (step G2). The third communication terminal (owner's mobile phone, $TE_{owner}$) removes the encrypted shared key information ($C_{a,y}$) related to the first communication terminal (user's mobile phone, $TE_a$) (step G3). The third communication terminal (owner's mobile phone, $TE_{owner}$) generates and updates the encrypted shared key information "$C^*_{all,y}=E(K_{all,y}, K^*_{PN,y})$", using the group shared key ($K^*_{PN,y}$) and the encryption information ($K_{all,y}$) corresponding to each group member (step G4).

This completes the description of Embodiment 7.

Embodiment 8

Figure 44:
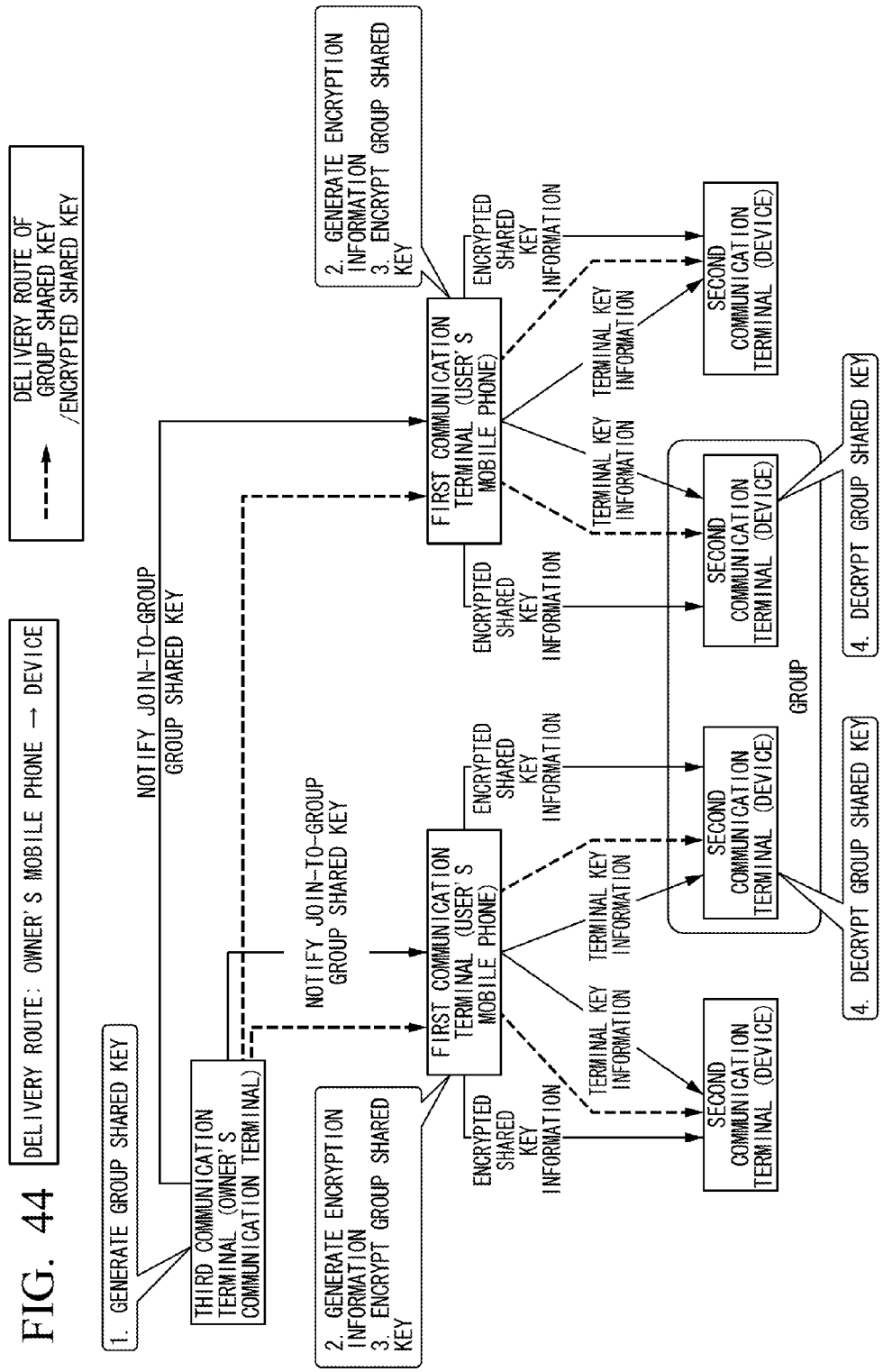
FIG. 44 is a conceptual diagram according to Embodiment 8.

In Embodiment 8, a group shared key (encrypted shared key) is delivered from a third communication terminal (owner's mobile phone, $TE_{owner}$) to a second communication terminal (device, $nTE_z$). FIG. 44 is a conceptual diagram according to Embodiment 8. As shown in FIG. 44, the group shared key is supplied from the third communication terminal (owner's mobile phone, $TE_{owner}$) to the first communication terminal (user's mobile phone, $TE_x$), it is encrypted by the first communication terminal (user's mobile phone, $TE_x$), and it is then transmitted as encrypted shared key information from the first communication terminal (user's mobile phone, $TE_x$) to the second communication terminal (device, $nTE_z$).

In FIG. 44, the third communication terminal (owner's mobile phone, $TE_{owner}$) generates a group shared key and transmits it to the first communication terminal (user's mobile phone, $TE_x$). The first communication terminal (user's mobile phone, $TE_x$) generates terminal key information from terminal individual information for each of the second communication terminals (device, $nTE_z$) to join the group, and transmits the terminal key information to the second communication terminal (device, $nTE_z$). The first communication terminal (user's mobile phone, $TE_x$) generates encryption information using the terminal individual information of the second communication terminals (device, $nTE_z$) to join the group, encrypts the group shared key using this encryption information, and transmits the encrypted shared key information to the second communication terminal (owner's mobile phone, $nTE_z$). The second communication terminal (device, $nTE_z$) decrypts the group shared key, using the encrypted shared key information and the terminal key information.

Figure 45:
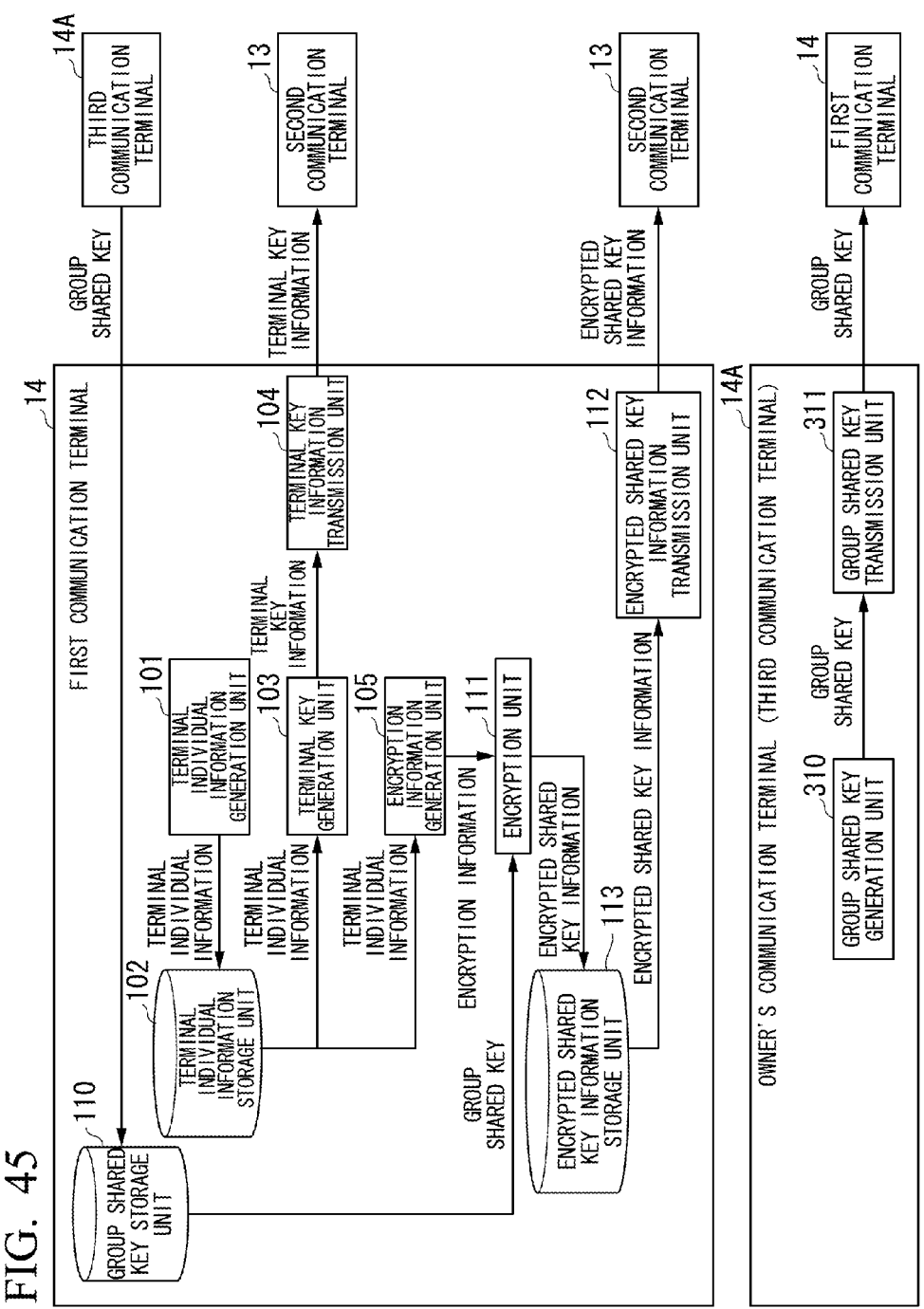
FIG. 45 is a diagram of a device configuration according to Embodiment 8.

FIG. 45 is a diagram of a device configuration according to Embodiment 8. In FIG. 45, the first communication terminal (user's mobile phone, $TE_x$) 14 has a terminal individual information generation unit 101, a terminal individual information storage unit 102, a terminal key information generation unit 103, a terminal key information transmission unit 104, an encryption information generation unit 105, a group shared key storage unit 110, an encryption unit 111, an encrypted shared key information transmission unit 112, and an encrypted shared key information storage unit 113. The third communication terminal (owner's mobile phone, $TE_{owner}$) 14A has a group shared key generation unit 310 and a group shared key transmission unit 311. Embodiment 8 differs from Embodiment 1 in that the first communication terminal (user's mobile phone, $TE_x$) supplies encrypted shared key information to the second communication terminal (device, $nTE_z$).

Next, among the operations according to Embodiment 8, the points which differ from those in Embodiment 1 are mainly described, with reference to FIG. 46 through FIG. 49. FIG. 46 through FIG. 49 are sequence charts each showing a procedure of operations according to Embodiment 8.

[User Usage Registration Stage]

Figure 46:
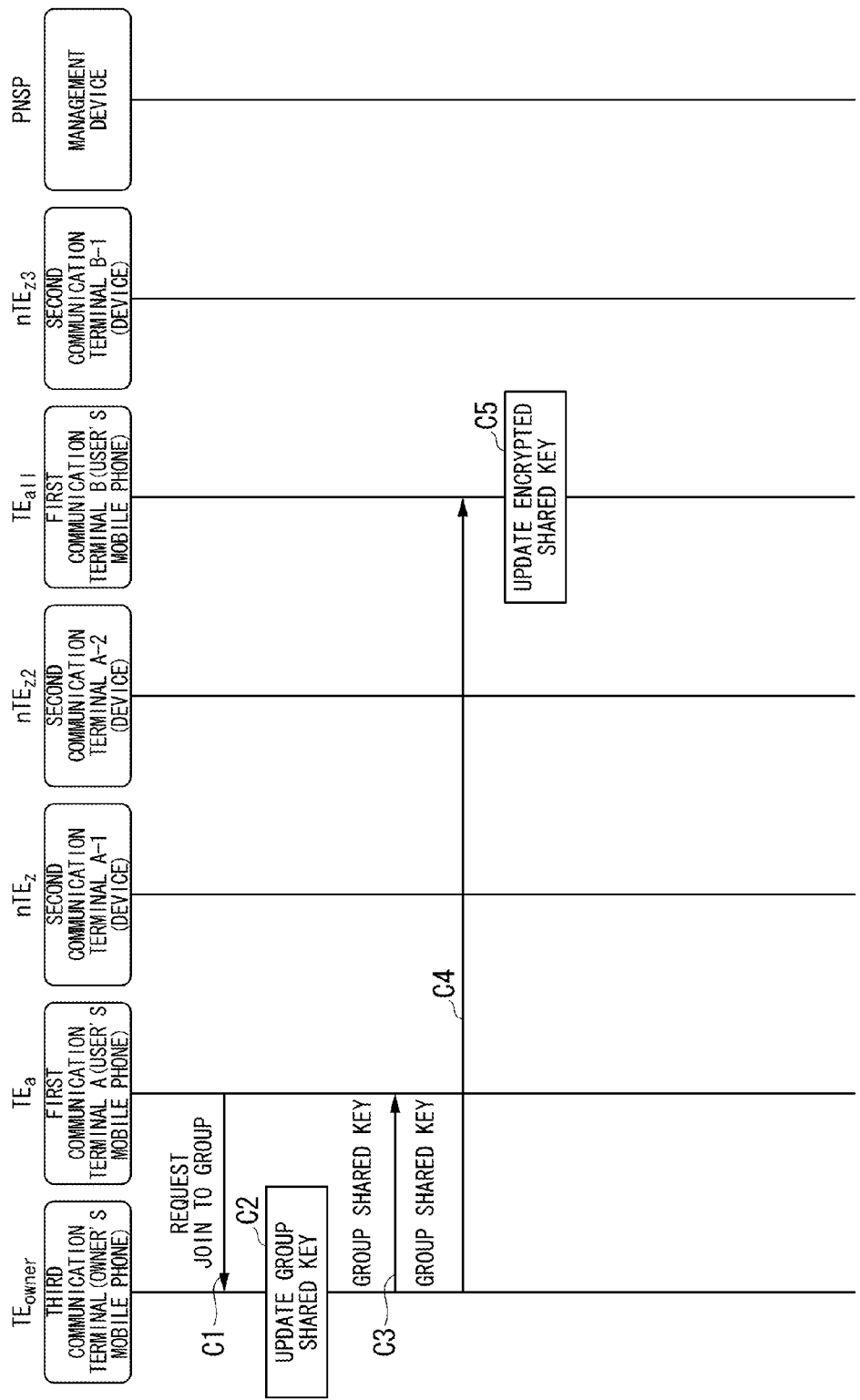
FIG. 46 is a sequence chart of a user usage registration stage according to Embodiment 8.

FIG. 46 is a sequence chart of a user usage registration stage according to Embodiment 8. This is a step in which a user performs usage registration with the owner of a group when joining a group. In FIG. 46, the first communication terminal (user's mobile phone, $TE_a$) transmits a request to join the group ($PN_y$) to the third communication terminal (owner's mobile phone, $TE_{owner}$) (step C1). When permitting the user to join the group ($PN_y$), the third communication terminal (owner's mobile phone, $TE_{owner}$) updates the group shared key ($K_{PN_y}$) from "$K_{PN_y}$" to "$K^*_{PN_y}$" (step C2). When permitting join, the third communication terminal (owner's mobile phone, $TE_{owner}$) transmits the updated group shared key ($K^*_{PN_y}$) to the first communication terminal (user's mobile phone, $TE_a$) (step C3). When permitting join, the third communication terminal (owner's mobile phone, $TE_{owner}$) transmits the updated group shared key ($K^*_{PN_y}$) to the other group-member first communication terminal (user's mobile phone, $TE_{all}$) (step C4). The other group-member first communication terminal (user's mobile phone, $TE_{all}$) encrypts the group shared key ($K^*_{PN_y}$) using the encryption information ($k_{all,y}$), and updates the encrypted shared key information ($C_{all,y}$) to "$C^*_{all,y}=E(K_{all,y}, K^*_{PN_y})$" (step C5).

[Device Addition Stage]

Figure 47:
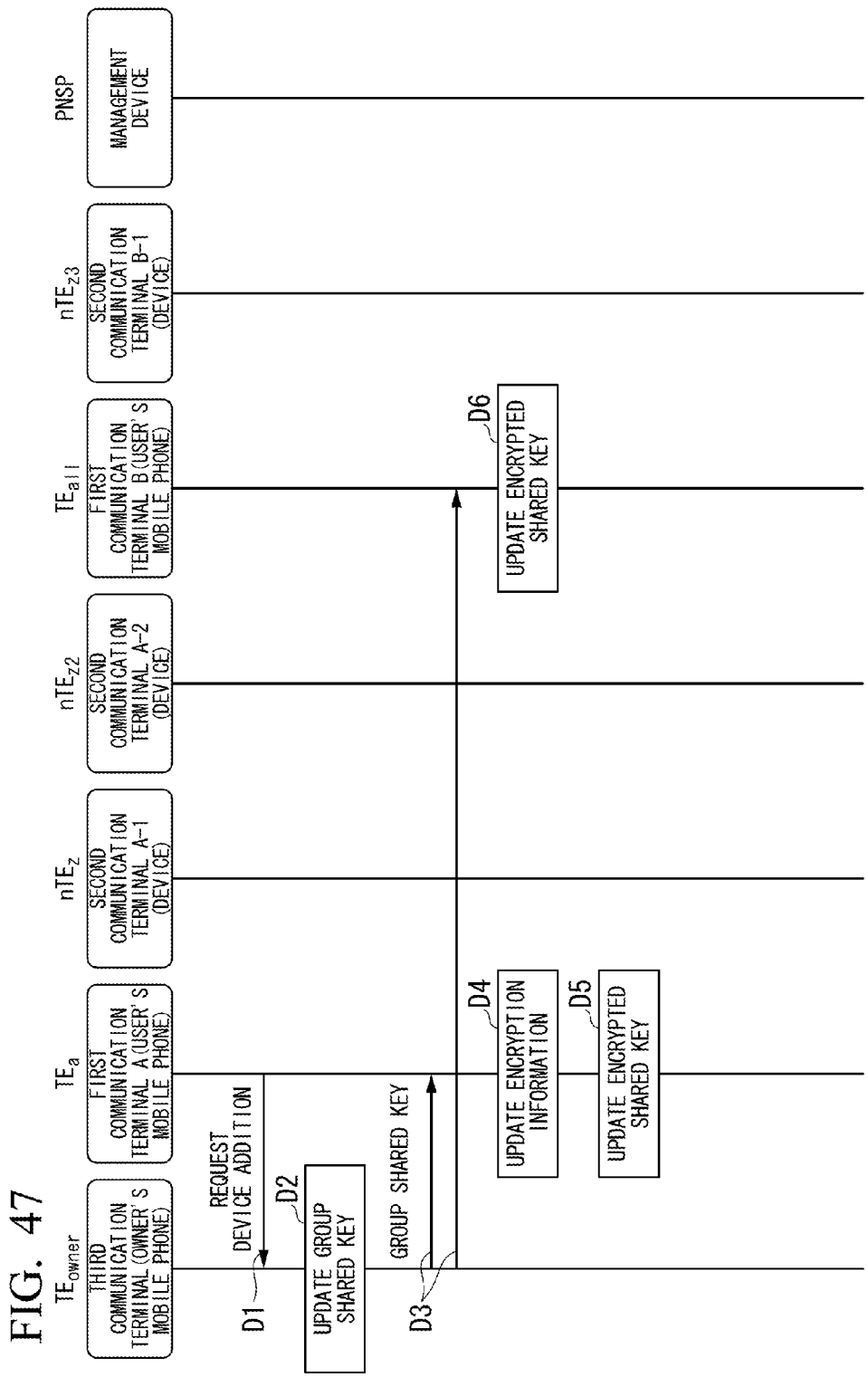
FIG. 47 is a sequence chart of a device addition stage according to Embodiment 8.

FIG. 47 is a sequence chart of a device addition stage according to Embodiment 8. This is a step to be performed when the second communication terminal (device, $nTE_z$) joins the group after a user has performed user usage registration. In FIG. 47, the first communication terminal (user's mobile phone, $TE_a$) requests the third communication terminal (owner's mobile phone, $TE_{owner}$) for an addition of a second communication terminal (device, $TE_z$) (step D1). The third communication terminal (owner's mobile phone, $TE_{owner}$) updates the group shared key ($K_{PN_y}$) from "$K_{PN_y}$" to "$K^*_{PN_y}$" (step D2). The third communication terminal (owner's mobile phone, $TE_{owner}$) transmits the updated group shared key ($K^*_{PN_y}$) to the first communication terminal (user's mobile phone, $TE_a$) and the other group-member first communication terminal (user's mobile phone, $TE_{all}$) (step D3).

The first communication terminal (user's mobile phone, $TE_a$) updates the encryption information ($K_{a,y}$) from "$K_{a,y}$" to "$K^*_{a,y}$", using the terminal individual information ($I_{a,z}, I_{a,w}$ ($w \in P_{a,y}, P_{a,y}$: aggregate of nTE ($nTE_z$) already engaged with $PN_y$, among the nTE used by user A)) corresponding to the second communication terminal (device, $nTE_z$) added to the group ($PN_y$) and each of the second communication terminals (device, $nTE_z$) already engaged with the group ($PN_y$) (step D4). The first communication terminal (user's mobile phone, $TE_a$) encrypts the group shared key ($K^*_{PN_y}$) using the encryption information ($K^*_{a,y}$), and generates and updates encrypted shared key information "$C^*_{a,y}=E(K^*_{a,y}, K^*_{PN_y})$" (step D5). The other group-member first communication terminal (user's mobile phone, $TE_{all}$) encrypts the group shared key ($K_{PN_y}$) using the encryption information ($k_{all,y}$), and updates the encrypted shared key information ($C_{all,y}$) to "$C^*_{all,y}=E(K_{all,y}, K^*_{PN_y})$" (step D6).

[Shared Key Restoration Stage]

A shared key restoration stage according to Embodiment 8 is similar to that in Embodiment 6 illustrated in FIG. 34.

[Device Departure Stage]

Figure 48:
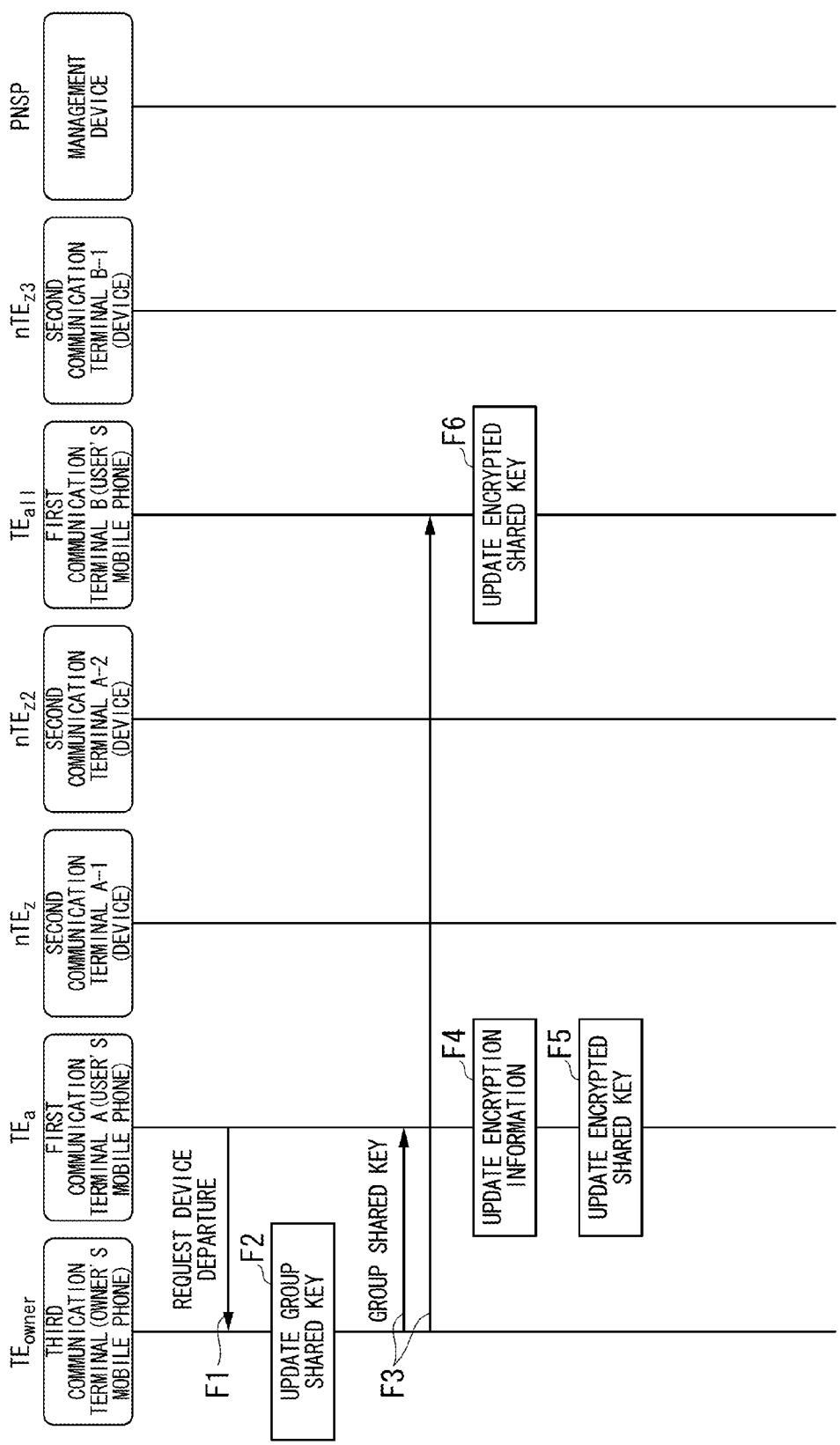
FIG. 48 is a sequence chart of a device departure stage according to Embodiment 8.

FIG. 48 is a sequence chart of a device departure stage according to Embodiment 8. This is a step to be performed when a user makes a second communication terminal (device, $nTE_z$) depart from the group. In FIG. 48, the first communication terminal (user's mobile phone, $TE_a$) transmits a device departure request to the third communication terminal (owner's mobile phone, $TE_{owner}$) (step F1). The third communication terminal (owner's mobile phone, $TE_{owner}$) updates the group shared key ($K_{PN_y}$) from "$K_{PN_y}$" to "$K^*_{PN_y}$" (step F2). The third communication terminal (owner's mobile phone, $TE_{owner}$) transmits the updated group shared key ($K^*_{PN_y}$) to the first communication terminal (user's mobile phone, $TE_a$) and the other group-member first communication terminal (user's mobile phone, $TE_{all}$) (step F3).

The first communication terminal (user's mobile phone, $TE_a$) generates and updates encryption information ($K^*_{a,y}$), using the terminal individual information ($I_{a,w}$) corresponding to each of the second communication terminals (device, $nTE_z$) engaged with the group ($PN_y$), other than the second communication terminal (device, $nTE_z$) which has departed from the group ($PN_y$) (step F4). The first communication terminal (user's mobile phone, $TE_a$) encrypts the group shared key ($K^*_{PN_y}$) using the encryption information ($K^*_{a,y}$), and generates and updates encrypted shared key information "$C^*_{a,y}=E(K^*_{a,y}, K^*_{PN_y})$" (step F5). The other group-member first communication terminal (user's mobile phone, $TE_{all}$) encrypts the group shared key ($K^*_{PN_y}$) using the encryption information ($k_{all,y}$), and updates the encrypted shared key information ($C_{all,y}$) to "$C^*_{all,y}=E(K_{all,y}, K^*_{PN_y})$" (step F6).

[User Departure Stage]

Figure 49:
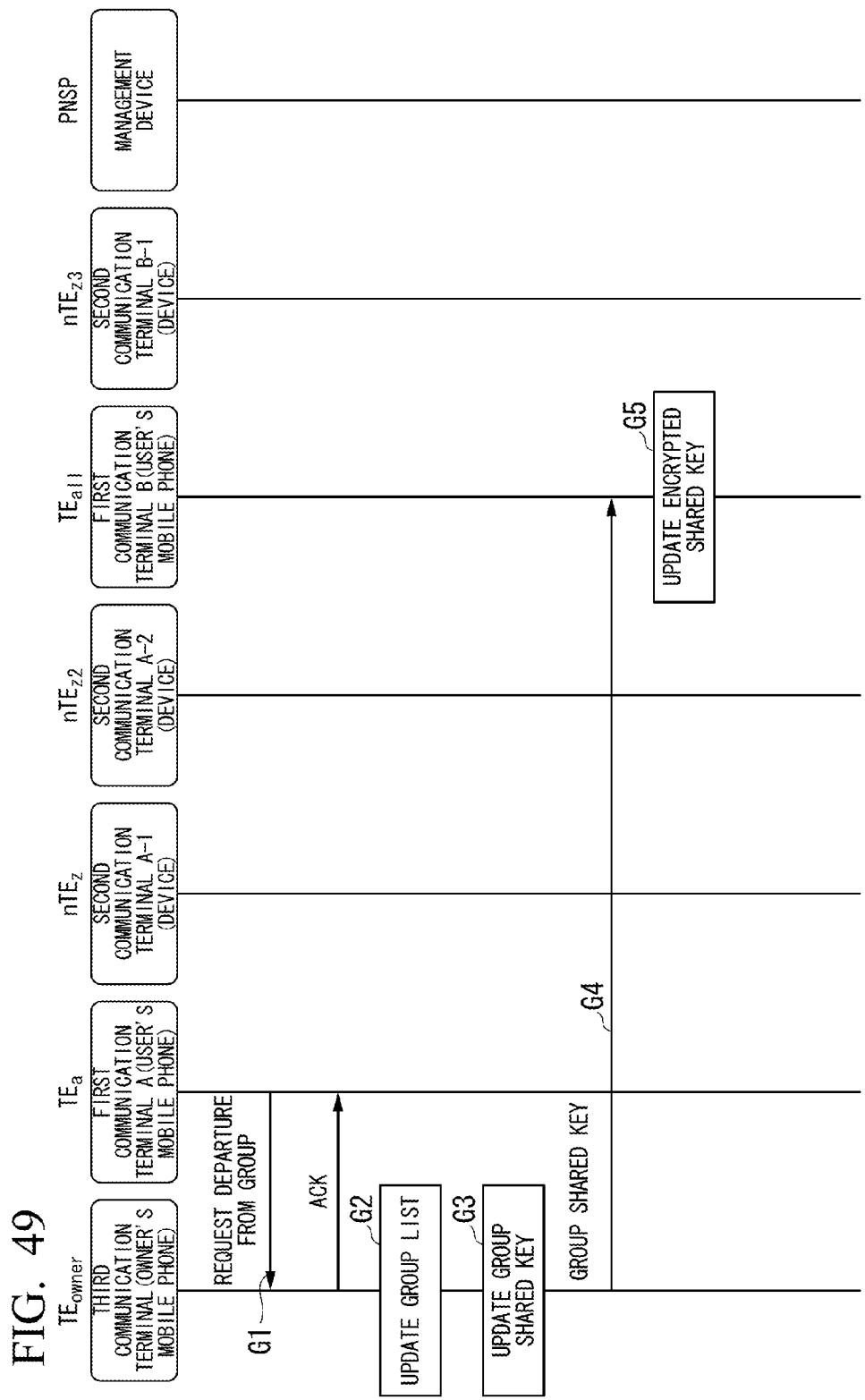
FIG. 49 is a sequence chart of a user departure stage according to Embodiment 8.

FIG. 49 is a sequence chart of a user departure stage according to Embodiment 8. This is a step to be performed when the group owner makes a user depart from the group. In FIG. 49, the first communication terminal (user's mobile phone, $TE_a$) requests the third communication terminal (owner's mobile phone, $TE_{owner}$) for removal of information ($C_{a,y}$) related to the first communication terminal (user's mobile phone, $TE_a$) (step G1). The third communication terminal (owner's mobile phone, $TE_{owner}$) removes the first communication terminal (user's mobile phone, $TE_a$) from the group list, and updates the group list (step G2). The third communication terminal (owner's mobile phone, $TE_{owner}$) updates the group shared key ($K_{PN_y}$) from "$K_{PN_y}$" to "$K^*_{PN_y}$" (step G3).

The third communication terminal (owner's mobile phone, $T_{owner}$) transmits the updated group shared key ($K^*_{PN_y}$) to the other group-member first communication terminal (user's mobile phone, $TE_{all}$) (step G4). The other group-member first communication terminal (user's mobile phone, $TE_{all}$) encrypts the group shared key ($K^*_{PN_y}$) using the encryption information ($k_{all,y}$), and updates the encrypted shared key information ($C_{all,y}$) to "$C^*_{all,y}=E(K_{all,y}, K^*_{PN_y})$" (step G5).

This completes the description of Embodiment 8.

Embodiment 9

Figure 50:
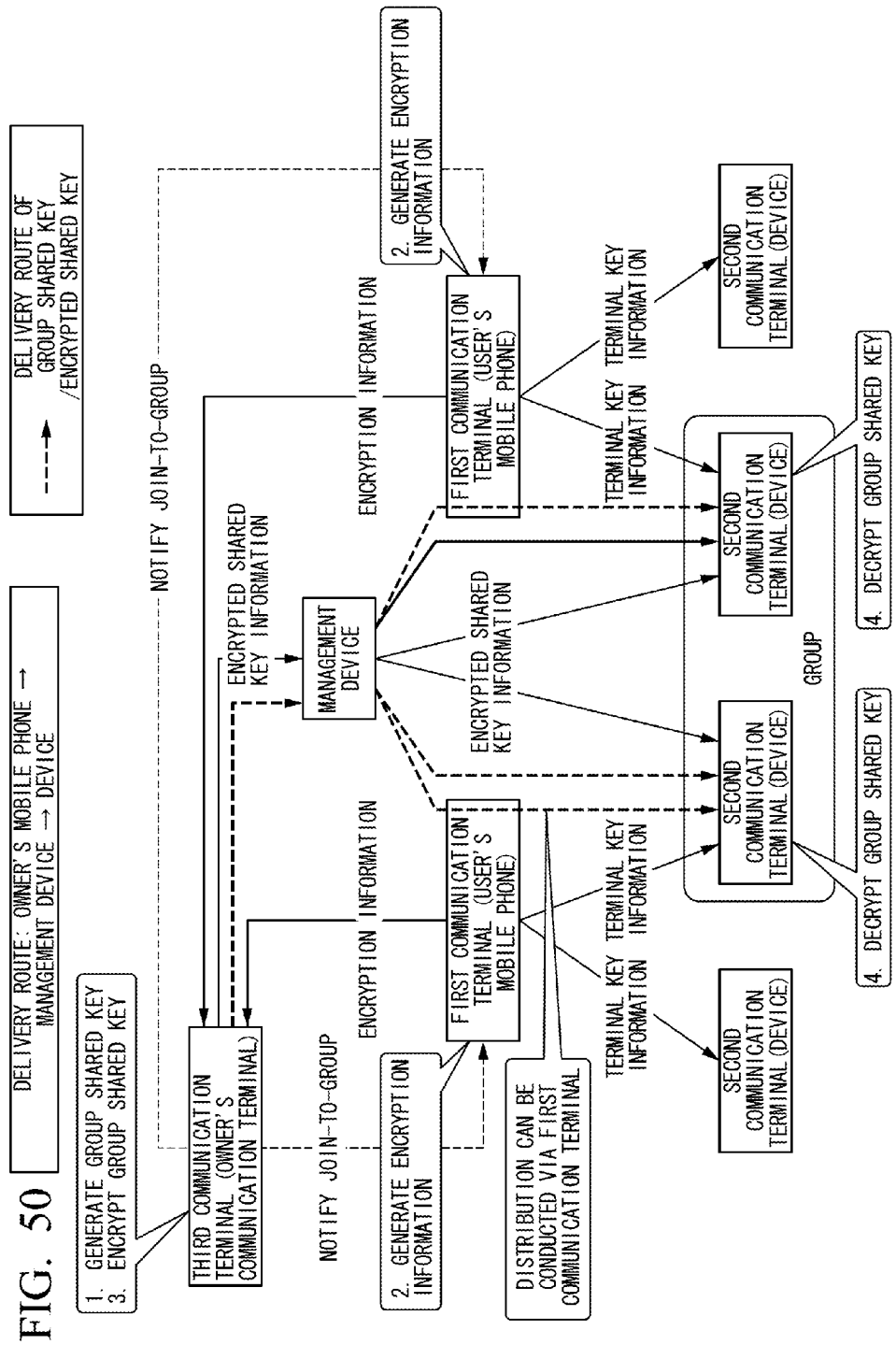
FIG. 50 is a conceptual diagram according to Embodiment 9.

In Embodiment 9, a group shared key (encrypted shared key) is delivered from a third communication terminal (owner's mobile phone, $TE_{owner}$) to a second communication terminal (device, $nTE_z$) via a management device (PNSP). FIG. 50 is a conceptual diagram according to Embodiment 9. As shown in FIG. 50, having been encrypted by the third communication terminal (owner's mobile phone, $T_{owner}$), the group shared key is transmitted as encrypted shared key information from the third communication terminal (owner's mobile phone, $TE_{owner}$) to the second communication terminal (device, nTE$_z$) via the management device (PNSP). The encrypted shared key information may be further delivered from the management device (PNSP) to the second communication terminal (device, nTE$_z$) via the first communication terminal (user's mobile phone, TE$_x$).

In FIG. 50, the third communication terminal (owner's mobile phone, TE$_{owner}$) generates a group shared key. The first communication terminal (user's mobile phone, TE$_x$) generates terminal key information from terminal individual information for each of the second communication terminals (device, nTE$_z$) to join the group, and transmits the terminal key information to the second communication terminal (device, nTE$_z$). The first communication terminal (user's mobile phone, TE$_x$) generates encryption information using the terminal individual information of the second communication terminals (device, nTE$_z$) to join the group, and transmits the encryption information to the third communication terminal (owner's mobile phone, TE$_{owner}$). The third communication terminal (owner's mobile phone, TE$_{owner}$) encrypts the group shared key using the encryption information, and transmits the encrypted shared key information to the management device (PNSP). The management device (PNSP) transmits the encrypted shared key information to the second communication terminal (device, nTE$_z$). The second communication terminal (device, nTE$_z$) decrypts the group shared key, using the encrypted shared key information and the terminal key information.

Figure 51:
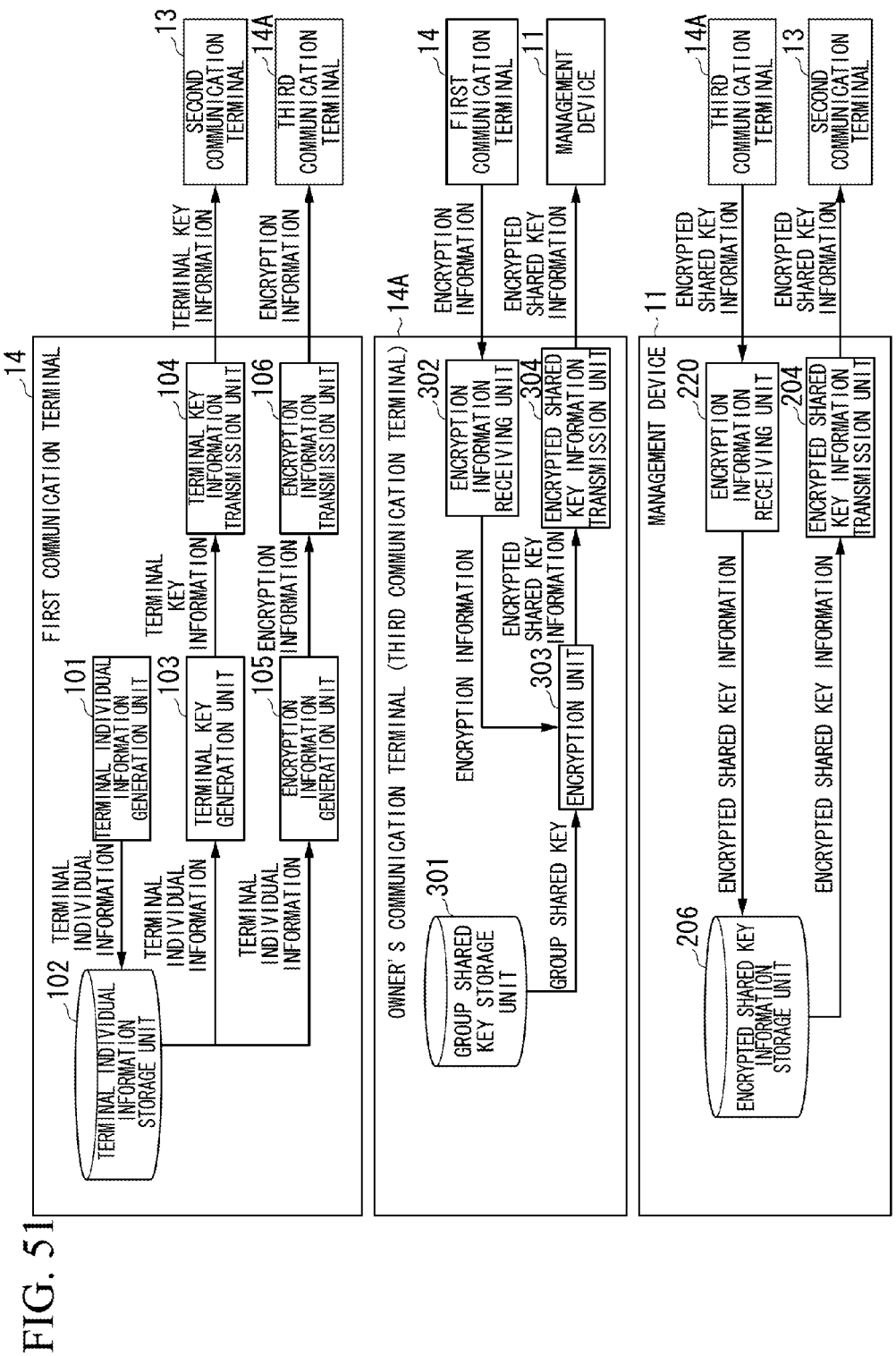
FIG. 51 is a diagram of a device configuration according to Embodiment 9.

FIG. 51 is a diagram of a device configuration according to Embodiment 9. In FIG. 51, the first communication terminal (user's mobile phone, TE$_x$) 14 has a terminal individual information generation unit 101, a terminal individual information storage unit 102, a terminal key information generation unit 103, a terminal key information transmission unit 104, an encryption information generation unit 105, and an encryption information transmission unit 106. The third communication terminal (owner's mobile phone, TE$_{owner}$) 14A has a group shared key storage unit 301, an encryption information receiving unit 302, an encryption unit 303, and an encrypted shared key information transmission unit 304. The management device (PNSP) 11 has an encrypted shared key information receiving unit 220, an encrypted shared key information storage unit 206, and an encrypted shared key information transmission unit 204. Embodiment 9 differs from Embodiment 1 in that the third communication terminal (owner's mobile phone, TE$_{owner}$) generates encrypted shared key information.

Next, among the operations according to Embodiment 9, the points which differ from those in Embodiment 1 are mainly described, with reference to FIG. 52 through FIG. 55. FIG. 52 through FIG. 55 are sequence charts each showing a procedure of operations according to Embodiment 9.

[User Usage Registration Stage]

Figure 52:
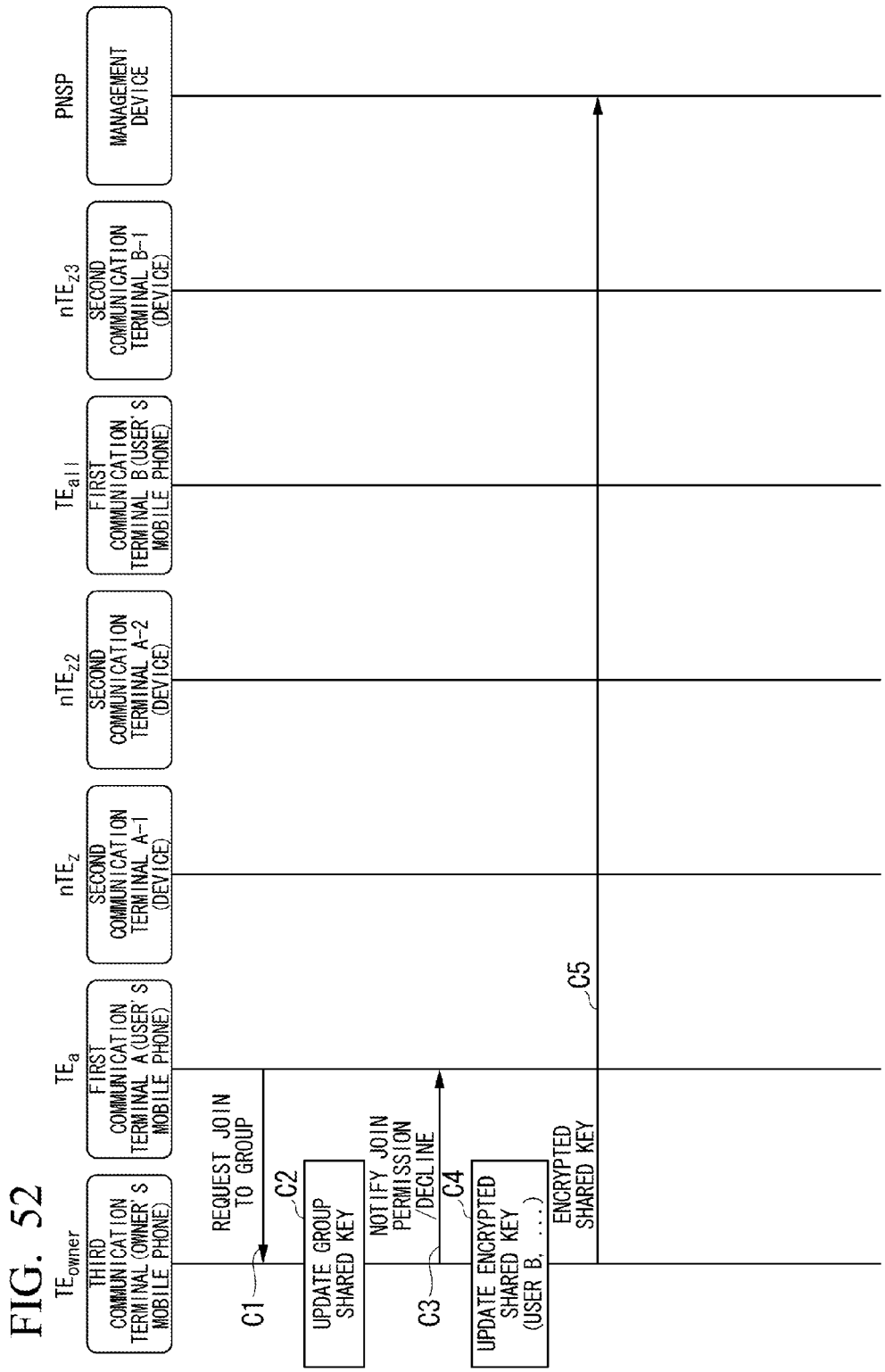
FIG. 52 is a sequence chart of a user usage registration stage according to Embodiment 9.

FIG. 52 is a sequence chart of a user usage registration stage according to Embodiment 9. This is a step in which a user performs usage registration with the owner of a group when joining a group. In FIG. 52, the first communication terminal (user's mobile phone, TE$_a$) transmits a request to join the group (PN$_y$) to the third communication terminal (owner's mobile phone, TE$_{owner}$) (step C1). When permitting the user to join the group (PN$_y$), the third communication terminal (owner's mobile phone, TE$_{owner}$) updates the group shared key (K$_{PN_y}$) from "K$_{PN_y}$" to "K*$_{PN_y}$" (step C2). The third communication terminal (owner's mobile phone, TE$_{owner}$) replies to the first communication terminal (user's mobile phone, TE$_a$) with a permission for join or decline for join (step C3). When permitting join, the third communication terminal (owner's mobile phone, TE$_{owner}$) encrypts the updated group shared key (K*$_{PN_y}$) using encryption information corresponding to each group member (k$_{all,y}$), and updates the encrypted shared key information (C$_{all,y}$) to "C*$_{all,y}$=E(K$_{all,y}$, K*$_{PN_y}$)" (step C4). The third communication terminal (owner's mobile phone, TE$_{owner}$) transmits the updated encrypted shared key information (C*$_{all,y}$) to the management device (PNSP) (step C5).

[Device Addition Stage]

Figure 53:
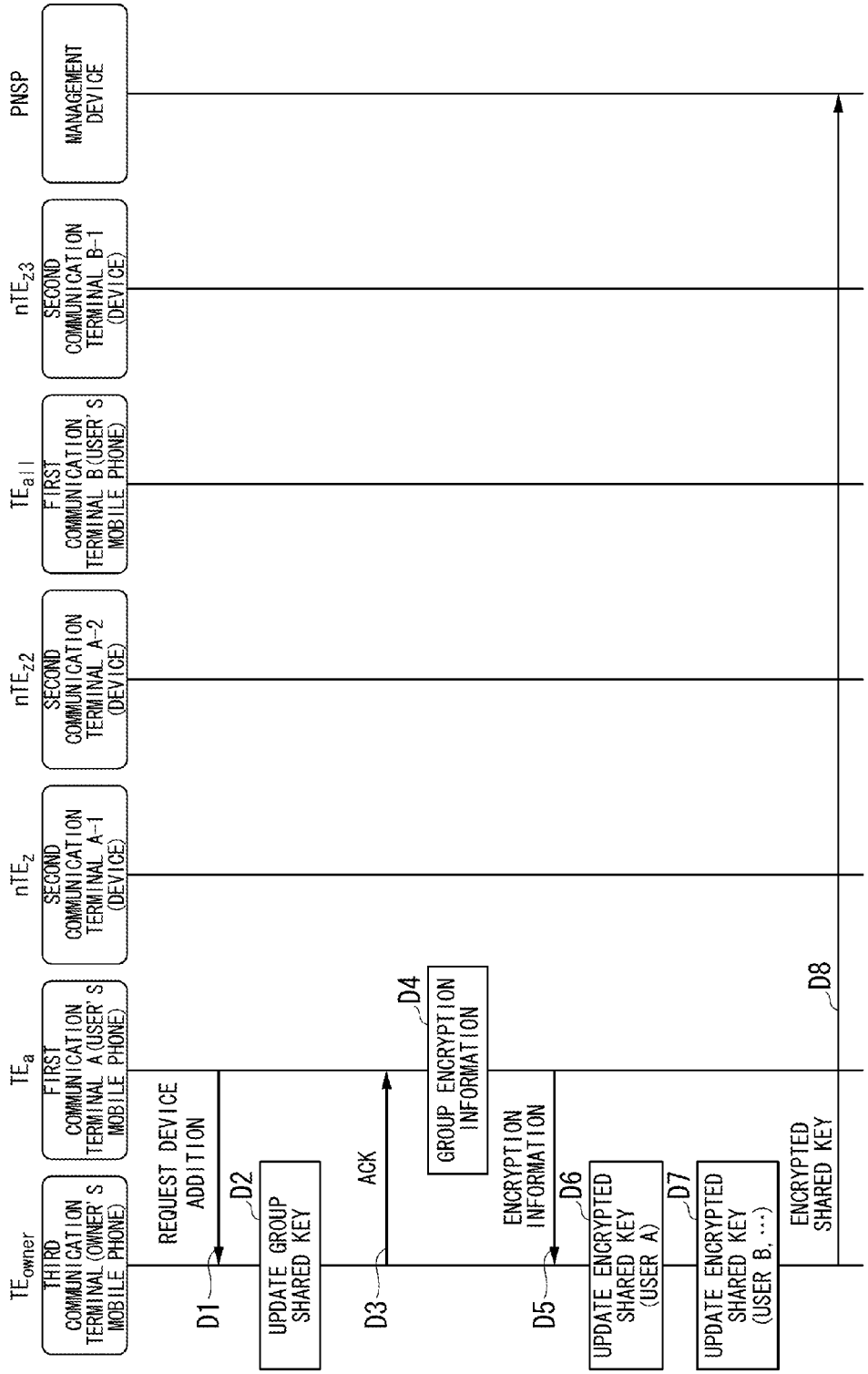
FIG. 53 is a sequence chart of a device addition stage according to Embodiment 9.

FIG. 53 is a sequence chart of a device addition stage according to Embodiment 9. This is a step to be performed when the second communication terminal (device, nTE$_z$) joins the group after a user has performed user usage registration. In FIG. 53, the first communication terminal (user's mobile phone, TE$_a$) requests the third communication terminal (owner's mobile phone, T$_{owner}$) for an addition of a second communication terminal (device, TE$_z$) (step D1). The third communication terminal (owner's mobile phone, TE$_{owner}$) updates the group shared key (K$_{PN_y}$) from "K$_{PN_y}$" to "K*$_{PN_y}$" (step D2). The third communication terminal (owner's mobile phone, TE$_{owner}$) replies to the first communication terminal (user's mobile phone, TE$_a$) (step D3).

The first communication terminal (user's mobile phone, TE$_a$) updates the encryption information (K$_{a,y}$) from "K$_{a,y}$" to "K*$_{a,y}$", using the terminal individual information (I$_{a,z}$, I$_{a,w}$ (w∈P$_{a,y}$, P$_{a,y}$: aggregate of nTE (nTE$_w$) already engaged with PN$_y$, among the nTE used by user A)) corresponding to the second communication terminal (device, nTE$_z$) added to the group (PN$_y$) and each of the second communication terminals (device, nTE$_z$) already engaged with the group (PN$_y$) (step D4). The first communication terminal (user's mobile phone, TE$_a$) transmits the updated encryption information (K*$_{a,y}$) to the third communication terminal (owner's mobile phone, TE$_{owner}$) (step D5).

The third communication terminal (owner's mobile phone, TE$_{owner}$) encrypts the group shared key (K*$_{PN_y}$) using the encryption information (K*$_{a,y}$), and generates and updates encrypted shared key information "C*$_{a,y}$=E(K*$_{a,y}$, K*$_{PN_y}$)" (step D6). The third communication terminal (owner's mobile phone, TE$_{owner}$) generates and updates the encrypted shared key information "C*$_{all,y}$=E(K$_{all,y}$, K*$_{PN_y}$)", using the group shared key (K*$_{PN_y}$) and the encryption information (K$_{all,y}$) corresponding to each group member (step D7). The third communication terminal (owner's mobile phone, TE$_{owner}$) transmits the updated encrypted shared key information (C*$_{a,y}$, C*$_{all,y}$) to the management device (PNSP) (step D8).

[Device Departure Stage]

Figure 54:
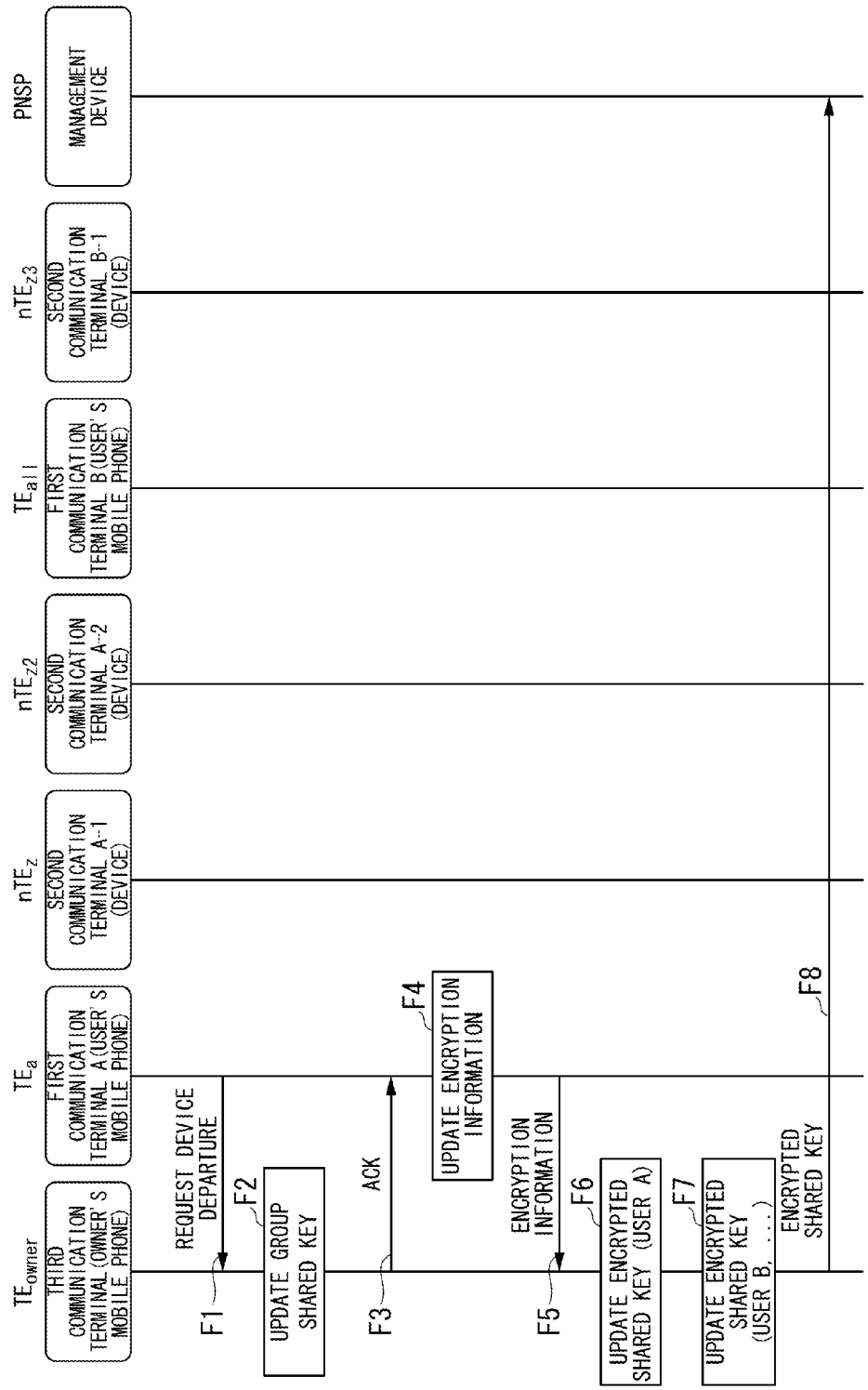
FIG. 54 is a sequence chart of a device departure stage according to Embodiment 9.

FIG. 54 is a sequence chart of a device departure stage according to Embodiment 9. This is a step to be performed when a user makes a second communication terminal (device, nTE$_z$) depart from the group. In FIG. 54, the first communication terminal (user's mobile phone, TE$_a$) transmits a device departure request to the third communication terminal (owner's mobile phone, TE$_{owner}$) (step F1). The third communication terminal (owner's mobile phone, TE$_{owner}$) updates the group shared key (K$_{PN_y}$) from "K$_{PN_y}$" to "K*$_{PN_y}$" (step F2). The third communication terminal (owner's mobile phone, TE$_{owner}$) replies to the first communication terminal (user's mobile phone, TE$_a$) (step F3).

The first communication terminal (user's mobile phone, TE$_a$) generates and updates encryption information (K*$_{a,y}$), using the terminal individual information (I$_{a,w}$) corresponding to each of the second communication terminals (device, nTE$_z$) engaged with the group (PN$_y$), other than the second communication terminal (device, nTE$_z$) which has departed from the group (PN$_y$) (step F4). The first communication terminal (user's mobile phone, TE$_a$) transmits the updated encryption information ($K^*_{a,y}$) to the third communication terminal (owner's mobile phone, $TE_{owner}$) (step F5).

The third communication terminal (owner's mobile phone, $TE_{owner}$) encrypts the group shared key ($K^*_{PN,y}$) using the encryption information ($K^*_{a,y}$), and generates and updates encrypted shared key information "$C^*_{a,y}=E(K^*_{a,y}, K^*_{PN,y})$" (step F6). The third communication terminal (owner's mobile phone, $TE_{owner}$) generates and updates the encrypted shared key information "$C^*_{all,y}=E(K_{all,y}, K^*_{PN,y})$", using the group shared key ($K^*_{PN,y}$) and the encryption information ($K_{all,y}$) corresponding to each group member (step F7). The third communication terminal (owner's mobile phone, $TE_{owner}$) transmits the updated encrypted shared key information ($C^*_{a,y}, C^*_{a,y}$) to the management device (PNSP) (step F8).

[User Departure Stage]

Figure 55:
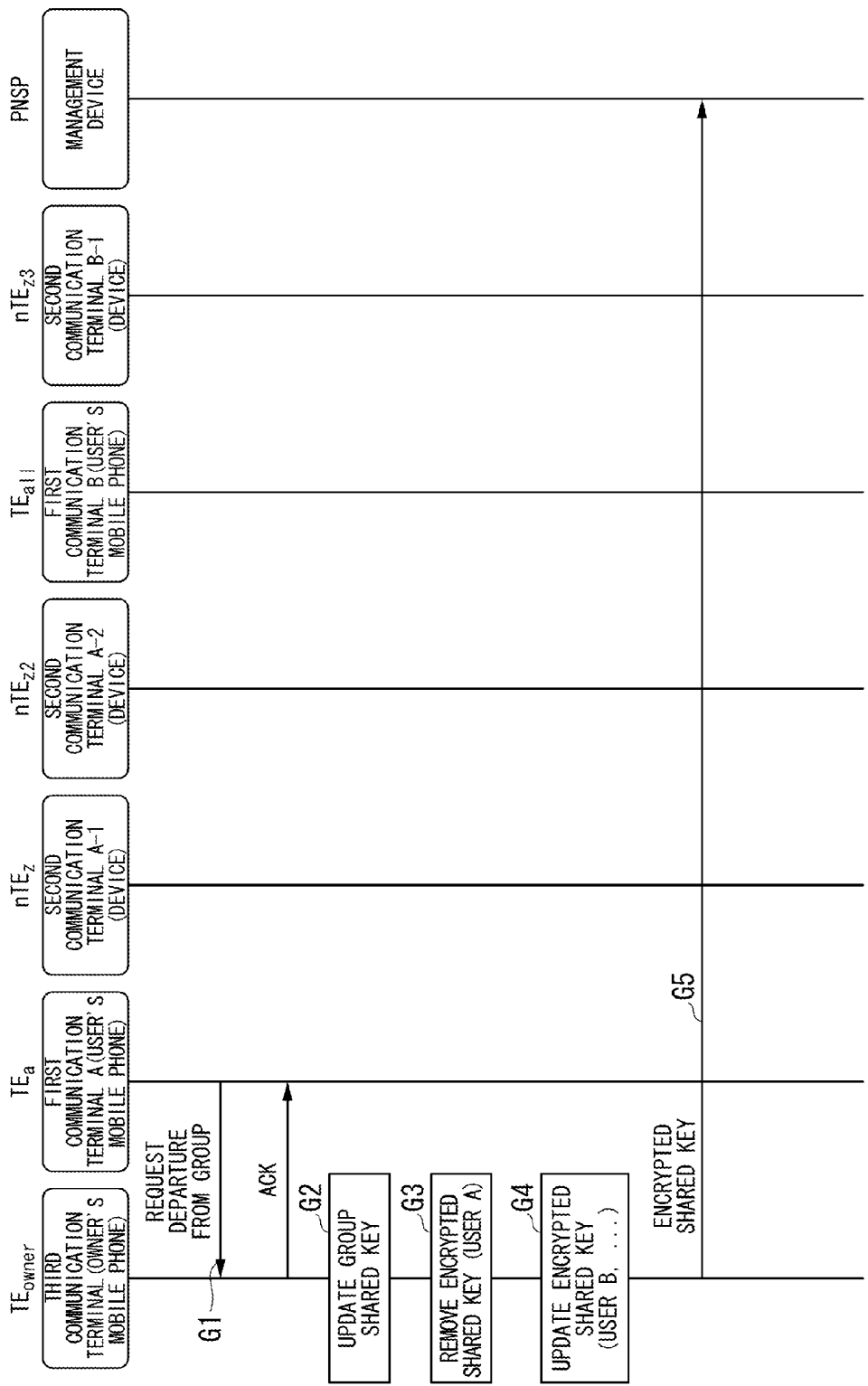
FIG. 55 is a sequence chart of a user departure stage according to Embodiment 9.

FIG. 55 is a sequence chart of a user departure stage according to Embodiment 9. This is a step to be performed when the group owner makes a user depart from the group. In FIG. 55, the first communication terminal (user's mobile phone, $TE_a$) requests the third communication terminal (owner's mobile phone, $TE_{owner}$) for removal of information ($C_{a,y}$) related to the first communication terminal (user's mobile phone, $TE_a$) (step G1). The third communication terminal (owner's mobile phone, $TE_{owner}$) replies to the first communication terminal (user's mobile phone, $TE_a$). The third communication terminal (owner's mobile phone, $TE_{owner}$) updates the group shared key ($K_{PN,y}$) from "$K_{PN,y}$" to "$K^*_{PN,y}$" (step G2). The third communication terminal (owner's mobile phone, $TE_{owner}$) removes the encrypted shared key information ($C_{a,y}$) related to the first communication terminal (user's mobile phone, $TE_a$) (step G3). The third communication terminal (owner's mobile phone, $TE_{owner}$) generates and updates the encrypted shared key information "$C^*_{all,y}=E(K_{all,y}, K^*_{PN,y})$", using the group shared key ($K^*_{PN,y}$) and the encryption information ($K_{all,y}$) corresponding to each group member (step G4). The third communication terminal (owner's mobile phone, $TE_{owner}$) transmits the updated encrypted shared key information ($C^*_{all,y}$) to the management device (PNSP), and requests it to remove the encrypted shared key information ($C_{a,y}$) related to the first communication terminal (user's mobile phone, $TE_a$) (step G5). The management device (PNSP) removes the encrypted shared key information ($C_{a,y}$) related to the first communication terminal (user's mobile phone, $TE_a$).

This completes the description of Embodiment 9.

Next, Embodiment 10 through Embodiment 15, which are modified examples of Embodiment 2 described above, are sequentially described. In Embodiments 10 through 15, the following denotations are used.

$TE_X$: Mobile phone of user x (first communication terminal, registered communication terminal)

$TE_{owner}$: Mobile phone of owner (third communication terminal, registered communication terminal)

$PN_y$: Group y $nTE_z$: Device z (second communication terminal, non-registered communication terminal)

IMS: Operator authentication infrastructure (IP multimedia subsystem)

PNSP: Group key management device (management device)

$IMPU_{nTE,x,z}$: IMS ID of $nTE_z$ used by user x (IMPU: IP multimedia public identity)

$K_{nTE,x,z}$: Shared key $nTE_z$ used by user x and PNSP (second shared key)

$K_{PN,y}$: Group shared key in $PN_y$ (key to be used within the group, group key), $1=|K_{PN,y}|$ $\Delta K_{PN,y}$: Difference in group shared key ($K_{PN,y}$) between before and after update $S_{x,y}$: First distributed key of $K_{PN,y}$ for user x $U_{x,y}$: Second distributed key of $K_{PN,y}$ for user x $I_{x,z}$: Terminal individual information for $nTE_z$ of user x $k_{x,z}$: Terminal individual information for $nTE_z$ of user x $K_{x,y}$: Encryption information of distributed key within $PN_y$ of user x $C_{x,y}$: Encrypted distributed key information for $PN_y$ of user x E(k, x): Encrypt x with encryption information x D(k, c): Decrypt c with terminal key information k Div(k): Divide secret information k into two distributed keys Comb(x, y): Combine distributed keys x, y, and restore original secret information Update(x, $\Delta k$): Generate distributed key x* corresponding to secret information k* after update, based on difference $\Delta k$ in secret information k between before and after update, and distributed key x of original secret information k (Comb(x*, y)=k*, provided that Div(k)=x, y), Update(x, $\Delta k$)=x*)

Embodiment 10

Figure 56:
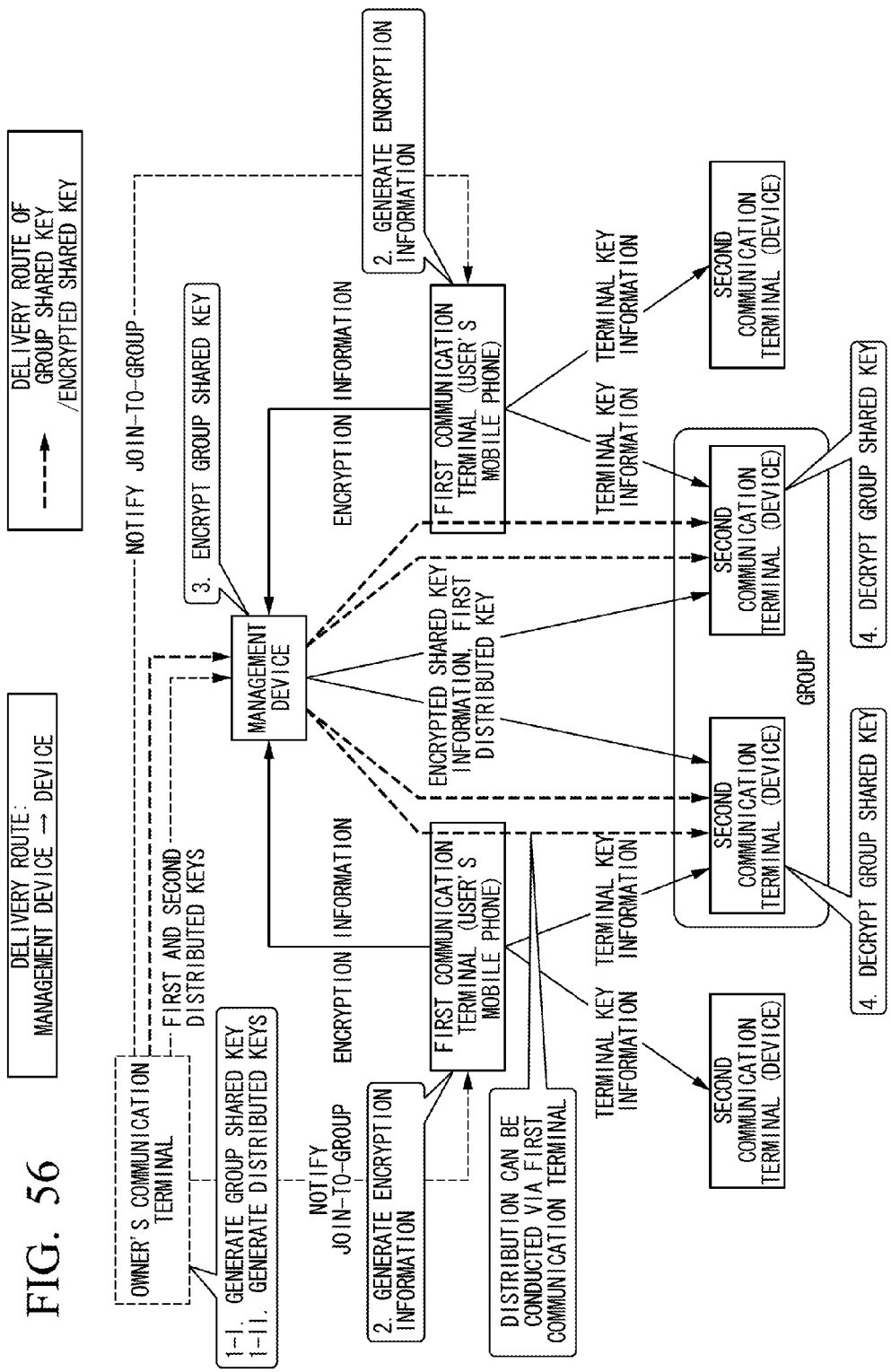
FIG. 56 is a conceptual diagram according to Embodiment 10.

Embodiment 10 is an embodiment in which Embodiment 2 and Embodiment 4 are combined. In Embodiment 10, a group shared key (encrypted shared key) is delivered from the management device (PNSP) to the second communication terminal (device, $nTE_z$). FIG. 56 is a conceptual diagram according to Embodiment 10. As shown in FIG. 56, the group shared key is divided into a first distributed key and a second distributed key by the third communication terminal (owner's mobile phone, $TE_{owner}$) by means of a secret sharing scheme, and it is then transmitted to the management device (PNSP). The first distributed shared key is delivered from the management device (PNSP) to the second communication terminal (device, $nTE_z$). The second distributed key is encrypted by the management device (PNSP), and is then transmitted as encrypted distributed key information from the management device (PNSP) to the second communication terminal (device, $nTE_z$). The first distributed key and the encrypted distributed key information may be delivered from the management device (PNSP) to the second communication terminal (device, $nTE_z$) via the first communication terminal (user's mobile phone, $TE_x$).

In FIG. 56, the third communication terminal (owner's mobile phone, $TE_{owner}$) generates a group shared key. The third communication terminal (owner's mobile phone, $TE_{owner}$) divides the group shared key to a first distributed key and a second distributed key by means of a secret sharing scheme, and transmits the second distributed key and the second distributed key to the management device (PNSP). The first communication terminal (user's mobile phone, $TE_x$) generates terminal key information from terminal individual information for each of the second communication terminals (device, $nTE_z$) to join the group, and transmits the terminal key information to the second communication terminal (device, $nTE_z$). The first communication terminal (user's mobile phone, $TE_x$) generates encryption information using the terminal individual information of the second communication terminals (device, $nTE_z$) to join the group, and transmits the encryption information to the management device (PNSP). The management device (PNSP) encrypts the second distributed key using the encryption information, and transmits the encrypted distributed key information to the second communication terminal (device, $nTE_z$). The second communication terminal (device, $nTE_z$) decrypts the second distributed key, using the encrypted distributed key information and the terminal key information. The management device (PNSP) transmits the first distributed key to the second communication terminal (device, nTE$_z$). The second communication terminal (device, nTE$_z$) restores the group shared key, using the first distributed key and the second distributed key.

Figure 57:
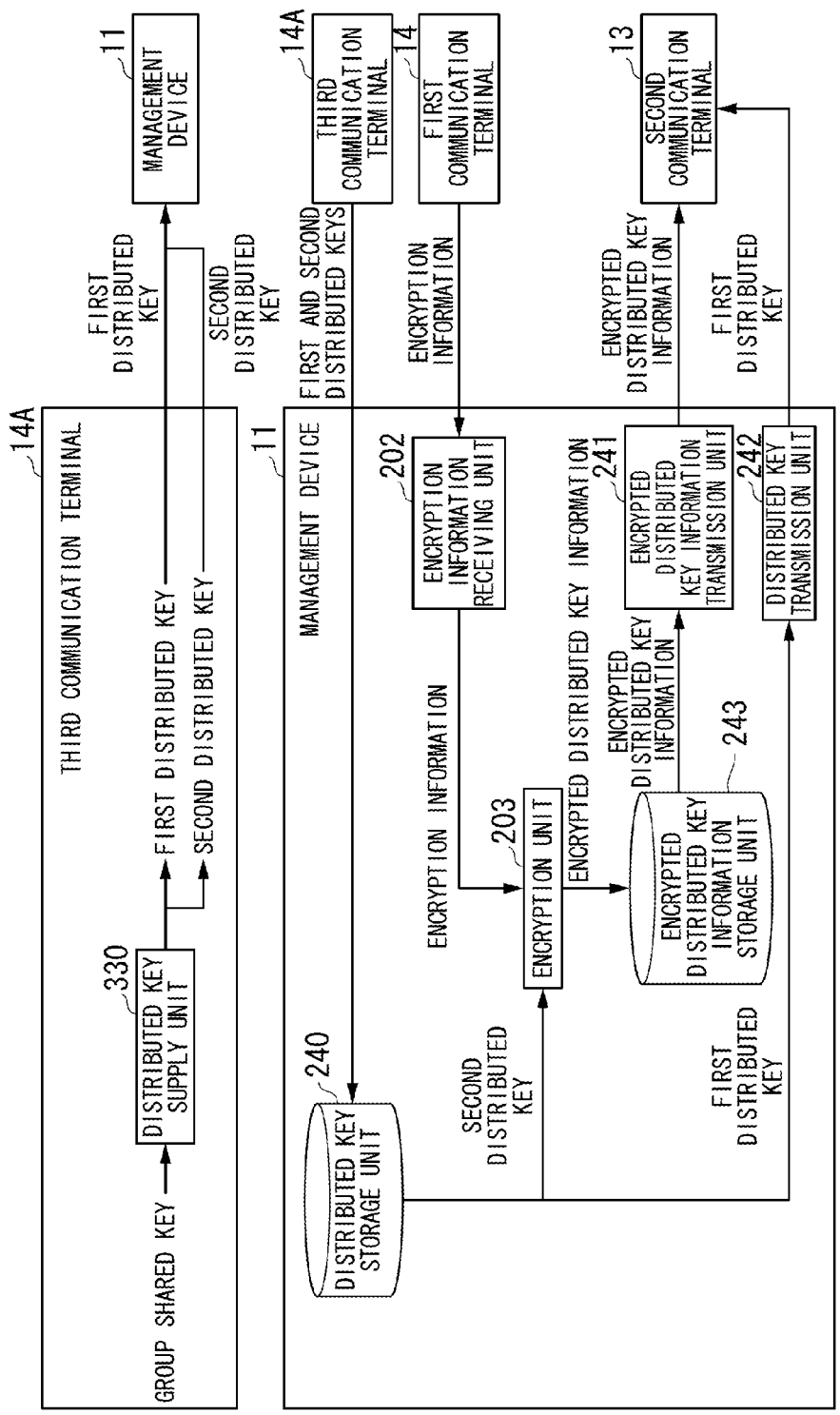
FIG. 57 is a diagram of a device configuration according to Embodiment 10.

FIG. 57 is a diagram of a device configuration according to Embodiment 10. In FIG. 57, the third communication terminal (owner's mobile phone, TE$_{owner}$) 14A has a distributed key supply unit 330. The management device (PNSP) has an encryption information receiving unit 202, an encryption unit 203, a distributed key storage unit 240, an encrypted distributed key information transmission unit 241, a distributed key transmission unit 424, and an encrypted distributed key information storage unit 243. The first communication terminal (user's mobile phone, TE$_x$) 14 is of a configuration similar to that of Embodiment 4 illustrated in FIG. 17. Embodiment 10 differs from Embodiment 2 in that the management device (PNSP) generates encrypted distributed key information.

Next, among the operations according to Embodiment 10, the points which differ from those in Embodiment 2 are mainly described, with reference to FIG. 58 through FIG. 62. FIG. 58 through FIG. 62 are sequence charts each showing a procedure of operations according to Embodiment 10.

[Preparation Stage]

Figure 58:
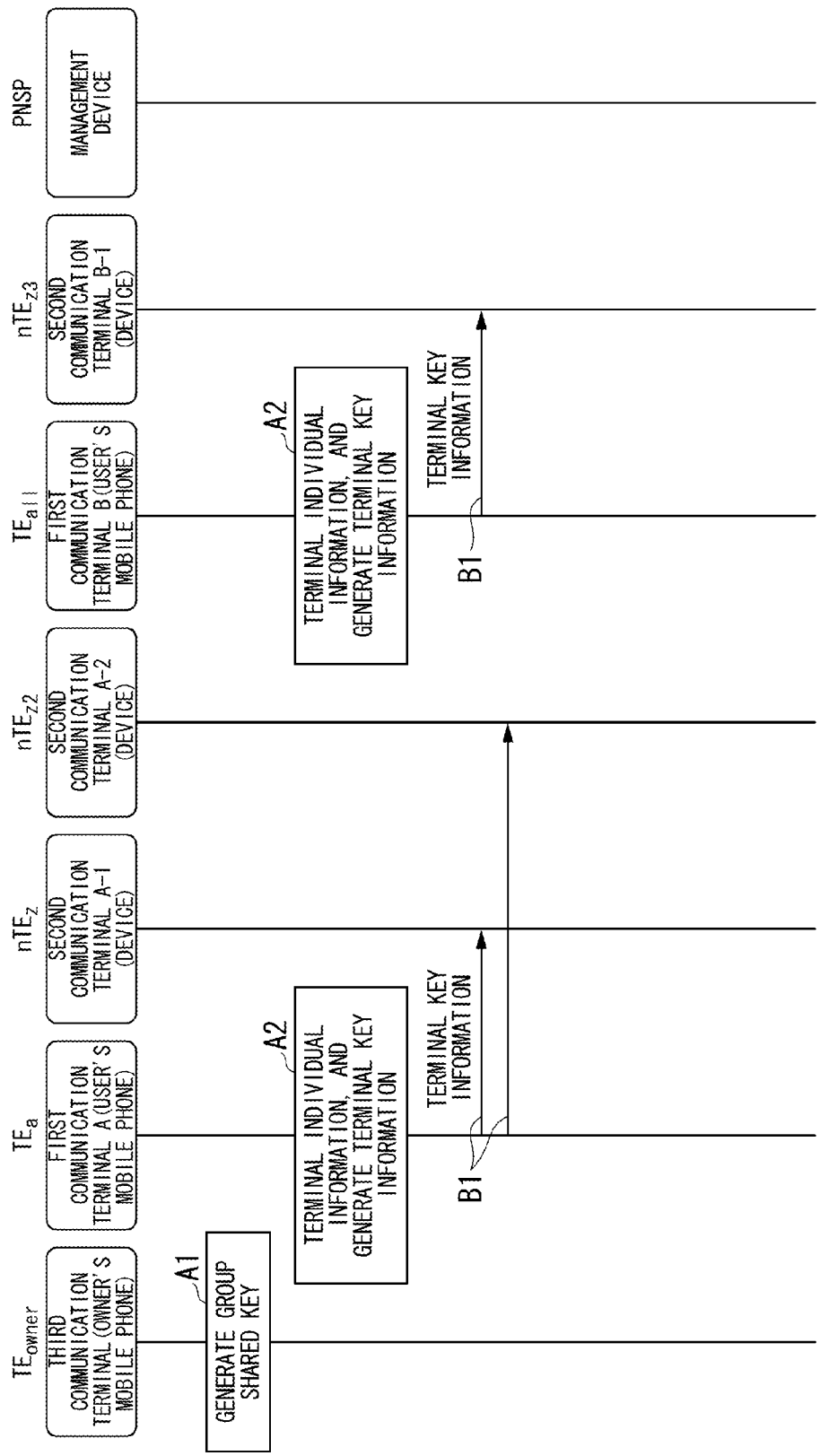
FIG. 58 is a sequence chart of a preparation stage according to Embodiment 10.

FIG. 58 is a sequence chart of a preparation stage according to Embodiment 10. In FIG. 58, the third communication terminal (owner's mobile phone, T$_{owner}$) generates a group shared key (K$_{PN_y}$) of the group (PN$_y$) (step A1). The first communication terminal (user's mobile phone TE$_a$) generates terminal individual information (I$_{a,z}$ (z=1, . . . , N$_{nTE}$: N$_{nTE}$ is an upper limit of the number of devices which can be used by user), and generates terminal key information (k$_{a,z}$) from terminal individual information (I$_{a,z}$) (step A2). The first communication terminal (user's mobile phone, TE$_a$) transmits the terminal key information (k$_{a,z}$) to the second communication terminal (device, nTE$_z$) (step B1).

[User Usage Registration Stage]

Figure 59:
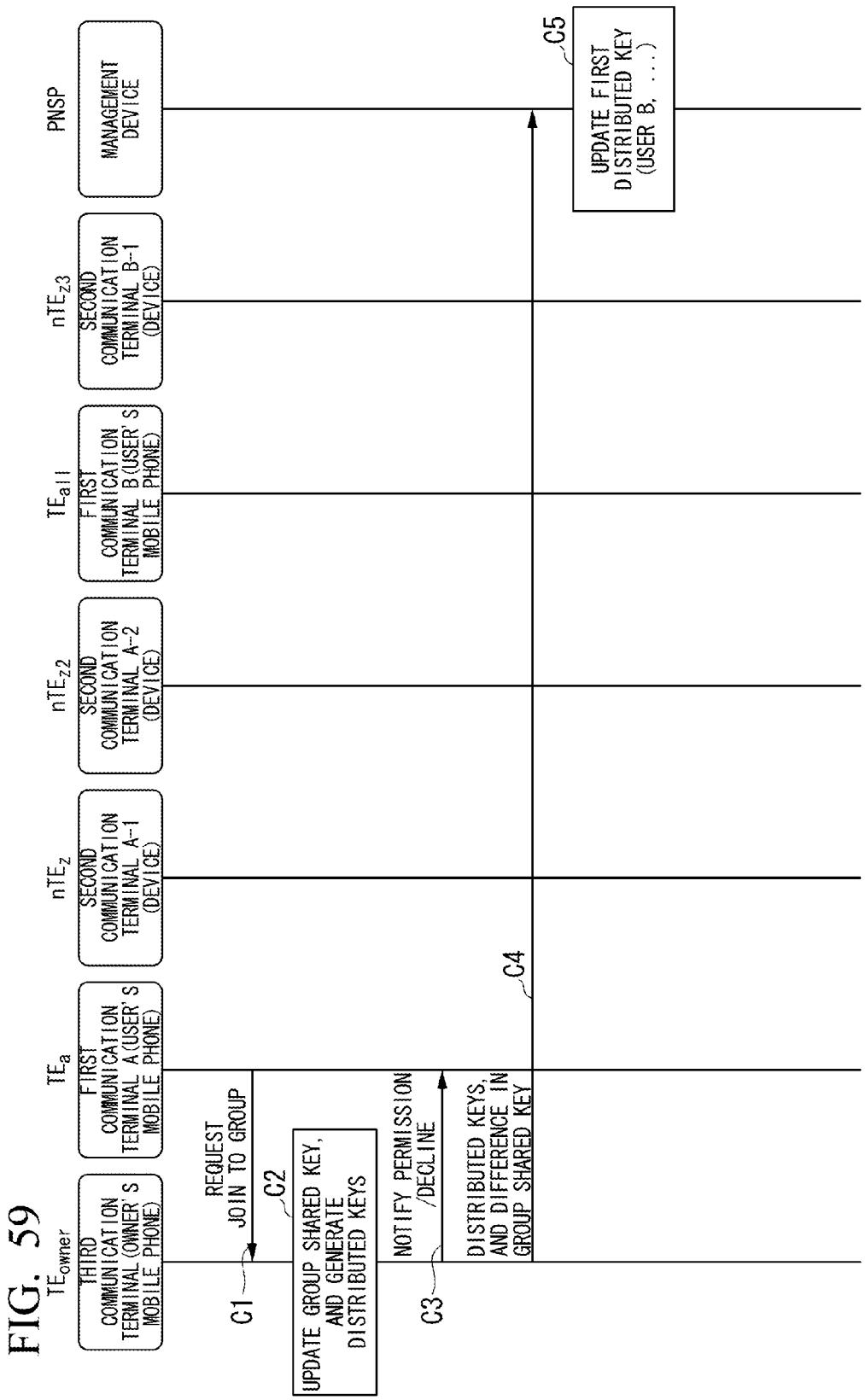
FIG. 59 is a sequence chart of a user usage registration stage according to Embodiment 10.

FIG. 59 is a sequence chart of a user usage registration stage according to Embodiment 10. This is a step in which a user performs usage registration with the owner of a group when joining a group. In FIG. 59, the first communication terminal (user's mobile phone, TE$_a$) transmits a request to join the group (PN$_y$) to the third communication terminal (owner's mobile phone, TE$_{owner}$) (step C1). When permitting the user to join the group (PN$_y$), the third communication terminal (owner's mobile phone, TE$_{owner}$) updates the group shared key (K$_{PN_y}$) from "K$_{PN_y}$" to "K*$_{PN_y}$", and generates a first distributed key (S$_{a,y}$) corresponding to the user and a second distributed key (U$_{a,y}$) on the basis of "(S$_{a,y}$, U$_{a,y}$)=Div (K*$_{PN_y}$)" (step C2). The third communication terminal (owner's mobile phone, TE$_{owner}$) replies to the first communication terminal (user's mobile phone, TE$_a$) with a permission for join or decline for join (step C3). When permitting join, the third communication terminal (owner's mobile phone, TE$_{owner}$) transmits the first distributed key (S$_{a,y}$), the second distributed key (U$_{a,y}$), and the difference in the group shared key (ΔK$_{PN_y}$) to the management device (PNSP) (step C4). The management device (PNSP) updates the first distributed key (S$_{all,y}$), which corresponds to each of the other group members, to "S*$_{all,y}$=Update(S$_{all,y}$, ΔK$_{PN_y}$)", using the difference in the group shared key (ΔK$_{PN_y}$) (step C5).

[Device Addition Stage]

Figure 60:
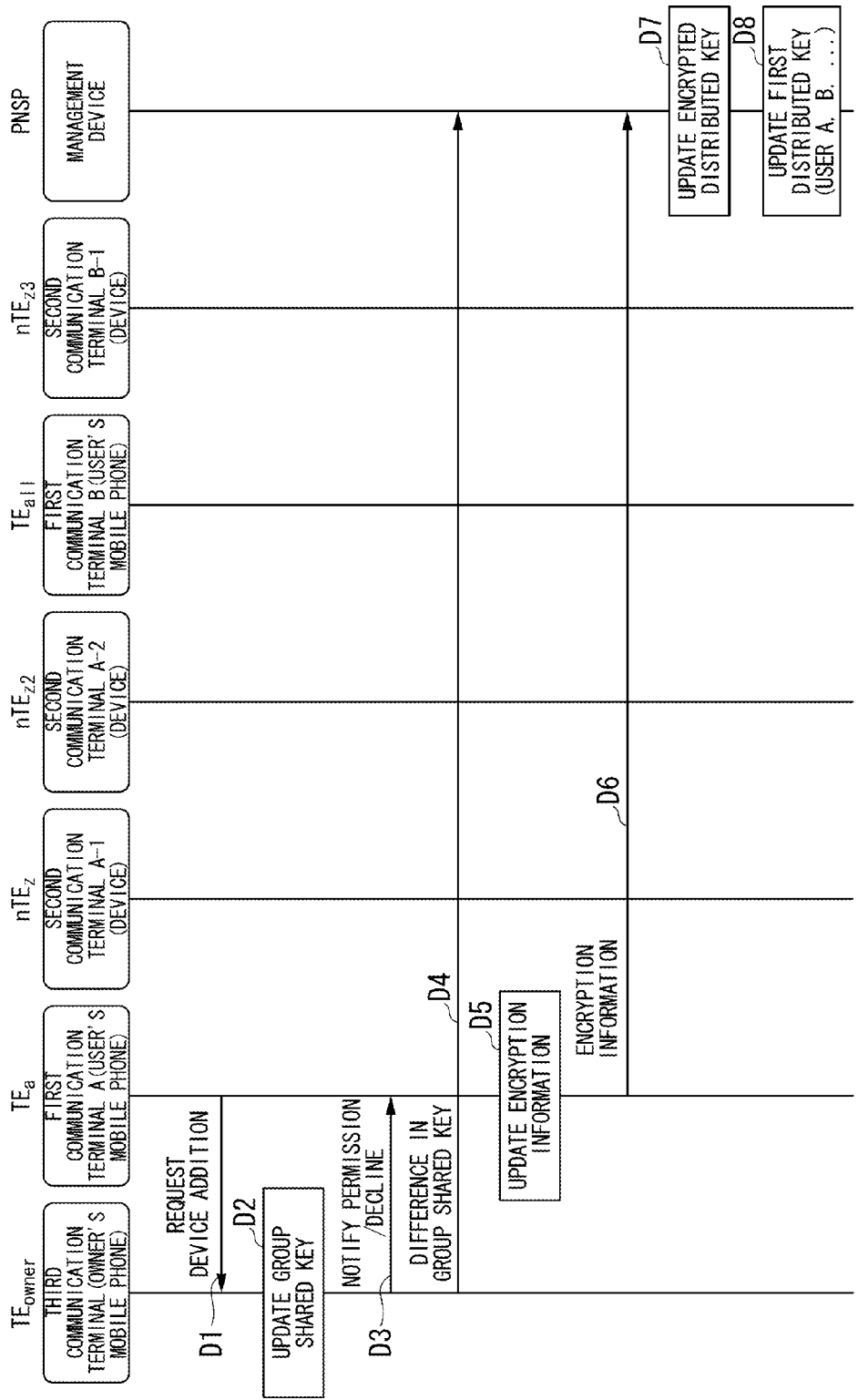
FIG. 60 is a sequence chart of a device addition stage according to Embodiment 10.

FIG. 60 is a sequence chart of a device addition stage according to Embodiment 10. This is a step to be performed when the second communication terminal (device, nTE$_z$) joins the group after a user has performed user usage registration. In FIG. 60, the first communication terminal (user's mobile phone, TE$_a$) requests the third communication terminal (owner's mobile phone, TE$_{owner}$) for an addition of a second communication terminal (device, TE$_z$) (step D1). The third communication terminal (owner's mobile phone, TE$_{owner}$) updates the group shared key (K$_{PN_y}$) from "K$_{PN_y}$" to "K*$_{PN_y}$" (step D2). The third communication terminal (owner's mobile phone, TE$_{owner}$) replies to the first communication terminal (user's mobile phone, TE$_a$) (step D3). The third communication terminal (owner's mobile phone, TE$_{owner}$) transmits the difference in the group shared key (ΔK$_{PN_y}$) to the management device (PNSP) (step C4).

The first communication terminal (user's mobile phone, TE$_a$) updates the encryption information (K$_{a,y}$) from "K$_{a,y}$" to "K*$_{a,y}$", using the terminal individual information (I$_{a,z}$, I$_{a,w}$ (w∈P$_{a,y}$, P$_{a,y}$: aggregate of nTE (nTE$_z$) already engaged with PN$_y$, among the nTE used by user A)) corresponding to the second communication terminal (device, nTE$_z$) added to the group (PN$_y$) and each of the second communication terminals (device, nTE$_z$) already engaged with the group (PN$_y$) (step D5). The first communication terminal (user's mobile phone, TE$_a$) transmits the updated encryption information (k*$_{a,z}$) to the management device (PNSP) (step D6).

The management device (PNSP) encrypts the second distributed key (U$_{a,y}$) corresponding to the first communication terminal (user's mobile phone, TE$_a$), using the encryption information (K*$_{a,y}$), and generates and updates encrypted distributed key information "C*$_{a,y}$=E(k*$_{a,y}$, U$_{a,y}$)" (step D7). The management device (PNSP) updates the first distributed key (S$_{all,y}$), which corresponds to each of the other group members, to "S*$_{all,y}$=Update(S$_{all,y}$, ΔK$_{PN_y}$)", using the difference in the group shared key (ΔK$_{PN_y}$) (step D8).

[Device Departure Stage]

Figure 61:
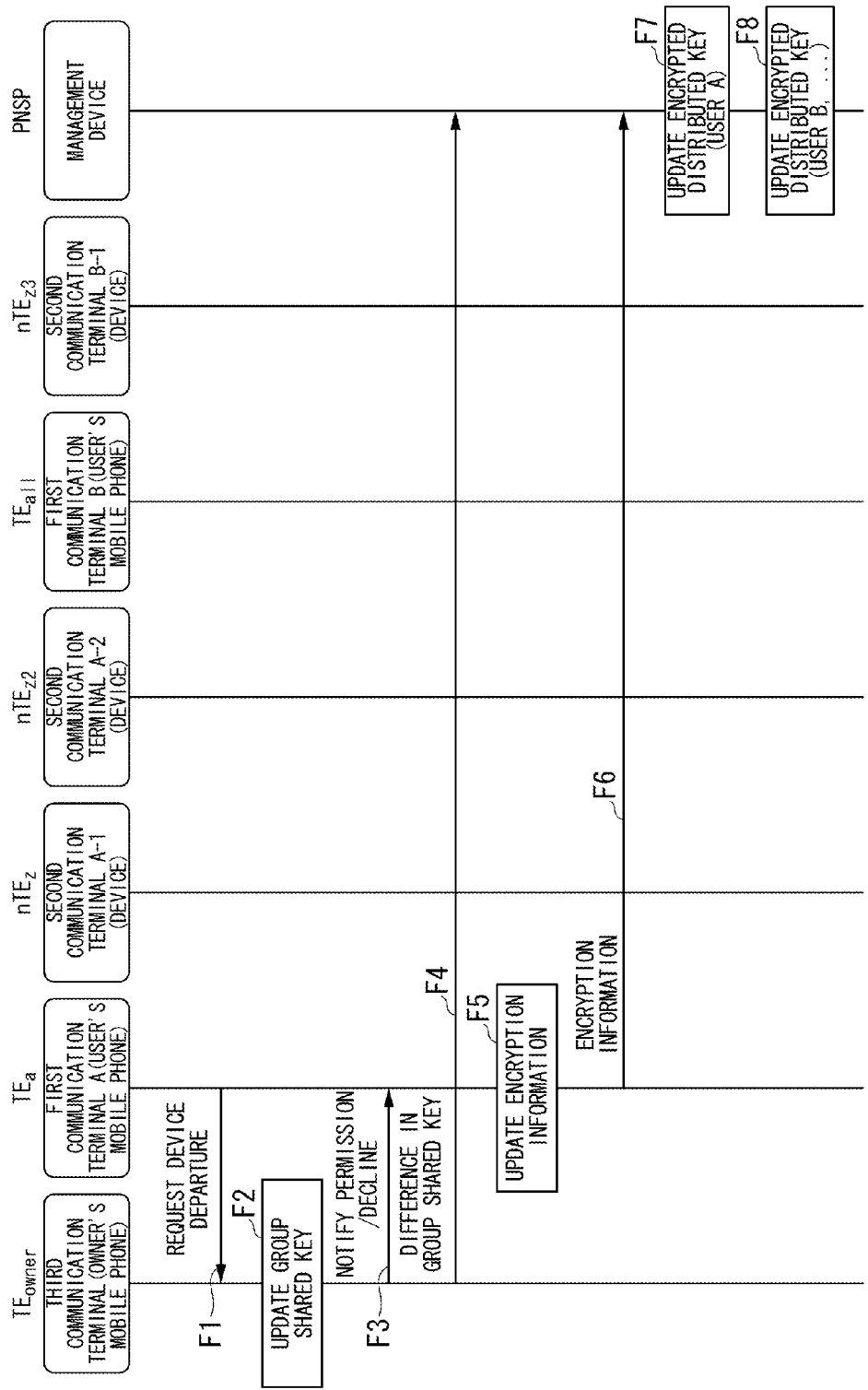
FIG. 61 is a sequence chart of a device departure stage according to Embodiment 10.

FIG. 61 is a sequence chart of a device departure stage according to Embodiment 10. This is a step to be performed when a user makes a second communication terminal (device, nTE$_z$) depart from the group. In FIG. 61, the first communication terminal (user's mobile phone, TE$_a$) transmits a device departure request to the third communication terminal (owner's mobile phone, TE$_{owner}$) (step F1). The third communication terminal (owner's mobile phone, TE$_{owner}$) updates the group shared key (K$_{PN_y}$) from "K$_{PN_y}$" to "K*$_{PN_y}$" (step F2). The third communication terminal (owner's mobile phone, TE$_{owner}$) replies to the first communication terminal (user's mobile phone, TE$_a$) (step F3). The third communication terminal (owner's mobile phone, TE$_{owner}$) transmits the difference in the group shared key (ΔK$_{PN_y}$) to the management device (PNSP) (step F4).

The first communication terminal (user's mobile phone, TE$_a$) generates and updates encryption information (K*$_{a,y}$), using the terminal individual information (I$_{a,w}$) corresponding to each of the second communication terminals (device, nTE$_z$) engaged with the group (PN$_y$), other than the second communication terminal (device, nTE$_z$) which has departed from the group (PN$_y$) (step F5). The first communication terminal (user's mobile phone, TE$_a$) transmits the updated encryption information (k*$_{a,z}$) to the management device (PNSP) (step F6).

The management device (PNSP) updates the second distributed key (U$_{a,y}$), which corresponds to the first communication terminal (user's mobile phone, TE$_a$), to "U$_{a,y}$=Update (U$_{a,y}$, ΔK$_{PN_y}$)", using the difference in the group shared key (ΔK$_{PN_y}$), and further, it encrypts the updated second distributed key (U*$_{a,y}$), using the encryption information (K*$_{a,y}$), and generates and updates encrypted distributed key information "C*$_{a,y}$=E(k*$_{a,y}$, U*$_{a,y}$)" (step F7). The management device (PNSP) updates the first distributed key (S$_{all,y}$), which corresponds to each of the other group members, to "S*$_{all,y}$=Update(S$_{all,y}$, ΔK$_{PN,y}$,", using the difference in the group shared key (ΔK$_{PN,y}$) (step F8).

[User Departure Stage]

Figure 62:
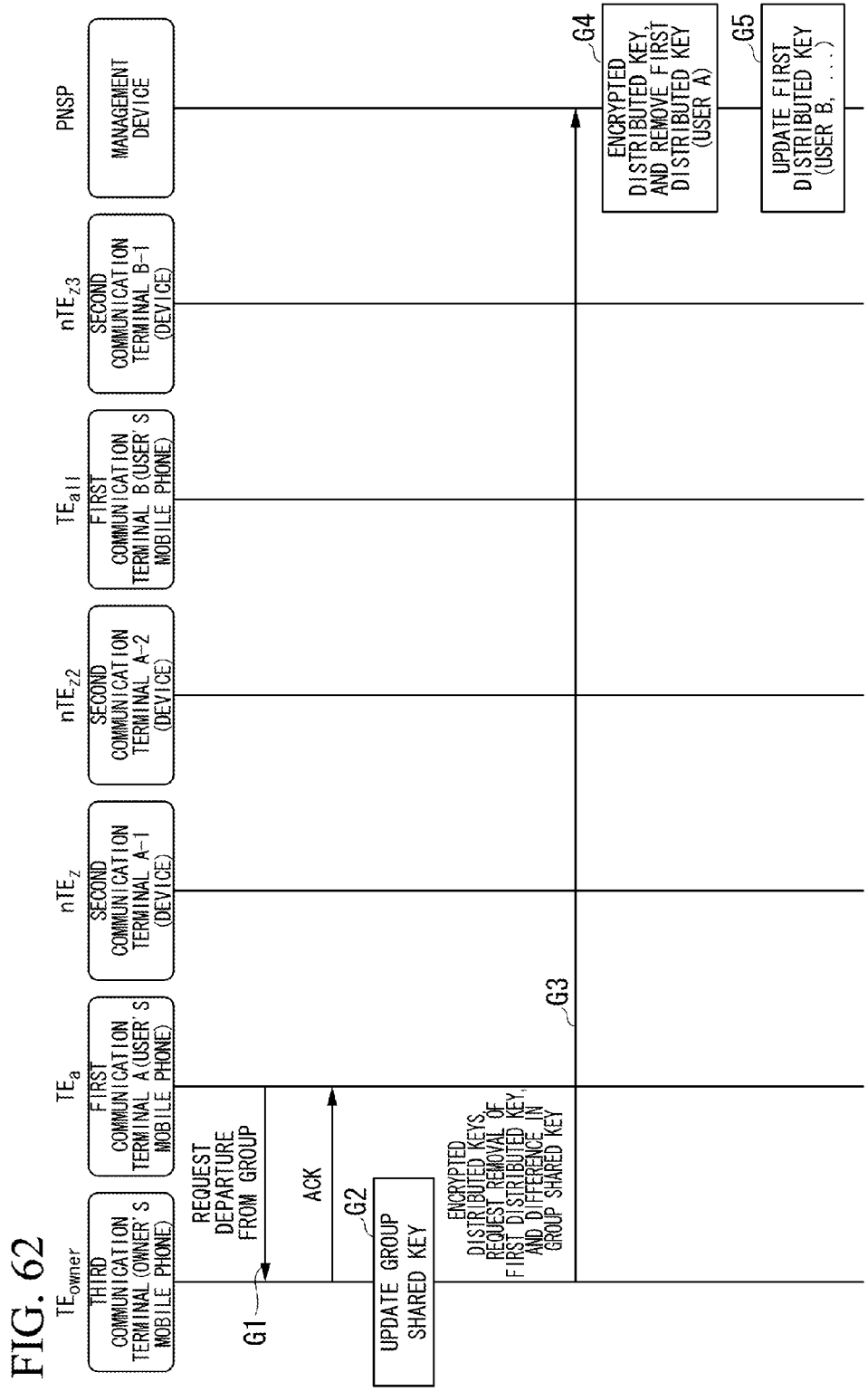
FIG. 62 is a sequence chart of a user departure stage according to Embodiment 10.

FIG. 62 is a sequence chart of a user departure stage according to Embodiment 10. This is a step to be performed when the group owner makes a user depart from the group. In FIG. 62, the first communication terminal (user's mobile phone, TE$_a$) requests the third communication terminal (owner's mobile phone, TE$_{owner}$) for removal of information (C$_{a,y}$) related to the first communication terminal (user's mobile phone, TE$_a$) (step G1). The third communication terminal (owner's mobile phone, TE$_{owner}$) replies to the first communication terminal (user's mobile phone, TE$_a$). The third communication terminal (owner's mobile phone, TE$_{owner}$) updates the group shared key (K$_{PN,y}$) from "K$_{PN,y}$" to "K*$_{PN,y}$" (step G2). The third communication terminal (owner's mobile phone, TE$_{owner}$) requests the management device (PNSP) for removal of the encrypted shared key information (C$_{a,y}$) related to the first communication terminal (user's mobile phone, TE$_a$) and the first distributed key (S$_{a,y}$), and transmits the difference in the group shared key (K$_{PN,y}$) thereto (step G3).

The management device (PNSP) removes the encrypted shared key information (C$_{a,y}$) related to the first communication terminal (user's mobile phone, TE$_a$) and the first distributed key (S$_{a,y}$) (step G4). The management device (PNSP) updates the first distributed key (S$_{all,y}$), which corresponds to each of the other group members, to "S*$_{all,y}$=Update(S$_{all,y}$, ΔK$_{PN,y}$,", using the difference in the group shared key (ΔK$_{PN,y}$) (step G5).

This completes the description of Embodiment 10.

Embodiment 11

Figure 63:
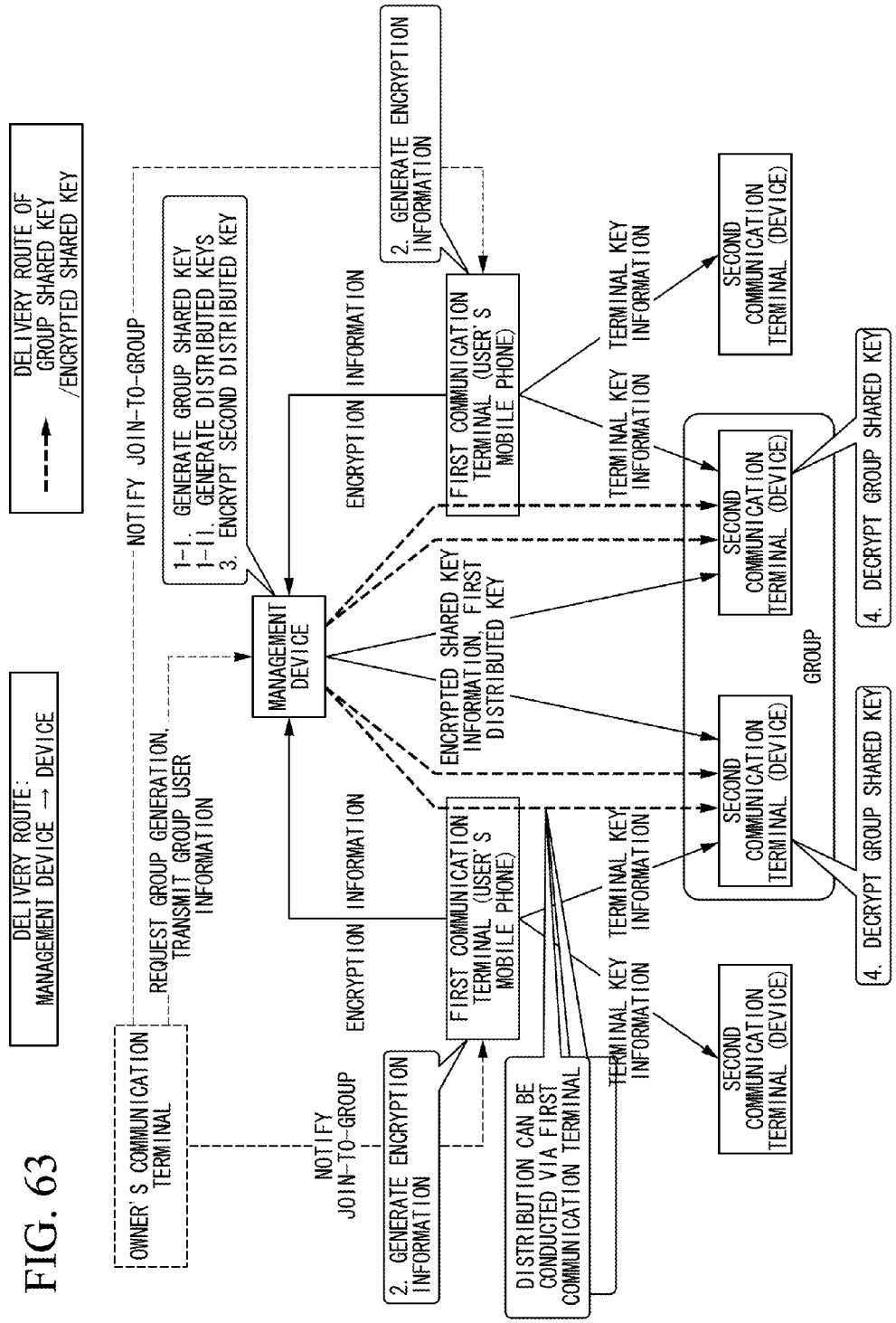
FIG. 63 is a conceptual diagram according to Embodiment 11.

Embodiment 11 is an embodiment in which Embodiment 2 and Embodiment 5 are combined. In Embodiment 11, a group shared key (encrypted shared key) is delivered from the management device (PNSP) to the second communication terminal (device, nTE$_z$). FIG. 63 is a conceptual diagram according to Embodiment 11. As shown in FIG. 63, the group shared key is divided into a first distributed key and a second distributed key by the management device (PNSP) by means of a secret sharing scheme. The first distributed shared key is delivered from the management device (PNSP) to the second communication terminal (device, nTE$_z$). The second distributed key is encrypted by the management device (PNSP), and is then transmitted as encrypted distributed key information from the management device (PNSP) to the second communication terminal (device, nTE$_z$). The first distributed key and the encrypted distributed key information may be delivered from the management device (PNSP) to the second communication terminal (device, nTE$_z$) via the first communication terminal (user's mobile phone, TE$_x$).

In FIG. 63, the management device (PNSP) generates a group shared key. The management device (PNSP) divides the group shared key into a first distributed key and a second distributed key by means of a secret sharing scheme. The first communication terminal (user's mobile phone, TE$_x$) generates terminal key information from terminal individual information for each of the second communication terminals (device, nTE$_z$) to join the group, and transmits the terminal key information to the second communication terminal (device, nTE$_z$). The first communication terminal (user's mobile phone, TE$_x$) generates encryption information using the terminal individual information of the second communication terminals (device, nTE$_z$) to join the group, and transmits the encryption information to the management device (PNSP).

The management device (PNSP) encrypts the second distributed key using the encryption information, and transmits the encrypted distributed key information to the second communication terminal (device, nTE$_z$). The second communication terminal (device, nTE$_z$) decrypts the second distributed key, using the encrypted distributed key information and the terminal key information. The management device (PNSP) transmits the first distributed key to the second communication terminal (device, nTE$_z$). The second communication terminal (device, nTE$_z$) restores the group shared key, using the first distributed key and the second distributed key.

Figure 64:
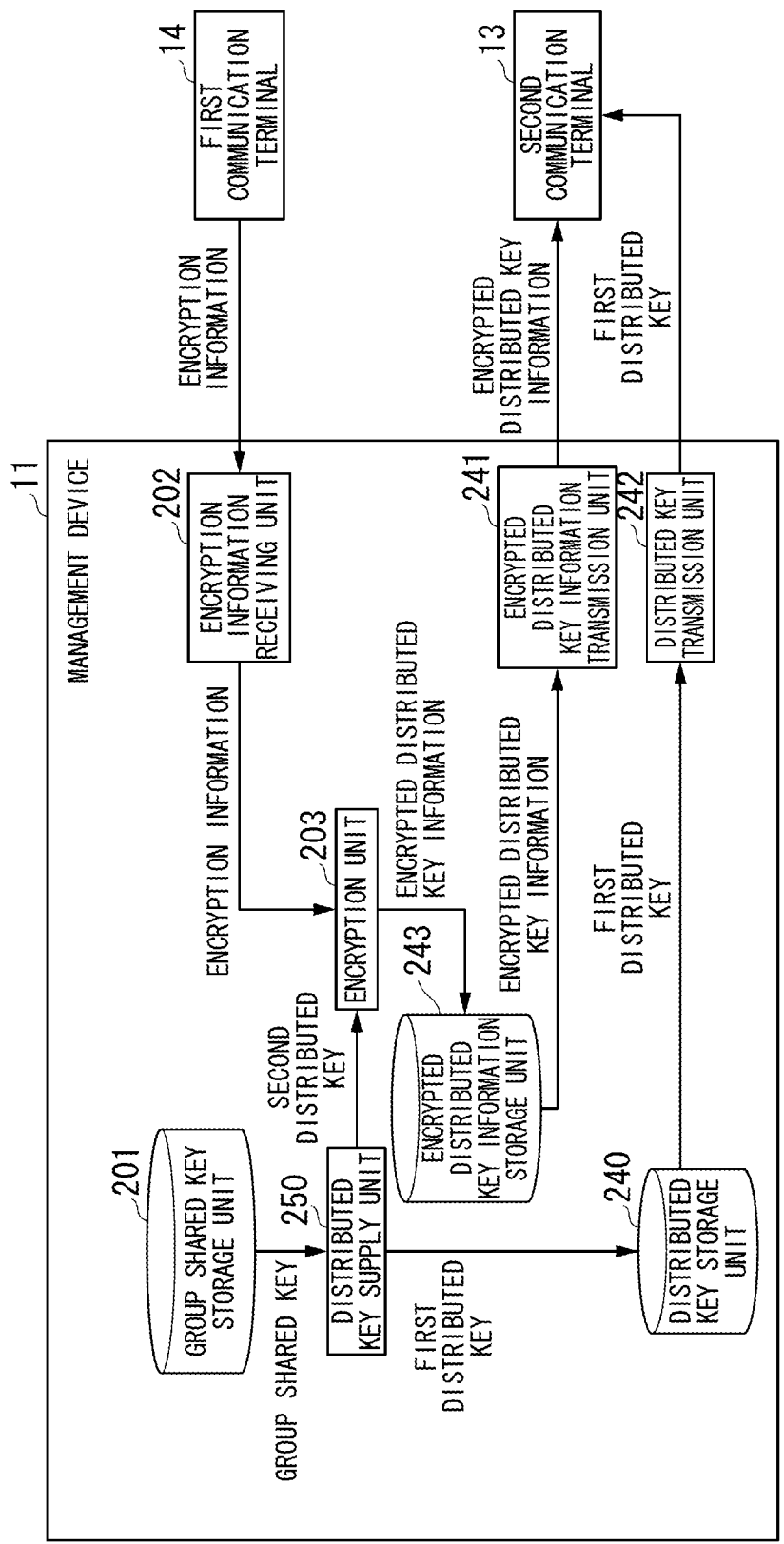
FIG. 64 is a diagram of a device configuration according to Embodiment 11.

FIG. 64 is a diagram of a device configuration according to Embodiment 11. In FIG. 64, the management device (PNSP) 11 has a group shared key storage unit 201, an encryption information receiving unit 202, an encryption unit 203, a distributed key storage unit 240, an encrypted distributed key information transmission unit 241, a distributed key transmission unit 242, an encrypted distributed key information storage unit 243, and a distributed key supply unit 250. The first communication terminal (user's mobile phone, TE$_x$) 14 is of a configuration similar to that of Embodiment 4 illustrated in FIG. 17. Embodiment 11 differs from Embodiment 2 in that the management device (PNSP) generates a group shared key and encrypted distributed key information.

Next, among the operations according to Embodiment 11, the points which differ from those in Embodiment 2 are mainly described, with reference to FIG. 65 through FIG. 69. FIG. 65 through FIG. 69 are sequence charts each showing a procedure of operations according to Embodiment 11.

[Preparation Stage]

Figure 65:
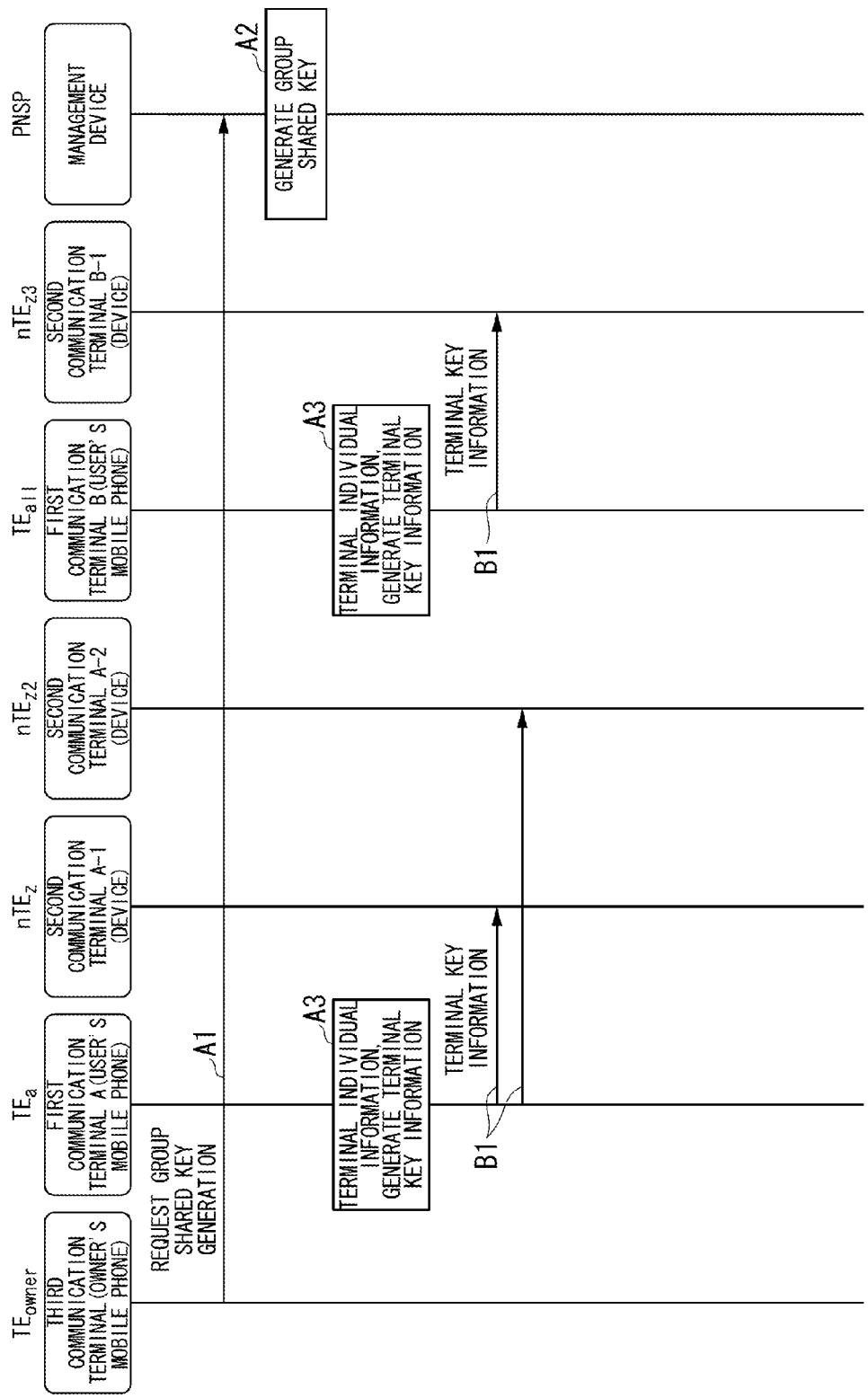
FIG. 65 is a sequence chart of a preparation stage according to Embodiment 11.

FIG. 65 is a sequence chart of a preparation stage according to Embodiment 11. In FIG. 65, the third communication terminal (owner's mobile phone, TE$_{owner}$) requests the management device (PNSP) to generate a group shared key (K$_{PN,y}$) of the group (PN$_y$) (step A1). The management device (PNSP) generates the group shared key (K$_{PN,y}$) of the group (PN$_y$) (step A2). The first communication terminal (user's mobile phone TE$_a$) generates terminal individual information (I$_{a,z}$ (z=1, . . . , N$_{nTE}$: N$_{nTE}$ is an upper limit of the number of devices which can be used by user), and generates terminal key information (k$_{a,z}$) from terminal individual information (I$_{a,z}$) (step A3). The first communication terminal (user's mobile phone, TE$_a$) transmits the terminal key information (k$_{a,z}$) to the second communication terminal (device, nTE$_z$) (step B1).

[User Usage Registration Stage]

Figure 66:
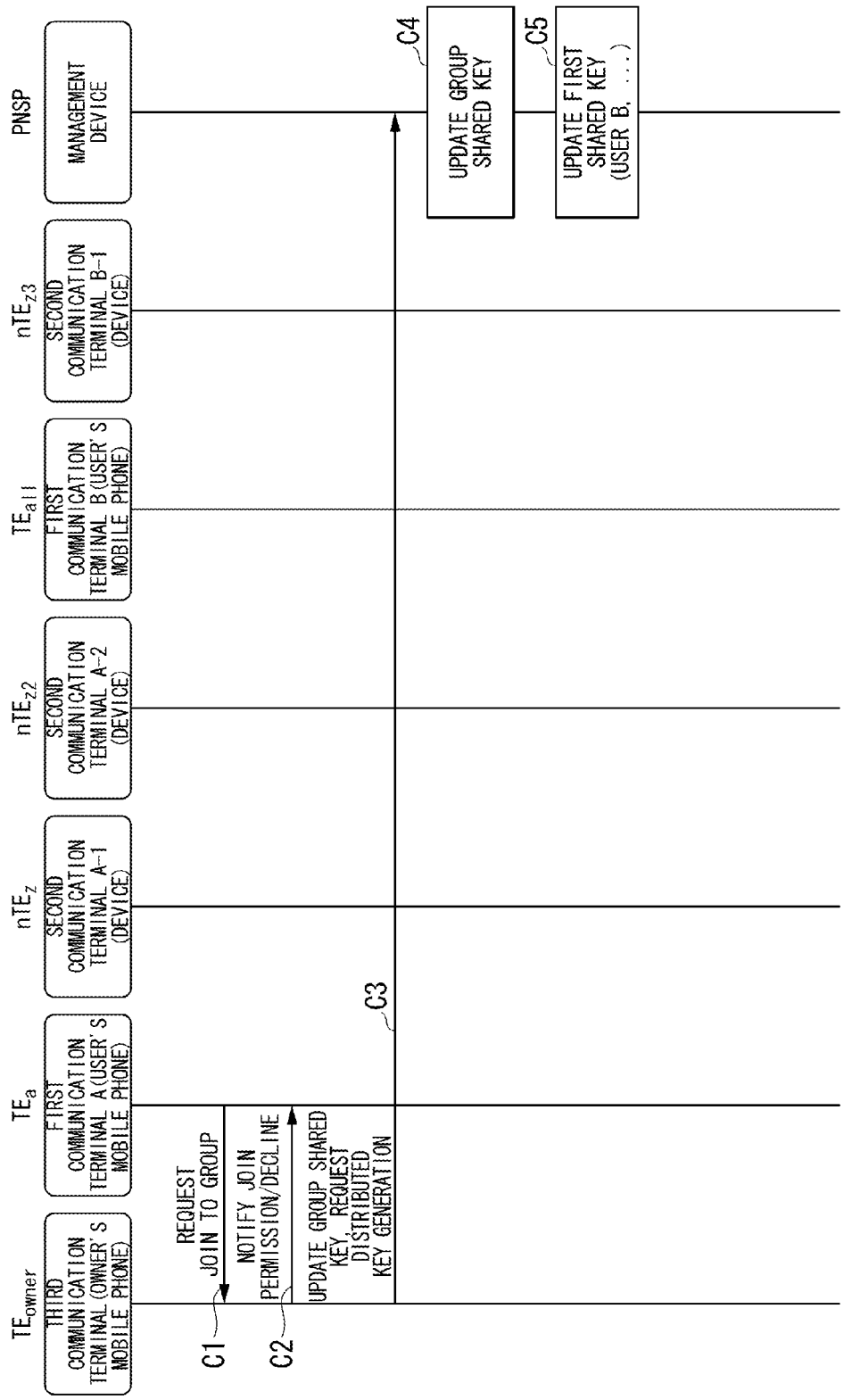
FIG. 66 is a sequence chart of a user usage registration stage according to Embodiment 11.

FIG. 66 is a sequence chart of a user usage registration stage according to Embodiment 11. This is a step in which a user performs usage registration with the owner of a group when joining a group. In FIG. 66, the first communication terminal (user's mobile phone, TE$_a$) transmits a request to join the group (PN$_y$) to the third communication terminal (owner's mobile phone, TE$_{owner}$) (step C1). The third communication terminal (owner's mobile phone, TE$_{owner}$) replies to the first communication terminal (user's mobile phone, TE$_a$) with a permission for join or decline for join (step C2). When join is permitted, the third communication terminal (owner's mobile phone, TE$_{owner}$) requests the management device (PNSP) to update the group shared key, and to generate a first distributed key (S$_{a,y}$) corresponding to the first communication terminal (user's mobile phone, TE$_a$) and a second distributed key (U$_{a,y}$) (step C3).

The management device (PNSP) updates the group shared key (K$_{PN,y}$) from "K$_{PN,y}$" to "K*$_{PN,y}$", and generates the first distributed key (S$_{a,y}$) corresponding to the first communication terminal (user's mobile phone, TE$_a$) and the second distributed key ($U_{a,y}$) on the basis of "($S_{a,y}$, $U_{a,y}$)=Div($K^*_{PN,y}$)" (step C4). The management device (PNSP) updates the first distributed key ($S_{all,y}$), which corresponds to each of the other group members, to "$S^*_{all,y}$=Update($S_{all,y}$, $\Delta K_{PN,y}$)", using the difference in the group shared key ($\Delta K_{PN,y}$) (step C5).

[Device Addition Stage]

Figure 67:
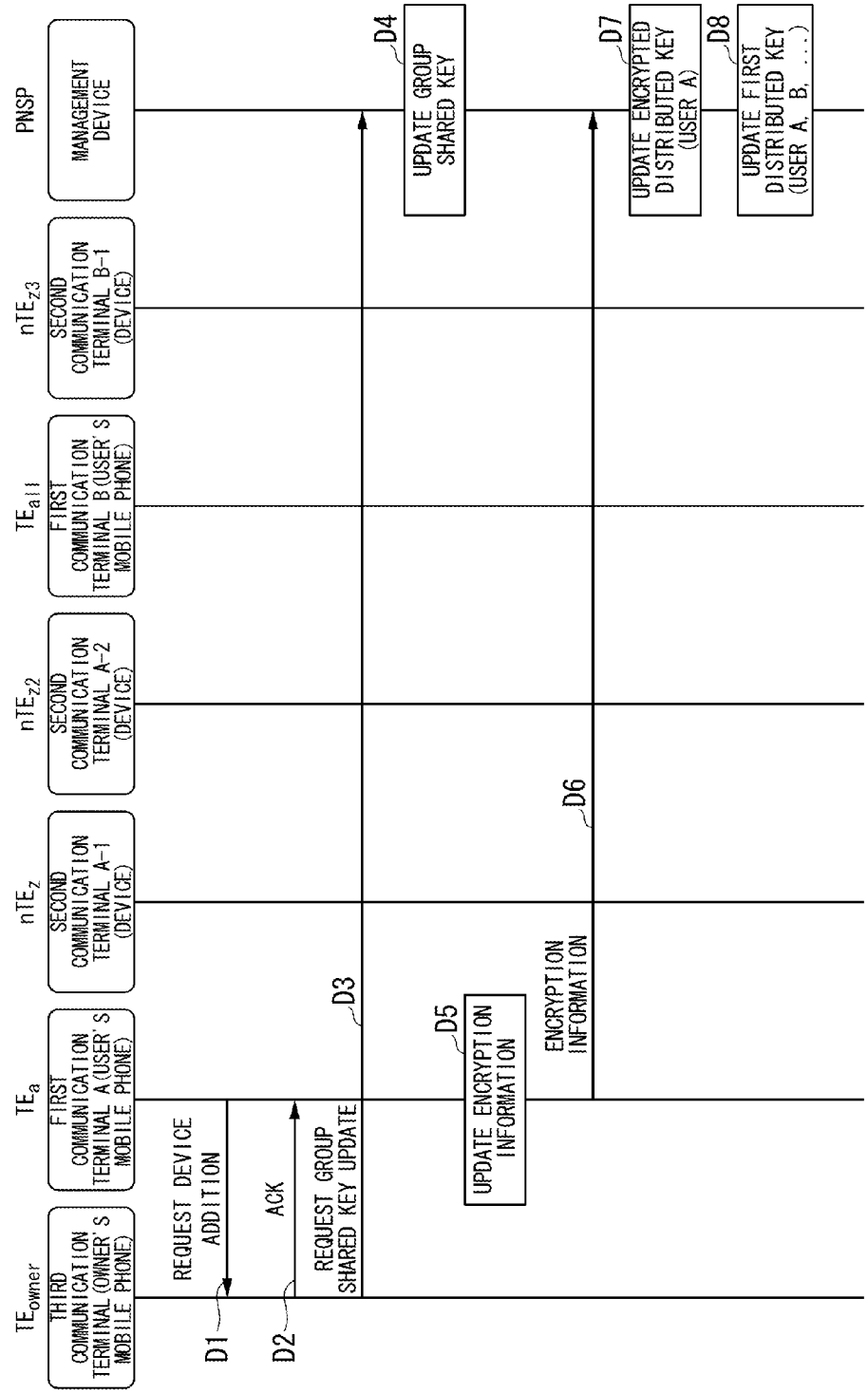
FIG. 67 is a sequence chart of a device addition stage according to Embodiment 11.

FIG. 67 is a sequence chart of a device addition stage according to Embodiment 11. This is a step to be performed when the second communication terminal (device, $nTE_z$) joins the group after a user has performed user usage registration. In FIG. 67, the first communication terminal (user's mobile phone, $TE_a$) requests the third communication terminal (owner's mobile phone, $TE_{owner}$) for an addition of a second communication terminal (device, $TE_z$) (step D1). The third communication terminal (owner's mobile phone, $TE_{owner}$) replies to the first communication terminal (user's mobile phone, $TE_a$) (step D2). The third communication terminal (owner's mobile phone, $TE_{owner}$) requests the management device (PNSP) to update the group shared key ($K_{PN,y}$) (step D3). The management device (PNSP) updates the group shared key ($K_{PN,y}$) from "$K_{PN,y}$" to "$K^*_{PN,y}$" (step D4).

The first communication terminal (user's mobile phone, $TE_a$) updates the encryption information ($K_{a,y}$) from "$K_{a,y}$" to "$K^*_{a,y}$", using the terminal individual information ($I_{a,z}$, $I_{a,w}$ (w∈$P_{a,y}$, $P_{a,y}$: aggregate of nTE ($nTE_w$) already engaged with $PN_y$, among the nTE used by user A)) corresponding to the second communication terminal (device, $nTE_z$) added to the group ($PN_y$) and each of the second communication terminals (device, $nTE_z$) already engaged with the group ($PN_y$) (step D5). The first communication terminal (user's mobile phone, $TE_a$) transmits the updated encryption information ($k^*_{a,z}$) to the management device (PNSP) (step D6).

The management device (PNSP) encrypts the second distributed key ($U_{a,y}$) corresponding to the first communication terminal (user's mobile phone, $TE_a$), using the encryption information ($K^*_{a,y}$), and generates and updates encrypted distributed key information "$C^*_{a,y}$=E($k^*_{a,y}$, $U_{a,y}$)" (step D7). The management device (PNSP) updates the first distributed key ($S_{all,y}$), which corresponds to each of the other group members, to "$S^*_{all,y}$=Update($S_{all,y}$, $\Delta K_{PN,y}$)", using the difference in the group shared key ($\Delta K_{PN,y}$) (step D8).

[Device Departure Stage]

Figure 68:
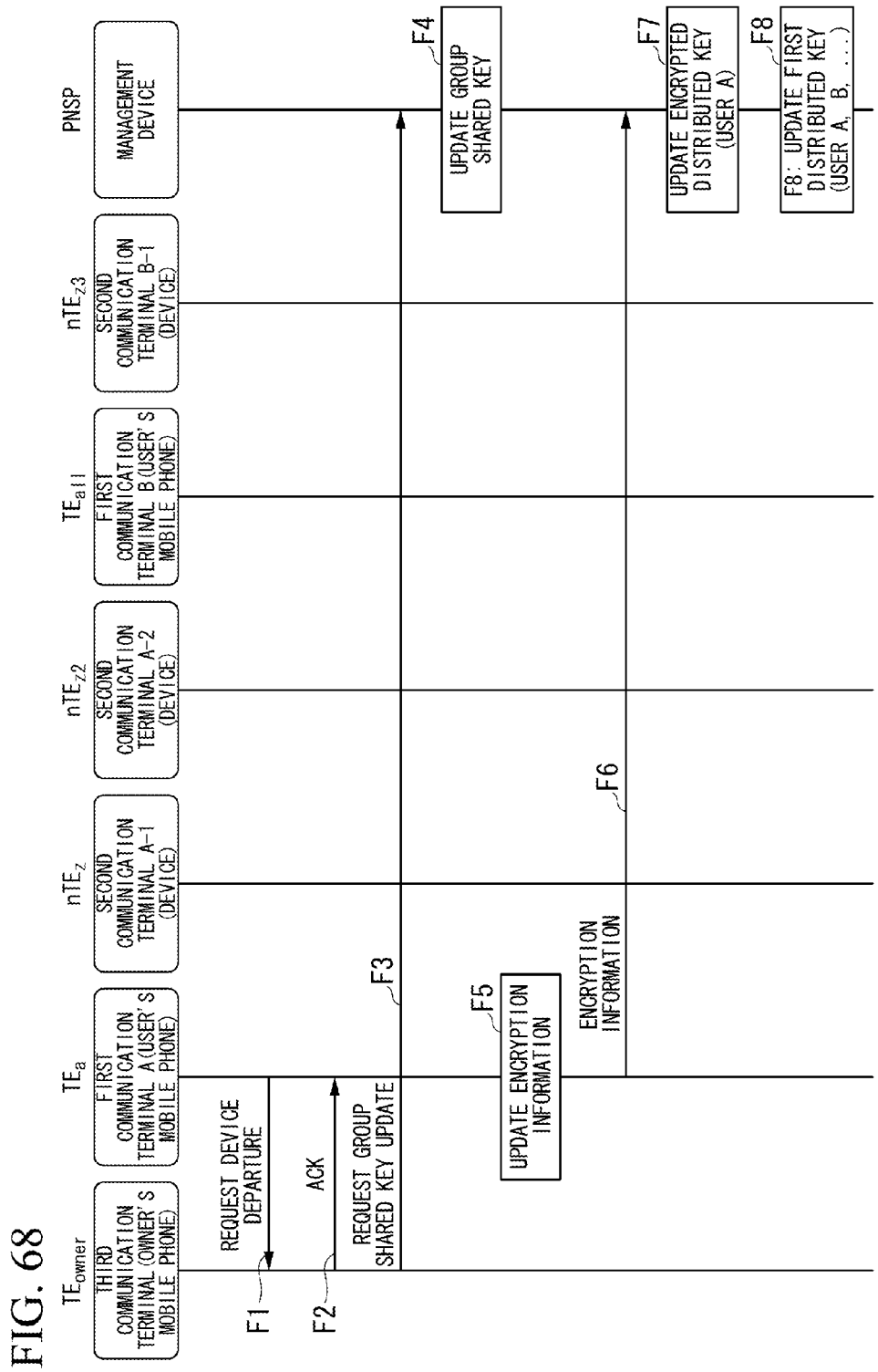
FIG. 68 is a sequence chart of a device departure stage according to Embodiment 11.

FIG. 68 is a sequence chart of a device departure stage according to Embodiment 11. This is a step to be performed when a user makes a second communication terminal (device, $nTE_z$) depart from the group. In FIG. 68, the first communication terminal (user's mobile phone, $TE_a$) transmits a device departure request to the third communication terminal (owner's mobile phone, $TE_{owner}$) (step F1). The third communication terminal (owner's mobile phone, $TE_{owner}$) replies to the first communication terminal (user's mobile phone, $TE_a$) (step F2). The third communication terminal (owner's mobile phone, $TE_{owner}$) requests the management device (PNSP) to update the group shared key ($K_{PN,y}$) (step F3). The management device (PNSP) updates the group shared key ($K_{PN,y}$) from "$K_{PN,y}$" to "$K^*_{PN,y}$" (step F4).

The first communication terminal (user's mobile phone, $TE_a$) generates and updates encryption information ($K^*_{a,y}$), using the terminal individual information ($I_{a,w}$) corresponding to each of the second communication terminals (device, $nTE_z$) engaged with the group ($PN_y$), other than the second communication terminal (device, $nTE_z$) which has departed from the group ($PN_y$) (step F5). The first communication terminal (user's mobile phone, $TE_a$) transmits the updated encryption information ($k^*_{a,z}$) to the management device (PNSP) (step F6).

The management device (PNSP) updates the second distributed key ($U_{a,y}$), which corresponds to the first communication terminal (user's mobile phone, $TE_a$), to "$U^*_{a,y}$=Update($U_{a,y}$, $\Delta K_{PN,y}$)", using the difference in the group shared key ($\Delta K_{PN,y}$), and further, it encrypts the updated second distributed key ($U^*_{a,y}$), using the encryption information ($K^*_{a,y}$), and generates and updates encrypted distributed key information "$C^*_{a,y}$=E($k^*_{a,y}$, $U^*_{a,y}$)" (step F7). The management device (PNSP) updates the first distributed key ($S_{all,y}$), which corresponds to each of the other group members, to "$S^*_{all,y}$=Update($S_{all,y}$, $\Delta K_{PN,y}$)", using the difference in the group shared key ($\Delta K_{PN,y}$) (step F8).

[User Departure Stage]

Figure 69:
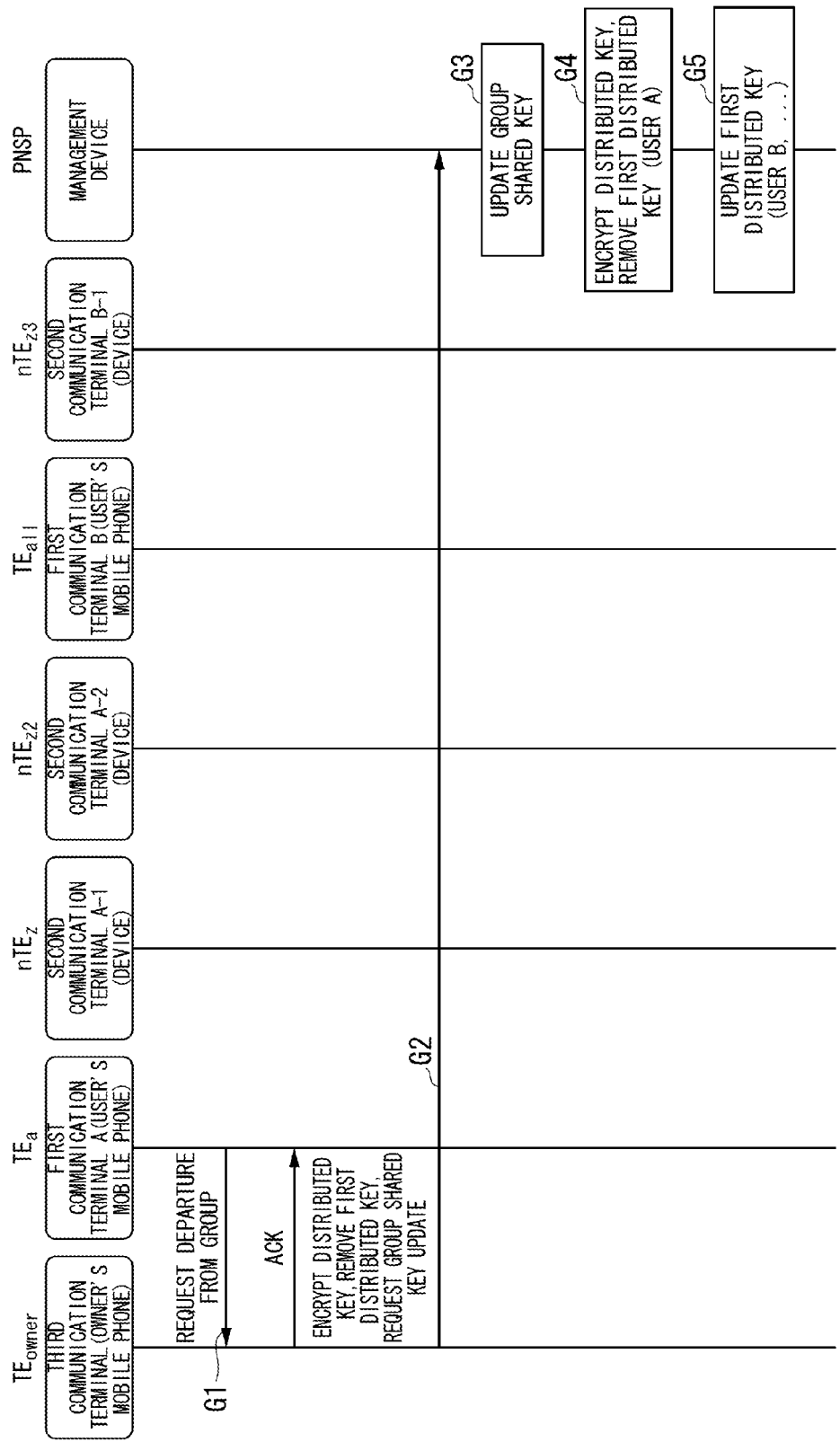
FIG. 69 is a sequence chart of a user departure stage according to Embodiment 11.

FIG. 69 is a sequence chart of a user departure stage according to Embodiment 11. This is a step to be performed when the group owner makes a user depart from the group. In FIG. 69, the first communication terminal (user's mobile phone, $TE_a$) requests the third communication terminal (owner's mobile phone, $TE_{owner}$) for removal of information ($C_{a,y}$) related to the first communication terminal (user's mobile phone, $TE_a$) (step G1). The third communication terminal (owner's mobile phone, $TE_{owner}$) replies to the first communication terminal (user's mobile phone, $TE_a$). The third communication terminal (owner's mobile phone, $TE_{owner}$) requests the management device (PNSP) for removal of the encrypted shared key information ($C_{a,y}$) related to the first communication terminal (user's mobile phone, $TE_a$) and the first distributed key ($S_{a,y}$), and requests it to update the group shared key ($K_{PN,y}$) (step G2).

The management device (PNSP) updates the group shared key ($K_{PN,y}$) from "$K_{PN,y}$" to "$K^*_{PN,y}$" (step G3). The management device (PNSP) removes the encrypted shared key information ($C_{a,y}$) related to the first communication terminal (user's mobile phone, $TE_a$) and the first distributed key ($S_{a,y}$) (step G4). The management device (PNSP) updates the first distributed key ($S_{all,y}$), which corresponds to each of the other group members, to "$S^*_{all,y}$=Update($S_{all,y}$, $\Delta K_{PN,y}$)", using the difference in the group shared key ($\Delta K_{PN,y}$) (step G5).

This completes the description of Embodiment 11.

Embodiment 12

Figure 70:
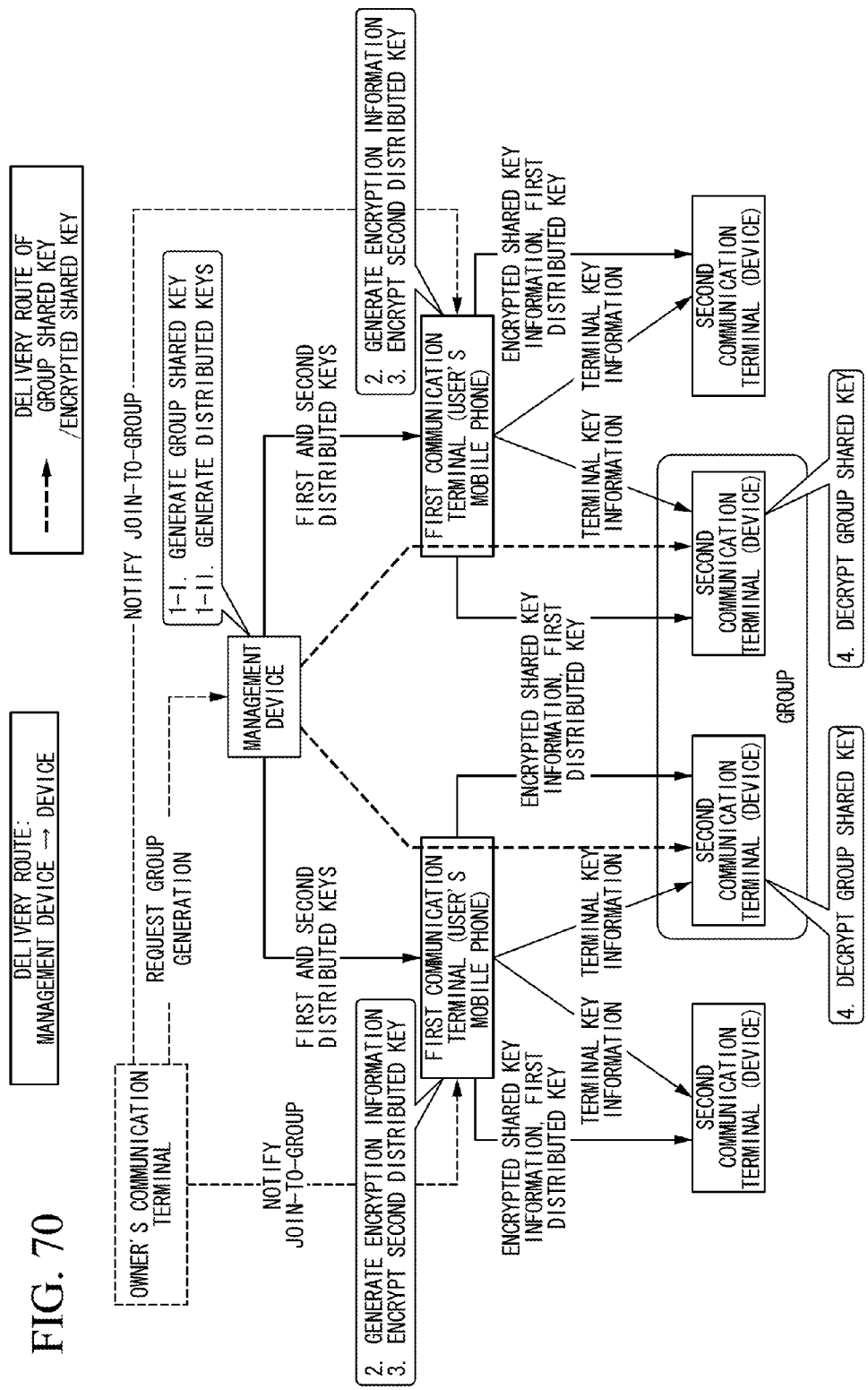
FIG. 70 is a conceptual diagram according to Embodiment 12.

Embodiment 12 is an embodiment in which Embodiment 2 and Embodiment 6 are combined. In Embodiment 12, a group shared key (encrypted shared key) is delivered from the management device (PNSP) to the second communication terminal (device, $nTE_z$). FIG. 70 is a conceptual diagram according to Embodiment 12. As shown in FIG. 70, the group shared key is divided into a first distributed key and a second distributed key by the management device (PNSP) by means of a secret sharing scheme, and it is then transmitted from the management device (PNSP) to the first communication terminal (user's mobile phone, $TE_x$). The first distributed key is transmitted from the first communication terminal (user's mobile phone, $TE_x$) to the second communication terminal (device, $nTE_z$). The second distributed key is encrypted by the first communication terminal (user's mobile phone, $TE_x$), and it is then transmitted as encrypted distributed key information from the first communication terminal (user's mobile phone, $TE_x$) to the second communication terminal (device, $nTE_z$).

In FIG. 70, the management device (PNSP) generates a group shared key. The management device (PNSP) divides the group shared key into a first distributed key and a second distributed key by means of a secret sharing scheme. The management device (PNSP) transmits the first distributed key and the second distributed key to the first communication terminal (user's mobile phone, $TE_x$). The first communication terminal (user's mobile phone, $TE_x$) generates terminal key information from terminal individual information for each of the second communication terminals (device, $nTE_z$) to join the group, and transmits the terminal key information to the second communication terminal (device, $nTE_z$). The first communication terminal (user's mobile phone, $TE_x$) generates encryption information using the terminal individual information of the second communication terminals (device, $nTE_z$) to join the group. The first communication terminal (user's mobile phone, $TE_x$) encrypts the second distributed key using the encryption information, and transmits the encrypted distributed key information to the second communication terminal (device, $nTE_z$). The second communication terminal (device, $nTE_z$) decrypts the second distributed key, using the encrypted distributed key information and the terminal key information. The first communication terminal (user's mobile phone, $TE_x$) transmits the first distributed key to the second communication terminal (device, $nTE_z$). The second communication terminal (device, $nTE_z$) restores the group shared key, using the first distributed key and the second distributed key.

Figure 71:
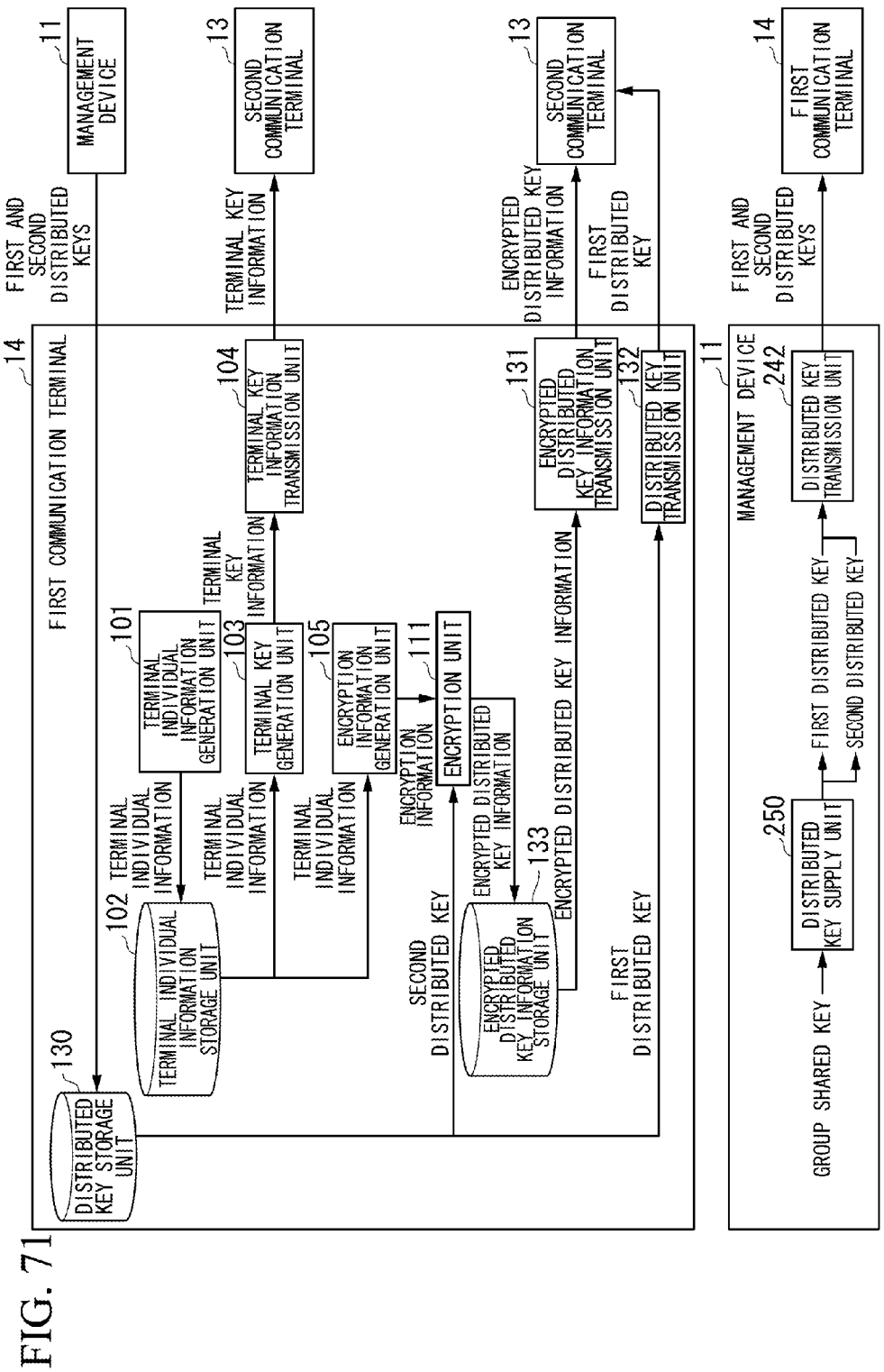
FIG. 71 is a diagram of a device configuration according to Embodiment 12.

FIG. 71 is a diagram of a device configuration according to Embodiment 12. In FIG. 71, the first communication terminal (user's mobile phone, $TE_x$) 14 has a terminal individual information generation unit 101, a terminal individual information storage unit 102, a terminal key information generation unit 103, a terminal key information transmission unit 104, an encryption information generation unit 105, an encryption unit 111, a distributed key storage unit 130, an encryption unit 130, an encrypted distributed key information transmission unit 131, a distributed key transmission unit 132, and an encrypted distributed key information storage unit 133. The management device (PNSP) 11 has a distributed key transmission unit 242 and a distributed key supply unit 250. Embodiment 12 differs from Embodiment 2 in that the management device (PNSP) generates a distributed key and supplies it to the first communication terminal (user's mobile phone, $TE_x$), and in that the first communication terminal (user's mobile phone, $TE_x$) supplies a first distributed key and encrypted distributed key information to the second communication terminal (device, $nTE_z$).

Next, among the operations according to Embodiment 12, the points which differ from those in Embodiment 2 are mainly described, with reference to FIG. 72 through FIG. 76. FIG. 72 through FIG. 76 are sequence charts each showing a procedure of operations according to Embodiment 12.

[Preparation Stage]

A preparation stage according to Embodiment 12 is similar to that in Embodiment 11 illustrated in FIG. 65.

[User Usage Registration Stage]

Figure 72:
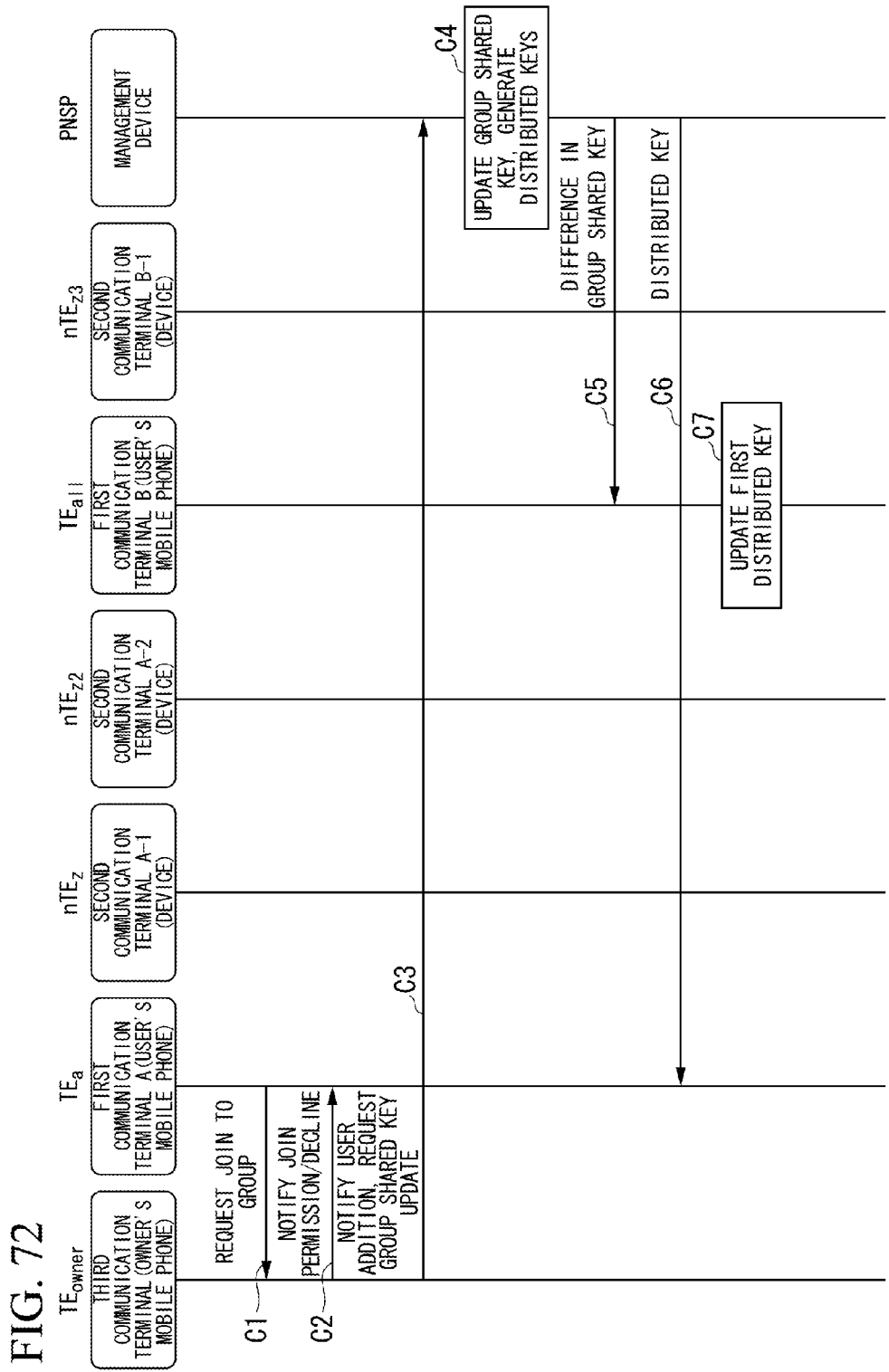
FIG. 72 is a sequence chart of a user usage registration stage according to Embodiment 12.

FIG. 72 is a sequence chart of a user usage registration stage according to Embodiment 12. This is a step in which a user performs usage registration with the owner of a group when joining a group. In FIG. 72, the first communication terminal (user's mobile phone, $TE_a$) transmits a request to join the group ($PN_y$) to the third communication terminal (owner's mobile phone, $TE_{owner}$) (step C1). The third communication terminal (owner's mobile phone, $TE_{owner}$) replies to the first communication terminal (user's mobile phone, $TE_a$) with a permission for join or decline for join (step C2). When join is permitted, the third communication terminal (owner's mobile phone, $TE_{owner}$) requests the management device (PNSP) to update the group shared key, and to generate a first distributed key ($S_{a,y}$) corresponding to the first communication terminal (user's mobile phone, $TE_a$) and a second distributed key ($U_{a,y}$) (step C3).

The management device (PNSP) updates the group shared key ($K_{PN,y}$) from "$K_{PN,y}$" to "$K^*_{PN,y}$", and generates the first distributed key ($S_{a,y}$) corresponding to the first communication terminal (user's mobile phone, $TE_a$) and the second distributed key ($U_{a,y}$) on the basis of "($S_{a,y}$, $U_{a,y}$)=Div($K^*_{PN,y}$)" (step C4). The management device (PNSP) transmits difference in the group shared key ($\Delta K_{PN,y}$) to the other group-member first communication terminal (user's mobile phone, $TE_{all}$) (step C5). The management device (PNSP) transmits the first distributed key ($S_{a,y}$) and the second distributed key ($U_{a,y}$) to the first communication terminal (user's mobile phone, $TE_a$) (step C6). Each group-member first communication terminal (user's mobile phone, $TE_{all}$) updates the first distributed key ($S_{all,y}$) to "$S^*_{all,y}$=Update($S_{all,y}$, $\Delta K_{PN,y}$)", using the difference in the group shared key ($\Delta K_{PN,y}$) (step C7).

[Device Addition Stage]

Figure 73:
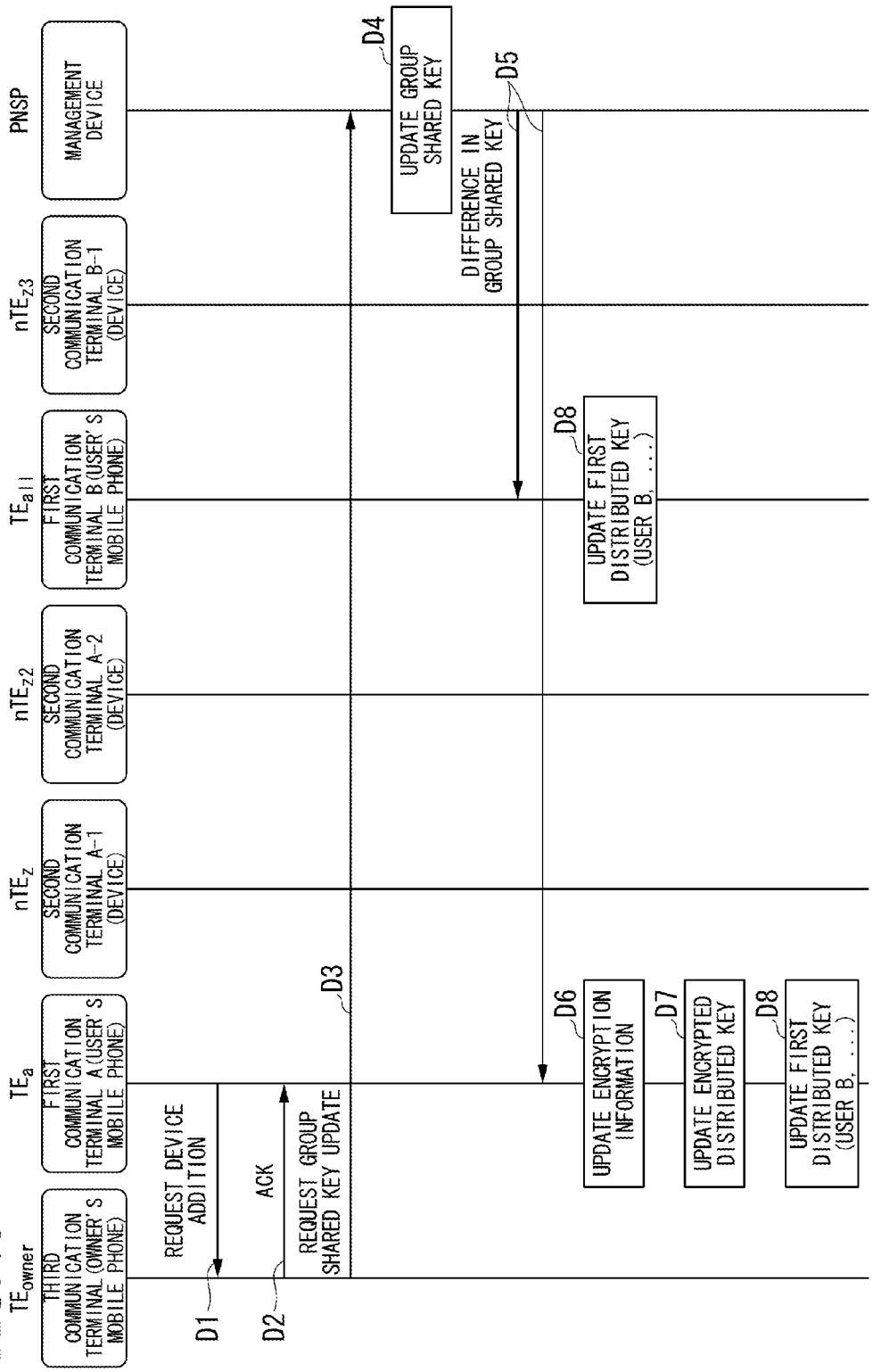
FIG. 73 is a sequence chart of a device addition stage according to Embodiment 12.

FIG. 73 is a sequence chart of a device addition stage according to Embodiment 12. This is a step to be performed when the second communication terminal (device, $nTE_z$) joins the group after a user has performed user usage registration. In FIG. 73, the first communication terminal (user's mobile phone, $TE_a$) requests the third communication terminal (owner's mobile phone, $TE_{owner}$) for an addition of a second communication terminal (device, $TE_z$) (step D1). The third communication terminal (owner's mobile phone, $TE_{owner}$) replies to the first communication terminal (user's mobile phone, $TE_a$) (step D2). The third communication terminal (owner's mobile phone, $TE_{owner}$) requests the management device (PNSP) to update the group shared key ($K_{PN,y}$) (step D3). The management device (PNSP) updates the group shared key ($K_{PN,y}$) from "$K_{PN,y}$" to "$K^*_{PN,y}$" (step D4). The management device (PNSP) transmits the difference in the group shared key ($\Delta K_{PN,y}$) to the first communication terminal (user's mobile phone, $TE_a$) and the other group-member first communication terminal (user's mobile phone, $TE_{all}$) (step D5).

The first communication terminal (user's mobile phone, $TE_a$) updates the encryption information ($K_{a,y}$) from "$K_{a,y}$" to "$K^*_{a,y}$", using the terminal individual information ($I_{a,z}$, $I_{a,w}$ ($w \in P_{a,y}$, $P_{a,y}$: aggregate of nTE ($nTE_z$) already engaged with $PN_y$, among the nTE used by user A)) corresponding to the second communication terminal (device, $nTE_z$) added to the group ($PN_y$) and each of the second communication terminals (device, $nTE_z$) already engaged with the group ($PN_y$) (step D6). The first communication terminal (user's mobile phone, $TE_a$) encrypts the second distributed key ($U_{a,y}$) using the encryption information ($K^*_{a,y}$), and generates and updates encrypted distributed key information "$C^*_{a,y}$=E($k^*_{a,y}$, $U_{a,y}$)" (step D7). Each group-member first communication terminal (user's mobile phone, $TE_{all}$) updates the first distributed key ($S_{all,y}$) to "$S^*_{all,y}$=Update($S_{all,y}$, $\Delta K_{PN,y}$)", using the difference in the group shared key ($\Delta K_{PN,y}$) (step D8).

[Shared Key Restoration Stage]

Figure 74:
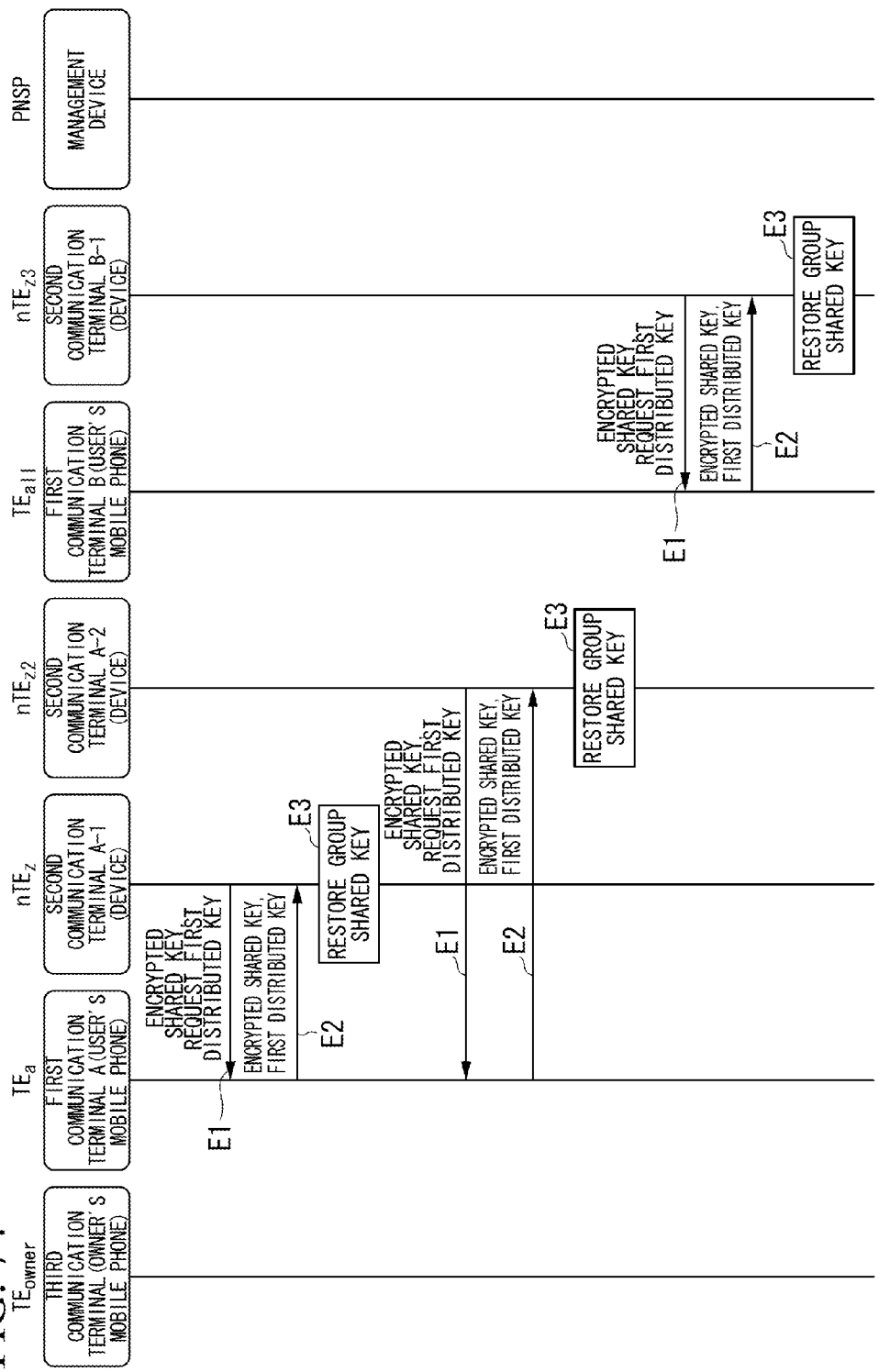
FIG. 74 is a sequence chart of a shared key restoration stage according to Embodiment 12.

FIG. 74 is a sequence chart of a shared key restoration stage according to Embodiment 12. This is a step to be performed when a group shared key is restored at the point in time where the second communication terminal (device, $nTE_z$) actually receives services within a group. In FIG. 74, the second communication terminal (device, $nTE_z$) requests the first communication terminal (user's mobile phone, $TE_a$) to start services of the group ($PN_y$) (encrypted shared key) (step E1). The first communication terminal (user's mobile phone, $TE_a$) transmits, to the second communication terminal (device, $nTE_z$) of the service-start request origin, encrypted distributed key information ($C_{a,y}$) corresponding to the device of the group ($PN_y$) and the first distributed key ($S_{a,y}$) (step E2). The second communication terminal (device, $nTE_z$) restores the group shared key ($K_{PN,y}$=Comb(D($k_{a,z}$, $C_{a,y}$), $S_{a,y}$)), using the encrypted distributed key information ($C_{a,y}$) and the terminal key information ($k_{a,z}$) (step E3).

[Device Departure Stage]

Figure 75:
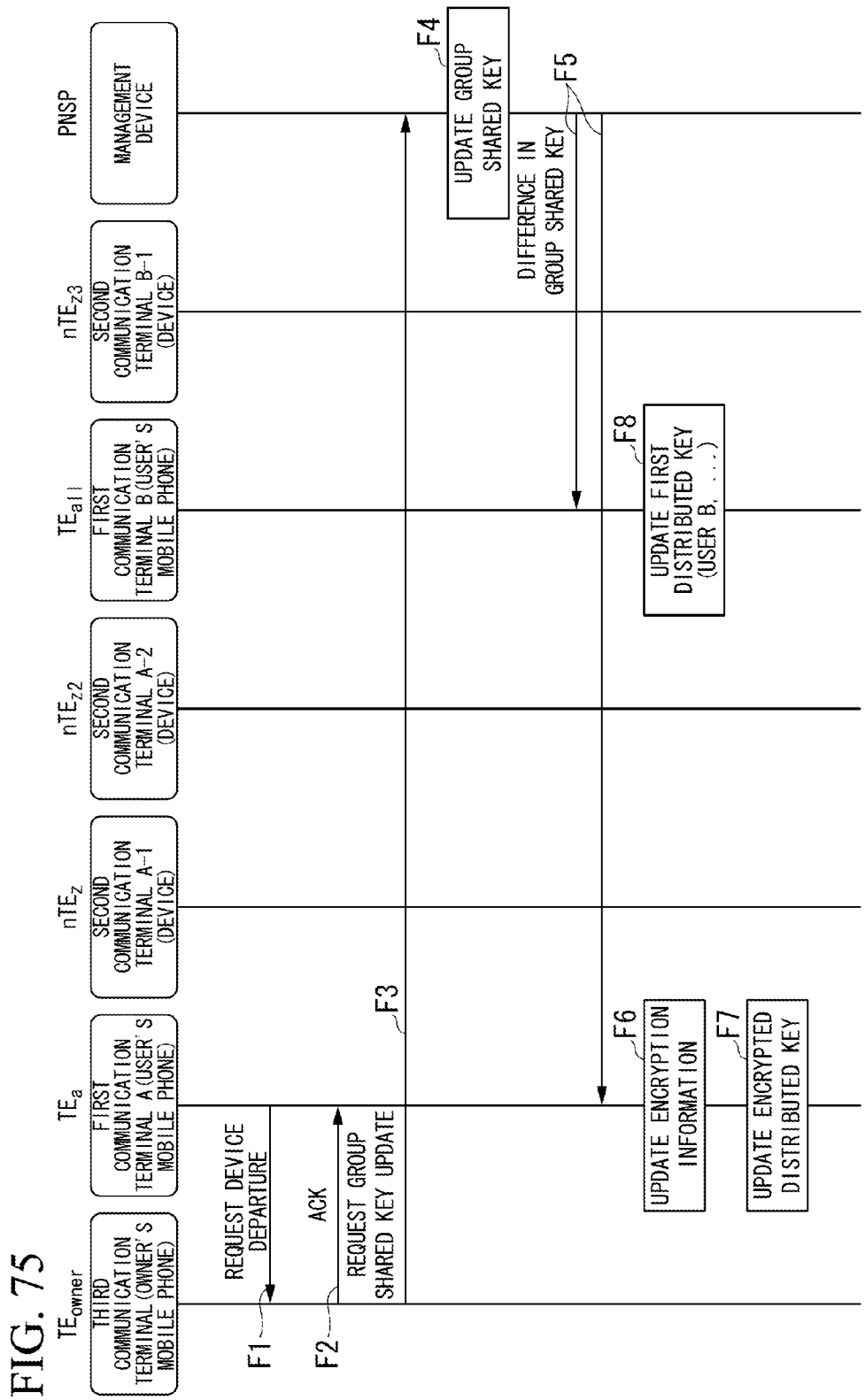
FIG. 75 is a sequence chart of a device departure stage according to Embodiment 12.

FIG. 75 is a sequence chart of a device departure stage according to Embodiment 12. This is a step to be performed when a user makes a second communication terminal (device, $nTE_z$) depart from the group. In FIG. 75, the first communication terminal (user's mobile phone, $TE_a$) transmits a device departure request to the third communication terminal (owner's mobile phone, $TE_{owner}$) (step F1). The third communication terminal (owner's mobile phone, $TE_{owner}$) replies to the first communication terminal (user's mobile phone, $TE_a$) (step F2). The third communication terminal (owner's mobile phone, $TE_{owner}$) requests the management device (PNSP) to update the group shared key ($K_{PN,y}$) (step F3). The management device (PNSP) updates the group shared key ($K_{PN,y}$) from "$K_{PN,y}$" to "$K^*_{PN,y}$" (step F4). The management device (PNSP) transmits the difference in the group shared key ($\Delta K_{PN,y}$) to the first communication terminal (user's mobile phone, $TE_a$) and the other group-member first communication terminal (user's mobile phone, $TE_{all}$) (step F5).

The first communication terminal (user's mobile phone, $TE_a$) generates and updates encryption information ($K^*_{a,y}$), using the terminal individual information ($I_{a,w}$) corresponding to each of the second communication terminals (device, $nTE_z$) engaged with the group ($PN_y$), other than the second communication terminal (device, $nTE_z$) which has departed from the group ($PN_y$) (step F6). The first communication terminal (user's mobile phone, $TE_a$) updates the second distributed key ($U_{a,y}$) to "$U^*_{a,y}$=Update($U_{a,y}$, $\Delta K_{PN,y}$)", using the difference in the group shared key ($\Delta K_{PN,y}$), and further, it encrypts the updated second distributed key ($U^*_{a,y}$), using the encryption information ($K^*_{a,y}$), and generates and updates encrypted distributed key information "$C^*_{a,y}$=E($k^*_{a,y}$, $U^*_{a,y}$)" (step F7). The other group-member first communication terminal (user's mobile phone, $TE_{all}$) updates the first distributed key ($S_{all,y}$) to "$S^*_{all,y}$=Update($S_{all,y}$, $\Delta K_{PN,y}$)", using the difference in the group shared key ($\Delta K_{PN,y}$) (step F8).

[User Departure Stage]

Figure 76:
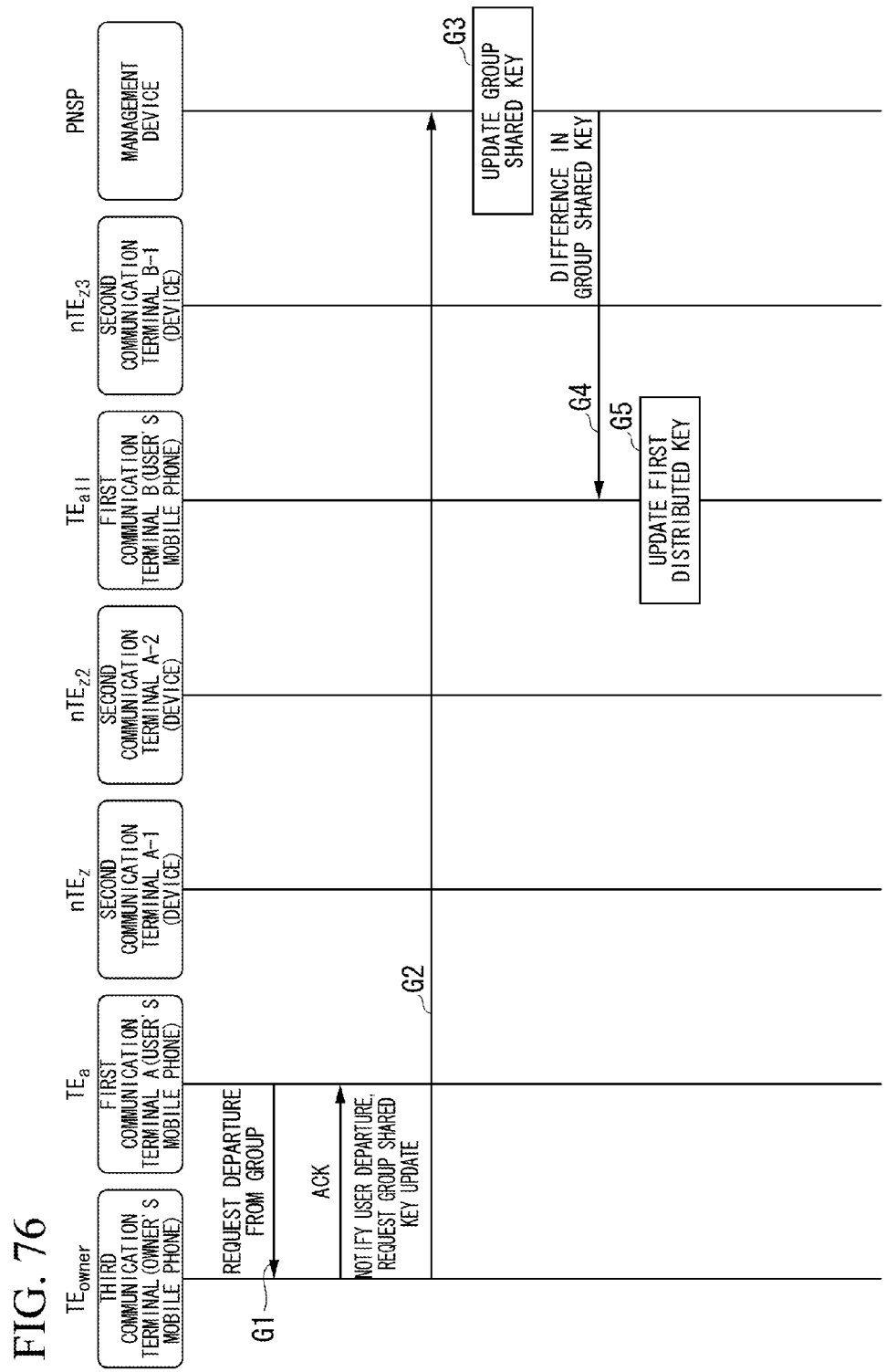
FIG. 76 is a sequence chart of a user departure stage according to Embodiment 12.

FIG. 76 is a sequence chart of a user departure stage according to Embodiment 12. This is a step to be performed when the group owner makes a user depart from the group. In FIG. 76, the first communication terminal (user's mobile phone, $TE_a$) requests the third communication terminal (owner's mobile phone, $TE_{owner}$) for removal of information ($C_{a,y}$) related to the first communication terminal (user's mobile phone, $TE_a$) (step G1). The third communication terminal (owner's mobile phone, $TE_{owner}$) replies to the first communication terminal (user's mobile phone, $TE_a$). The third communication terminal (owner's mobile phone, $TE_{owner}$) notifies the management device (PNSP) of the departure of the first communication terminal (user's mobile phone, $TE_a$) from the group, and requests it to update the group shared key ($K_{PN,y}$) (step G2).

The management device (PNSP) updates the group shared key ($K_{PN,y}$) from "$K_{PN,y}$" to "$K^*_{PN,y}$" (step G3). The management device (PNSP) transmits difference in the group shared key ($\Delta K_{PN,y}$) to the other group-member first communication terminal (user's mobile phone, $TE_{all}$) (step G4). The other group-member first communication terminal (user's mobile phone, $TE_{all}$) updates the first distributed key ($S_{all,y}$) to "$S^*_{all,y}$=Update($S_{all,y}$, $\Delta K_{PN,y}$)", using the difference in the group shared key ($\Delta K_{PN,y}$) (step G5).

This completes the description of Embodiment 12.

Embodiment 13

Figure 77:
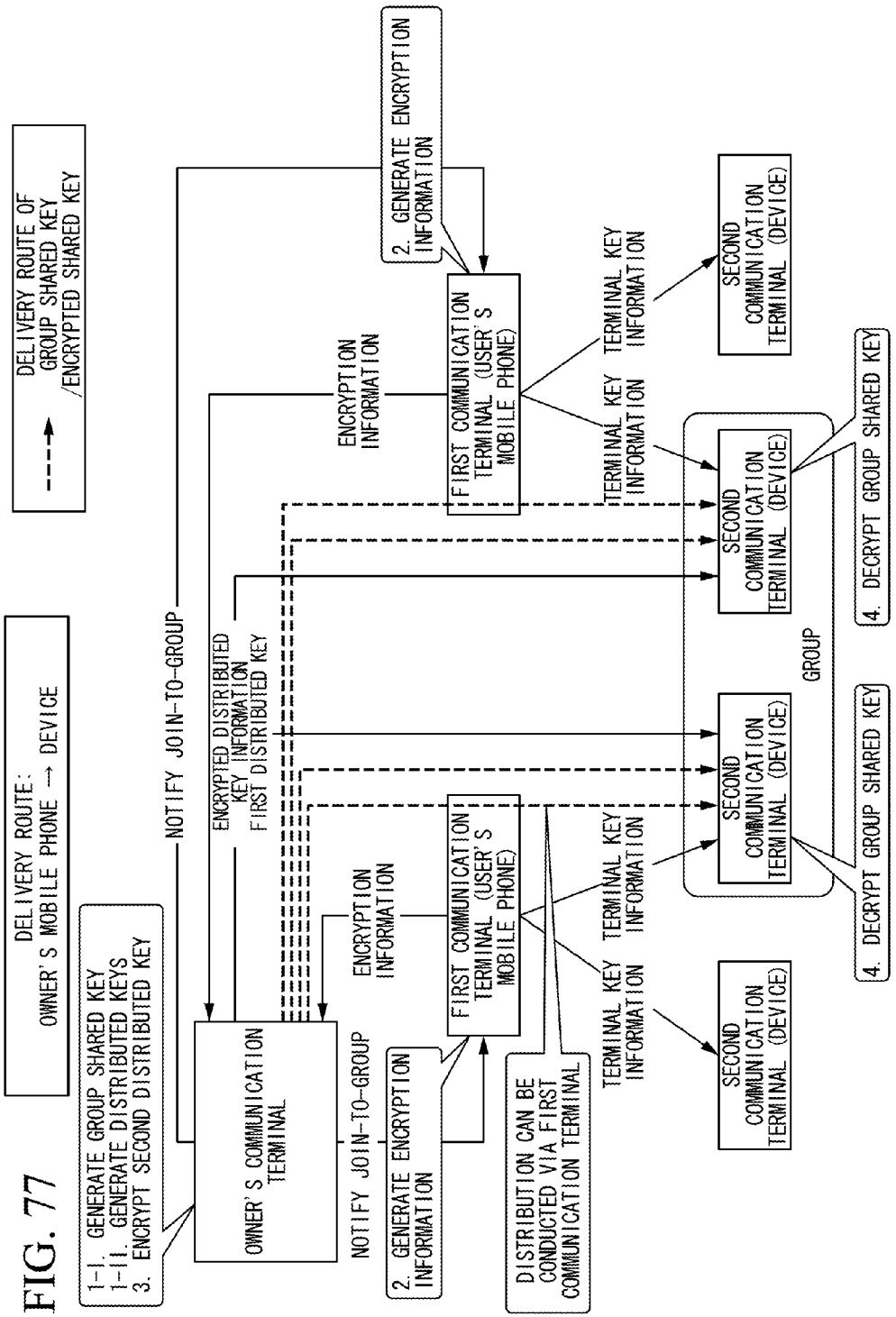
FIG. 77 is a conceptual diagram according to Embodiment 13.

Embodiment 13 is an embodiment in which Embodiment 2 and Embodiment 7 are combined. In Embodiment 13, a group shared key (encrypted shared key) is delivered from a third communication terminal (owner's mobile phone, $TE_{owner}$) to a second communication terminal (device, $nTE_z$). FIG. 77 is a conceptual diagram according to Embodiment 13. As shown in FIG. 77, the group shared key is divided into a first distributed key and a second distributed key by the third communication terminal (owner's mobile phone, $TE_{owner}$) by means of a secret sharing scheme. The first distributed key is transmitted from the third communication terminal (owner's mobile phone, $TE_{owner}$) to the second communication terminal (device, $nTE_z$). The second distributed key is encrypted by the third communication terminal (owner's mobile phone, $TE_{owner}$), and it is then transmitted as encrypted distributed key information from the third communication terminal (owner's mobile phone, $TE_{owner}$) to the second communication terminal (device, $nTE_z$). The first distributed key and the encrypted distributed key information may be delivered from the third communication terminal (owner's mobile phone, $TE_{owner}$) to the second communication terminal (device, $nTE_z$) via the first communication terminal (user's mobile phone, $TE_x$).

In FIG. 77, the third communication terminal (owner's mobile phone, $TE_{owner}$) generates a group shared key. The third communication terminal (owner's mobile phone, $TE_{owner}$) divides the group shared key into a first distributed key and a second distributed key by means of a secret sharing scheme. The first communication terminal (user's mobile phone, $TE_x$) generates terminal key information from terminal individual information for each of the second communication terminals (device, $nTE_z$) to join the group, and transmits the terminal key information to the second communication terminal (device, $nTE_z$). The first communication terminal (user's mobile phone, $TE_x$) generates encryption information using the terminal individual information of the second communication terminals (device, $nTE_z$) to join the group, and transmits the encryption information to the third communication terminal (owner's mobile phone, $TE_{owner}$). The third communication terminal (owner's mobile phone, $TE_{owner}$) encrypts the second distributed key using the encryption information, and transmits the encrypted distributed key information to the second communication terminal (device, $nTE_z$). The second communication terminal (device, $nTE_z$) decrypts the second distributed key, using the encrypted distributed key information and the terminal key information. The third communication terminal (owner's mobile phone, $TE_{owner}$) transmits the first distributed key to the second communication terminal (device, $nTE_z$). The second communication terminal (device, $nTE_z$) restores the group shared key, using the first distributed key and the second distributed key.

Figure 78:
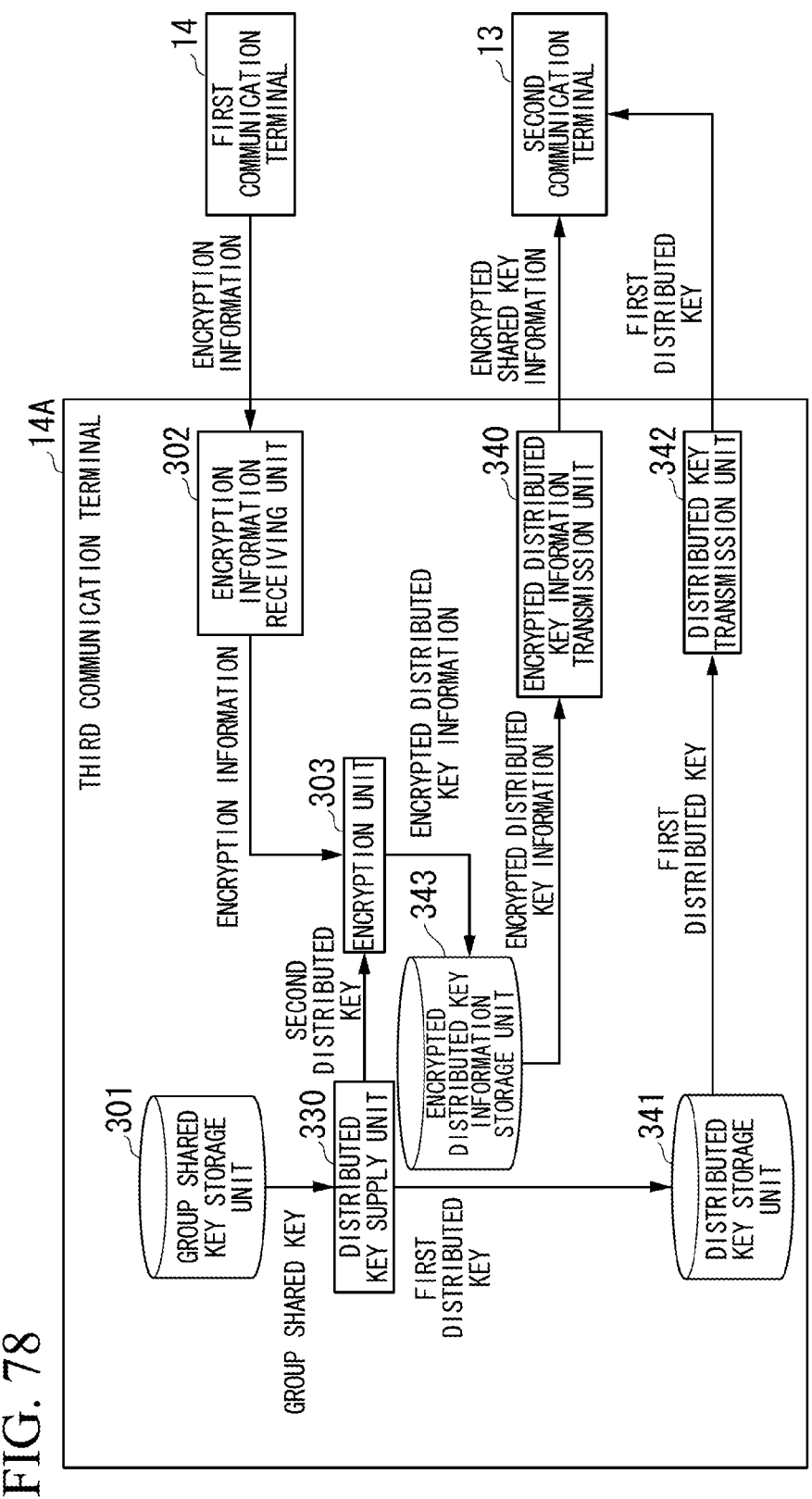
FIG. 78 is a diagram of a device configuration according to Embodiment 13.

FIG. 78 is a diagram of a device configuration according to Embodiment 13. In FIG. 78, the third communication terminal (owner's mobile phone, $TE_{owner}$) 14A has a group shared key storage unit 301, an encryption information receiving unit 302, an encryption unit 303, a distributed key supply unit 330, an encrypted distributed key information transmission unit 340, a distributed key storage unit 341, a distributed key transmission unit 342, and an encrypted distributed key information storage unit 343. The first communication terminal (user's mobile phone, $TE_x$) 14 is of a configuration similar to that of Embodiment 7 illustrated in FIG. 38. Embodiment 13 differs from Embodiment 2 in that the third communication terminal (owner's mobile phone, $TE_{owner}$) generates encrypted distributed key information and transmits it to the second communication terminal (device, $nTE_z$).

Next, among the operations according to Embodiment 13, the points which differ from those in Embodiment 2 are mainly described, with reference to FIG. 79 through FIG. 83. FIG. 79 through FIG. 83 are sequence charts each showing a procedure of operations according to Embodiment 13.

[User Usage Registration Stage]

Figure 79:
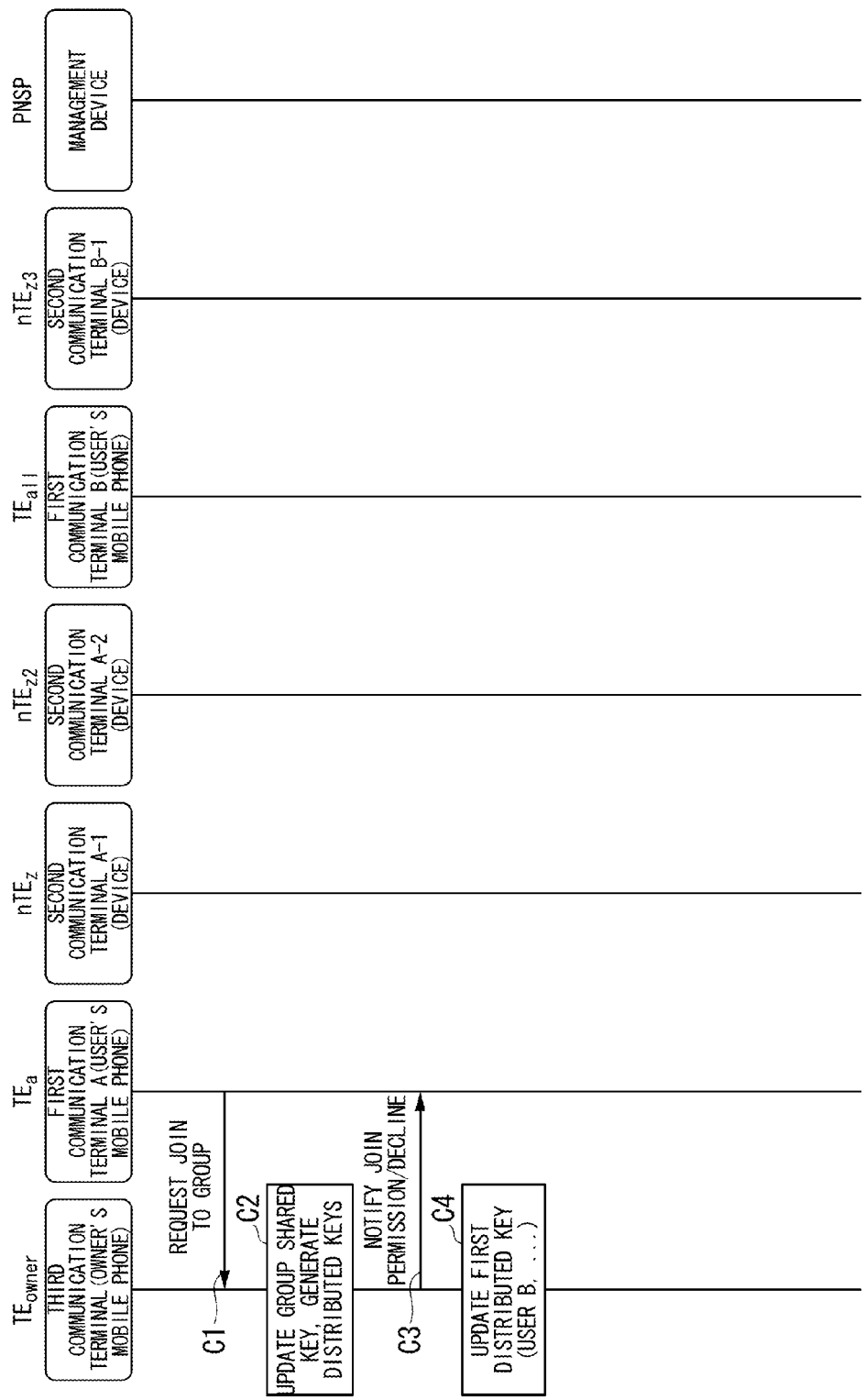
FIG. 79 is a sequence chart of a user usage registration stage according to Embodiment 13.

FIG. 79 is a sequence chart of a user usage registration stage according to Embodiment 13. This is a step in which a user performs usage registration with the owner of a group when joining a group. In FIG. 79, the first communication terminal (user's mobile phone, $TE_a$) transmits a request to join the group ($PN_y$) to the third communication terminal (owner's mobile phone, $TE_{owner}$) (step C1). When permitting the user to join the group ($PN_y$), the third communication terminal (owner's mobile phone, $T_{owner}$) updates the group shared key ($K_{PN,y}$) from "$K_{PN,y}$" to "$K^*_{PN,y}$", and generates a first distributed key ($S_{a,y}$) corresponding to the user and a second distributed key ($U_{a,y}$) on the basis of "$(S_{a,y}, U_{a,y})=Div(K^*_{PN,y})$" (step C2). The third communication terminal (owner's mobile phone, $TE_{owner}$) replies to the first communication terminal (user's mobile phone, $TE_a$) with a permission for join or decline for join (step C3). When permitted join, the third communication terminal (owner's mobile phone, $TE_{owner}$) updates the first distributed key ($S_{all,y}$), which corresponds to each of the other group members, to "$S^*_{all,y}=Update(S_{all,y}, \Delta K_{PN,y})$", using the difference in the group shared key ($\Delta K_{PN,y}$) (step C4).

[Device Addition Stage]

Figure 80:
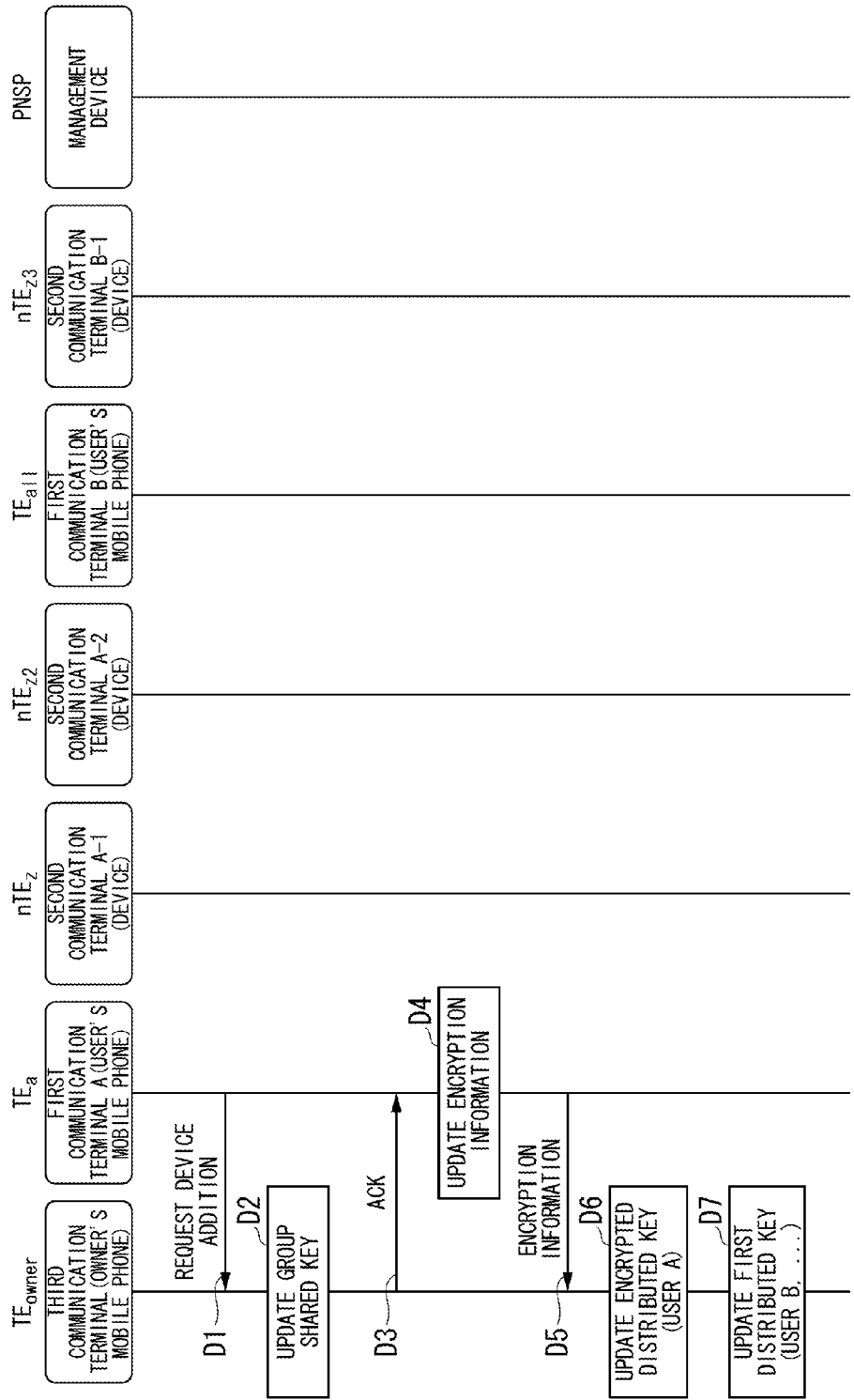
FIG. 80 is a sequence chart of a device addition stage according to Embodiment 13.

FIG. 80 is a sequence chart of a device addition stage according to Embodiment 13. This is a step to be performed when the second communication terminal (device, $nTE_z$) joins the group after a user has performed user usage registration. In FIG. 80, the first communication terminal (user's mobile phone, $TE_a$) requests the third communication terminal (owner's mobile phone, $TE_{owner}$) for an addition of a second communication terminal (device, $TE_z$) (step D1). The third communication terminal (owner's mobile phone, $TE_{owner}$) updates the group shared key ($K_{PN,y}$) from "$K_{PN,y}$" to "$K^*_{PN,y}$" (step D2). The third communication terminal (owner's mobile phone, $TE_{owner}$) replies to the first communication terminal (user's mobile phone, $TE_a$) (step D3).

The first communication terminal (user's mobile phone, $TE_a$) updates the encryption information ($K_{a,y}$) from "$K_{a,y}$" to "$K^*_{a,y}$", using the terminal individual information ($I_{a,z}$, $I_{a,w}$ (w∈$P_{a,y}$, $P_{a,y}$: aggregate of nTE ($nTE_w$) already engaged with $PN_y$, among the nTE used by user A)) corresponding to the second communication terminal (device, $nTE_z$) added to the group ($PN_y$) and each of the second communication terminals (device, $nTE_z$) already engaged with the group ($PN_y$) (step D4). The first communication terminal (user's mobile phone, $TE_a$) transmits the updated encryption information ($K^*_{a,y}$) to the third communication terminal (owner's mobile phone, $TE_{owner}$) (step D5).

The third communication terminal (owner's mobile phone, $TE_{owner}$) encrypts the second distributed key ($U_{a,y}$) related to the first communication terminal (user's mobile phone, $TE_a$) using the encryption information ($K^*_{a,y}$), and generates and updates encrypted distributed key information "$C^*_{a,y}=E(k^*_{a,y}, U_{a,y})$" (step D6). The third communication terminal (owner's mobile phone, $TE_{owner}$) updates the first distributed key ($S_{all,y}$), which corresponds to each of the other group members, to "$S^*_{all,y}=Update(S_{all,y}, \Delta K_{PN,y})$", using the difference in the group shared key ($\Delta K_{PN,y}$) (step D7).

[Shared Key Restoration Stage]

Figure 81:
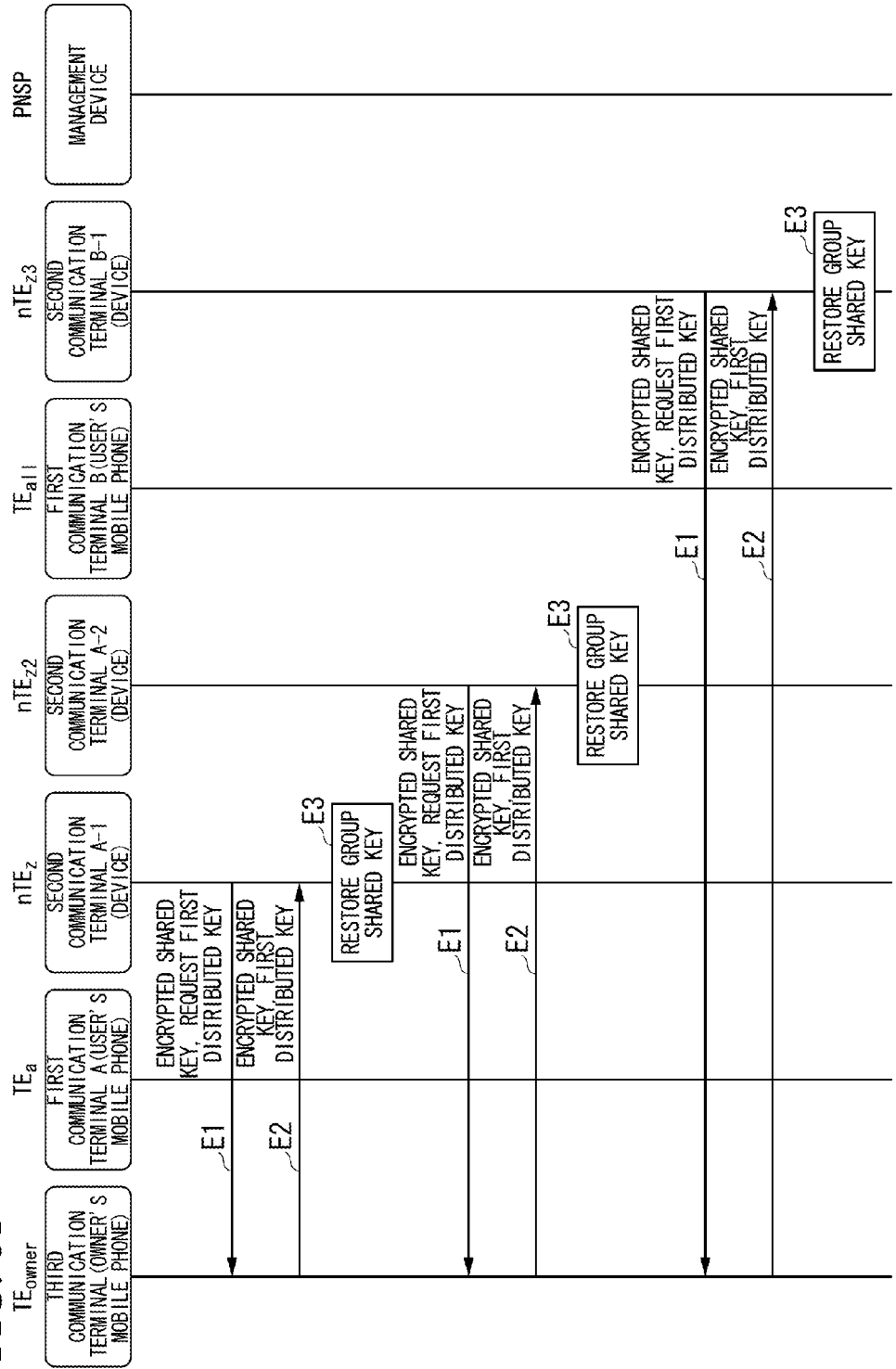
FIG. 81 is a sequence chart of a shared key restoration stage according to Embodiment 13.

FIG. 81 is a sequence chart of a shared key restoration stage according to Embodiment 13. This is a step to be performed when a group shared key is restored at the point in time where the second communication terminal (device, $nTE_z$) actually receives services within a group. In FIG. 81, the second communication terminal (device, $nTE_z$) requests the third communication terminal (owner's mobile phone, $TE_{owner}$) to start services of the group ($PN_y$) (encrypted shared key) (step E1). The third communication terminal (owner's mobile phone, $TE_{owner}$) transmits, to the second communication terminal (device, $nTE_z$) of the service-start request origin, encrypted distributed key information ($C_{a,y}$) corresponding to the device of the group ($PN_y$) (step E2). The second communication terminal (device, $nTE_z$) restores the group shared key ($K_{PN,y}=Comb(D(k_{a,z}, C_{a,y}), S_{a,y})$), using the encrypted distributed key information ($C_{a,y}$) and the terminal key information ($k_{a,z}$) (step E3).

[Device Departure Stage]

Figure 82:
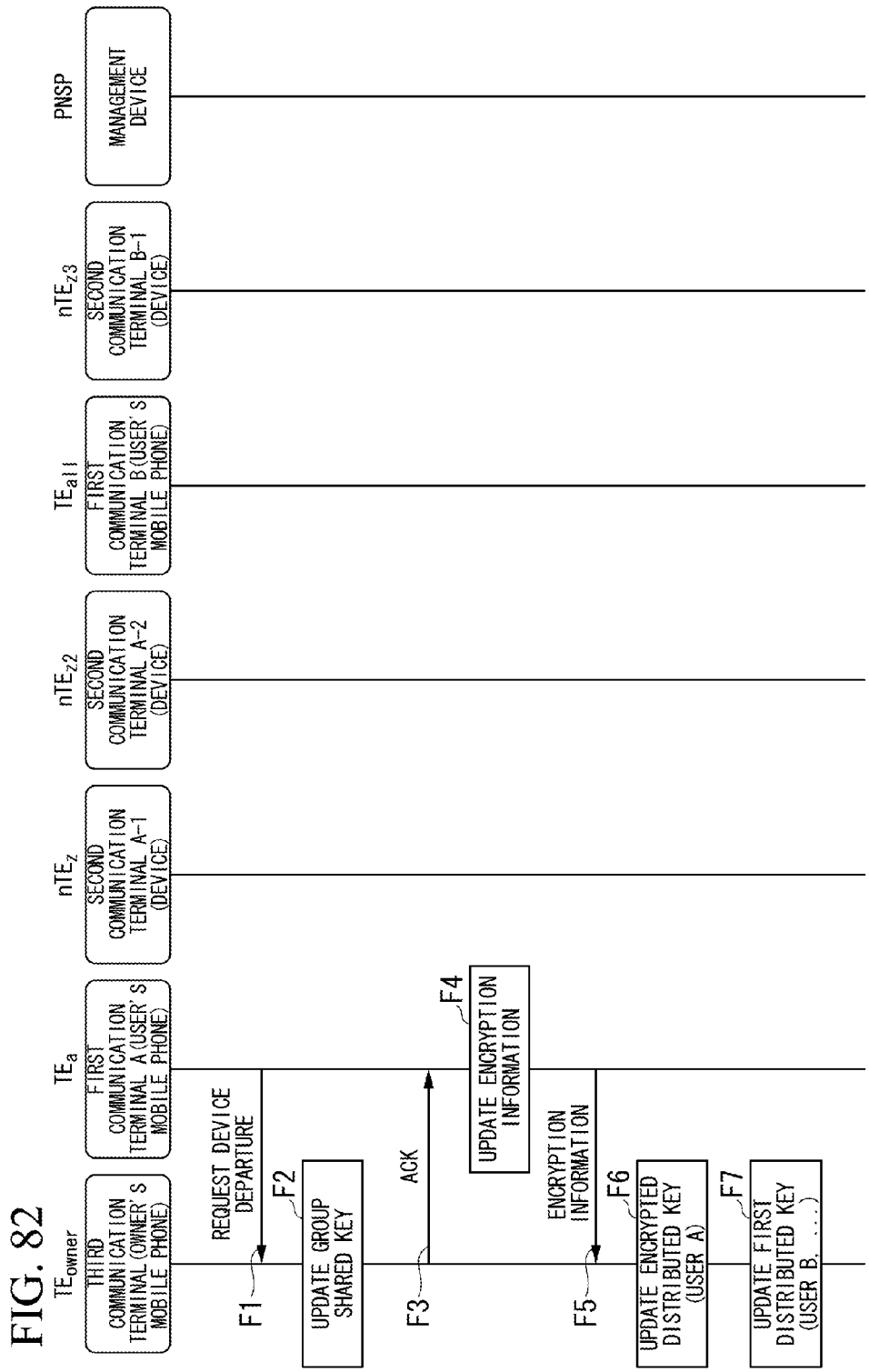
FIG. 82 is a sequence chart of a device departure stage according to Embodiment 13.

FIG. 82 is a sequence chart of a device departure stage according to Embodiment 13. This is a step to be performed when a user makes a second communication terminal (device, $nTE_z$) depart from the group. In FIG. 82, the first communication terminal (user's mobile phone, $TE_a$) transmits a device departure request to the third communication terminal (owner's mobile phone, $TE_{owner}$) (step F1). The third communication terminal (owner's mobile phone, $TE_{owner}$) updates the group shared key ($K_{PN,y}$) from "$K_{PN,y}$" to "$K^*_{PN,y}$" (step F2). The third communication terminal (owner's mobile phone, $TE_{owner}$) replies to the first communication terminal (user's mobile phone, $TE_a$) (step F3).

The first communication terminal (user's mobile phone, $TE_a$) generates and updates encryption information ($K^*_{a,y}$), using the terminal individual information ($I_{a,w}$) corresponding to each of the second communication terminals (device, $nTE_z$) engaged with the group ($PN_y$), other than the second communication terminal (device, $nTE_z$) which has departed from the group ($PN_y$) (step F4). The first communication terminal (user's mobile phone, $TE_a$) transmits the updated encryption information ($K^*_{a,y}$) to the third communication terminal (owner's mobile phone, $TE_{owner}$) (step F5).

The third communication terminal (owner's mobile phone, $TE_{owner}$) updates the second distributed key ($U_{a,y}$), which corresponds to the first communication terminal (user's mobile phone, $Te_a$), to "$U^*_{a,y}=Update(U_{a,y}, \Delta K_{PN,y})$", using the difference in the group shared key ($\Delta K_{PN,y}$), and further, it encrypts the updated second distributed key ($U^*_{a,y}$), using the encryption information ($K^*_{a,y}$), and generates and updates encrypted distributed key information "$C^*_{a,y}=E(k^*_{a,y}, U^*_{a,y})$" (step F6). The third communication terminal (owner's mobile phone, $TE_{owner}$) updates the first distributed key ($S_{all,y}$), which corresponds to each group member, to "$S^*_{all,y}=Update(S_{all,y}, \Delta K_{PN,y})$", using the difference in the group shared key ($\Delta K_{PN,y}$) (step F7).

[User Departure Stage]

Figure 83:
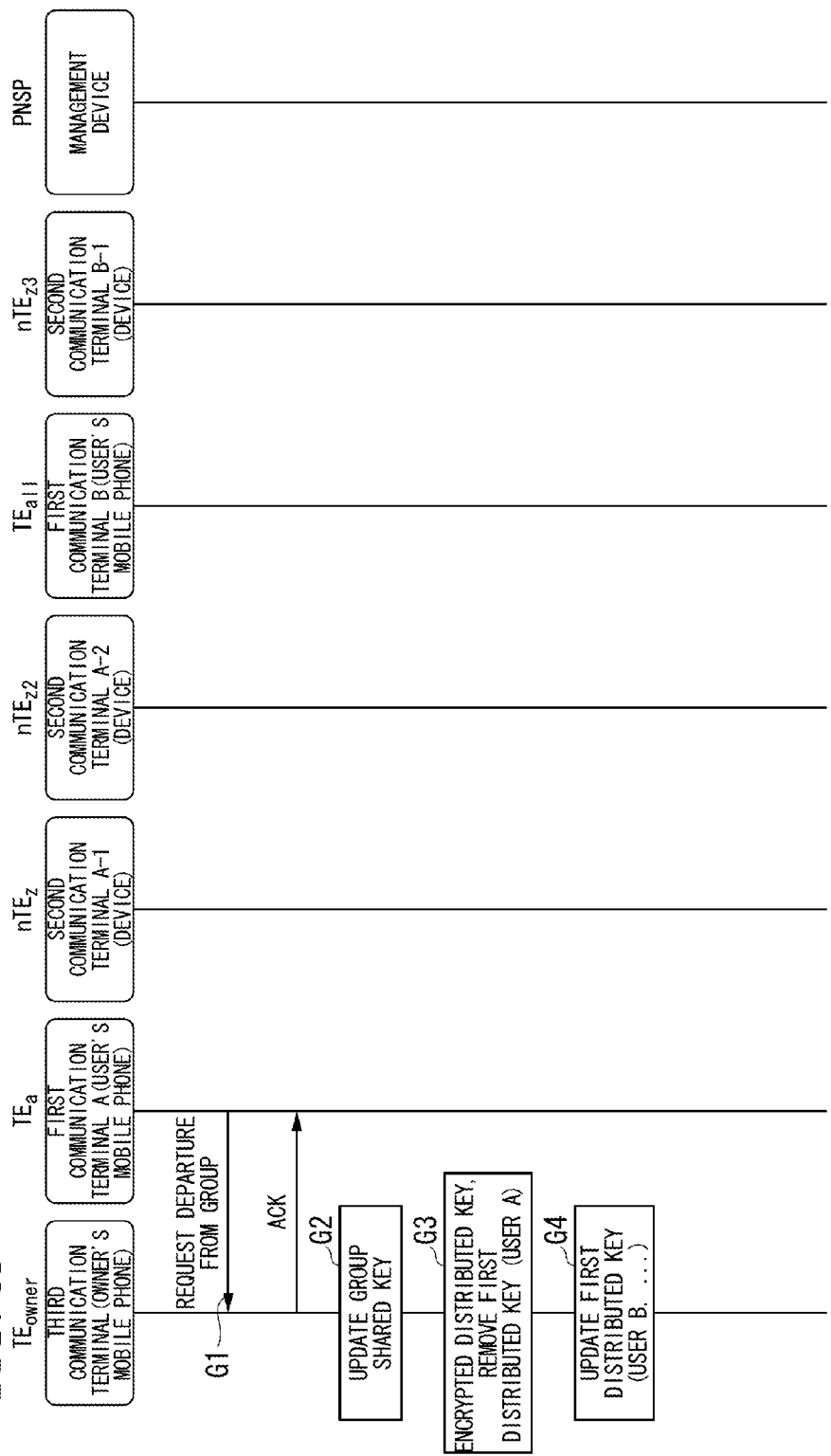
FIG. 83 is a sequence chart of a user departure stage according to Embodiment 13.

FIG. 83 is a sequence chart of a user departure stage according to Embodiment 13. This is a step to be performed when the group owner makes a user depart from the group. In FIG. 83, the first communication terminal (user's mobile phone, $TE_a$) requests the third communication terminal (owner's mobile phone, $TE_{owner}$) for removal of information ($C_{a,y}$) related to the first communication terminal (user's mobile phone, $TE_a$) (step G1). The third communication terminal (owner's mobile phone, $TE_{owner}$) replies to the first communication terminal (user's mobile phone, $TE_a$). The third communication terminal (owner's mobile phone, $TE_{owner}$)

updates the group shared key ($K_{PN,y}$) from "$K_{PN,y}$" to "$K^*_{PN,y}$" (step G2). The third communication terminal (owner's mobile phone, $TE_{owner}$) removes the encrypted distributed key information ($C_{a,y}$) related to the first communication terminal (user's mobile phone, $TE_a$) and the first distributed key ($S_{a,y}$) (step G3). The third communication terminal (owner's mobile phone, $TE_{owner}$) updates the first distributed key ($S_{all,y}$), which corresponds to each of the other group members, to "$S^*_{all,y}$=Update($S_{all,y}$, $\Delta K_{PN,y}$)", using the difference in the group shared key ($\Delta K_{PN,y}$) (step G4).

This completes the description of Embodiment 13.

Embodiment 14

Figure 84:
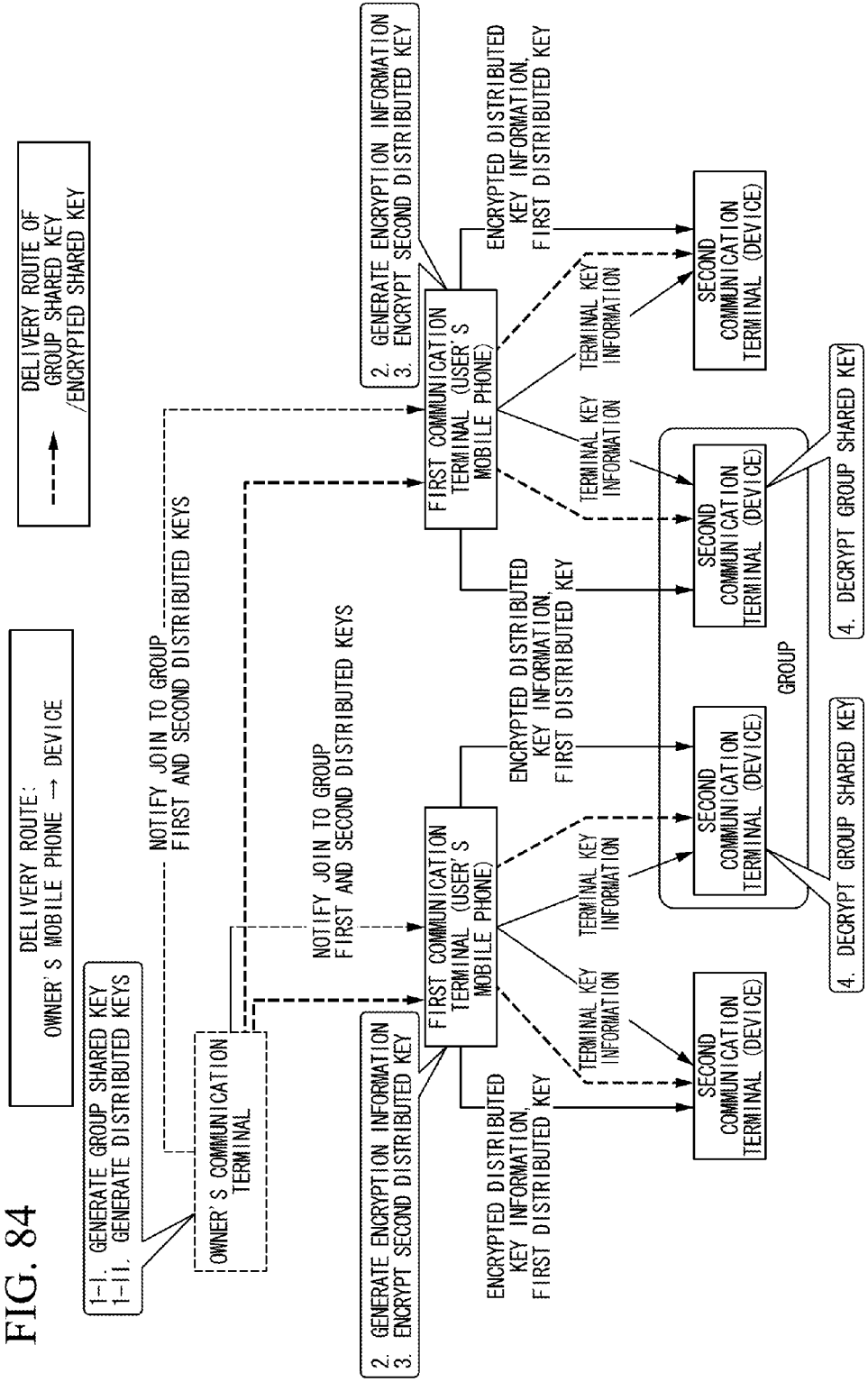
FIG. 84 is a conceptual diagram according to Embodiment 14.

Embodiment 14 is an embodiment in which Embodiment 2 and Embodiment 8 are combined. In Embodiment 14, a group shared key (encrypted shared key) is delivered from a third communication terminal (owner's mobile phone, $TE_{owner}$) to a second communication terminal (device, $nTE_z$). FIG. 84 is a conceptual diagram according to Embodiment 14. As shown in FIG. 84, the group shared key is divided into a first distributed key and a second distributed key by the third communication terminal (owner's mobile phone, $TE_{owner}$) by means of a secret sharing scheme. The first distributed key is delivered from the third communication terminal (owner's mobile phone, $TE_{owner}$) to the second communication terminal (device, $nTE_z$) via the first communication terminal (user's mobile phone, $TE_x$). The second distributed key is transmitted from the third communication terminal (owner's mobile phone, $TE_{owner}$) to the first communication terminal (user's mobile phone, $TE_x$), it is encrypted by the first communication terminal (user's mobile phone, $TE_x$), and it is then transmitted as encrypted distributed key information from the first communication terminal (user's mobile phone, $TE_x$) to the second communication terminal (device, $nTE_z$).

In FIG. 84, the third communication terminal (owner's mobile phone, $TE_{owner}$) generates a group shared key. The third communication terminal (owner's mobile phone, $TE_{owner}$) divides the group shared key to a first distributed key and a second distributed key by means of a secret sharing scheme, and transmits them to the first communication terminal, (user's mobile phone, $TE_x$). The first communication terminal (user's mobile phone, $TE_x$) generates terminal key information from terminal individual information for each of the second communication terminals (device, $nTE_z$) to join the group, and transmits the terminal key information to the second communication terminal (device, $nTE_z$). The first communication terminal (user's mobile phone, $TE_x$) generates encryption information using the terminal individual information of the second communication terminals (device, $nTE_z$) to join the group. The first communication terminal (user's mobile phone, $TE_x$) encrypts the second distributed key using the encryption information, and transmits the encrypted distributed key information to the second communication terminal (device, $nTE_z$). The second communication terminal (device, $nTE_z$) decrypts the second distributed key, using the encrypted distributed key information and the terminal key information. The first communication terminal (user's mobile phone, $TE_x$) transmits the first distributed key to the second communication terminal (device, $nTE_z$). The second communication terminal (device, $nTE_z$) restores the group shared key, using the first distributed key and the second distributed key.

Figure 85:
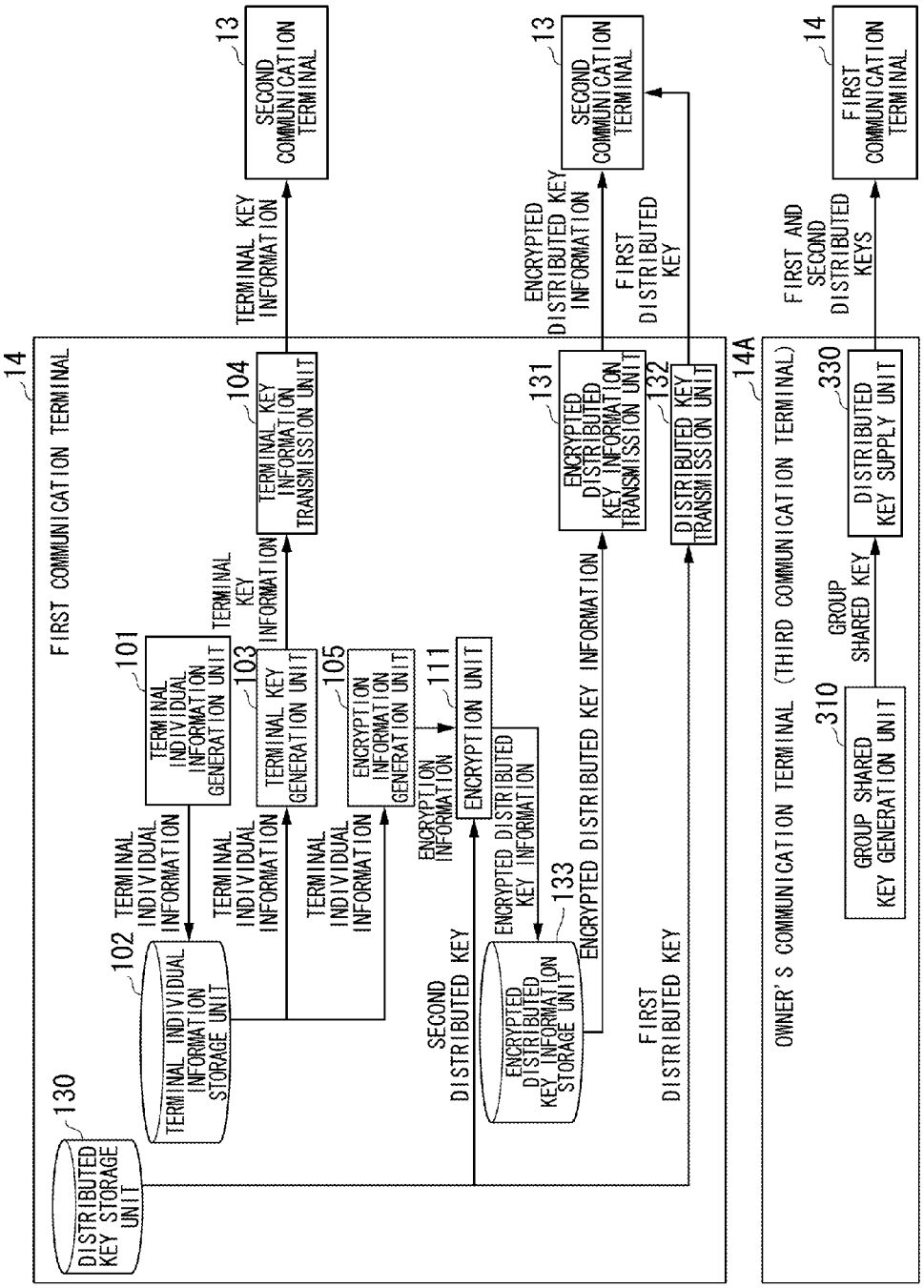
FIG. 85 is a diagram of a device configuration according to Embodiment 14.

FIG. 85 is a diagram of a device configuration according to Embodiment 14. In FIG. 85, the first communication terminal (user's mobile phone, $TE_x$) 14 has a terminal individual information generation unit 101, a terminal individual information storage unit 102, a terminal key information generation unit 103, a terminal key information transmission unit 104, an encryption information generation unit 105, an encryption unit 111, a distributed key storage unit 130, an encryption unit 130, an encrypted distributed key information transmission unit 131, a distributed key transmission unit 132, and an encrypted distributed key information storage unit 133. The third communication terminal (owner's mobile phone, $TE_{owner}$) 14A has a group shared key generation unit 310 and a distributed key supply unit 330. Embodiment 14 differs from Embodiment 2 in that the first communication terminal (user's mobile phone, $TE_x$) supplies encrypted distributed key information to the second communication terminal (device, $nTE_z$).

Next, among the operations according to Embodiment 14, the points which differ from those in Embodiment 2 are mainly described, with reference to FIG. 86 through FIG. 89. FIG. 86 through FIG. 89 are sequence charts each showing a procedure of operations according to Embodiment 14.

[User Usage Registration Stage]

Figure 86:
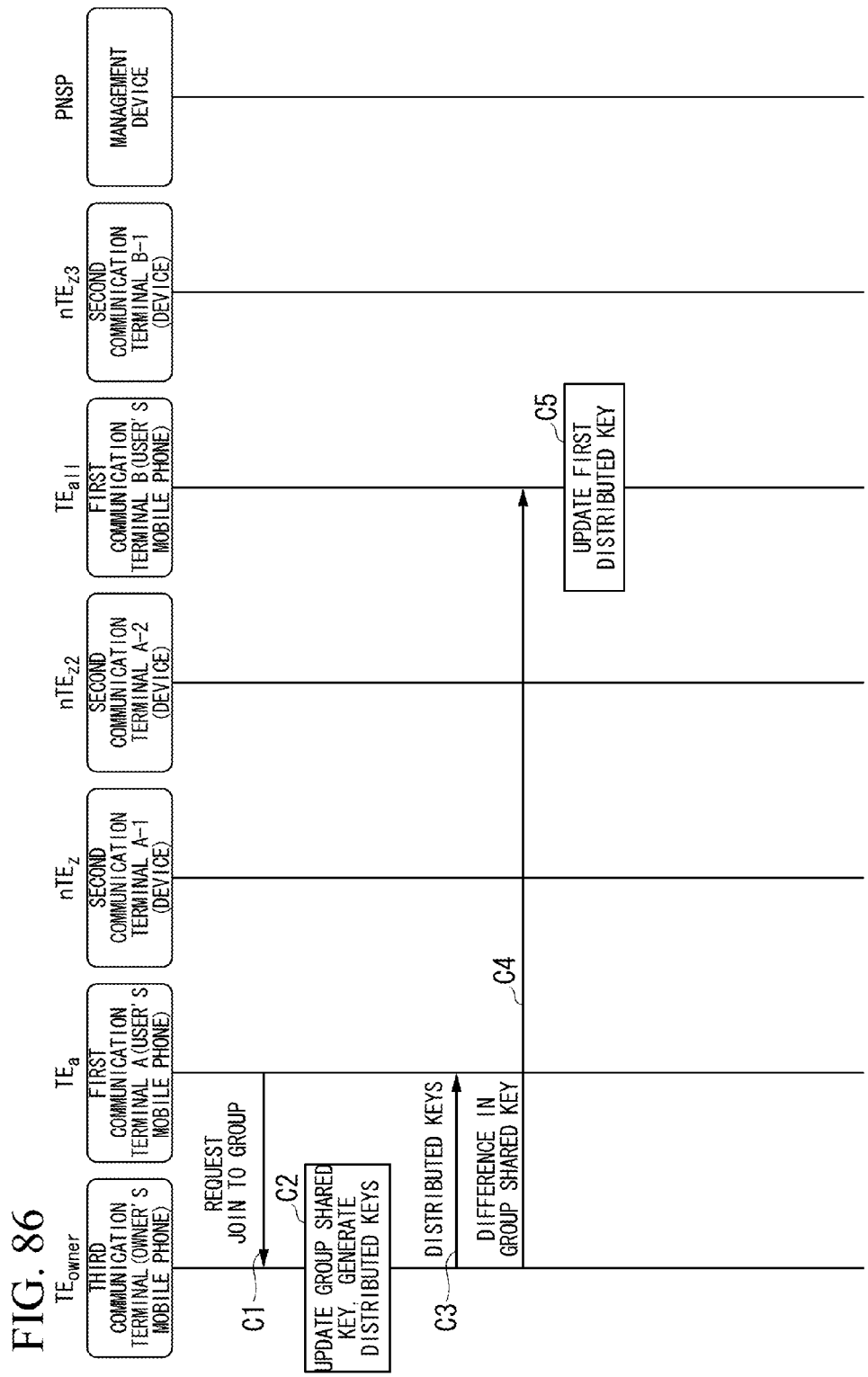
FIG. 86 is a sequence chart of a user usage registration stage according to Embodiment 14.

FIG. 86 is a sequence chart of a user usage registration stage according to Embodiment 14. This is a step in which a user performs usage registration with the owner of a group when joining a group. In FIG. 86, the first communication terminal (user's mobile phone, $TE_a$) transmits a request to join the group ($PN_y$) to the third communication terminal (owner's mobile phone, $TE_{owner}$) (step C1). When permitting the user to join the group ($PN_y$), the third communication terminal (owner's mobile phone, $T_{owner}$) updates the group shared key ($K_{PN,y}$) from "$K_{PN,y}$" to "$K^*_{PN,y}$", and generates a first distributed key ($S_{a,y}$) corresponding to the user and a second distributed key ($U_{a,y}$) on the basis of "($S_{a,y}$, $U_{a,y}$)=Div($K^*_{PN,y}$)" (step C2). When permitting join, the third communication terminal (owner's mobile phone, $TE_{owner}$) transmits the first distributed key ($S_{a,y}$) and the second distributed key ($U_{a,y}$) to the first communication terminal (user's mobile phone, $TE_a$) (step C3). When permitting join, the third communication terminal (owner's mobile phone, $TE_{owner}$) transmits the difference in the group shared key ($\Delta K_{PN,y}$) to the other group-member first communication terminal (user's mobile phone, $TE_{all}$) (step C4). The other group-member first communication terminal (user's mobile phone, $TE_{all}$) updates the first distributed key ($S_{all,y}$) to "$S^*_{all,y}$=Update($S_{all,y}$, $\Delta K_{PN,y}$)", using the difference in the group shared key ($\Delta K_{PN,y}$) (step C5).

[Device Addition Stage]

Figure 87:
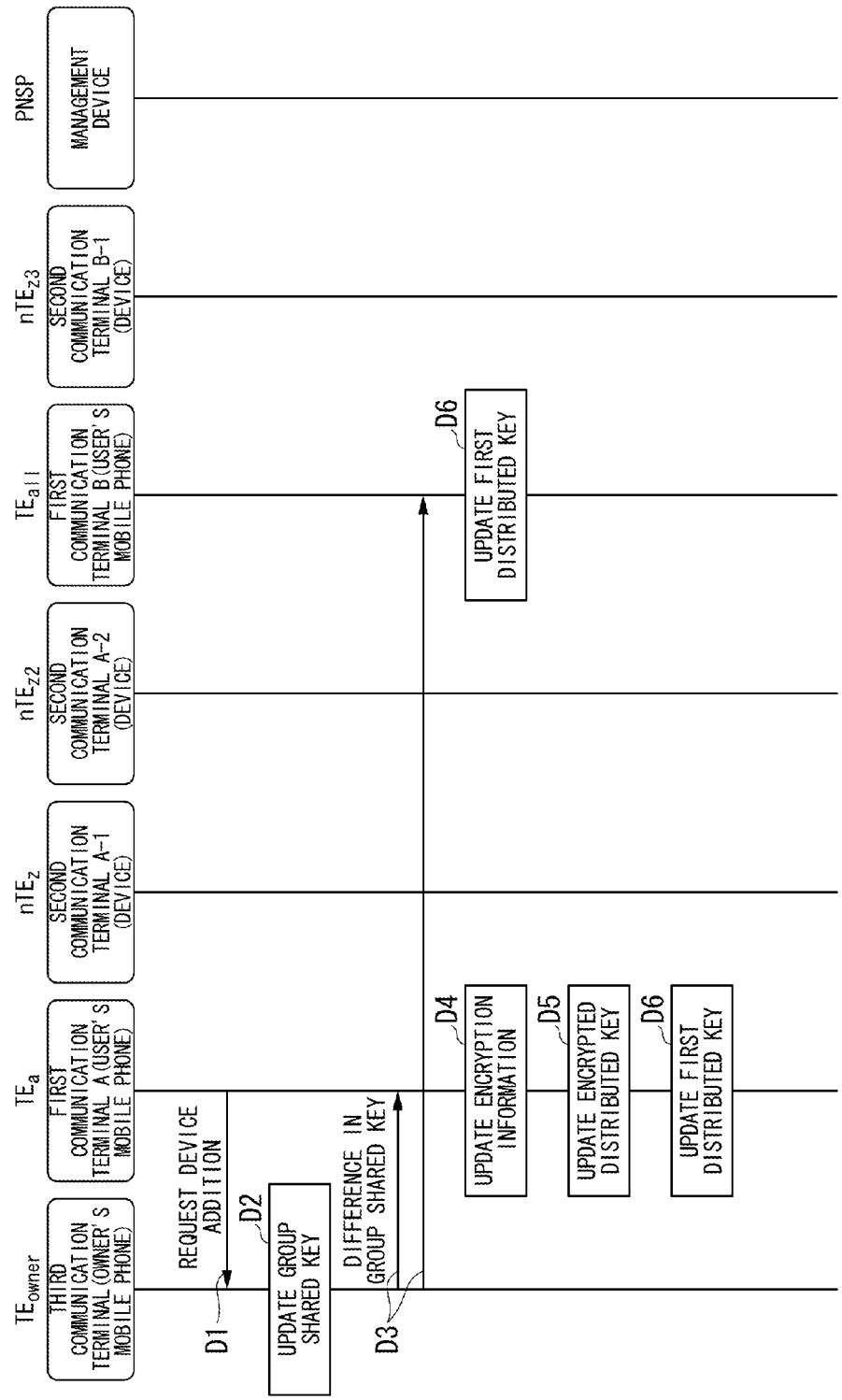
FIG. 87 is a sequence chart of a device addition stage according to Embodiment 14.

FIG. 87 is a sequence chart of a device addition stage according to Embodiment 14. This is a step to be performed when the second communication terminal (device, $nTE_z$) joins the group after a user has performed user usage registration. In FIG. 87, the first communication terminal (user's mobile phone, $TE_a$) requests the third communication terminal (owner's mobile phone, $TE_{owner}$) for an addition of a second communication terminal (device, $TE_z$) (step D1). The third communication terminal (owner's mobile phone, $TE_{owner}$) updates the group shared key ($K_{PN,y}$) from "$K_{PN,y}$" to "$K^*_{PN,y}$" (step D2). The third communication terminal (owner's mobile phone, $TE_{owner}$) transmits the difference in the group shared key ($\Delta K_{PN,y}$) to the first communication terminal (user's mobile phone, $TE_a$) and the other group-member first communication terminal (user's mobile phone, $TE_{all}$) (step D3).

The first communication terminal (user's mobile phone, $TE_a$) updates the encryption information ($K_{a,y}$) from "$K_{a,y}$" to "$K^*_{a,y}$", using the terminal individual information ($I_{a,z}$, $I_{a,w}$ (w∈$P_{a,y}$, $P_{a,y}$: aggregate of nTE ($nTE_z$) already engaged with $PN_y$, among the nTE used by user A)) corresponding to the second communication terminal (device, $nTE_z$) added to the group ($PN_y$) and each of the second communication terminals (device, $nTE_z$) already engaged with the group ($PN_y$) (step D4). The first communication terminal (user's mobile phone, $TE_a$) encrypts the second distributed key ($U_{a,y}$) using the encryption information ($K^*_{a,y}$), and generates and updates encrypted distributed key information "$C^*_{a,y}=E(k^*_{a,y}, U_{a,y})$" (step D5). Each group-member first communication terminal (user's mobile phone, $TE_{all}$) updates the first distributed key ($S_{all,y}$) to "$S^*_{all,y}=Update(S_{all,y}, \Delta K_{PN,y})$", using the difference in the group shared key ($\Delta K_{PN,y}$) (step D6).

[Shared Key Restoration Stage]

A shared key restoration stage according to Embodiment 14 is similar to that in Embodiment 12 illustrated in FIG. 74.

[Device Departure Stage]

Figure 88:
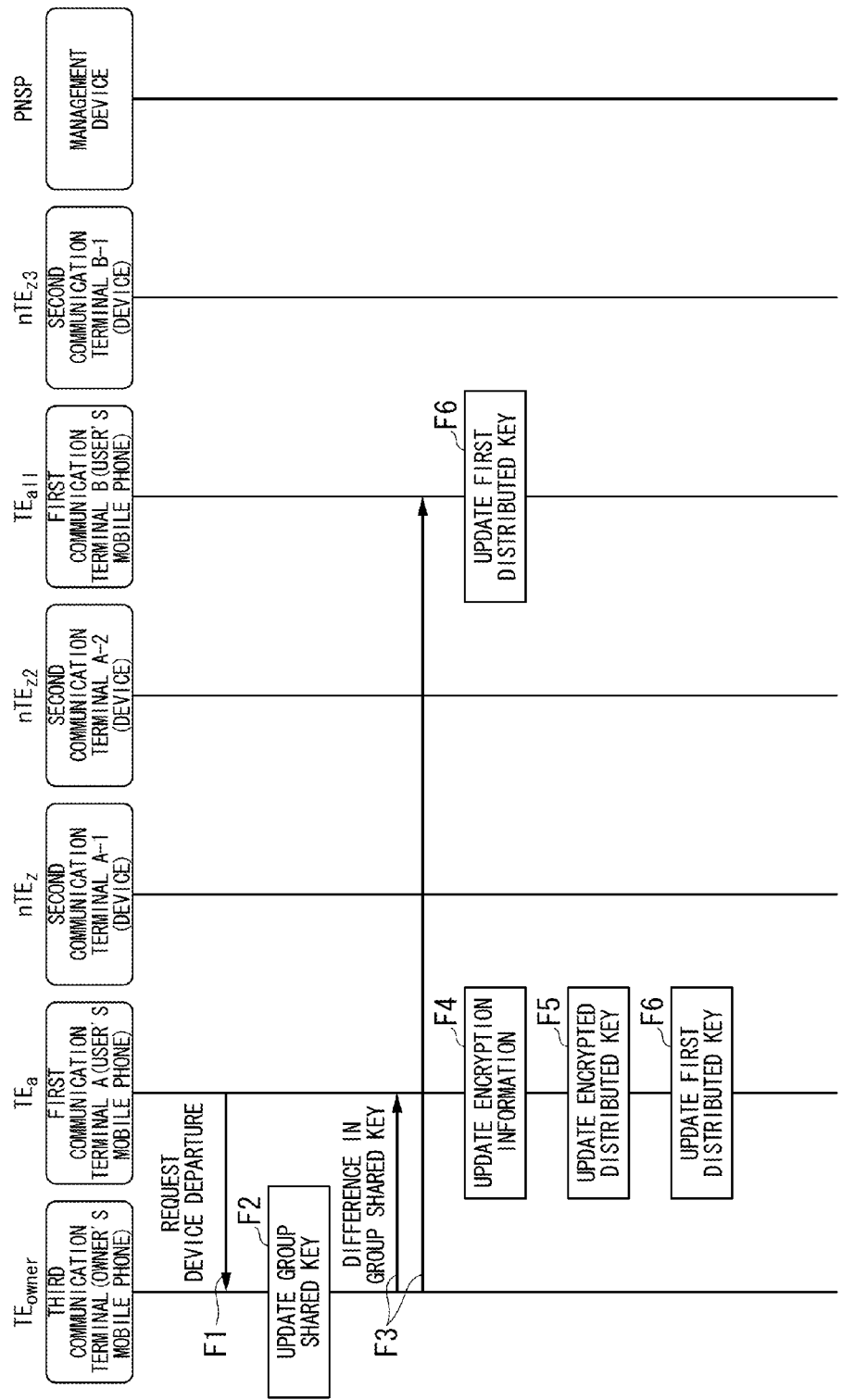
FIG. 88 is a sequence chart of a device departure stage according to Embodiment 14.

FIG. 88 is a sequence chart of a device departure stage according to Embodiment 14. This is a step to be performed when a user makes a second communication terminal (device, $nTE_z$) depart from the group. In FIG. 88, the first communication terminal (user's mobile phone, $TE_a$) transmits a device departure request to the third communication terminal (owner's mobile phone, $TE_{owner}$) (step F1). The third communication terminal (owner's mobile phone, $TE_{owner}$) updates the group shared key ($K_{PN,y}$) from "$K_{PN,y}$" to "$K^*_{PN,y}$" (step F2). The third communication terminal (owner's mobile phone, $TE_{owner}$) transmits the difference in the group shared key ($\Delta K_{PN,y}$) to the first communication terminal (user's mobile phone, $TE_a$) and the other group-member first communication terminal (user's mobile phone, $TE_{all}$) (step F3).

The first communication terminal (user's mobile phone, $TE_a$) generates and updates encryption information ($K^*_{a,y}$), using the terminal individual information ($I_{a,w}$) corresponding to each of the second communication terminals (device, $nTE_z$) engaged with the group ($PN_y$), other than the second communication terminal (device, $nTE_z$) which has departed from the group ($PN_y$) (step F4). The first communication terminal (user's mobile phone, $TE_a$) updates the second distributed key ($U_{a,y}$) to "$U^*_{a,y}=Update(U_{a,y}, \Delta K_{PN,y}$", using the difference in the group shared key ($\Delta K_{PN,y}$), and further, it encrypts the updated second distributed key ($U^*_{a,y}$), using the encryption information ($K^*_{a,y}$), and generates and updates encrypted distributed key information "$C^*_{a,y}=E(k^*_{a,y}, U^*_{a,y})$" (step F5). Each group-member first communication terminal (user's mobile phone, $TE_{all}$) updates the first distributed key ($S_{all,y}$) to "$S^*_{all,y}=Update(S_{all,y}, \Delta K_{PN,y})$", using the difference in the group shared key ($\Delta K_{PN,y}$) (step F6).

[User Departure Stage]

Figure 89:
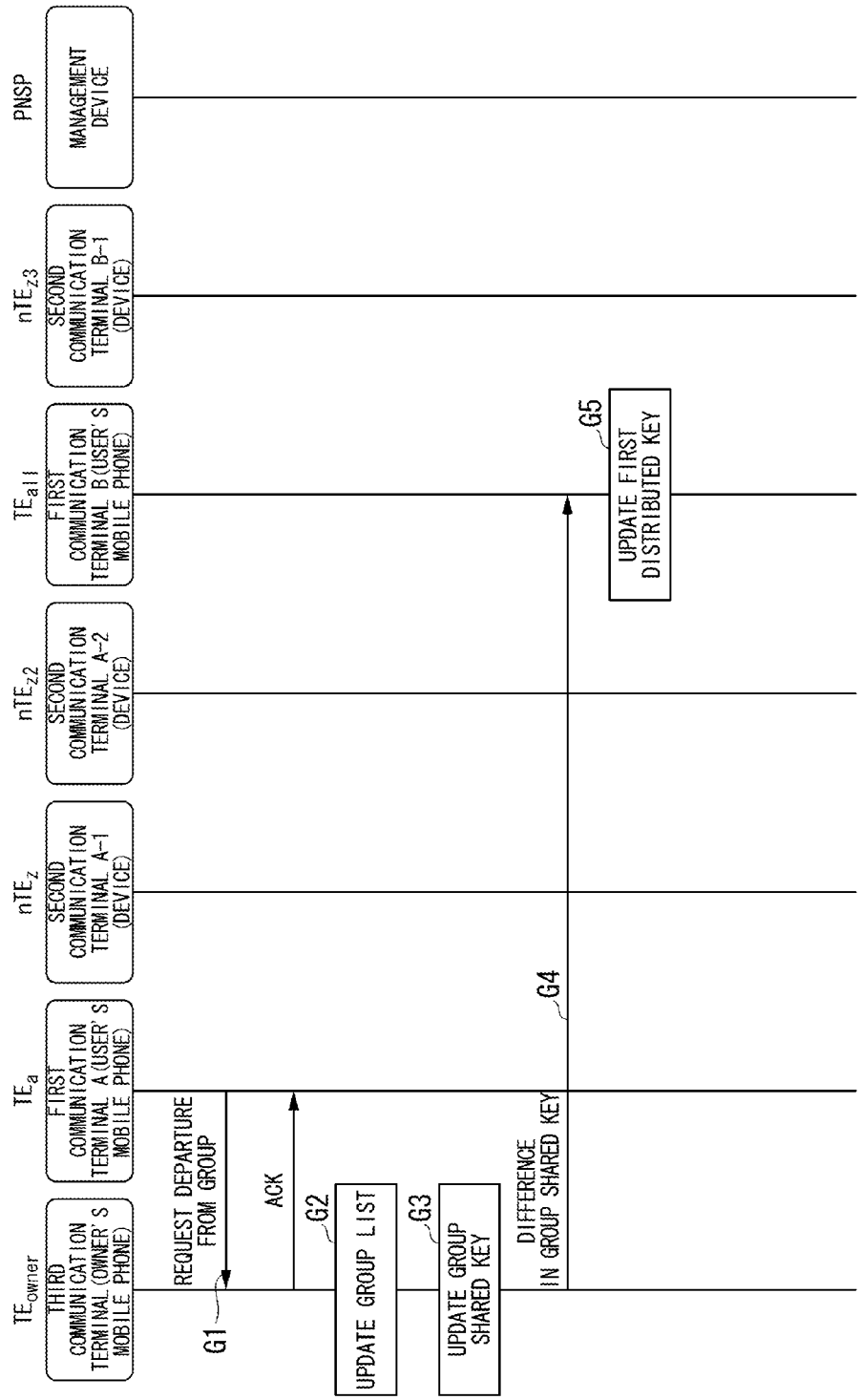
FIG. 89 is a sequence chart of a user departure stage according to Embodiment 14.

FIG. 89 is a sequence chart of a user departure stage according to Embodiment 14. This is a step to be performed when the group owner makes a user depart from the group. In FIG. 89, the first communication terminal (user's mobile phone, $TE_a$) requests the third communication terminal (owner's mobile phone, $TE_{owner}$) for removal of information ($C_{a,y}$) related to the first communication terminal (user's mobile phone, $TE_a$) (step G1). The third communication terminal (owner's mobile phone, $TE_{owner}$) removes the first communication terminal (user's mobile phone, $TE_a$) from the group list, and updates the group list (step G2). The third communication terminal (owner's mobile phone, $TE_{owner}$) updates the group shared key ($K_{PN,y}$) from "$K_{PN,y}$" to "$K^*_{PN,y}$" (step G3).

The third communication terminal (owner's mobile phone, $TE_{owner}$) transmits the difference in the group shared key ($\Delta K_{PN,y}$) to the other group-member first communication terminal (user's mobile phone, $TE_{all}$) (step G4). The other group-member first communication terminal (user's mobile phone, $TE_{all}$) updates the first distributed key ($S_{all,y}$) to "$S^*_{all,y}=Update(S_{all,y}, \Delta K_{PN,y})$", using the difference in the group shared key ($\Delta K_{PN,y}$) (step G5).

This completes the description of Embodiment 14.

Embodiment 15

Figure 90:
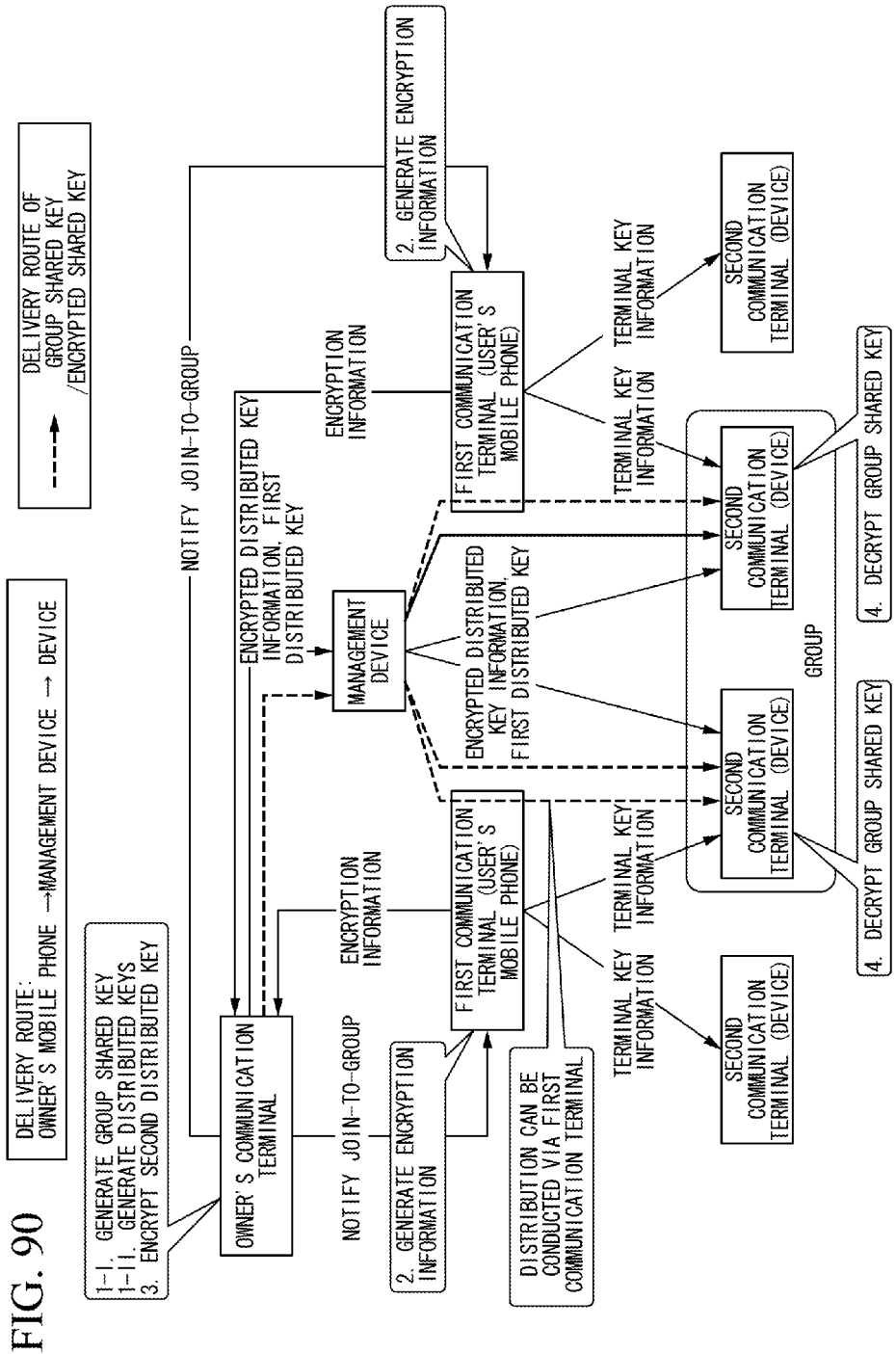
FIG. 90 is a conceptual diagram according to Embodiment 15.

Embodiment 15 is an embodiment in which Embodiment 2 and Embodiment 9 are combined. In Embodiment 15, a group shared key (encrypted shared key) is delivered from a third communication terminal (owner's mobile phone, $TE_{owner}$) to a second communication terminal (device, $nTE_z$) via a management device (PNSP). FIG. 90 is a conceptual diagram according to Embodiment 15. As shown in FIG. 90, the group shared key is divided into a first distributed key and a second distributed key by the third communication terminal (owner's mobile phone, $TE_{owner}$) by means of a secret sharing scheme. The first distributed key is transmitted from the third communication terminal (owner's mobile phone, $TE_{owner}$) to the second communication terminal (device, $nTE_z$) via the management device (PNSP). The second distributed key is encrypted by the third communication terminal (owner's mobile phone, $TE_{owner}$), and it is then transmitted as encrypted distributed key information from the third communication terminal (owner's mobile phone, $TE_{owner}$) to the second communication terminal (device, $nTE_z$) via the management device (PNSP). The first distributed key and the encrypted distributed key information may be further delivered from the management device (PNSP) to the second communication terminal (device, $nTE_z$) via the first communication terminal (user's mobile phone, $TE_x$).

In FIG. 90, the third communication terminal (owner's mobile phone, $TE_{owner}$) generates a group shared key. The third communication terminal (owner's mobile phone, $TE_{owner}$) divides the group shared key into a first distributed key and a second distributed key by means of a secret sharing scheme. The first communication terminal (user's mobile phone, $TE_x$) generates terminal key information from terminal individual information for each of the second communication terminals (device, $nTE_z$) to join the group, and transmits the terminal key information to the second communication terminal (device, $nTE_z$). The first communication terminal (user's mobile phone, $TE_x$) generates encryption information using the terminal individual information of the second communication terminals (device, $nTE_z$) to join the group, and transmits the encryption information to the third communication terminal (owner's mobile phone, $TE_{owner}$). The third communication terminal (owner's mobile phone, $TE_{owner}$) encrypts the second distributed key using the encryption information, and transmits the encrypted distributed key information to the management device (PNSP). The management device (PNSP) transmits the encrypted distributed key information to the second communication terminal (device, $nTE_z$). The second communication terminal (device, $nTE_z$) decrypts the second distributed key, using the encrypted distributed key information and the terminal key information. The third communication terminal (owner's mobile phone, $TE_{owner}$) transmits the first distributed key to the management device (PNSP). The management device (PNSP) transmits the first distributed key to the second communication terminal (device, $nTE_z$). The second communication terminal (device, $nTE_z$) restores the group shared key, using the first distributed key and the second distributed key.

Figure 91:
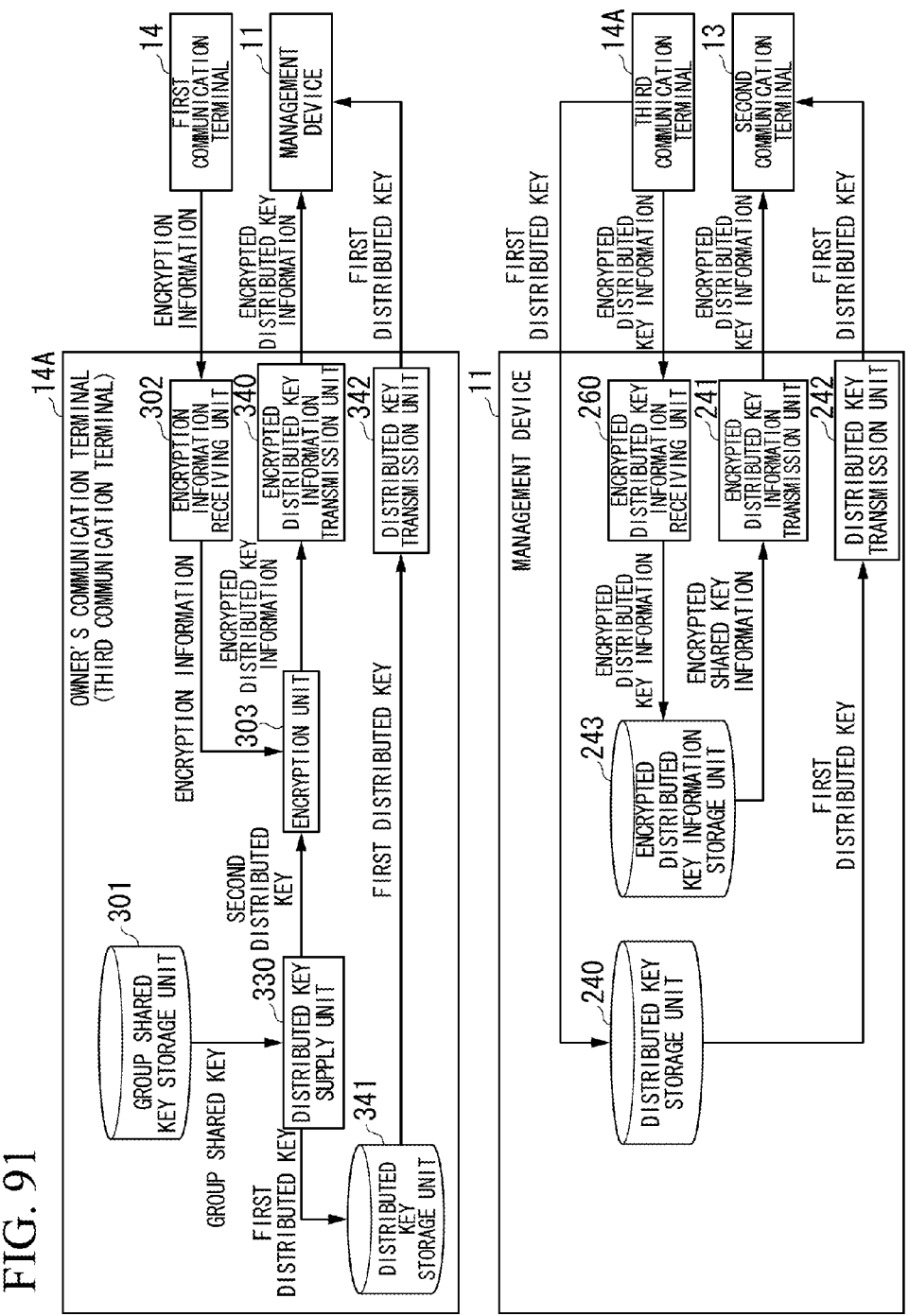
FIG. 91 is a diagram of a device configuration according to Embodiment 15.

FIG. 91 is a diagram of a device configuration according to Embodiment 15. In FIG. 91, the third communication terminal (owner's mobile phone, $TE_{owner}$) 14A has a group shared key storage unit 301, an encryption information receiving unit 302, an encryption unit 303, a distributed key supply unit 330, an encrypted distributed key information transmission unit 340, a distributed key storage unit 341, and a distributed key transmission unit 342. The management device (PNSP) 11 has a distributed key storage unit 240, an encrypted distributed key information transmission unit 241, a distributed key transmission unit 242, an encrypted distributed key information receiving unit 260, and an encrypted distributed key information storage unit 243. The first communication terminal (user's mobile phone, $TE_x$) 14 is of a configuration similar to that of Embodiment 9 illustrated in FIG. 51. Embodiment 15 differs from Embodiment 2 in that the third communication terminal (owner's mobile phone, $TE_{owner}$) generates encrypted distributed key information.

Next, among the operations according to Embodiment 15, the points which differ from those in Embodiment 2 are mainly described, with reference to FIG. 92 through FIG. 95. FIG. 92 through FIG. 95 are sequence charts each showing a procedure of operations according to Embodiment 15.

[User Usage Registration Stage]

Figure 92:
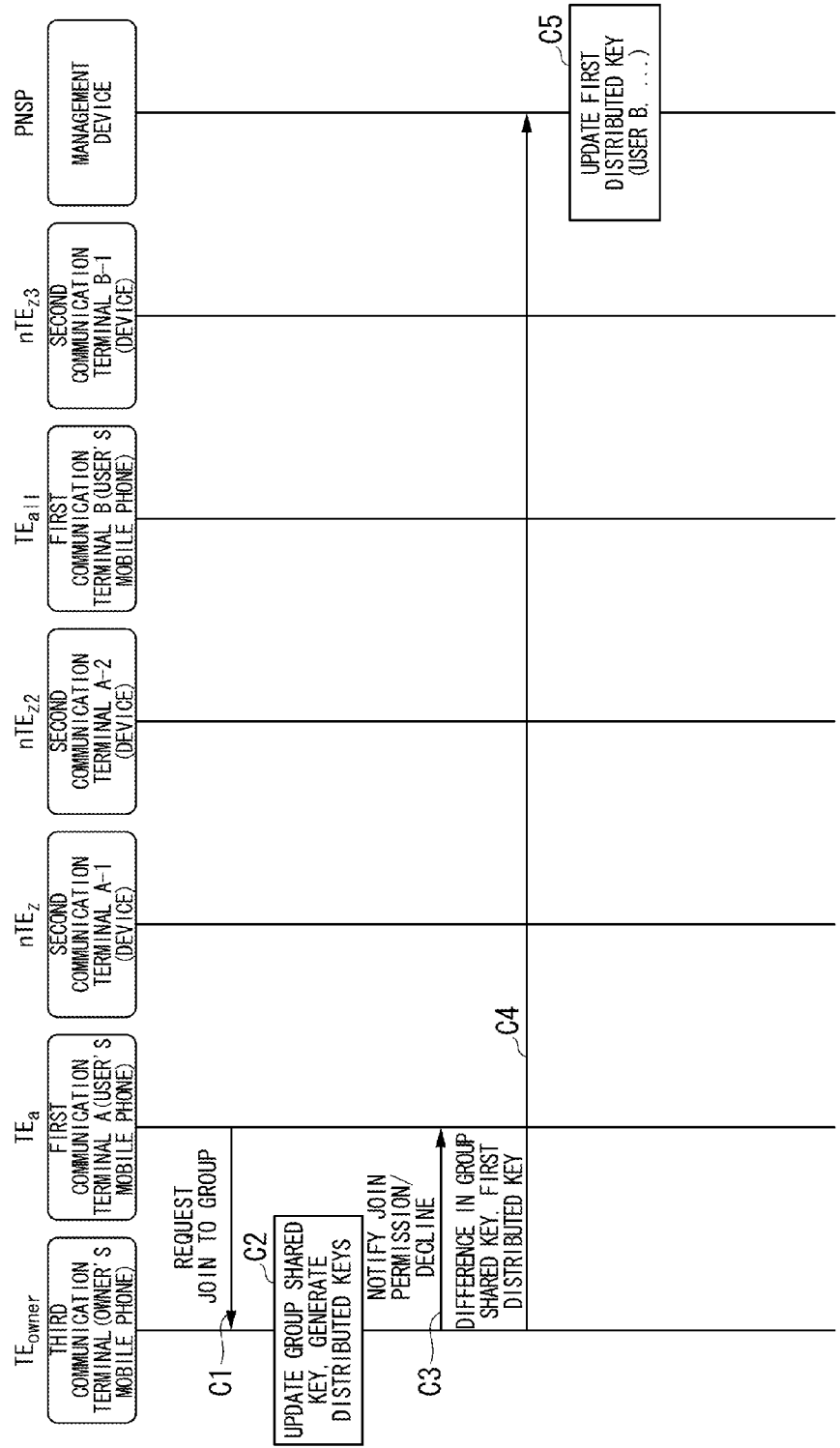
FIG. 92 is a sequence chart of a user usage registration stage according to Embodiment 15.

FIG. 92 is a sequence chart of a user usage registration stage according to Embodiment 15. This is a step in which a user performs usage registration with the owner of a group when joining a group. In FIG. 92, the first communication terminal (user's mobile phone, $TE_a$) transmits a request to join the group ($PN_y$) to the third communication terminal (owner's mobile phone, $TE_{owner}$) (step C1). When permitting the user to join the group ($PN_y$), the third communication terminal (owner's mobile phone, $T_{owner}$) updates the group shared key ($K_{PN,y}$) from "$K_{PN,y}$" to "$K^*_{PN,y}$", and generates a first distributed key ($S_{a,y}$) corresponding to the user and a second distributed key ($U_{a,y}$) on the basis of "$(S_{a,y}, U_{a,y})$=Div$(K^*_{PN,y})$" (step C2). The third communication terminal (owner's mobile phone, $TE_{owner}$) replies to the first communication terminal (user's mobile phone, $TE_a$) with a permission for join or decline for join (step C3). When permitting join, the third communication terminal (owner's mobile phone, $TE_{owner}$) transmits the difference in the group shared key ($\Delta K_{PN,y}$) and the first distributed key ($S_{a,y}$) to the management device (PNSP) (step C4). The management device (PNSP) updates the first distributed key ($S_{all,y}$), which corresponds to each of the other group members, to "$S^*_{all,y}$=Update($S_{all,y}, \Delta K_{PN,y}$)", using the difference in the group shared key ($\Delta K_{PN,y}$) (step C5).

[Device Addition Stage]

Figure 93:
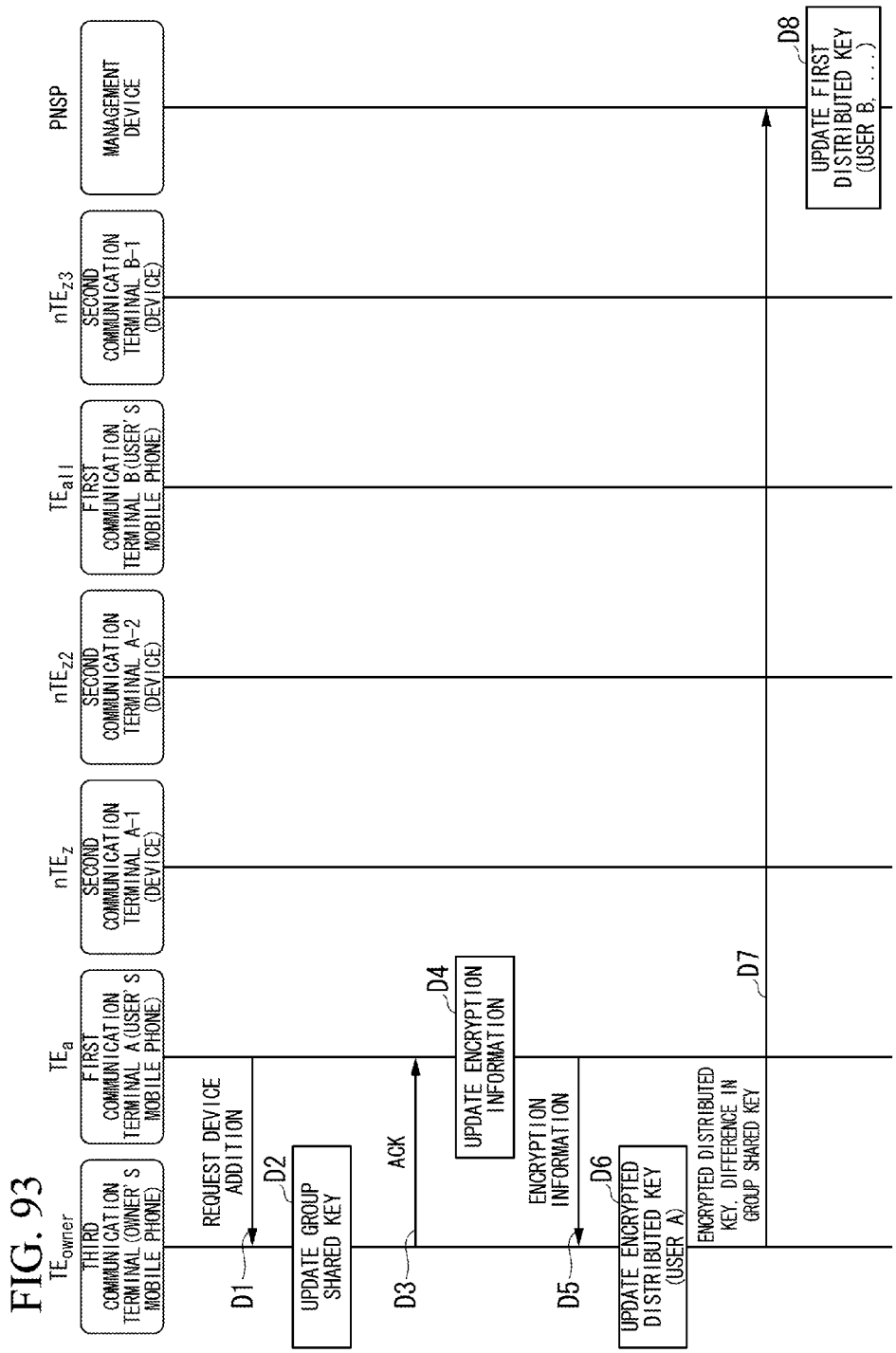
FIG. 93 is a sequence chart of a device addition stage according to Embodiment 15.

FIG. 93 is a sequence chart of a device addition stage according to Embodiment 15. This is a step to be performed when the second communication terminal (device, $nTE_z$) joins the group after a user has performed user usage registration. In FIG. 93, the first communication terminal (user's mobile phone, $TE_a$) requests the third communication terminal (owner's mobile phone, $TE_{owner}$) for an addition of a second communication terminal (device, $TE_z$) (step D1). The third communication terminal (owner's mobile phone, $TE_{owner}$) updates the group shared key ($K_{PN,y}$) from "$K_{PN,y}$" to "$K^*_{PN,y}$" (step D2). The third communication terminal (owner's mobile phone, $TE_{owner}$) replies to the first communication terminal (user's mobile phone, $TE_a$) (step D3).

The first communication terminal (user's mobile phone, $TE_a$) updates the encryption information ($K_{a,y}$) from "$K_{a,y}$" to "$K^*_{a,y}$", using the terminal individual information ($I_{a,z}, I_{a,w}$ ($w \in P_{a,y}$, $P_{a,y}$: aggregate of nTE ($nTE_w$) already engaged with $PN_y$, among the nTE used by user A)) corresponding to the second communication terminal (device, $nTE_z$) added to the group ($PN_y$) and each of the second communication terminals (device, $nTE_z$) already engaged with the group ($PN_y$) (step D4). The first communication terminal (user's mobile phone, $TE_a$) transmits the updated encryption information ($K^*_{a,y}$) to the third communication terminal (owner's mobile phone, $TE_{owner}$) (step D5).

The third communication terminal (owner's mobile phone, $TE_{owner}$) encrypts the second distributed key ($U_{a,y}$) related to the first communication terminal (user's mobile phone, $TE_a$) using the encryption information ($K^*_{a,y}$), and generates and updates encrypted distributed key information "$C^*_{a,y}$=$E(k^*_{a,y}, U_{a,y})$" (step D6). The third communication terminal (owner's mobile phone, $TE_{owner}$) transmits the difference in the group shared key ($\Delta K_{PN,y}$) and the encrypted distributed key information ($C^*_{a,y}$) to the management device (PNSP) (step D7). The management device (PNSP) updates the first distributed key ($S_{all,y}$), which corresponds to each of the other group members, to "$S^*_{all,y}$=Update($S_{all,y}, \Delta K_{PN,y}$)", using the difference in the group shared key ($\Delta K_{PN,y}$) (step D8).

[Device Departure Stage]

Figure 94:
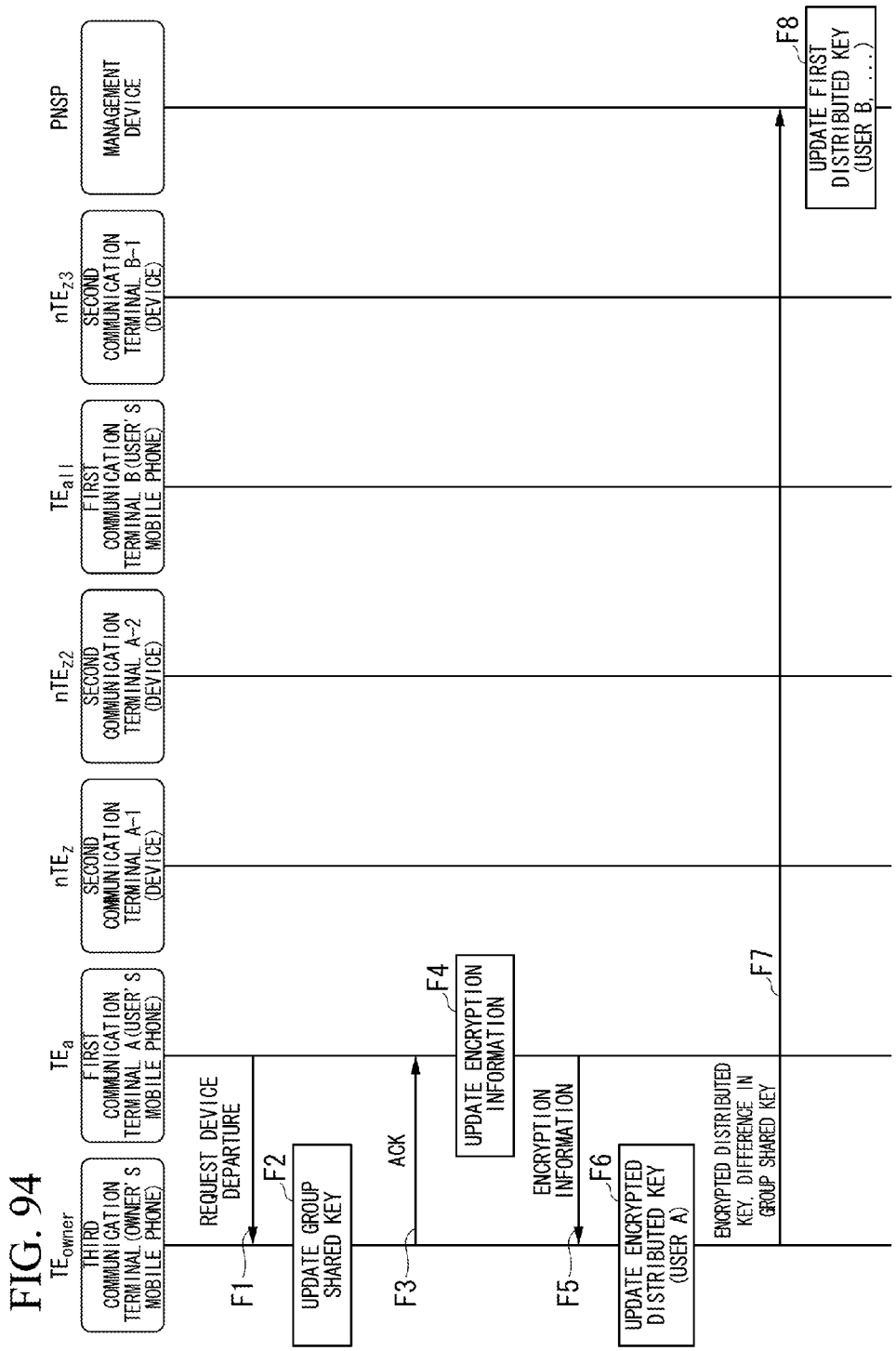
FIG. 94 is a sequence chart of a device departure stage according to Embodiment 15.

FIG. 94 is a sequence chart of a device departure stage according to Embodiment 15. This is a step to be performed when a user makes a second communication terminal (device, $nTE_z$) depart from the group. In FIG. 94, the first communication terminal (user's mobile phone, $TE_a$) transmits a device departure request to the third communication terminal (owner's mobile phone, $TE_{owner}$) (step F1). The third communication terminal (owner's mobile phone, $TE_{owner}$) updates the group shared key ($K_{PN,y}$) from "$K_{PN,y}$" to "$K^*_{PN,y}$" (step F2). The third communication terminal (owner's mobile phone, $TE_{owner}$) replies to the first communication terminal (user's mobile phone, $TE_a$) (step F3).

The first communication terminal (user's mobile phone, $TE_a$) generates and updates encryption information ($K^*_{a,y}$), using the terminal individual information ($I_{a,w}$) corresponding to each of the second communication terminals (device, $nTE_z$) engaged with the group ($PN_y$), other than the second communication terminal (device, $nTE_z$) which has departed from the group ($PN_y$) (step F4). The first communication terminal (user's mobile phone, $TE_a$) transmits the updated encryption information ($K^*_{a,y}$) to the third communication terminal (owner's mobile phone, $TE_{owner}$) (step F5).

The third communication terminal (owner's mobile phone, $TE_{owner}$) updates the second distributed key ($U_{a,y}$), which corresponds to the first communication terminal (user's mobile phone, $Te_a$), to "$U^*_{a,y}$=Update($U_{a,y}, \Delta K_{PN,y}$)", using the difference in the group shared key ($\Delta K_{PN,y}$), and further, it encrypts the updated second distributed key ($U^*_{a,y}$), using the encryption information ($K^*_{a,y}$), and generates and updates encrypted distributed key information "$C^*_{a,y}$=$E(k^*_{a,y}, U^*_{a,y})$" (step F6). The third communication terminal (owner's mobile phone, $TE_{owner}$) transmits the difference in the group shared key ($\Delta K_{PN,y}$) and the encrypted distributed key information ($C^*_{a,y}$) to the management device (PNSP) (step F7). The management device (PNSP) updates the first distributed key ($S_{all,y}$), which corresponds to each group member, to "$S^*_{amy}$=Update($S_{all,y}, \Delta K_{PN,y}$)", using the difference in the group shared key ($\Delta K_{PN,y}$) (step F8).

[User Departure Stage]

Figure 95:
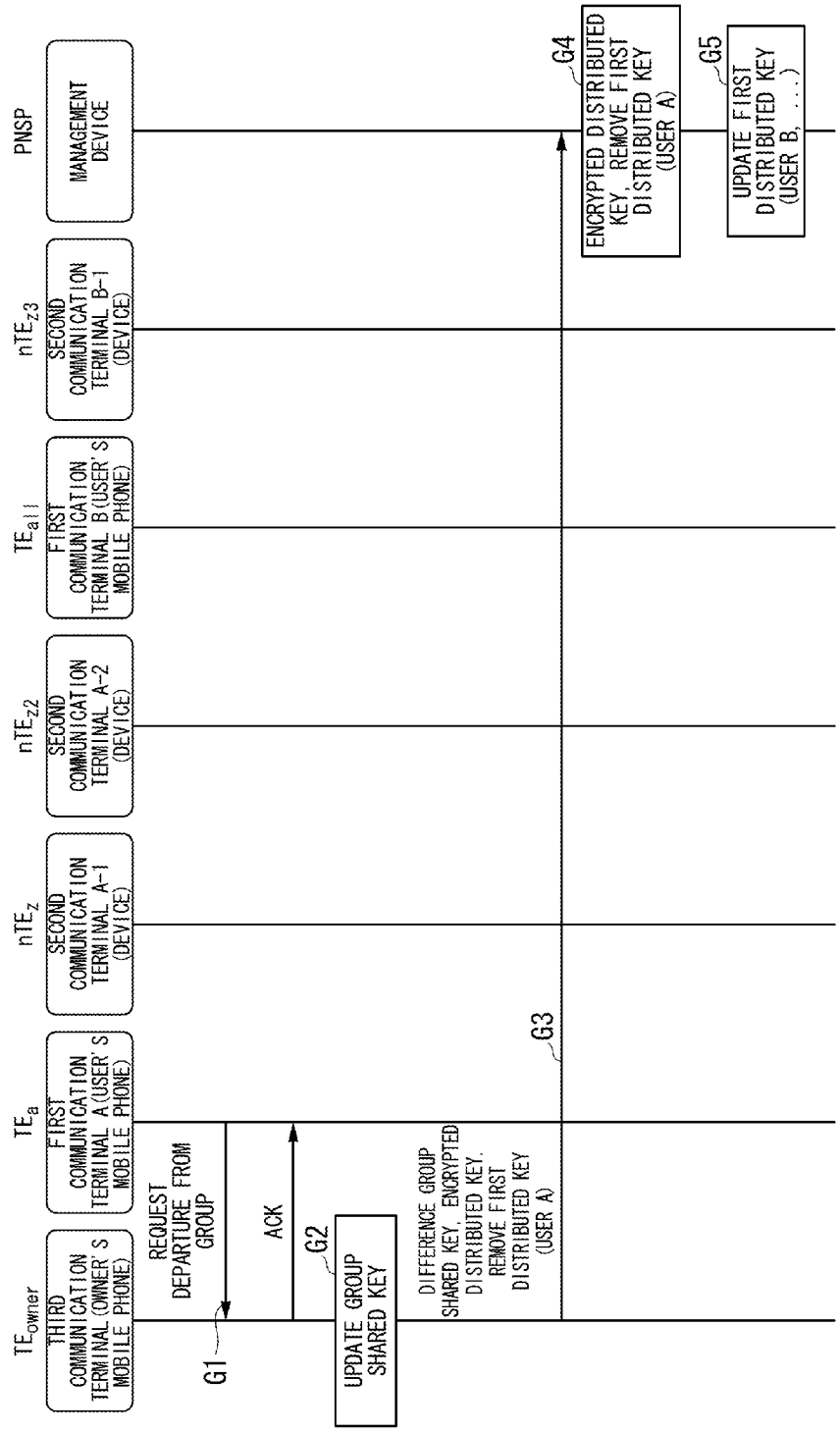
FIG. 95 is a sequence chart of a user departure stage according to Embodiment 15.

FIG. 95 is a sequence chart of a user departure stage according to Embodiment 15. This is a step to be performed when the group owner makes a user depart from the group. In FIG. 95, the first communication terminal (user's mobile phone, $TE_a$) requests the third communication terminal (owner's mobile phone, $TE_{owner}$) for removal of information ($C_{a,y}$) related to the first communication terminal (user's mobile phone, $TE_a$) (step G1). The third communication terminal (owner's mobile phone, $TE_{owner}$) replies to the first communication terminal (user's mobile phone, $TE_a$). The third communication terminal (owner's mobile phone, $TE_{owner}$)

updates the group shared key ($K_{PN,y}$) from "$K_{PN,y}$" to "$K^*_{PN,y}$" (step G2). The third communication terminal (owner's mobile phone, $TE_{owner}$) transmits the difference in the group shared key ($\Delta K_{PN,y}$) to the management device (PNSP), and requests it for removal of the encrypted shared key information ($C_{a,y}$) related to the first communication terminal (user's mobile phone, $TE_a$) and the first distributed key ($S_{a,y}$) (step G3).

The management device (PNSP) removes the encrypted shared key information ($C_{a,y}$) related to the first communication terminal (user's mobile phone, $TE_a$) and the first distributed key ($S_{a,y}$) (step G4). The management device (PNSP) updates the first distributed key ($S_{all,y}$), which corresponds to each of the other group members, to "$S^*_{all,y}=Update(S_{all,y}, \Delta K_{PN,y}$)", using the difference in the group shared key ($\Delta K_{PN,y}$) (step G5).

This completes the description of Embodiment 15.

The group shared key distribution method according to Embodiment 3 may be applied to Embodiment 10 through Embodiment 15 described above.

A program for realizing each step of the respective stages of the above respective embodiments may be recorded on a computer-readable recording medium, and this program recorded on the recording medium may be loaded and executed on a computer system, to thereby perform the key sharing process. A "computer system" here may be a system with an operating system and hardware devices such as peripheral devices included therein.

Moreover, the "computer system" may include a homepage-providing environment (or homepage displaying environment) in those cases where a WWW system is in use.

Furthermore, the "computer-readable recording medium" here refers to a storage device such as a flexible disk, an optical magnetic disk, a ROM, a writable non-volatile memory such as flash memory, a portable medium such as DVD (digital versatile disk), and a built-in hard disk drive of the computer system.

Moreover, the "computer-readable recording medium" here may include a recording medium which holds a program for a certain period of time such as a built-in volatile memory (for example, a dynamic random access memory) of a computer system which serves as a server or a client when the program is to be transmitted over a network such as the Internet or a communication line such as telephone line.

Moreover, the above program may be transferred from a computer system with this program stored in a storage device or the like to another computer system via a transfer medium or transmission waves in the transfer medium. Here, the "transfer medium" for transferring the program refers to a medium having a function of transferring information such as a network such as the Internet and a communication line such as telephone line.

Moreover, the above program may realize a portion of the function above. Furthermore, the program may be a so-called difference file (difference program), which can realize the function described above when combined with a program already recorded on a computer system.

The embodiments of the present inventions have been described with reference to the drawings. However, the specific configuration thereof is not limited to these embodiments, and it may include modifications to be made without departing from the scope of the invention.

According to these embodiments, it is possible to share a key (group shared key) for realizing highly secure communications within a group of a plurality of devices remotely located via a network (for example, user communication terminals and a HSS, user communication terminals and an application server, a user communication terminal and other user communication terminals, and the like), and perform communications in a form to guarantee confidentiality and integrity of communication contents. In a case where a certain device departs from the group, it is made possible that this device becomes unable after departure to restore the group shared key using information held on the device. As a result, it is possible to prevent the user who has departed from the group from intercepting communications performed within the group.

INDUSTRIAL APPLICABILITY

The present invention may be applied to a key sharing system in which a plurality of terminal devices perform key sharing on a network.

DESCRIPTION OF REFERENCE SYMBOLS

1 Key sharing system
11 Management device (PNSP)
12 Operator authentication infrastructure (IMS)
13 Non-registered communication terminal (nTE)
14 Registered communication terminal (TE)

The invention claimed is:

1. A key sharing system with communication terminals which belong to a same group, and a management device which holds information for sharing a group shared key among said communication terminals, wherein a first communication terminal among said communication terminals comprises;

a group shared key storage device that stores said group shared key;

a terminal individual information generation device that generates terminal individual information individually for each second communication terminal among said communication terminals;

a terminal individual information storage device that stores said terminal individual information;

a terminal key information generation device that generates terminal key information individually for each of said second communication terminals, using said terminal individual information;

a terminal key information transmission device that transmits said terminal key information to said second communication terminal;

an encryption information generation device that generates common encryption information for said second communication terminals, using said terminal individual information;

an encryption device that encrypts said group shared key, using said encryption information; and an encrypted shared key information transmission device that transmits encrypted shared key information obtained in said encryption to said management device, and said management device comprises:

an encrypted shared key information receiving device that receives encrypted shared key information from said first communication terminal;

an encrypted shared key information storage device that stores said received encrypted shared key information; and an encrypted shared key information transmission device that transmits encrypted shared key information stored in said encrypted shared key information storage device to said second communication terminal, and said second communication terminal comprises:
- a terminal key information receiving device that receives terminal key information from said first communication terminal;
- an encrypted shared key information receiving device that receives encrypted shared key information from said management device; and
- a decryption device that restores said group shared key, using said received terminal key information and said received encrypted shared key information, and
- when a situation arises where at least one of said second communication terminals departs from said group, said first communication terminal: updates encryption information, using the terminal individual information of said second communication terminals other than said at least, one of said second communication terminals; transmits encrypted shared key information, in which said group shared key is encrypted using the updated encryption information, to said management device; and updates the encrypted shared key information to be stored in said management device.

2. A communication terminal (first communication terminal) in a key sharing system with communication terminals which belong to a same group, and a management device which holds information for sharing a group shared key among said communication terminals, the communication terminal comprising:
- a group shared key storage device that stores said group shared key;
- a terminal individual information generation device that generates terminal individual information individually for each second communication terminal among said communication terminals;
- a terminal individual information storage device that stores said terminal individual information;
- a terminal key information generation device that generates terminal key information individually for each of said second communication terminals, using said terminal individual information;
- a terminal key information transmission device that transmits said terminal key information to said second communication terminal;
- an encryption information generation device that generates common encryption information for said second communication terminals, using said terminal individual information;
- an encryption device that encrypts said group shared key, using said encryption information; and
- an encrypted shared key information transmission device that transmits encrypted shared key information obtained in said encryption to said management device, wherein
- when a situation arises where at least one of said second communication terminals departs from said group, encryption information is updated using the terminal individual information of said second communication terminals other than said at least one of said second communication terminals; encrypted shared key information in which said group shared key is encrypted using the updated encryption information, is transmitted to said management device; and the encrypted shared key information to be stored in said management device is updated.

3. A key sharing method in a key sharing system with communication terminals which belong to a same group, and a management device which holds information for sharing a group shared key among said communication terminals, wherein there are included:
- a step in which a first communication terminal among said communication terminals stores said group shared key in a storage device;
- a step in which said first communication terminal generates terminal individual information individually for each second communication terminal among said communication terminals;
- a step in which said first communication terminal stores said terminal individual information in a storage device;
- a step in which said first communication terminal generates terminal key information individually for each of said second communication terminals, using said terminal individual information;
- a step in which said first communication terminal transmits said terminal key information to said second communication terminal;
- a step in which said first communication terminal generates common encryption information for said second communication terminals, using said terminal individual information;
- a step in which said first communication terminal encrypts said group shared key, using said encryption information;
- a step in which said first communication terminal transmits the encrypted shared key information obtained from said encryption to said management device;
- a step in which said management device receives the encrypted shared key information from said first communication terminal;
- a step in which said management device stores the received encrypted shared key information in a storage device;
- a step in which said management device transmits the encrypted shared key information stored in the storage device to said second communication terminal;
- a step in which said second communication terminal receives terminal key information from said first communication terminal;
- a step in which said second communication terminal receives the encrypted shared key information from said management device;
- a step in which said second communication terminal restores said group shared key, using the received terminal key information and the received encrypted shared key information;
- a step in which when a situation arises where at least one of said second communication terminals departs from said group, said first communication terminal updates the encryption information, using the terminal individual information of said second communication terminals other than said at least one of said second communication terminals;
- a step in which said first communication terminal transmits the encrypted shared key information, in which said group shared key is encrypted using the updated encryption information, to said management device; and
- a step in which said management device updates the encrypted shared key information stored in said storage device, using the encrypted shared key information received from said first communication terminal.

4. A key sharing system with communication terminals which belong to a same group, and a management device which holds information for sharing a group shared key among said communication terminals, wherein a third communication terminal among said communication terminals comprises a distributed key supply device that generates first and second distributed keys from said group shared key, supplying the first distributed key to said management device, and supplying the second distributed key to a first communication terminal among said communication terminals, and said first communication terminal comprises:

a distributed key storage device that stores said second distributed key;

a terminal individual information generation device that generates terminal individual information individually for each second communication terminal among said communication terminals;

a terminal individual information storage device that stores said terminal individual information;

a terminal key information generation device that generates terminal key information individually for each of said second communication terminals, using said terminal individual information;

a terminal key information transmission device that transmits said terminal key information to said second communication terminal;

an encryption information generation device that generates common encryption information for said second communication terminals, using said terminal individual information;

an encryption device that encrypts said second distributed key, using said encryption information; and an encrypted distributed key information transmission device that transmits encrypted distributed key information obtained in said encryption to said management device, and said management device comprises:

an encrypted distributed key information receiving device that receives encrypted distributed key information from said first communication terminal;

an encrypted distributed key information storage device that stores said received encrypted distributed key information;

a distributed key storage device that stores said first distributed key;

an encrypted distributed key information transmission device that transmits encrypted distributed key information stored in said encrypted distributed key information storage device to said second communication terminal; and a distributed key transmission device that transmits the first distributed key stored in said distributed key storage device to said second communication terminal, and said second communication terminal comprises:

a terminal key information receiving device that receives terminal key information from said first communication terminal;

an encrypted distributed key information receiving device that receives encrypted distributed key information from said management device;

a distributed key receiving device that receives the first distributed key from said management device;

a decryption device that restores said second distributed key, using said received terminal key information and said received encrypted distributed key information; and a distributed key combining device that restores said group shared key, combining said received first distributed key and said restored second distributed key, and when a situation arises where at least one of said second communication terminals departs from said group, said first communication terminal: updates encryption information, using the terminal individual information of said second communication terminals other than said at least one of said second communication terminals; transmits encrypted distributed key information, in which said second distributed key is encrypted using the updated encryption information, to said management device; and updates the encrypted distributed key information to be stored in said management device.

5. A communication terminal (first communication terminal) in a key sharing system with communication terminals which belong to a same group, and a management device which holds information for sharing a group shared key among said communication terminals, the communication terminal comprising:

a distributed key storage device that stores a second distributed key of said group shared key;

a terminal individual information generation device that generates terminal individual information individually for each second communication terminal among said communication terminals;

a terminal individual information storage device that stores said terminal individual information;

a terminal key information generation device that generates terminal key information individually for each of said second communication terminals, using said terminal individual information;

a terminal key information transmission device that transmits said terminal key information to said second communication terminal;

an encryption information generation device that generates common encryption information for said second communication terminals, using said terminal individual information;

an encryption device that encrypts said second distributed key, using said encryption information; and an encrypted distributed key information transmission device that transmits encrypted distributed key information obtained in said encryption to said management device, wherein when a situation arises where at least one of said second communication terminals departs from said group: encryption information is updated using the terminal individual information of said second communication terminals other than said at least one of said second communication terminals; encrypted distributed key information in which said distributed key is encrypted using the updated encryption information, is transmitted to said management device; and the encrypted distributed key information to be stored in said management device is updated.

6. A key sharing method in a key sharing system with communication terminals which belong to a same group, and a management device which holds information for sharing a group shared key among said communication terminals, wherein there are included:

a step in which a third communication terminal among said communication terminals generates first and second distributed keys from said group shared key;

a step in which said third communication terminal supplies the first distributed key to said management device, and supplies the second distributed key to a first communication terminal among said communication terminals;

a step in which the first communication terminal among said communication terminals stores the second distributed key of said group shared key in a storage device;

a step in which said first communication terminal generates terminal individual information individually for each second communication terminal among said communication terminals;

a step in which said first communication terminal stores said terminal individual information in a storage device;

a step in which said first communication terminal generates terminal key information individually for each of said second communication terminals, using said terminal individual information;

a step in which said first communication terminal transmits said terminal key information to said second communication terminal;

a step in which said first communication terminal generates common encryption information for said second communication terminals, using said terminal individual information;

a step in which said first communication terminal encrypts said second distributed key, using said encryption information;

a step in which said first communication terminal transmits the encrypted distributed key information obtained from said encryption to said management device;

a step in which said management device receives the encrypted distributed key information from said first communication terminal;

a step in which said management device stores said received encrypted distributed key information in a storage device;

a step in which said management device stores the first distributed key of said group shared key in the storage device;

a step in which said management device transmits the encrypted distributed key information stored in said storage device to said second communication terminal;

a step in which said management device transmits the first distributed key stored in said storage device to said second communication terminal;

a step in which said second communication terminal receives terminal key information from said first communication terminal;

a step in which said second communication terminal receives the encrypted distributed key information from said management device;

a step in which said second communication terminal receives the first distributed key from said management device;

a step in which said second communication terminal restores said second distributed key, using said received terminal key information and said received encrypted distributed key information;

a step in which said second communication terminal restores said group shared key, combining said received first distributed key and said restored second distributed key;

a step in which when a situation arises where at least one of said second communication terminals departs from said group, said first communication terminal updates the encryption information, using the terminal individual information of said second communication terminals other than said at least one of said second communication terminals;

a step in which said first communication terminal transmits the encrypted distributed key information, in which said second distributed key is encrypted using the updated encryption information, to said management device; and a step in which said management device updates the encrypted distributed key information stored in said storage device, using the encrypted distributed key information received from said first communication terminal.

7. A communication terminal (first communication terminal) in a key sharing system with communication terminals which belong to a same group and a key encryption device, the communication terminal comprising:

a terminal individual information generation device that generates terminal individual information individually for each second communication terminal among said communication terminals;

a terminal individual information storage device that stores said terminal individual information;

a terminal key information generation device that generates terminal key information individually for each of said second communication terminals, using said terminal individual information;

a terminal key information transmission device that transmits said terminal key information to said second communication terminal;

an encryption information generation device that generates common encryption information for said second communication terminals, using said terminal individual information; and an encryption information transmission device that transmits said encryption information to said key encryption device, wherein when a situation arises where at least one of said second communication terminals departs from said group, encryption information is updated using the terminal individual information of said second communication terminals other than said at least one of said second communication terminals, and the updated encryption information is transmitted to said key encryption device.

8. A key sharing system with communication terminals which belong to a same group, and a key encryption device, wherein a first communication terminal among said communication terminals comprises:

a terminal individual information generation device that generates terminal individual information individually for each second communication terminal among said communication terminals;

a terminal individual information storage device that stores said terminal individual information;

a terminal key information generation device that generates terminal key information individually for each of said second communication terminals, using said terminal individual information;

a terminal key information transmission device that transmits said terminal key information to said second communication terminal;

an encryption information generation device that generates common encryption information for said second communication terminals, using said terminal individual information; and an encryption information transmission device that transmits said encryption information to said key encryption device, and said key encryption device comprises:

an encryption information receiving device that receives said encryption information from said first communication terminal;

an encryption device that encrypts a group shared key of said group, using said encryption information;

an encrypted shared key information storage device that stores encrypted shared key information obtained from said encryption; and an encrypted shared key information transmission device that transmits said encrypted shared key information to said second communication terminal, and said second communication terminal comprises:

a terminal key information receiving device that receives terminal key information from said first communication terminal;

an encrypted shared key information receiving device that receives encrypted shared key information from said key encryption device; and a decryption device that restores said group shared key, using said received terminal key information and said received encrypted shared key information, and when a situation arises where at least one of said second communication terminals departs from said group, said first communication terminal updates the encryption information, using the terminal individual information of said second communication terminals other than said at least one of said second communication terminals, and transmits the updated encryption information to said key encryption device.

9. A key encryption device in a key sharing system with communication terminals which belong to a same group, and a key encryption device, wherein there are provided:

an encryption information receiving device that receives encryption information from a first communication terminal among said communication terminals;

an encryption device that encrypts a group shared key of said group, using said encryption information;

an encrypted shared key information storage device that stores encrypted shared key information obtained from said encryption; and an encrypted shared key information transmission device that transmits said encrypted shared key information to a second communication terminal among said communication terminals, wherein when at least one of said second communication terminals departs from said group, said encryption device updates said group shared key by using said encryption information which has been updated by using said terminal individual information of said second communication terminals other than said at least one of said second communication terminals.

10. A key sharing system with communication terminals which belong to a same group, and a group shared key transmission device, wherein said group shared key transmission device comprises;

a group shared key generation device that generates a group shared key of said group; and a group shared key transmission device that transmits said group shared key to a first communication terminal among said communication terminals, and said first communication terminal comprises:

a group shared key receiving device that receives said group shared key from said group shared key transmission device;

a terminal individual information generation device that generates terminal individual information individually for each second communication terminal among said communication terminals;

a terminal individual information storage device that stores said terminal individual information;

a terminal key information generation device that generates terminal key information individually for each of said second communication terminals, using said terminal individual information;

a terminal key information transmission device that transmits said terminal key information to said second communication terminal;

an encryption information generation device that generates common encryption information for said second communication terminals, using said terminal individual information;

an encryption device that encrypts said group shared key, using said encryption information;

an encrypted shared key information storage device that stores encrypted shared key information obtained horn said encryption; and an encrypted shared key information transmission device that transmits said encrypted shared key information to said second communication terminal, and said second communication terminal comprises:

a terminal key information receiving device that receives terminal key information from said first communication terminal;

an encrypted shared key information receiving device that receives encrypted shared key information from said first communication terminal; and a decryption device that restores said group shared key, using said received terminal key information and said received encrypted shared key information, and when a situation arises where at least one of said second communication terminals departs from said group, said first communication terminal updates the encryption information, using the terminal individual information of said second communication terminals other than said at least one of said second communication terminals remaining in said group.

11. A communication terminal (first communication terminal) in a key sharing system with communication terminals which belong to a same group and a group shared key transmission device, the communication terminal comprising:

a group shared key receiving device that receives a group shared key of said group from said group shared key transmission device;

a terminal individual information generation device that generates terminal individual information individually for each second communication terminal among said communication terminals;

a terminal individual information storage device that stores said terminal individual information;

a terminal key information generation device that generates terminal key information individually for each of said second communication terminals, using said terminal individual information;

a terminal key information transmission device that transmits said terminal key information to said second communication terminal;

an encryption information generation device that generates common encryption information for said second communication terminals, using said terminal individual information;

an encryption device that encrypts said group shared key, using said encryption information;

an encrypted shared key information storage device that stores encrypted shared key information obtained from said encryption; and an encrypted shared key information transmission device that transmits said encrypted shared key information to said second communication terminal, wherein
when a situation arises where at least one of said second communication terminals departs from said group, said first communication terminal updates the encryption information, using the terminal individual information of said second communication terminals other than said at least one of said second communication terminals.

12. A key sharing system with a first communication terminal and second communication terminals which belong to a same group, a key encryption device, and a management device, wherein
said first communication terminal comprises:
a terminal individual information generation device that generates terminal individual information individually for each of said second communication terminals;
a terminal individual information storage device that stores said terminal individual information;
a terminal key information generation device that generates terminal key information individually for each of said second communication terminals, using said terminal individual information;
a terminal key information transmission device that transmits said terminal key information to said second communication terminal;
an encryption information generation device that generates common encryption information for said second communication terminals, using said terminal individual information; and
an encryption information transmission device that transmits said encryption information to said key encryption device, and
said key encryption device comprises:
an encryption information receiving device that receives said encryption information from said first communication terminal;
an encryption device that encrypts a group shared key of said group, using said encryption information;
an encrypted shared key information storage device that stores encrypted shared key information obtained from said encryption; and
an encrypted shared key information transmission device that transmits said encrypted shared key information to said management device, and
said management device comprises:
an encrypted shared key information receiving device that receives said encrypted shared key information from said key encryption device;
an encrypted shared key information storage device that stores said encrypted shared key information; and
an encrypted shared key information transmission device that transmits said encrypted shared key information to said second communication terminal, and
said second communication terminal comprises:
a terminal key information receiving device that receives terminal key information from said first communication terminal;
an encrypted shared key information receiving device that receives encrypted shared key information from said management device; and
a decryption device that restores said group shared key, using said received terminal key information and said received encrypted shared key information, and
when a situation arises where at least one of said second communication terminals departs from said group, said first communication terminal updates the encryption information, using the terminal individual information of said second communication terminals other than said at least one of said second communication terminals, and transmits the updated encryption information to said key encryption device.

13. A management device in a key sharing system with a first communication terminal and second communication terminals which belong to a same group, a key encryption device, and a management device, wherein there are provided:
an encrypted shared key information receiving device that receives encrypted shared key information from said key encryption device;
an encrypted shared key information storage device that stores said encrypted shared key information; and
an encrypted shared key information transmission device that transmits said encrypted shared key information to said second communication terminals, wherein
when at least one of said second communication terminals departs from said group, said encrypted shared key information is updated based on said terminal individual information of said second communication terminals other than said at least one of said second communication terminals.

14. A key sharing system with communication terminals which belong to a same group, and a distributed key encryption device, wherein
a first communication terminal among said communication terminals comprises:
a terminal individual information generation device that generates terminal individual information individually for each second communication terminal among said communication terminals;
a terminal individual information storage device that stores said terminal individual information;
a terminal key information generation device that generates terminal key information individually for each of said second communication terminals, using said terminal individual information;
a terminal key information transmission device that transmits said terminal key information to said second communication terminal;
an encryption information generation device that generates common encryption information for said second communication terminals, using said terminal individual, information; and
an encryption information transmission device that transmits said encryption information to said distributed key encryption device, and
said distributed key encryption device comprises:
an encryption information receiving device that receives said encryption information from said first communication terminal;
an encryption device that encrypts, among first and second distributed keys generated from a group shared key of said group, said second distributed key, using said encryption information;
an encrypted distributed key information storage device that stores encrypted distributed key information obtained from said encryption;
an encrypted distributed key information transmission device that transmits said encrypted distributed key information to said second communication terminals; and
a first distributed key transmission device that transmits said first distributed key to said second communication terminal, and said second communication terminal comprises:
a terminal key information receiving device that receives terminal key information from said first communication terminal;
an encrypted distributed key information receiving device that receives encrypted distributed key information from said distributed key encryption device;
a distributed key receiving device that receives the first distributed key from said distributed key encryption device;
a decryption device that restores said second distributed key, using said received terminal key information and said received encrypted distributed key information; and
a distributed key combining device that restores said group shared key, combining said received first distributed key and said restored second distributed key, and
when a situation arises where at least one of said second communication terminals departs from said group, said first communication terminal updates the encryption information, using the terminal individual information of said second communication terminals other than said at least one of said second communication terminals, and transmits the updated encryption information to said distributed key encryption device.

15. A distributed key encryption device in a key sharing system with communication terminals which belong to a same group, and a distributed key encryption device, wherein there are provided:
an encryption information receiving device that receives encryption information from a first communication terminal among said communication terminals;
an encryption device that encrypts, among first and second distributed keys generated from a group shared key of said group, said second distributed key, using said encryption information;
an encrypted distributed key information storage device that stores encrypted distributed key information obtained from said encryption;
an encrypted distributed key information transmission device that transmits said encrypted distributed key information to a second communication terminal among said communication terminals; and
a first distributed key transmission device that transmits said first distributed key to said second communication terminal, wherein
when at least one of said second communication terminals departs from said group, said encryption device encrypts said second distributed key based on said terminal individual information of said second communication terminals other than said at least one of said second communication terminals.

16. A key sharing system with communication terminals which belong to a same group, and a distributed key transmission device, wherein
said distributed key transmission device comprises:
a group shared key generation device that generates a group shared key of said group;
a distributed key generation device that generates first and second distributed keys from said group shared key; and
a distributed key transmission device that transmits said first and second distributed keys to said second communication terminal among said communication terminals, and
said first communication terminal comprises:
a distributed key receiving device that receives said first and second distributed keys from said distributed key transmission device;

a terminal individual information generation device that generates terminal individual information individually for each second communication terminal among said communication terminals;
a terminal individual information storage device that stores said terminal individual information;
a terminal key information generation device that generates terminal key information individually for each of said second communication terminals, using said terminal individual information;
a terminal key information transmission device that transmits said terminal key information to said second communication terminal;
an encryption information generation device that generates common encryption information for said second communication terminals, using said terminal individual information;
an encryption device that encrypts said second distributed key, using said encryption information;
an encrypted distributed key information storage device that stores encrypted distributed key information obtained from said encryption;
an encrypted distributed key information transmission device that transmits said encrypted distributed key information to said second communication terminals; and
a first distributed key transmission device that transmits said first distributed key to said second communication terminal, and
said second communication terminal comprises;
a terminal key information receiving device that receives terminal key information from said first communication terminal;
an encrypted distributed key information receiving device that receives encrypted distributed key information from said first communication terminal;
a distributed key receiving device that receives the first distributed key from said first communication terminal;
a decryption device that restores said second distributed key, using said received terminal key information and said received encrypted distributed key information; and
a distributed key combining device that restores said group shared key, combining said received first distributed key and said restored second distributed key, and
when a situation arises where at least one of said second communication terminals departs from said group, said first communication terminal updates the encryption information, using the terminal individual information of said second communication terminals other than said at least one of said second communication terminals.

17. A communication terminal (first communication terminal) in a key sharing system with communication terminals which belong to a same group, and a distributed key transmission device, the communication terminal comprising:
a distributed key receiving device that receives first and second distributed keys generated from a group shared key of said group, from said distributed key transmission device;
a terminal individual information generation device that generates terminal individual information individually for each second communication terminal among said communication terminals;
a terminal individual information storage device that stores said terminal individual information;

a terminal key information generation device that generates terminal key information individually for each of said second communication terminals, using said terminal individual information;
a terminal key information transmission device that transmits said terminal key information to said second communication terminal;
an encryption information generation device that generates common encryption information for said second communication terminals, using said terminal individual information;
an encryption device that encrypts said second distributed key, using said encryption information;
an encrypted distributed key information storage device that stores encrypted distributed key information obtained from said encryption;
an encrypted distributed key information transmission device that transmits said encrypted distributed key information to said second communication terminals; and
a first distributed key transmission device that transmits said first distributed key to said second communication terminal, wherein
when a situation arises where at least one of said second communication terminals departs from said group, the encryption information is updated using the terminal individual information of said second communication terminals other than said at least one of said second communication terminals.

18. A key sharing system with a first communication terminal and second communication terminals which belong to a same group, a distributed key encryption device, and a management device, wherein
said first communication terminal comprises:
a terminal individual information generation device that generates terminal individual information individually for each of said second communication terminals;
a terminal individual information storage device that stores said terminal individual information;
a terminal key information generation device that generates terminal key information individually for each of said second communication terminals, using said terminal individual information;
a terminal key information transmission device that transmits said terminal key information to said second communication terminal;
an encryption information generation device that generates common encryption information for said second communication terminals, using said terminal individual information; and
an encryption information transmission device that transmits said encryption information to said distributed key encryption device, and
said distributed key encryption device comprises:
a group shared key generation device that generates a group shared key of said group;
a distributed key generation device that generates first and second distributed keys from said group shared key;
an encryption information receiving device that receives said encryption information from said first communication terminal;
an encryption device that encrypts said second distributed key, using said encryption information;
an encrypted distributed key information storage device that stores encrypted distributed key information obtained from said encryption;
an encrypted distributed key information transmission device that transmits said encrypted distributed key information to said management device; and
a first distributed key transmission device that transmits said first distributed key to said management device, and
said management device comprises:
an encrypted distributed key information receiving device that receives said encrypted distributed key information from said distributed key encryption device;
a distributed key receiving device that receives said first distributed key from said distributed key encryption device;
an encrypted distributed key information storage device that stores said encrypted distributed key information;
an encrypted distributed key information transmission device that transmits said encrypted distributed key information to said second communication terminals; and
a distributed key transmission device that transmits said first distributed key to said second communication terminal, and
said second communication terminal comprises:
a terminal key information receiving device that receives terminal key information from said first communication terminal;
an encrypted distributed key information receiving device that receives encrypted distributed key information from said management device;
a distributed key receiving device that receives the first distributed key from said management device;
a decryption device that restores said second distributed key, using said received terminal key information and said received encrypted distributed key information; and
a distributed key combining device that restores said group shared key, combining said received first distributed key and said restored second distributed key, and
when a situation arises where at least one of said second communication terminals departs from said group, said first communication terminal updates the encryption information, using the terminal individual information of said second communication terminals other than said at least one of said second communication, and transmits the updated encryption information to said distributed key encryption device.

19. A management device in a key sharing system with a first communication terminal and second communication terminals which belong to a same group, a distributed key encryption device, and a management device, wherein there are provided:
an encrypted distributed key information receiving device that receives encrypted distributed key information from said distributed key encryption device;
a distributed key receiving device that receives, among first and second distributed keys generated from a group shared key of said group, said first distributed key from said distributed key encryption device;
an encrypted distributed key information storage device that stores said encrypted distributed key information;
an encrypted distributed key information transmission device that transmits said encrypted distributed key information to said second communication terminals; and
a distributed key transmission device that transmits said first distributed key to said second communication terminal, wherein
when at least one of said second communication terminals departs from said group, said encrypted distributed key information is updated based on said terminal individual information of said second communication terminals other than said at least one of said second communication terminals.

20. A key sharing system with communication terminals which belong to a same group, and a group shared key transmission device, wherein
said group shared key transmission device comprises:
a group shared key generation device that generates a group shared key of said group; and
a group shared key transmission device that transmits said group shared key to a first communication terminal among said communication terminals, and said first communication terminal comprises:
a group shared key receiving device that receives said group shared key from said group shared key transmission device;
a terminal key information generation device that generates terminal key information individually for each second communication terminal among said communication terminals;
a terminal key information transmission device that transmits said terminal key information to said second communication terminal;
an encryption information generation device that generates encryption information which is common between said second communication terminals;
an encryption device that encrypts said group shared key, using said encryption information; and
an encrypted shared key information transmission device that transmits encrypted shared key information generated by said encryption device to said second communication terminal, and
said second communication terminal comprises:
a terminal key information receiving device that receives terminal key information from said first communication terminal;
an encrypted shared key information receiving device that receives encrypted shared key information from said first communication terminal; and
a decryption device that restores said group shared key, using said received terminal key information and said received encrypted shared key information, and
when a situation arises where at least one of said second communication terminals departs from said group, said first communication terminal generates the encryption information that is common between said second communication terminals other than said at least one of said second communication terminals.

21. A communication terminal (first communication terminal) in a key sharing system with communication terminals which belong to a same group and a group shared key transmission device, the communication terminal comprising:
a group shared key receiving device that receives a group shared key of said group from said group shared key transmission device;
a terminal key information generation device that generates terminal key information individually for each second communication terminal among said communication terminals;
a terminal key information transmission device that transmits said terminal key information to said second communication terminal;
an encryption information generation device that generates common encryption information for said second communication terminals;
an encryption device that encrypts said group shared key, using said encryption information;
an encrypted shared key information transmission device that transmits said encrypted shared key information generated by the encryption device to said second communication terminal, wherein
when at least one of said second communication terminals departs from said group, said first communication terminal generates the encryption information that is common between said second communication terminals other than said at least one of said second communication terminals.

22. A computer program stored in a non-transitory computer-readable storage medium of a computer of a key sharing system including a communication terminal (first communication terminal), communication terminals which belong to a same group and a group shared key transmission device, the computer program comprising instructions of:
receiving group shared key of said group from said group shared key transmission device;
generating terminal key information individually for each second communication terminal among said communication terminals;
transmitting said terminal key information to said second communication terminal; generating common encryption information for said second communication terminals;
encrypting said group shared key, using said encryption information;
transmitting said encrypted shared key information generated by an encryption operation to said second communication terminal; and
when at least one of said second communication terminals departs from said group, generating the encryption information that is common between said second communication terminals other than said at least one of said second communication terminals.

* * * * *